United States Patent
Kirkpatrick et al.

(10) Patent No.: US 6,424,099 B1
(45) Date of Patent: Jul. 23, 2002

(54) HIGH OUTPUT LAMP WITH HIGH BRIGHTNESS

(75) Inventors: Douglas A. Kirkpatrick, Great Falls, VA (US); Gary K. Bass, Mt. Airy, MD (US); Jesse F. Copsey, Germantown, MD (US); William E. Garber, Jr., Poolesville, MD (US); Vincent H. Kwong, Vancouver (CA); Izrail Levin, Silver Spring, MD (US); Donald A. MacLennan, Gaithersburg, MD (US); Robert J. Roy, Frederick, MD (US); Paul E. Steiner; Peter Tsai, both of Olney, MD (US); Brian P. Turner, Damascus, MD (US)

(73) Assignee: Fusion Lighting, Inc., Rockville, MD (US)

( * ) Notice: Subject to any disclaimer, the term of this patent is extended or adjusted under 35 U.S.C. 154(b) by 0 days.

(21) Appl. No.: 09/776,698

(22) Filed: Feb. 6, 2001

Related U.S. Application Data

(63) Continuation of application No. PCT/US00/16302, filed on Jun. 29, 2000.
(60) Provisional application No. 60/141,891, filed on Jul. 2, 1999, provisional application No. 60/144,834, filed on Jul. 21, 1999, provisional application No. 60/157,104, filed on Oct. 4, 1999, provisional application No. 60/188,205, filed on Mar. 10, 2000, and provisional application No. 60/210,154, filed on Jun. 2, 2000.

(51) Int. Cl.$^7$ ............................................... H05B 41/16
(52) U.S. Cl. ...................................... 315/248; 315/246
(58) Field of Search ................................. 315/244, 246, 315/248, 276, 344, 112–119, 289, 39; 313/153, 572

(56) References Cited

U.S. PATENT DOCUMENTS 3,873,884 A    3/1975   Gabriel ........................ 315/267

(List continued on next page.)

FOREIGN PATENT DOCUMENTS

| EP | 0549192 | 6/1993 | ............ G01S/7/282 |
| EP | 0604133 | 12/1993 | ............ H05B/41/29 |
| EP | 0727923 | 4/1999 | ............ H05H/1/46 |
| WO | 93/23975 | 11/1993 | ............ H05B/41/16 |
| WO | 99/36940 | 7/1999 | ............ H01J/65/04 |

OTHER PUBLICATIONS

D.O. Wharmby, PhD: "Electrodeless Lamps for Lighting: A Review," IEEE Proceedings–A, vol. 1240, No. 6, Nov. 1993, pp 465–473.

(List continued on next page.)

*Primary Examiner*—Don Wong
*Assistant Examiner*—Wilson Lee
(74) *Attorney, Agent, or Firm*—Paul E. Steiner

(57) ABSTRACT

An ultra bright, low wattage inductively coupled electrodeless aperture lamp is powered by a solid state RF source in the range of several tens to several hundreds of watts at various frequencies in the range of 400 to 900 MHz. Numerous novel lamp circuits and components are disclosed including a wedding ring shaped coil having one axial and one radial lead, a high accuracy capacitor stack, a high thermal conductivity aperture cup and various other aperture bulb configurations, a coaxial capacitor arrangement, and an integrated coil and capacitor assembly. Numerous novel RF circuits are also disclosed including a high power oscillator circuit with reduced complexity resonant pole configuration, parallel RF power FET transistors with soft gate switching, a continuously variable frequency tuning circuit, a six port directional coupler, an impedance switching RF source, and an RF source with controlled frequency-load characteristics. Numerous novel RF control methods are disclosed including controlled adjustment of the operating frequency to find a resonant frequency and reduce reflected RF power, controlled switching of an impedance switched lamp system, active power control and active gate bias control.

19 Claims, 73 Drawing Sheets

U.S. PATENT DOCUMENTS

| | | | |
|---|---|---|---|
| 3,995,194 A | 11/1976 | Blacker, Jr. et al. | 315/16 |
| 4,002,944 A | 1/1977 | McNeill et al. | 315/39 |
| 4,041,352 A | 8/1977 | McNeill et al. | 315/248 |
| 4,048,541 A | 9/1977 | Adams et al. | 315/248 |
| 4,383,203 A | 5/1983 | Stanley | 315/248 |
| 4,451,765 A | 5/1984 | Gray | 315/248 |
| 4,812,702 A | 3/1989 | Anderson | 313/153 |
| 4,910,439 A | 3/1990 | El-Hamamsy et al. | 315/248 |
| 5,013,977 A | 5/1991 | Droho | 315/289 |
| 5,214,357 A | 5/1993 | Dakin et al. | 315/248 |
| 5,404,076 A | 4/1995 | Dolan et al. | 313/572 |
| 5,589,740 A | 12/1996 | Rudolph et al. | 315/291 |
| 5,619,103 A | 4/1997 | Tobin et al. | 315/111.21 |
| 5,688,357 A | 11/1997 | Hanawa | 156/345 |
| 5,731,667 A | 3/1998 | Luchetta et al. | 315/323 |
| 5,773,918 A | 6/1998 | Dolan et al. | 313/113 |
| 5,831,396 A | 11/1998 | Rudolph | 315/307 |
| 5,903,091 A | 5/1999 | MacLennan et al. | 313/161 |
| 5,929,717 A | 7/1999 | Richardson et al. | 333/17.3 |
| 5,982,099 A | 11/1999 | Barnes et al. | 315/111.21 |
| 5,990,632 A | 11/1999 | Smith et al. | 315/248 |
| 6,027,601 A | 2/2000 | Hanawa | 156/345 |
| 6,080,149 A | 6/2000 | Huang et al. | 606/32 |
| 6,137,237 A * | 10/2000 | MacLennan et al. | 315/248 |
| 6,297,583 B1 * | 10/2001 | Kohne et al. | 315/248 |

OTHER PUBLICATIONS

R.B. Piejack, V.A. Godyak and B.M. Alexandrovich: "A Simple Analysis of an Inductive RF Discharge," Plasma Sources Sci. Technol. 1, 1992, pp 179–186.

V.A. Godyak, R.B. Piejack and B.M. Alexandrovich: "Electrical and Light Characteristics of RF–Inductive Fluorescent Lamps," Journal of the Illumination Engineering Society, Winter 1994, pp 40–44.

* cited by examiner

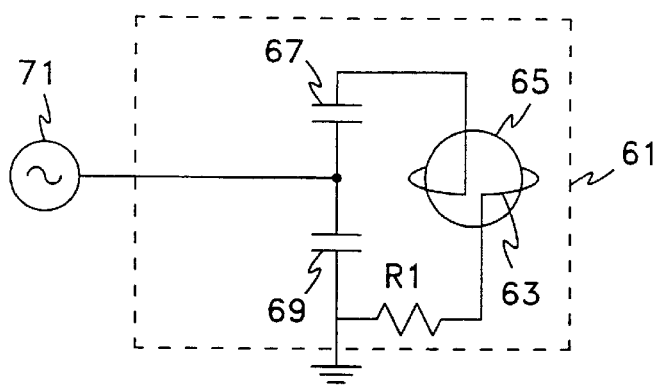
Fig. 16
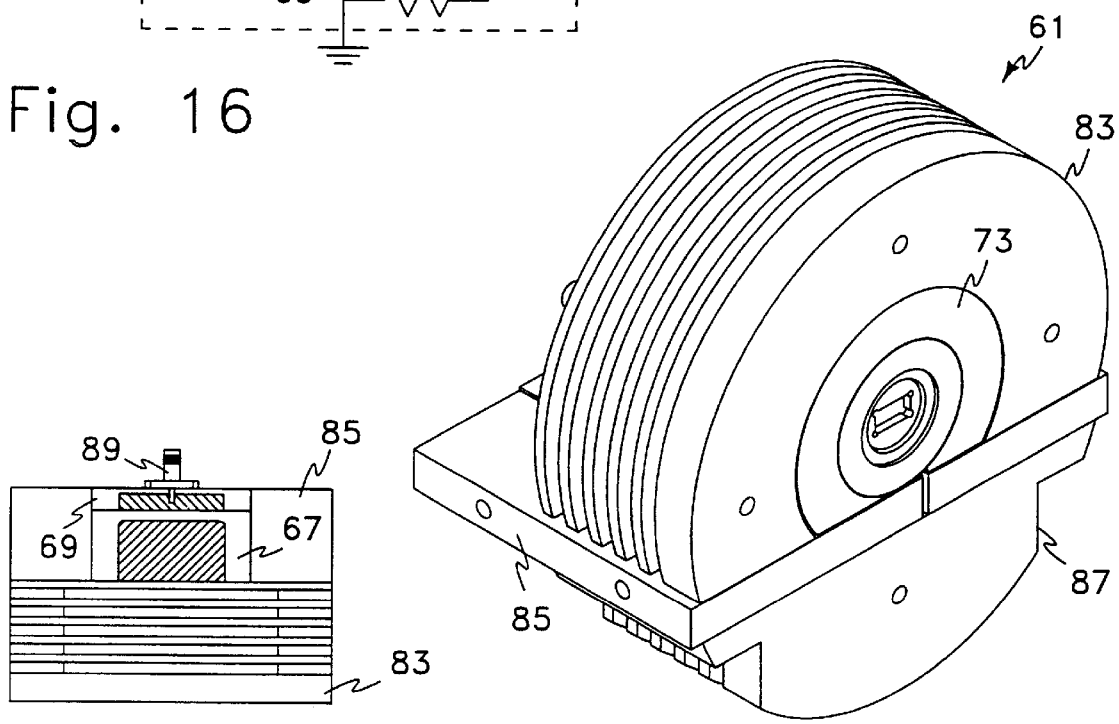
Fig. 18
Fig. 17
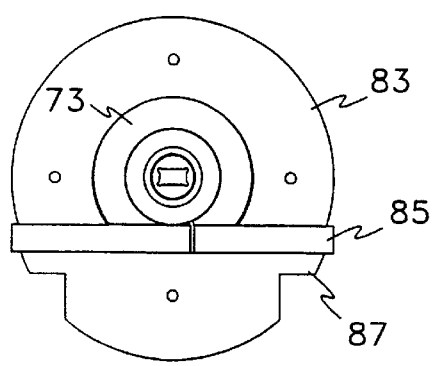
Fig. 19
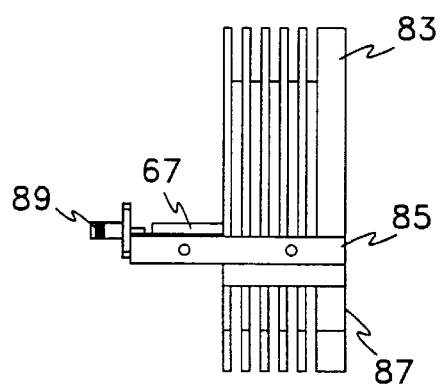
Fig. 20

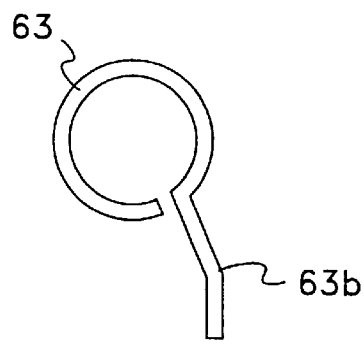
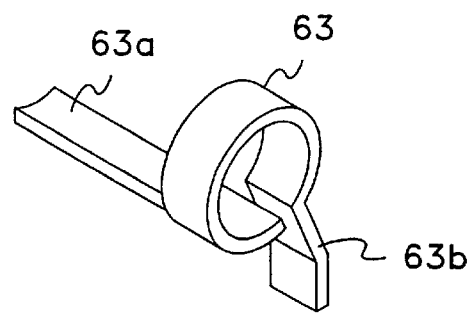
Fig. 27
Fig. 28
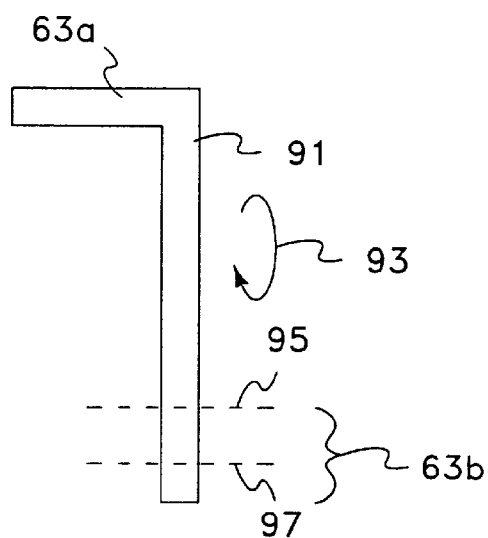
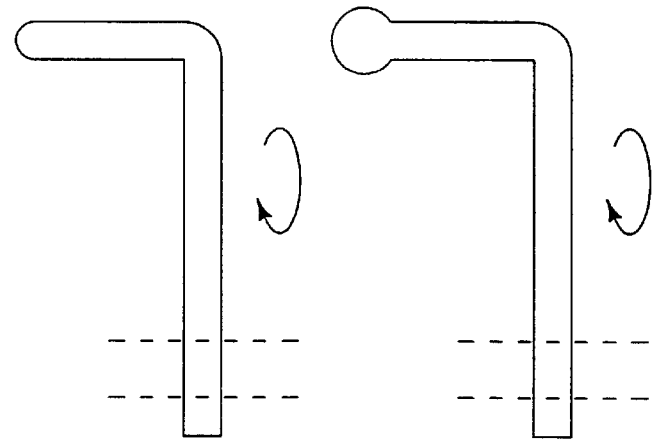
Fig. 29   Fig. 30   Fig. 31

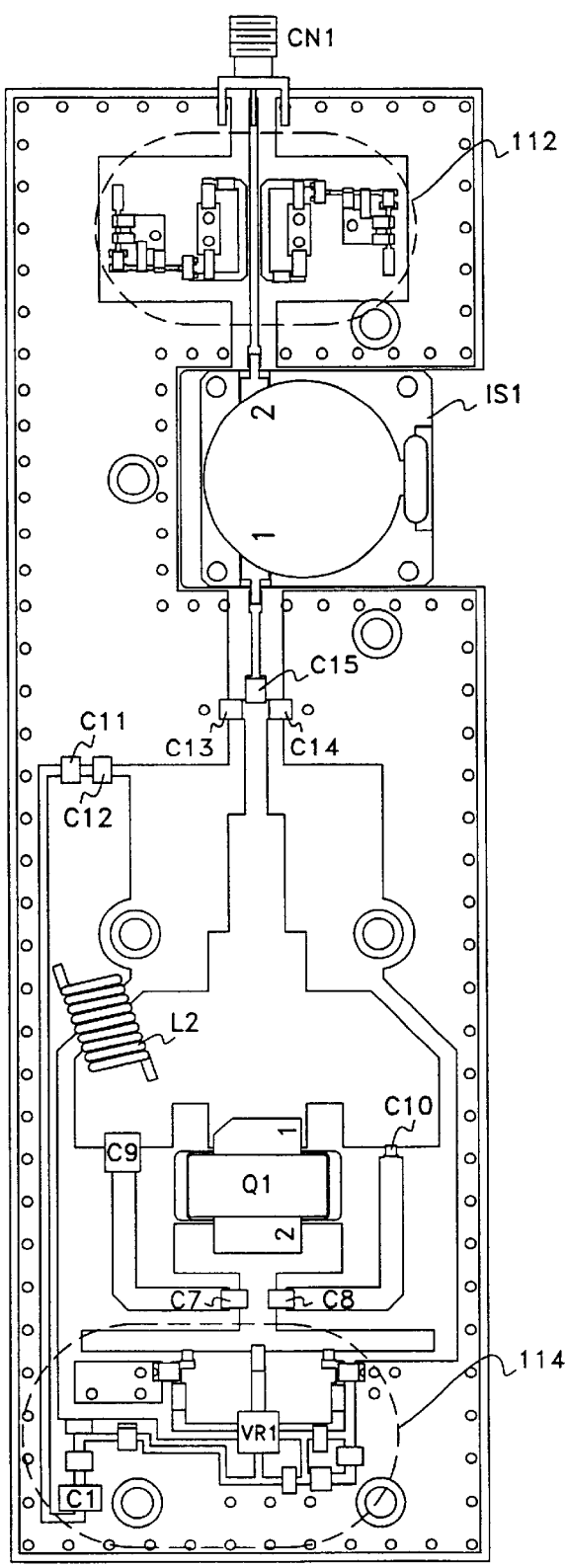
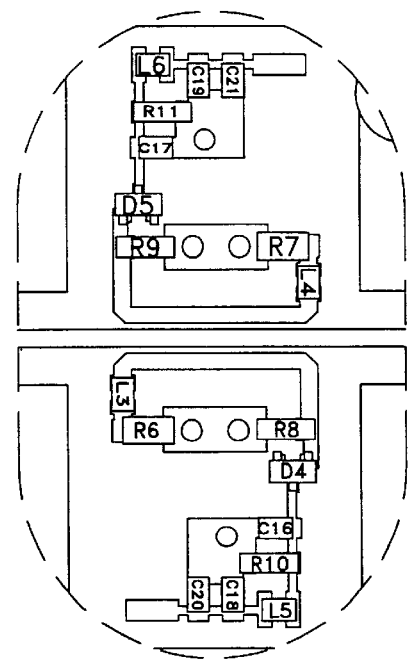
Fig. 112
Fig. 113
Fig. 111  Fig. 114

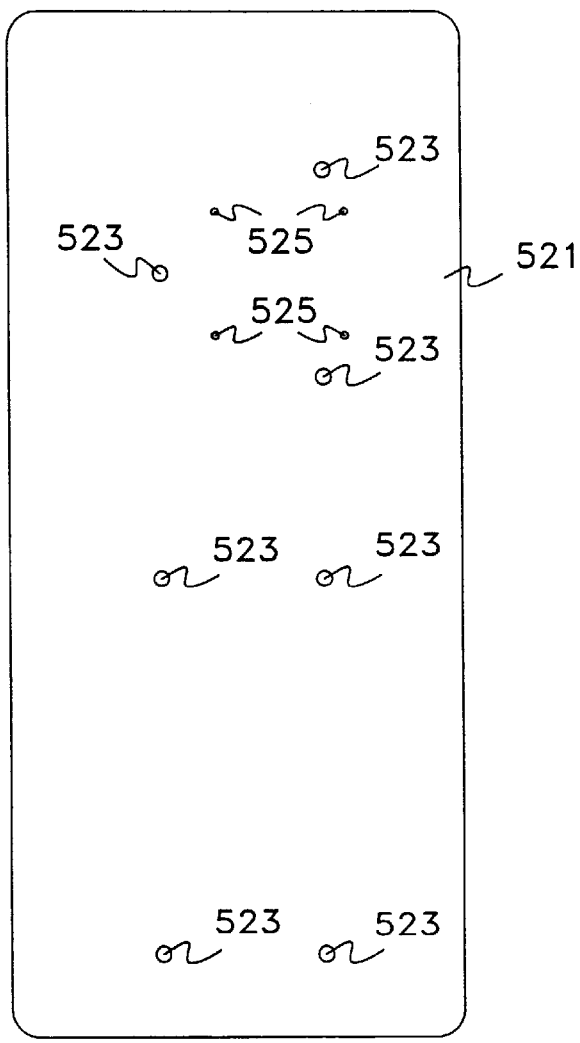
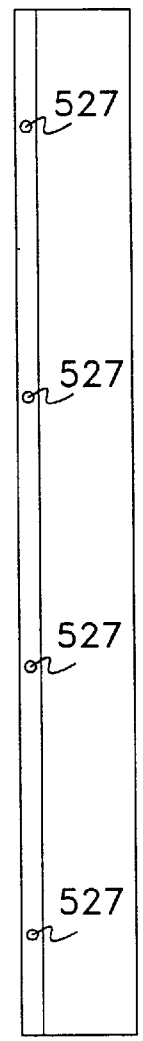
Fig. 115
Fig. 117
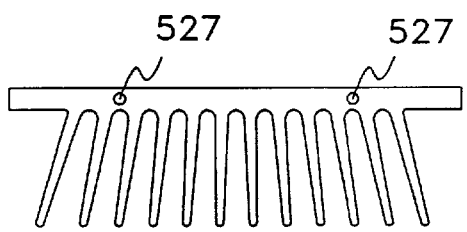
Fig. 116
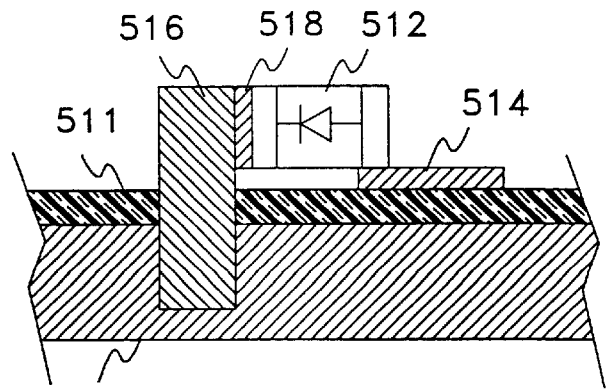
Fig. 118

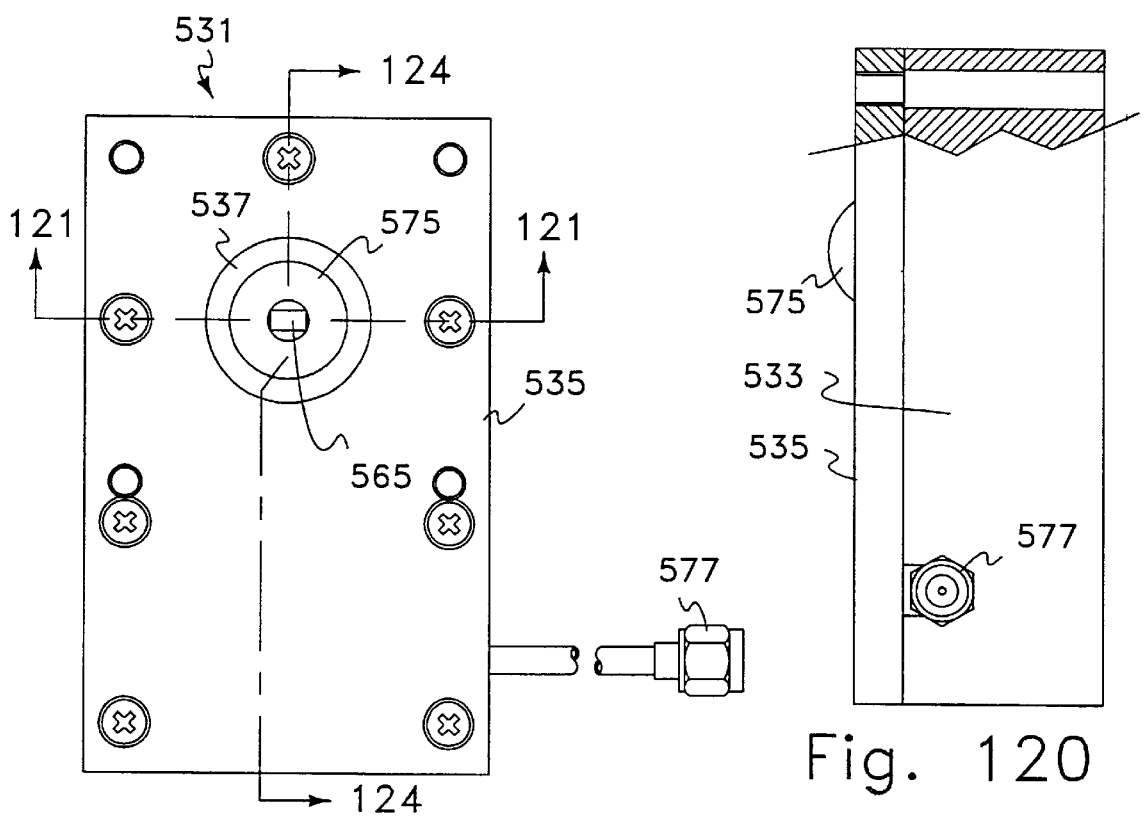
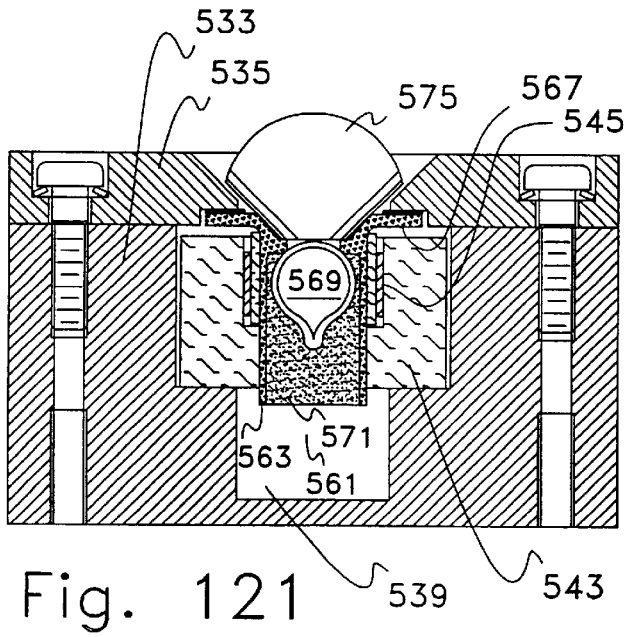
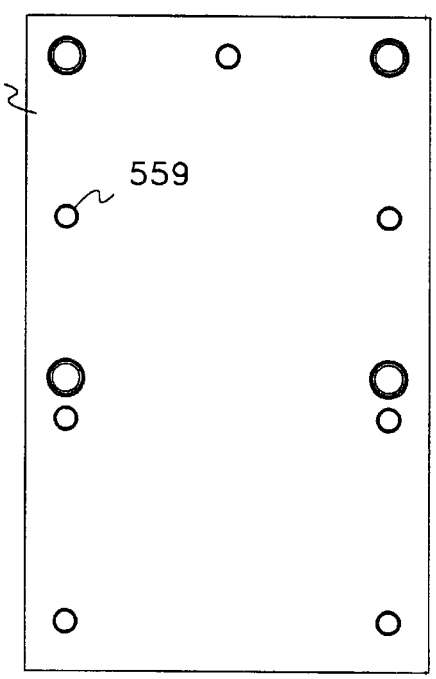
Fig. 119
Fig. 120
Fig. 121
Fig. 122

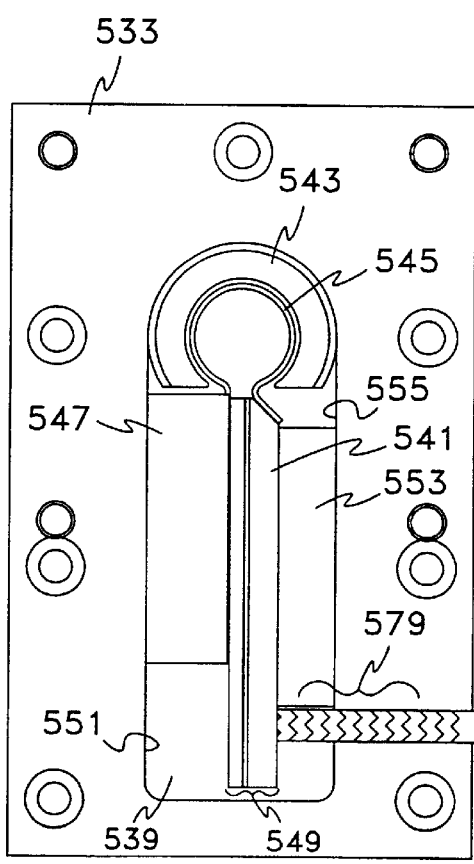
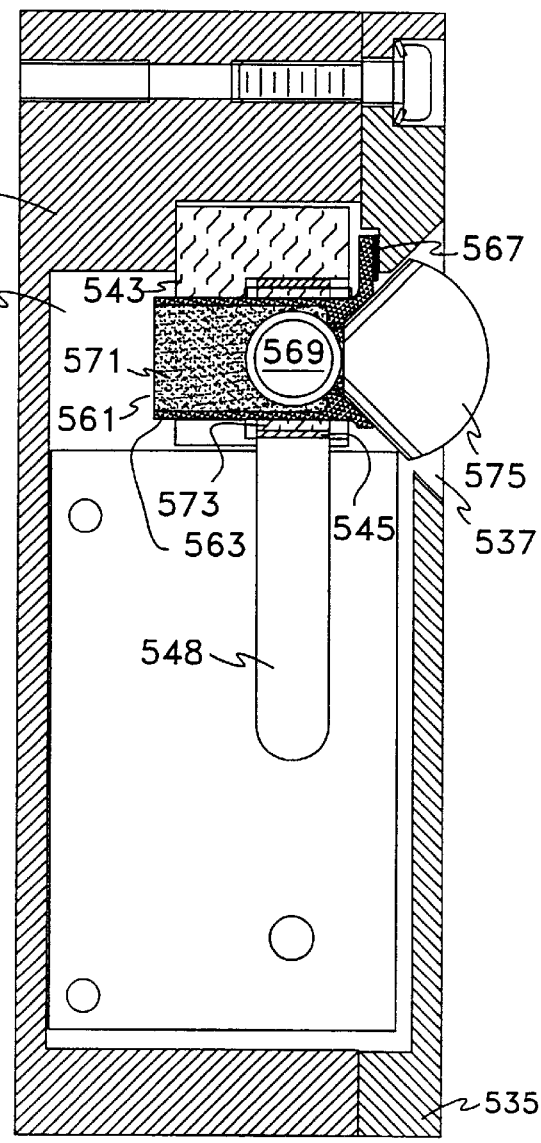
Fig. 123
Fig. 124

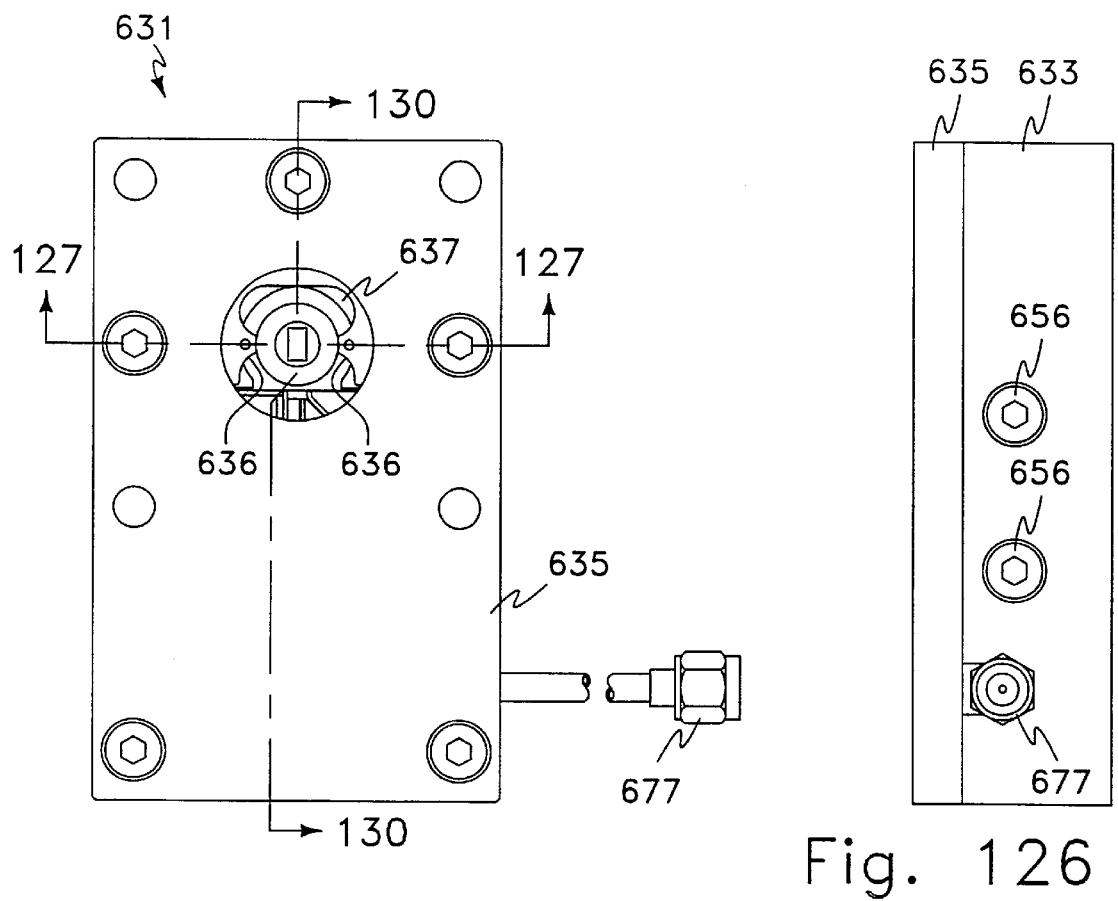
Fig. 125
Fig. 126
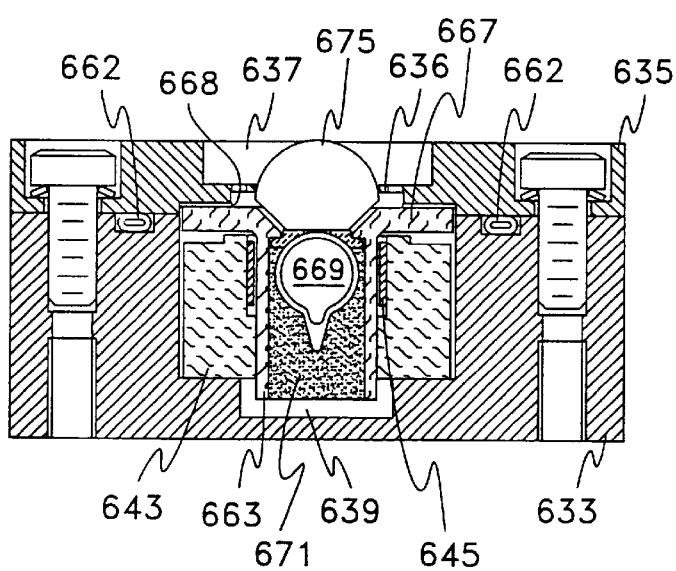
Fig. 127
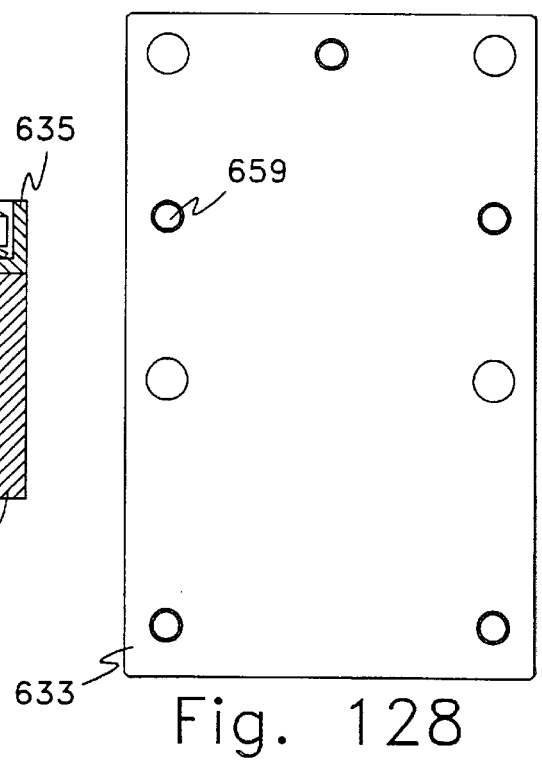
Fig. 128

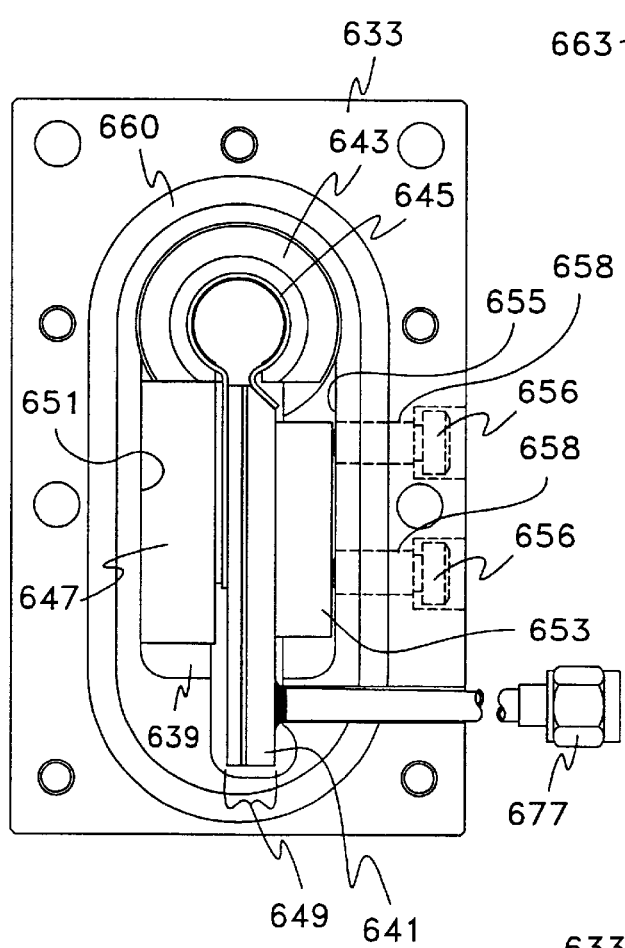
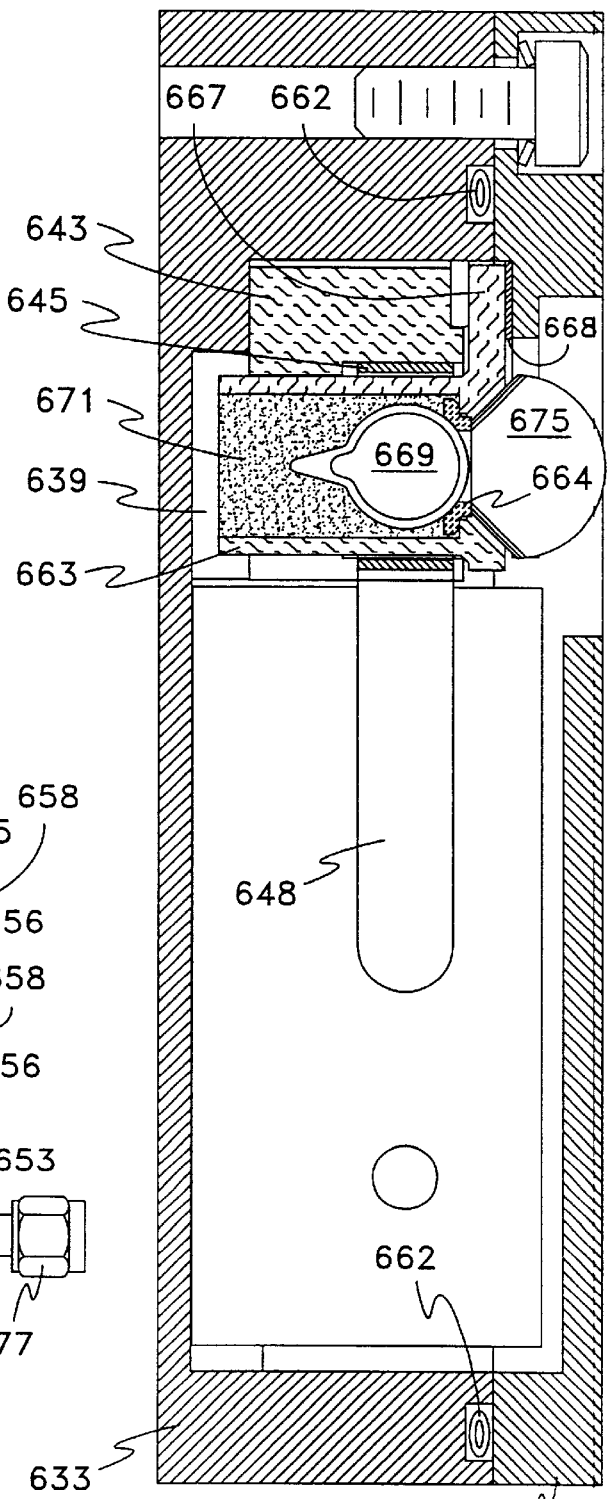
Fig. 129
Fig. 130

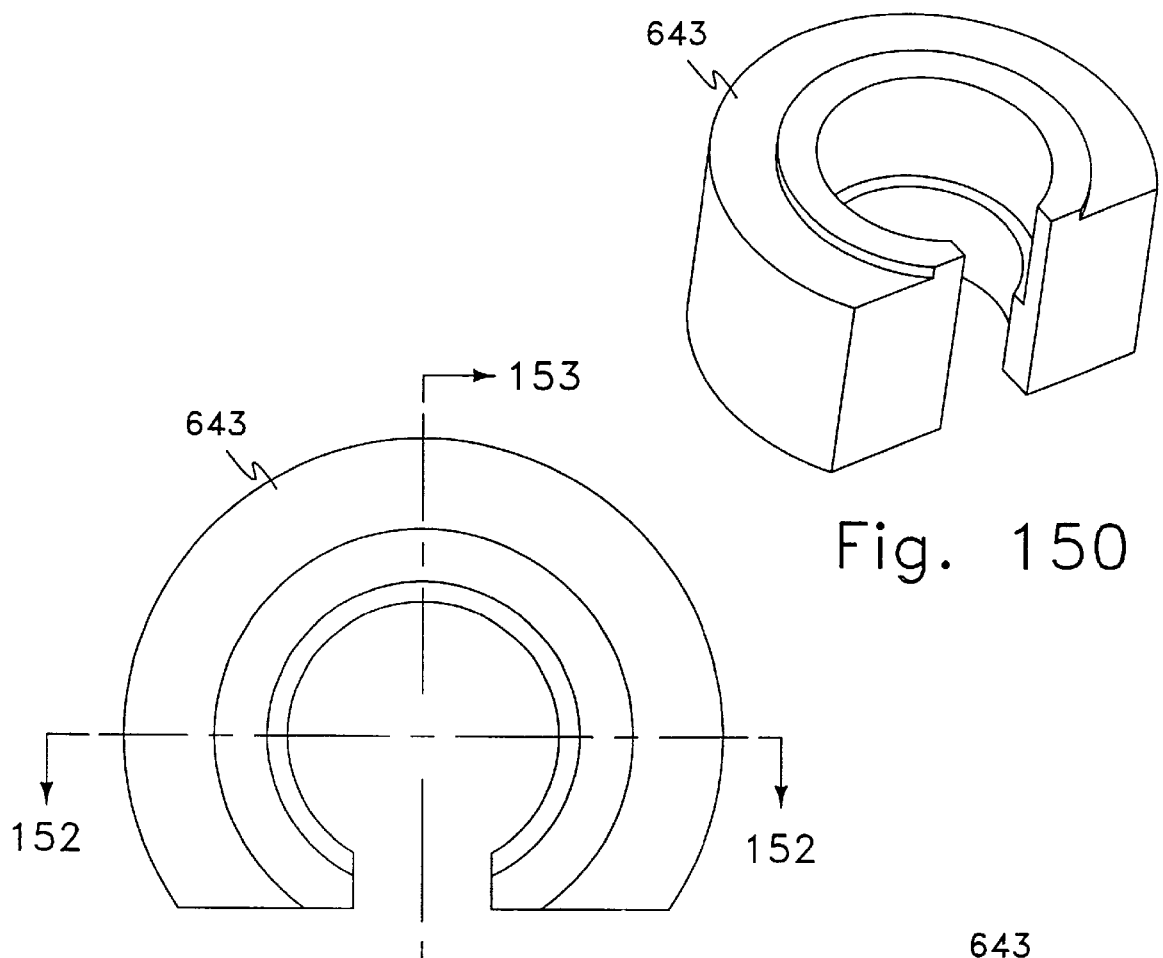
Fig. 150
Fig. 151
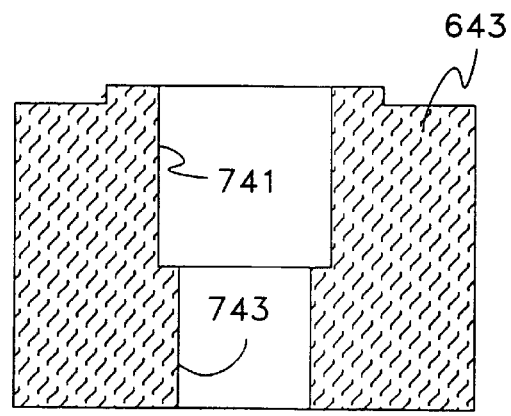
Fig. 152
Fig. 153

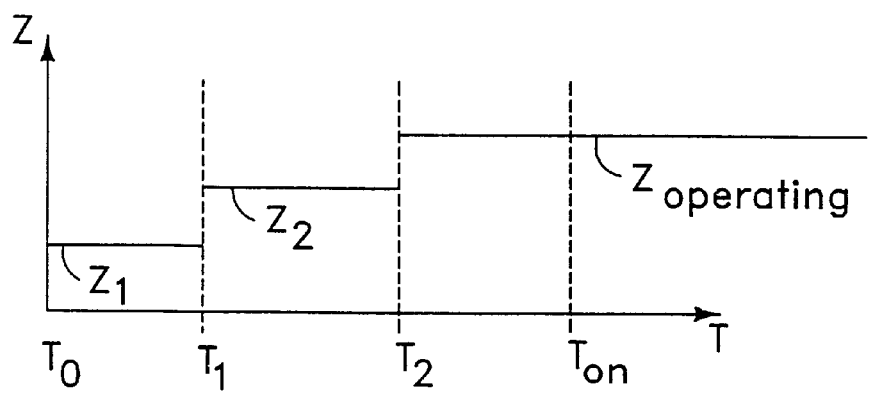
Fig. 164
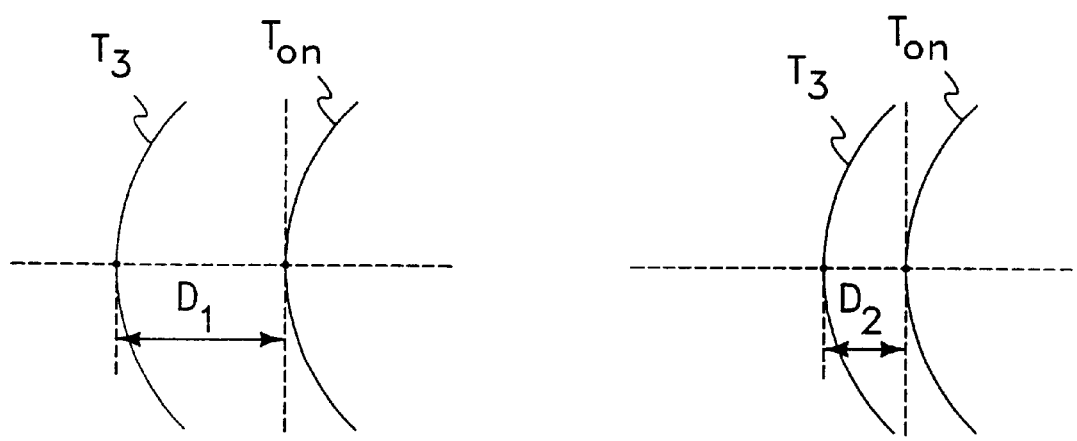
Fig. 165
Fig. 166

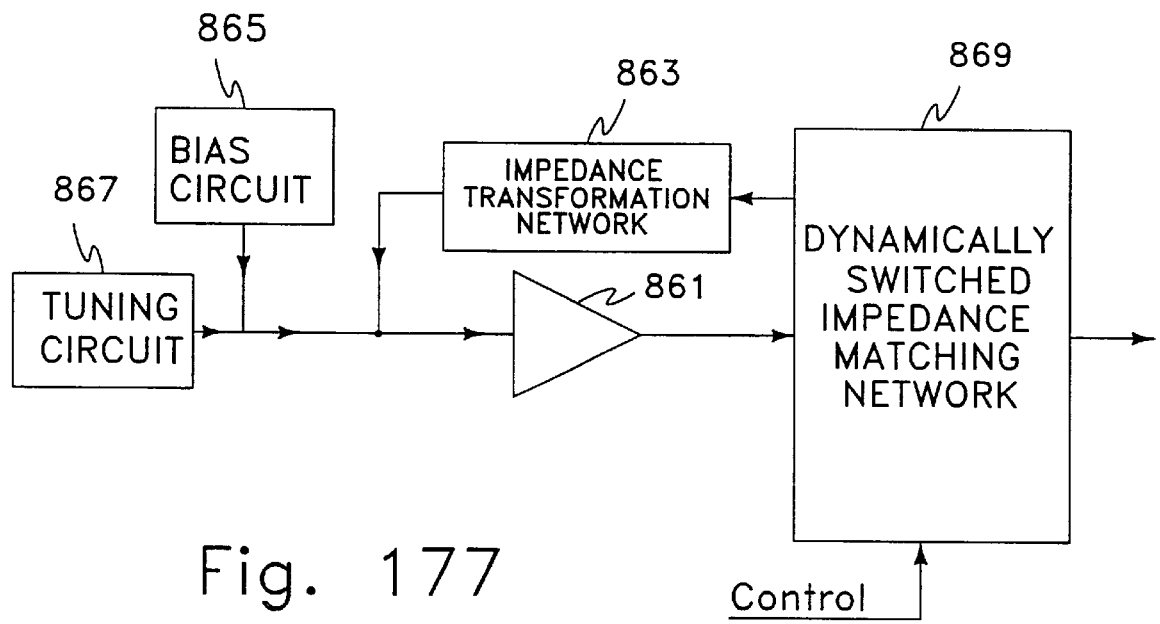
Fig. 177
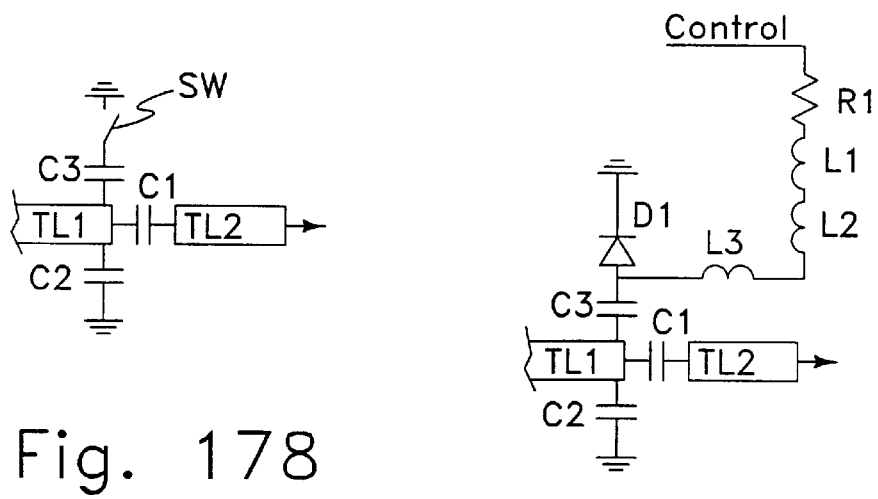
Fig. 178
Fig. 179

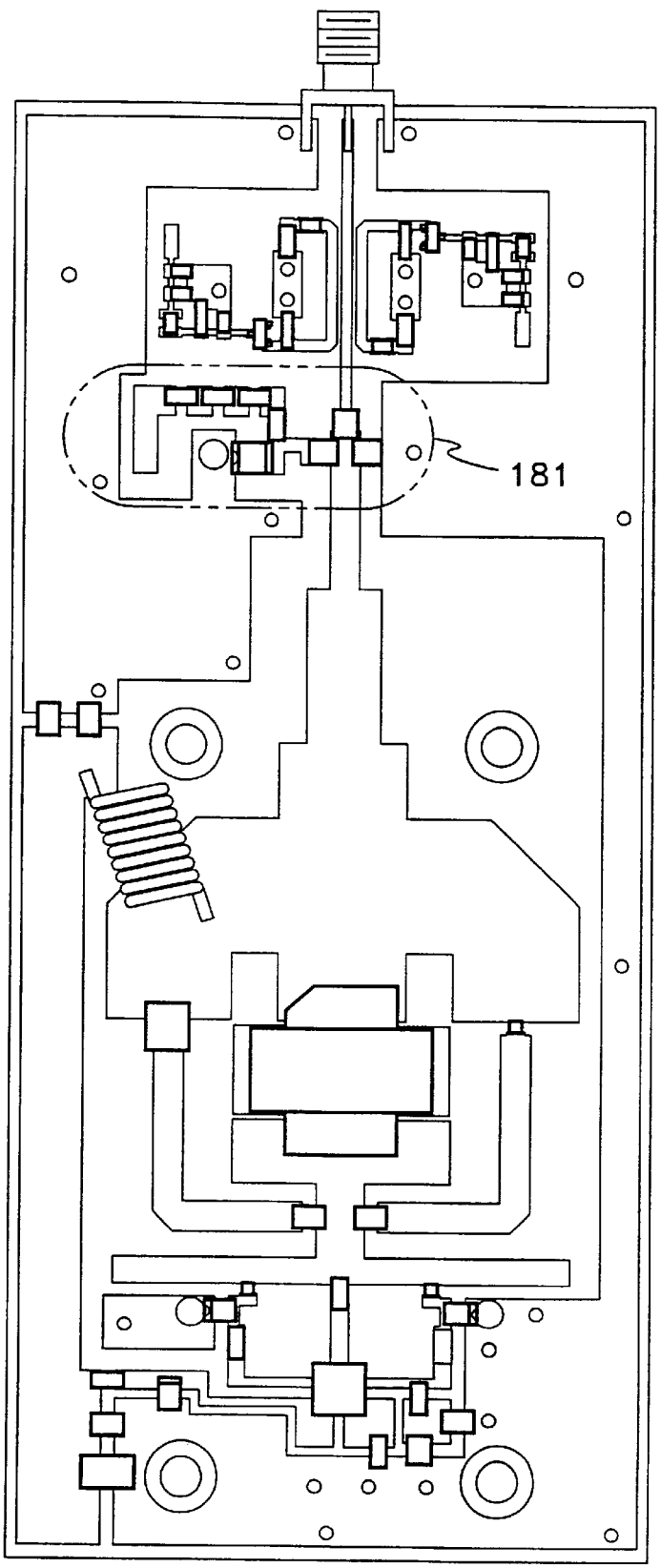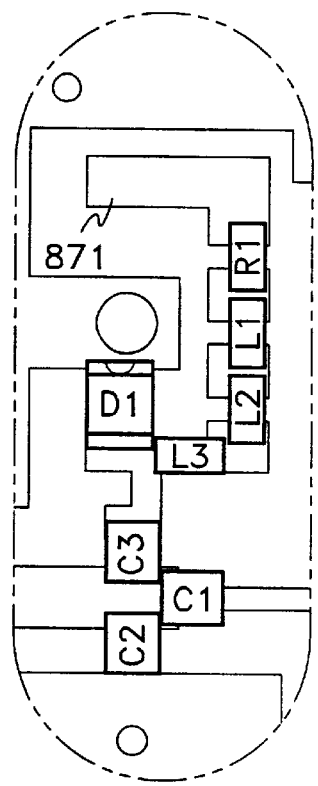
Fig. 180
Fig. 181

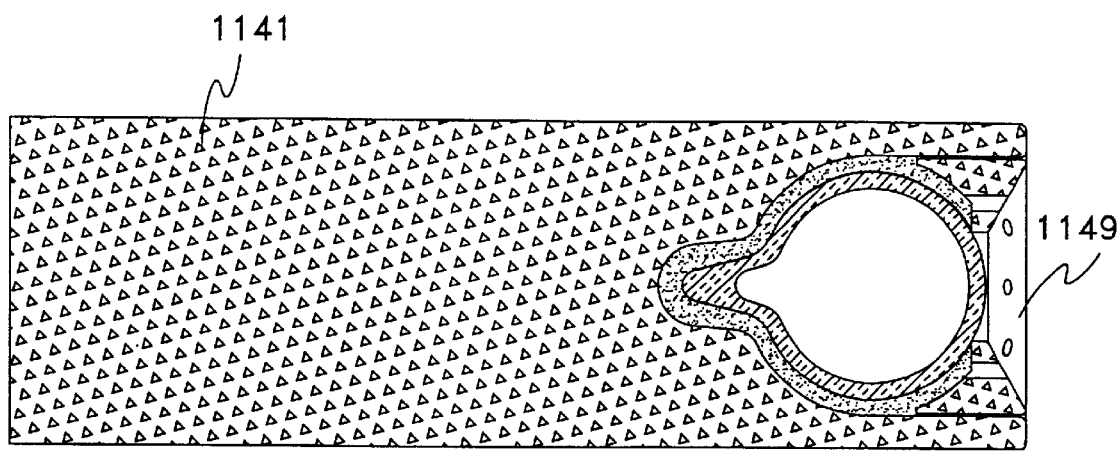
Fig. 200
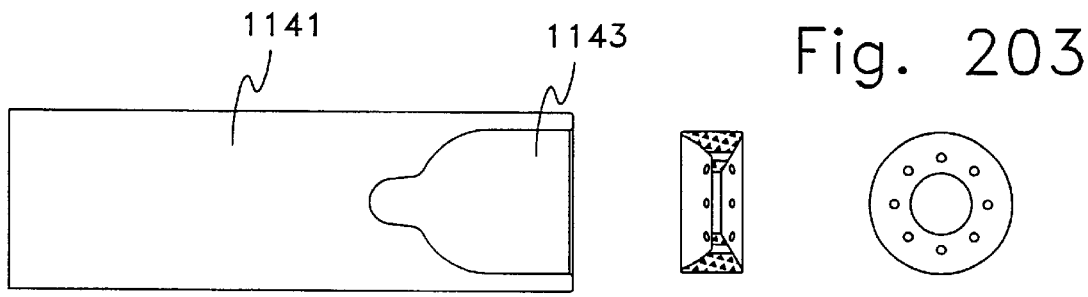
Fig. 201
Fig. 202
Fig. 203
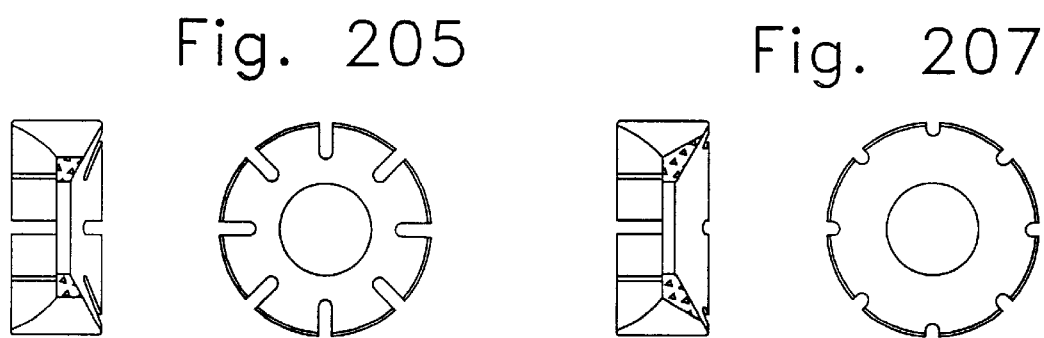
Fig. 204
Fig. 205
Fig. 206
Fig. 207

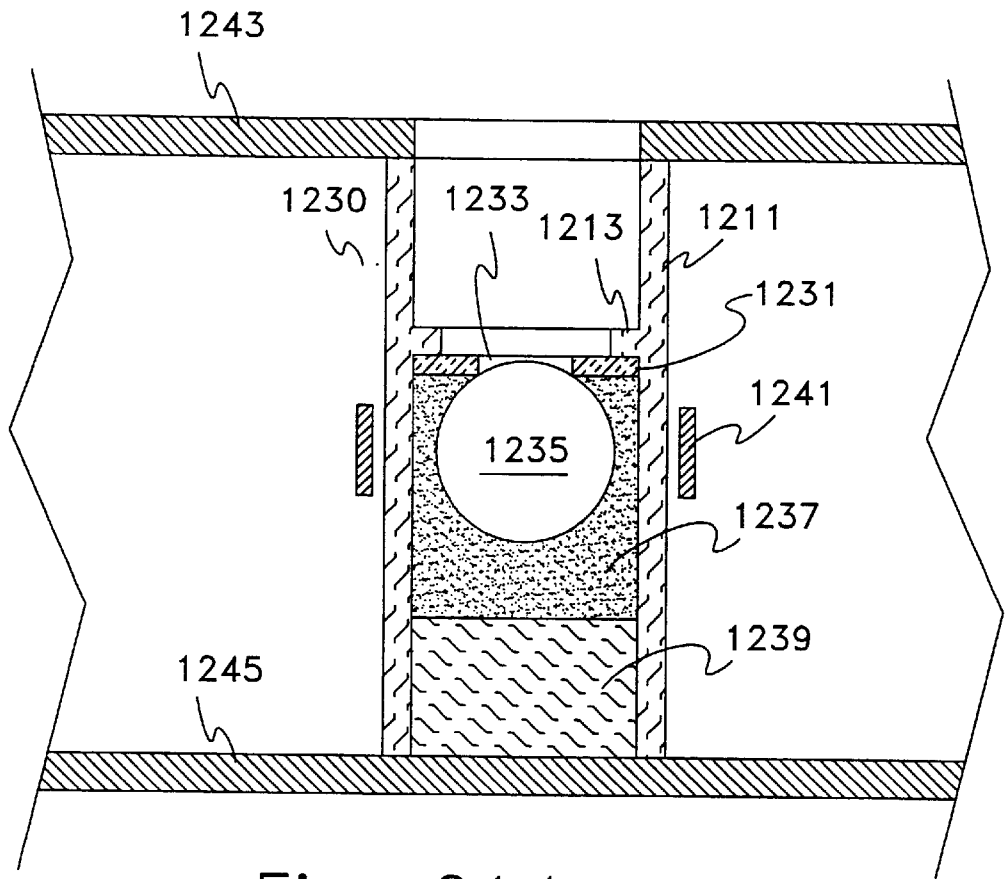
Fig. 214
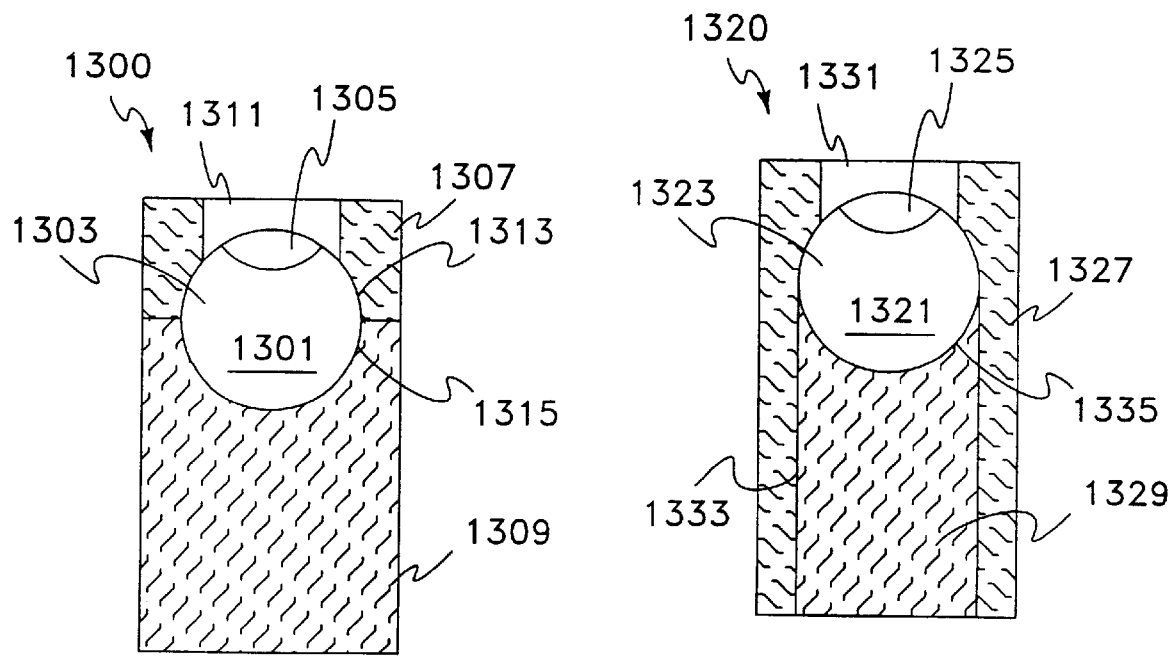
Fig. 215
Fig. 216

HIGH OUTPUT LAMP WITH HIGH BRIGHTNESS

CROSS REFERENCE TO RELATED APPLICATIONS

This application is a continuation of PCT/US00/16302, filed Jun. 29, 2000 and is related to U.S. Provisional patent application Nos. 60/141,891, filed Jul. 2, 1999, No. 60/144,834, filed Jul. 21, 1999, 60/157,104, filed Oct. 4, 1999, No. 60/188,205, filed Mar. 10, 2000, and No. 60/210,154, filed Jun. 2, 2000, each of which is herein incorporated by reference in its entirety.

Certain inventions described herein were made with Government support under Contract No. DE-FC01-97EE23776 awarded by the Department of Energy or Contract No. NAS10-99037 awarded by National Aeronautics and Space Administration. The Government has certain rights in those inventions.

BACKGROUND

1. Field of the Invention

The various aspects of the invention relate generally to discharge lamps, and more specifically to inductively coupled electrodeless lamps. The invention also relates to novel lamp configurations, coupling circuits, bulbs, heat dissipating lamp head assemblies, RF sources (oscillators), directional couplers, aperture structures, and excitation coils for inductively coupled electrodeless lamps. Another aspect of the invention also relates to an improved electrodeless aperture lamp, and to methods of making and using an electrodeless aperture lamp. The invention also relates generally to a novel high power, high frequency solid state oscillator. The invention further relates to a novel control circuit and method for operating an electrodeless lamp. Another aspect of the invention relates generally to RF driven loads with changing impedance characteristics.

2. Related Art

In general, the various aspects of the invention relate to the type of lamps disclosed in U.S. Pat. Nos. 5,404,076 and 5,903,091 and PCT Publication No. WO 99/36940, each of which is herein incorporated by reference in its entirety.

Electrodeless discharges are generally classified as either E discharges, microwave discharges, travelling wave discharges, or H discharges. Most examples of the invention relates to those discharges preponderantly characterized as H discharges.

FIG. 1 is a schematic diagram of a conventional electrodeless lamp which produces an E discharge. A power source 1 provides power to a capacitor 2. A gas-filled vessel 3 is placed between the plates of the capacitor 2. E discharges in electrodeless lamps are similar to arc discharges in an electroded lamp, except that current is usually much less in an electroded arc discharge. Once breakdown of the gas to its ionized or plasma state is achieved, current flows through the capacitance of the vessels walls between the plates of the capacitor 2, thereby producing a discharge current in the plasma.

FIG. 2 is a schematic diagram of a conventional electrodeless lamp which produces a microwave discharge. A microwave power source 4 provides microwave energy which is directed by a waveguide 5 to a microwave cavity 6 which houses a gas-filled bulb 7. The microwave energy excites the fill in the bulb 7 and produces a plasma discharge. In a microwave discharge, the wavelength of the electromagnetic field is comparable to the dimensions of the exciting structure, and the discharge is excited by both E and H components of the field.

FIG. 3 is a schematic diagram of a conventional electrodeless lamp which produces a travelling wave discharge. A power source 8 provides power to a launcher 9. A gas-filled vessel 10 is disposed in the launcher 9. The gap between the electrodes of the launcher 9 provides an E field which launches a surface wave discharge. The plasma in the vessel 10 is the structure along which the wave is then propagated.

FIG. 4 is a schematic diagram of a conventional electrodeless lamp which produces an H discharge. Electrodeless lamps which produce an H discharge are also referred to as inductively coupled lamps. As shown in FIG. 4, one example for a conventional inductively coupled lamp includes a low frequency power source 11 providing power to a coil 12 which is wound around a gas-filled vessel 13. The alternating current in the coil 12 causes a changing magnetic field, which induces an electric field which drives a current in the plasma. In effect, the plasma can be analyzed as a single turn secondary to the coil 12. An H discharge is characterized by a closed electrical field, which in many examples forms a visible donut-shaped plasma discharge.

A number of parameters characterize highly useful sources of light. These include spectrum, efficiency, brightness, economy, durability (working life), and others. For example, a highly efficient, low wattage light source with a long working life, particularly a light source with high brightness, represents a highly desirable combination of operating features. Electrodeless lamps have the potential to provide a much longer working life than electroded lamps.

SUMMARY

One aspect of the invention is to provide an ultra bright, low wattage electrodeless lamp which has many practical applications. Specifically, an aspect of the invention is to provide an electrodeless aperture lamp which is powered by a solid state RF source in the range of several tens to several hundreds of watts. Various aspects of the invention may be adapted to provide an excellent light source for such diverse applications as projection display, automotive headlamps and general illumination including office environments, schools, factories, shops, homes, and virtually anywhere which requires or benefits from artificial lighting.

According to one aspect of the invention, an inductively coupled electrodeless lamp includes an excitation coil; a capacitor structure connected to the excitation coil, the capacitor structure and excitation coil together forming a resonant lamp circuit; an electrodeless lamp bulb positioned proximate to the excitation coil, the bulb containing a fill which emits light when excited by RF energy; and an RF source connected to the resonant lamp circuit and adapted to provide RF energy for exciting the fill, wherein the capacitor structure is adapted to inhibit arcing during operation of the lamp. For example, the excitation coil comprises a wedding ring shaped excitation coil having an axial lead on one end and a radial lead on the other end, and wherein the capacitor structure comprises a capacitor stack connected to the axial lead of the wedding ring coil. The capacitor stack may include a material having a low dielectric constant for the high voltage capacitor an may further include a conformal coating covering at least a portion or substantially all of the capacitor stack and optionally a portion of the axial lead of the wedding ring coil. The capacitor stack may have a circular high voltage plate, which may include an edge radius which is larger than one half of the plate thickness. In some examples, the lamp may include a heat transfer structure providing a thermal conduction path from the capacitor structure to a heat dissipating structure.

According to another aspect of the invention, the capacitor structure comprises a coaxial capacitor circuit, including a first capacitor comprising a first cylindrical sleeve; a second capacitor comprising a second cylindrical sleeve disposed at least partially inside the first cylindrical sleeve of the first capacitor; and insulators disposed in between the first and second sleeves, wherein the first and second capacitors are connected in series with a center conductor being connected at a junction of the series connection.

According to another aspect of the invention, the lamp includes an enclosure housing the resonant lamp circuit, the enclosure comprising thermally conductive structures for transferring heat from the lamp circuit, and the enclosure comprises substantially flat outer surfaces for interfacing with further heat dissipating structures. The excitation coil may be made from copper. In some examples, the enclosure comprises a base portion and a cover, and a thermal gasket is disposed between the cover and the base. The coil and capacitor structure may be integrated in a single assembly, with the capacitor structure including a multi-layer printed circuit board adapted to form a capacitor stack.

According to yet another aspect of the invention, an inductively coupled electrodeless lamp includes an excitation coil; a capacitor structure connected to the excitation coil, the capacitor structure and excitation coil together forming a resonant lamp circuit; an electrodeless lamp bulb positioned proximate to the excitation coil, the bulb containing a fill which emits light when excited by RF energy; an RF source connected to the resonant lamp circuit and adapted to provide RF energy for exciting the fill; and a structure encasing the bulb except for a light emitting aperture, the structure comprising a ceramic material configured to promote heat transfer away from the bulb along a thermal path other than radially with respect to an axis of the coil. For example, the ceramic material comprises a high thermal conductivity material. In some examples, the material exhibits relatively higher thermal conductivity along a direction and the material is adapted such that the direction of higher thermal conductivity is aligned with an axis of the coil. For example, the material comprises boron nitride. The lamp may further include an enclosure housing the resonant lamp circuit, and the structure may include a ceramic cup with a flange, where a resilient, thermally conductive material is disposed between the flange and a heat dissipating structure inside the enclosure.

According to other aspects of the invention, the aperture structure includes a ceramic cylindrical rod defining a cavity at one end which is adapted to receive the bulb, wherein the bulb is disposed in the cavity; and a ceramic washer defining an aperture and disposed against the bulb, whereby the bulb is cooled relatively more from the portion of the bulb opposite from the aperture. In some examples, the structure includes a relatively tall cylindrical and hollow structure adapted to support a bulb along its axial dimension so that at least a portion of the cylindrical cup extends significantly beyond the bulb in each axial direction. In other examples the bulb bears a high temperature, high reflectivity, and wide angle dichroic coating except in a region which defines the aperture, and the structure comprises a high thermal conductivity ceramic encasing the bulb except for an opening in the region of the aperture.

According to yet another aspect of the invention, an oscillator includes an amplifier having an input and an output; and an impedance transformation network connected between the input of the amplifier and the output of the amplifier, the impedance transformation network being configured to provide suitable positive feedback from the output of the amplifier to the input of the amplifier to initiate and sustain an oscillating condition, the impedance matching network being further configured to protect the input of the amplifier from a destructive feedback signal, wherein the impedance transformation network comprises dual asymmetrical feedback paths adapted to provide an increased tuning range as compared to dual symmetrical feedback paths. For example, the amplifier comprises two RF power FET transistors connected in parallel and configured with soft gate switching. In some examples, the oscillator further includes a gate pad with a perpendicular transmission line extending therefrom and forming a resonant "T", and the feedback network is attached to the leg of the resonant "T". The oscillator may further include a continuously variable tuning circuit for adjusting the operating frequency of the oscillator. For example, the tuning circuit consists of solid state electrical components with no mechanically adjustable devices. In some examples, the tuning circuit comprises a plurality of PIN diode circuits configured as voltage controlled resistors. In other examples, the tuning circuit comprises a complementary PIN diode circuit. The oscillator may further include a heat transfer structure providing a thermal conduction path from the PIN diode to a heat dissipating structure. For example, the heat transfer structure comprises a metal post soldered to one pad of the PIN diode and the heat dissipating structure comprises an electrically grounded heat spreader plate.

In some oscillator examples, the impedance transformation network is adapted to combine a first portion of feedback from a load connected to the oscillator with a second portion of feedback from the amplifier to control a relative angle between lines of constant current and lines of constant frequency as plotted on a Rieke diagram.

In other oscillator examples, the oscillator includes a load connected to the oscillator; at least one impedance element connected to either the oscillator or the load by a switch; and a control circuit adapted to operate the switch at least once during operation of the oscillator. For example, the control circuit is adapted to operate the switch a pre-determined amount of time after the oscillator is started. Alternatively, where the load comprises an electrodeless discharge lamp, the control circuit may be adapted to operate the switch based on a sensed lamp condition. In some examples, the control circuit is adapted to operate the switch in accordance with providing closer matching of an impedance of the oscillator and the load during starting. In other examples, the control circuit is adapted to operate the switch in accordance with avoiding a region of unstable oscillator operation during starting.

According to a still further aspect of the invention, a lamp apparatus includes a discharge lamp; an RF power source connected to the discharge lamp for providing RF power to the lamp; and an RF control circuit adapted to control an operating parameter of the RF power source during operation. In some examples, the operating parameter corresponds to a frequency of the RF power source, and the lamp further includes a six port directional coupler connected in between the RF power source and the discharge lamp, the six port directional coupler being configured to detect forward and reflected power and provided respective signals representative thereof, and the RF control circuit is configured to receive the signals representative of forward and reflected power and to adjust an operating frequency of the RF power source in accordance with the received signals. The control circuit may be configured to delay initiation of active control until after the oscillator starts. The control circuit may be configured to step an operating frequency of the oscillator through a range of frequencies until the lamp is determined to be operating at a resonant frequency. The control circuit may be configured to adjust an operating frequency of the oscillator to minimize reflected power.

In other examples, the operating parameter corresponds to an amount of RF power coupled to the discharge lamp during operation. For example, the RF control circuit may be adapted to provide less RF power to the lamp prior to ignition as compared to an amount of RF power provided during steady state operation, thereby reducing arcing potential and reflected power during starting. The RF control circuit may also be adapted to temporarily provide more RF power to the lamp following ignition as compared to an amount of RF power provided during steady state operation, thereby bringing the lamp to full output faster. The RF control circuit may also be adapted to adjust a supply voltage of the RF power source during steady state operation to provide at least one of substantially constant forward power and substantially constant light output.

In other examples, the operating parameter corresponds to an amount of gate bias current provided to an active element of the RF power source. For example, the gate bias current is controlled such that the RF power source is not turned on until other functions of the RF control circuit have initialized.

One example of a lamp head according to an aspect of the invention includes a housing having a base and a cover adapted to fit over the base, an inductively coupled electrodeless lamp circuit including an excitation coil and a capacitor assembly which form a resonant circuit, the lamp circuit further including an aperture bulb positioned proximate to the excitation coil, wherein the base is adapted to receive the electrodeless lamp circuit and the cover provides an opening for light exiting from the aperture, and wherein the housing provides radio frequency shielding and substantially flat interfaces for external heatsinking.

According to another aspect of the invention, an integrated inductively coupled electrodeless lamp circuit includes an excitation coil, a high voltage capacitor, and a low voltage capacitor in an integrated assembly, wherein the high voltage capacitor and the low voltage capacitor are formed as a stack comprising a first conductive material, a first dielectric material, a second conductive material, a second dielectric material, and a third conductive material, wherein the first conductive material comprises a lead of the excitation coil, the second conductive material comprises a common plate of the high and low voltage capacitors, and the third conductive material comprises a grounded conductive surface, and wherein the first dielectric material is positioned between the first and second conductive materials thereby forming the high voltage capacitor and the second dielectric material is positioned between the second and third conductive materials thereby forming the low voltage capacitor, and wherein the first dielectric material, the second conductive material, and the second dielectric material are integrally formed as a multi-layer printed circuit board.

The foregoing and other objects, aspects, advantages, and/or features of the invention described herein are achieved individually and in combination. The invention should not be construed as requiring two or more of such features unless expressly recited in a particular claim.

BRIEF DESCRIPTION OF THE DRAWINGS

The foregoing and other objects, features, and advantages of the invention will be apparent from the following more particular description of preferred embodiments as illustrated in the accompanying drawings, in which reference characters generally refer to the same parts throughout the various views. The drawings are not necessarily to scale, the emphasis instead being placed upon illustrating the principles of the invention.

FIG. 16 is a circuit level schematic representation of a lamp head according to aspect of the invention.

FIG. 17 is a perspective view of the lamp head according to an aspect of the invention.

FIG. 18 is a top, schematic view of the lamp head illustrated in FIG. 17.

FIG. 19 is a front, schematic view of the lamp head illustrated in FIG. 17.

FIG. 20 is a side, schematic view of the lamp head illustrated in FIG. 17.

FIG. 27 is a front, schematic view of an example excitation coil according to an aspect of the invention.

FIG. 28 is a perspective view of the excitation coil in FIG. 27.

FIG. 29 is a schematic illustration of an L-shaped coil pre-form used to make the excitation coil in FIG. 27.

FIG. 30 is a schematic illustration of a first alternative coil pre-form used to make an example excitation coil according to an aspect of the invention.

FIG. 31 is a schematic illustration of a second alternative coil pre-form used to make an example excitation coil according to an aspect of the invention.

FIGS. 68 and 69 are schematic views a ninth example of a high voltage capacitor and a low voltage capacitor, respectively, according to an aspect of the invention.

FIG. 111 is a schematic, assembly level view of an RF source according to an aspect of the invention.

FIG. 112 is an enlarged view of the area 112 in FIG. 111 showing assembly details of a directional coupler utilized by the RF source.

FIG. 113 is a side schematic view of the RF source showing details of a hand wound coil.

FIG. 114 is an enlarged view of the area 114 in FIG. 111 showing assembly details of a tuning circuit utilized by the RF source.

FIG. 115 is a top schematic view of a heatsink for the RF source.

FIG. 116 is a front schematic view of the heatsink.

FIG. 117 is a side schematic view of the heatsink.

FIG. 118 is a fragmented, sectional view of a heatsink arrangement for a PIN diode according to an aspect of the invention.

FIG. 119 is a top schematic view of a first example of a lamp head assembly according to an aspect of the invention.

FIG. 120 is a right side schematic view the of the first lamp head assembly, with a partial cross sectional view.

FIG. 121 is a sectional view taken along line 121—121 in FIG. 119.

FIG. 122 is a bottom schematic view of the first lamp head assembly.

FIG. 123 is a top schematic view of the first lamp assembly with a cover removed therefrom.

FIG. 124 is a sectional view taken along line 124—124 in FIG. 119.

FIG. 125 is a top schematic view of a second example of a lamp head assembly according to an aspect of the invention.

FIG. 126 is a right side schematic view the of the first lamp head assembly.

FIG. 127 is a sectional view taken along line 127—127 in FIG. 125.

FIG. 128 is a bottom schematic view of the second lamp head assembly.

FIG. 129 is a top schematic view of the second lamp assembly with a cover removed therefrom.

FIG. 130 is a sectional view taken along line 130—130 in FIG. 125.

FIG. 131 is a top schematic view an integrated coil and capacitor assembly according to an aspect of the invention, prior to forming the coil.

FIG. 132 is a right side schematic view the integrated coil and capacitor assembly.

FIG. 133 is a top schematic view of a first subassembly of the integrated coil and capacitor assembly.

FIG. 134 is a sectional view taken along line 134—134 in FIG. 133.

FIG. 135 is a front side schematic view of the first subassembly.

FIG. 136 is a top schematic view of a second subassembly of the integrated coil and capacitor assembly.

FIG. 137 is a right side schematic view of the second subassembly.

FIG. 138 is an exploded schematic view of the integrated coil and capacitor assembly.

FIG. 139 is a left side perspective view of the integrated coil and capacitor assembly according to an aspect of the invention, after the coil has been formed.

FIG. 140 is a right side perspective view of the integrated coil and capacitor assembly according to an aspect of the invention, after the coil has been formed.

FIG. 141 is a left side schematic view of the fully formed integrated coil and capacitor assembly.

Figure 142:
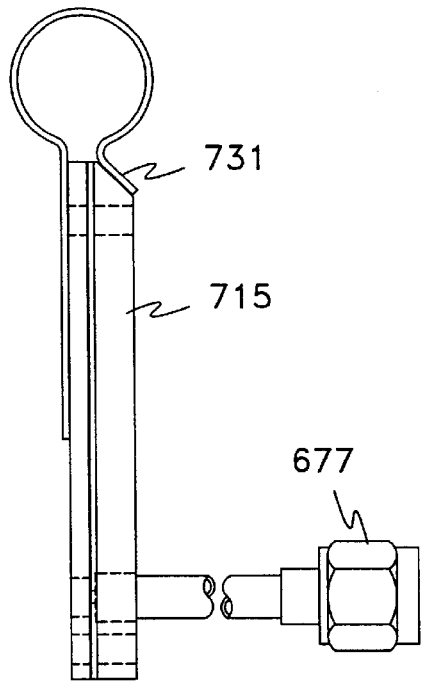
Figure 140:
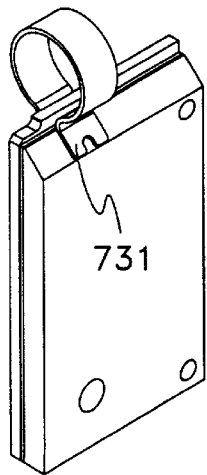

FIG. 142 is a front schematic view of the integrated coil and capacitor assembly together with a coaxial cable.

Figure 143:
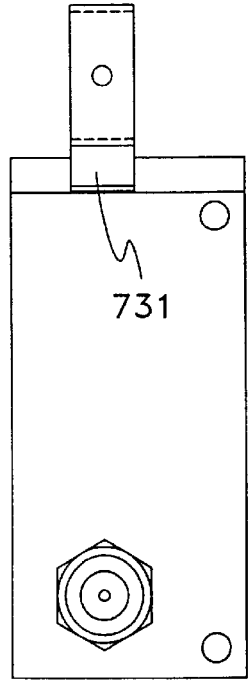

FIG. 143 is a right side schematic view of the integrated coil and capacitor assembly together with the coaxial cable.

Figure 144:
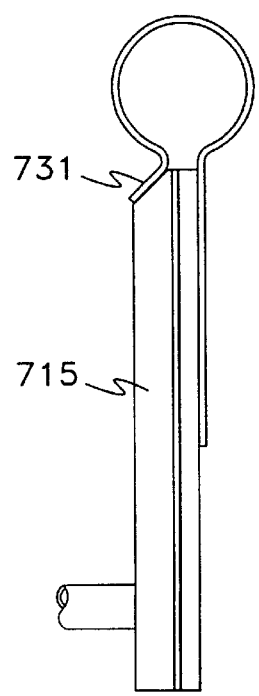

FIG. 144 is a back schematic view of the integrated coil and capacitor assembly together with the coaxial cable.

Figure 145:
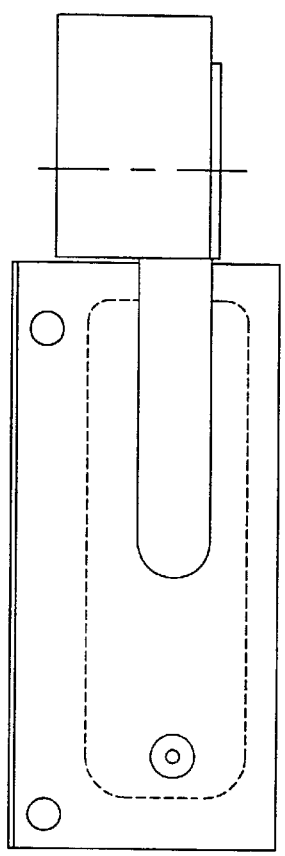

FIG. 145 is a left side schematic view of the fully formed integrated coil and capacitor assembly together with a ceramic heatsink for the coil.

Figure 146:
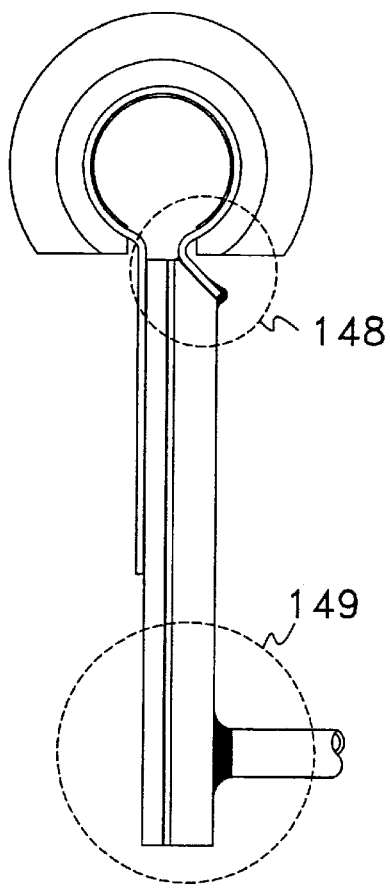

FIG. 146 is a front schematic view of the integrated coil and capacitor assembly together with the coaxial cable and ceramic heatsink.

Figure 147:
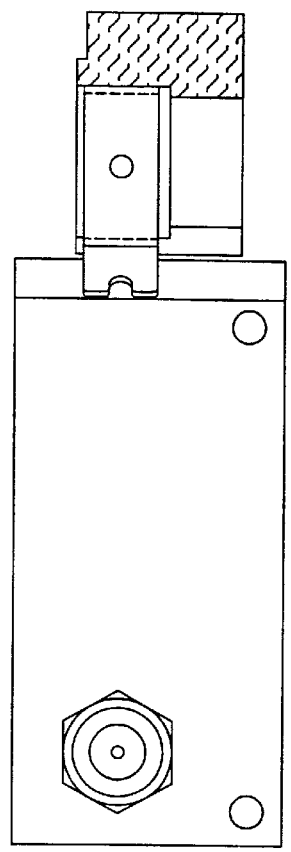

FIG. 147 is a back schematic view of the integrated coil and capacitor assembly together with the coaxial cable and a partial cross section of the ceramic heatsink.

Figure 148:
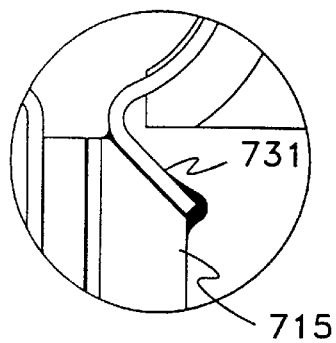

FIG. 148 is an enlarged view of the area 148 in FIG. 146, showing details of the solder connection of the coil to the spreader plate.

Figure 149:
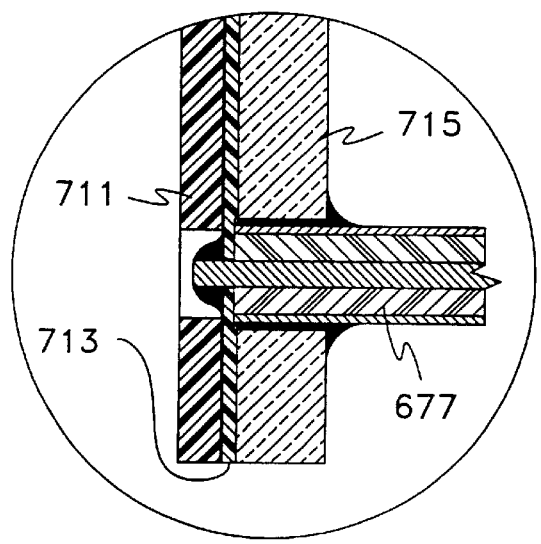

FIG. 149 is an enlarged view of the area 149 in FIG. 146, showing details of the solder connection of the coaxial cable to the integrated coil and capacitor assembly.

FIG. 150 is a perspective view of the ceramic heatsink for the coil.

FIG. 151 is a top schematic view of the ceramic heatsink for the coil.

FIG. 152 is a sectional view taken along line 152—152 in FIG. 151.

FIG. 153 is a sectional view taken along line 153—153 in FIG. 151.

Figure 154:
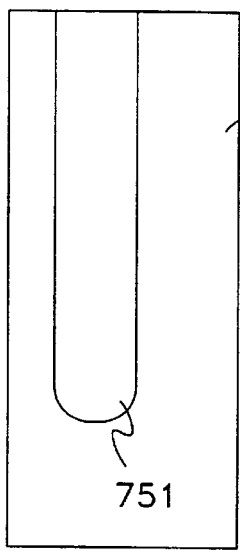

FIG. 154 is a top schematic view of a first example of a ceramic heatsink for the capacitor stack.

Figure 155:
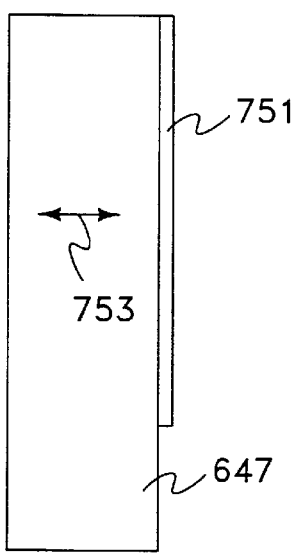

FIG. 155 is a right side schematic view of the first capacitor heatsink.

Figure 156:
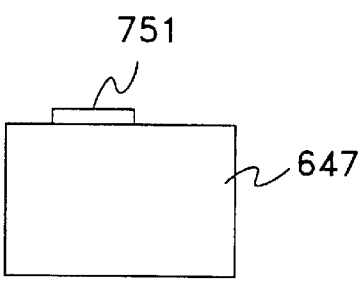

FIG. 156 is a back schematic view of the first capacitor heatsink.

Figure 157:
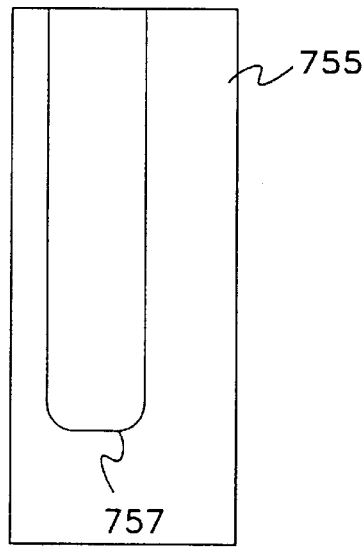

FIG. 157 is a top schematic view of a second example of a ceramic heatsink for the capacitor stack.

Figure 158:
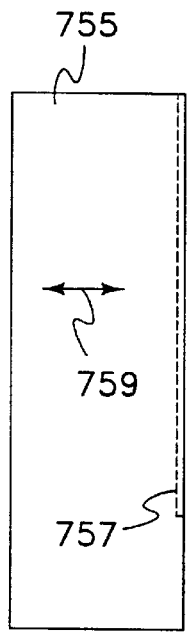

FIG. 158 is a right side schematic view of the second capacitor heatsink.

Figure 159:
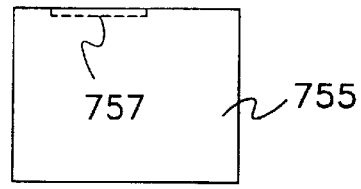

FIG. 159 is a back schematic view of the second capacitor heatsink.

Figure 160:
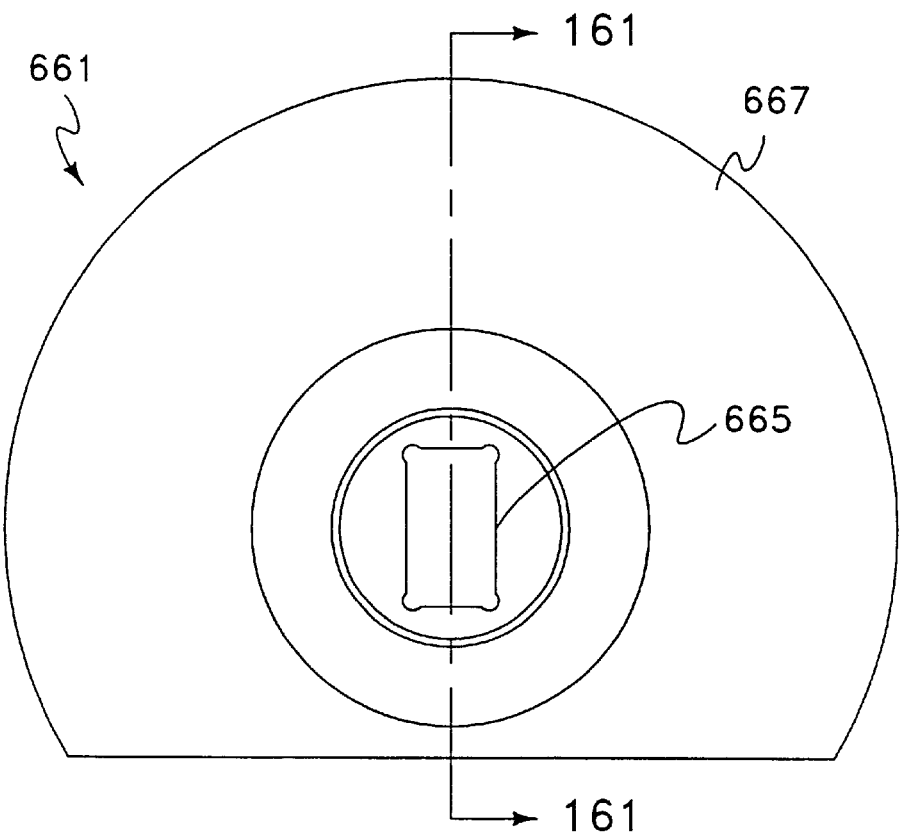

FIG. 160 is a top schematic view of an aperture bulb according to an aspect of the invention.

Figure 161:
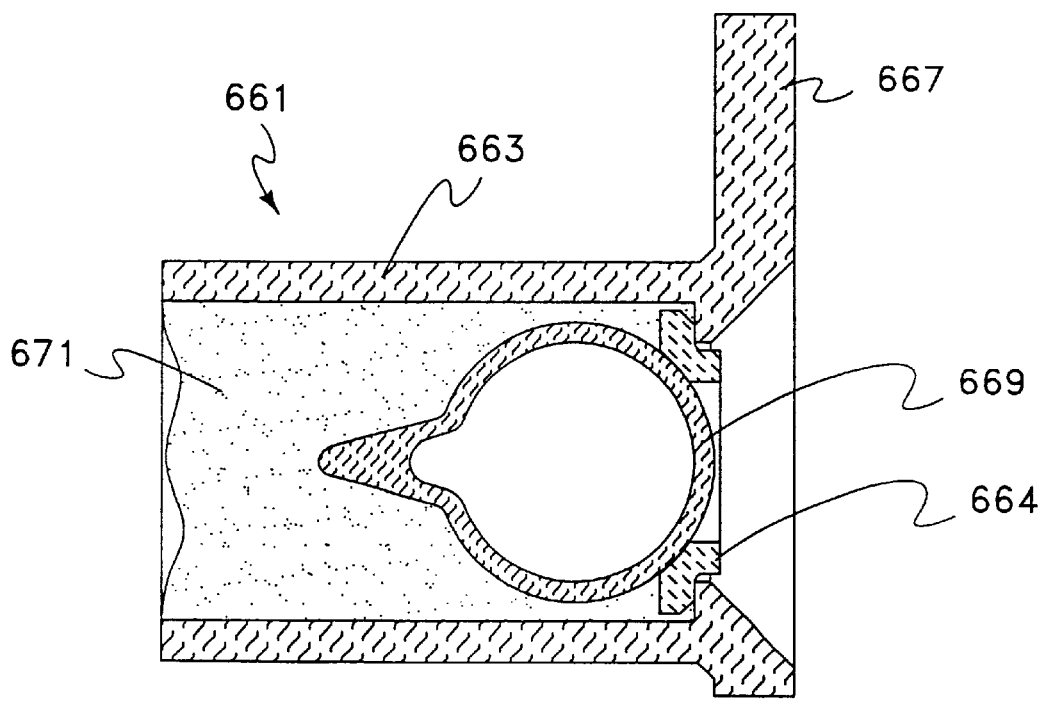

FIG. 161 is a sectional view taken along line 161—161 in FIG. 160.

Figure 162:
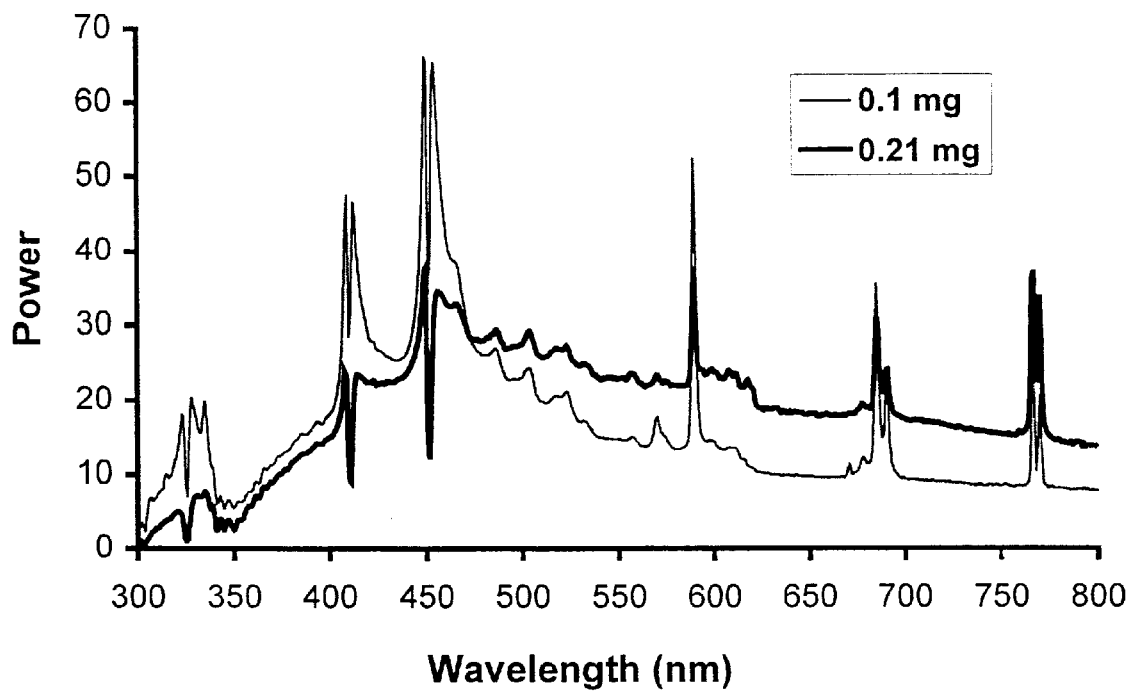

FIG. 162 is a comparison graph of spectra for two different dosages of indium chloride.

Figure 163:
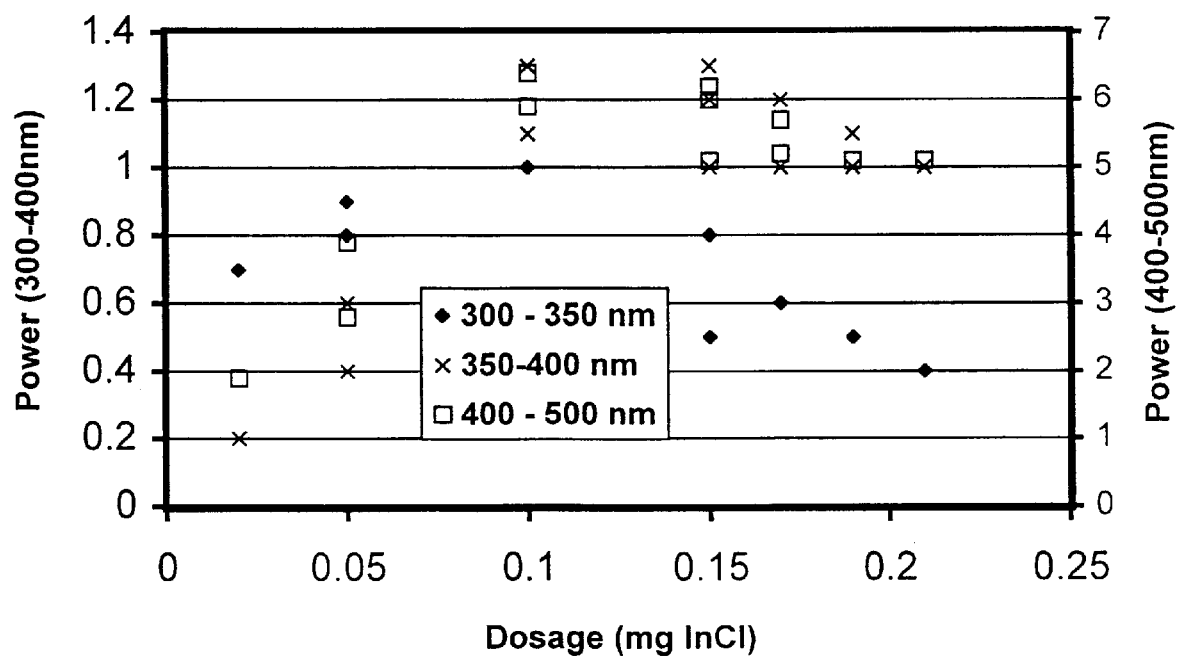

FIG. 163 is a chart comparing the amount of power in various wavelength ranges for various dosages of indium chloride.

FIG. 164 is a graph of nominal impedance switches versus time in accordance with an aspect of the invention.

FIG. 165 is a representative graph showing a portion of a Smith chart for a non-impedance switched lamp.

FIG. 166 is an representative graph showing a portion of a Smith chart for an impedance switched lamp in accordance with an aspect of the invention.

Figure 167:
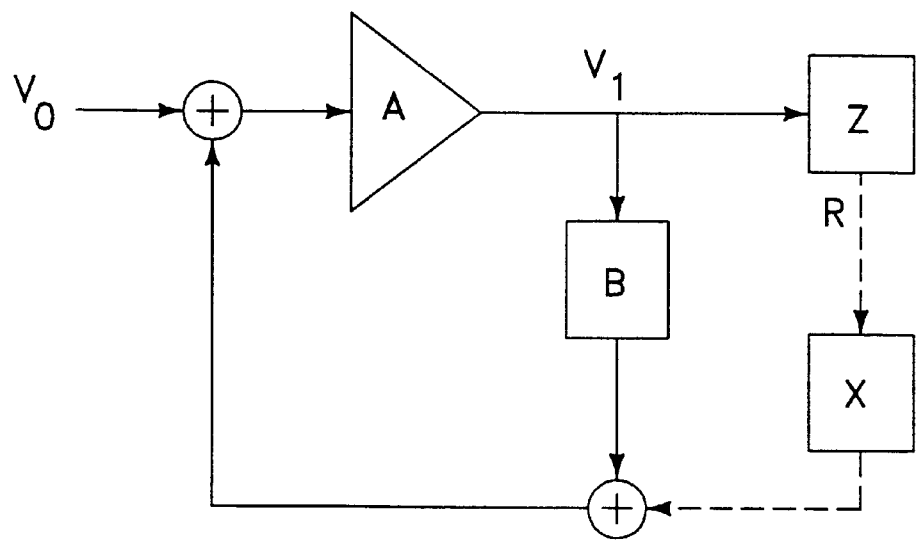

FIG. 167 is a generalized schematic illustration of a single stage oscillator.

Figure 168:
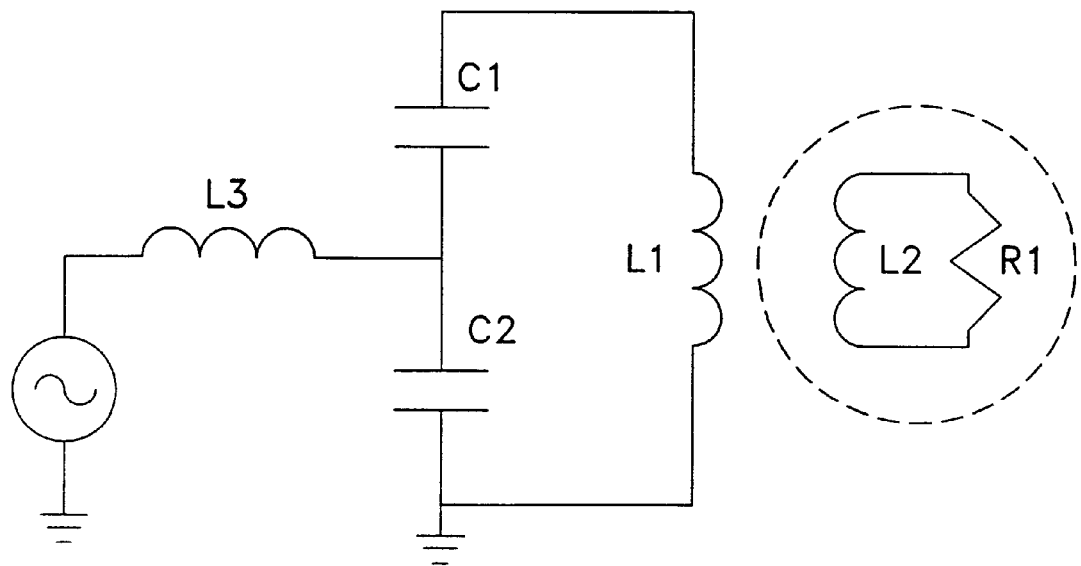

FIG. 168 is a schematic diagram of an RF source driving an electrodeless lamp circuit.

Figure 169:
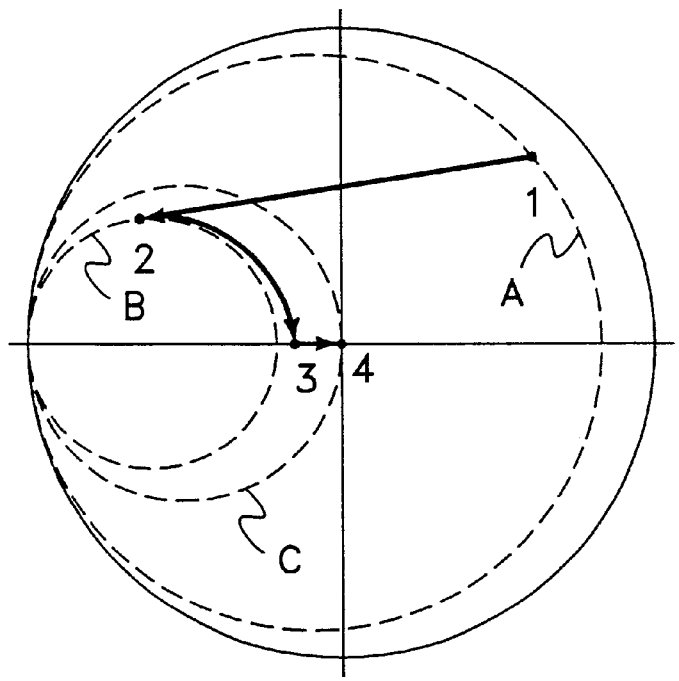

FIG. 169 is a Smith chart illustrating typical operation of an isolated, non-impedance switched RF source connected to an inductively coupled lamp head.

Figure 170:
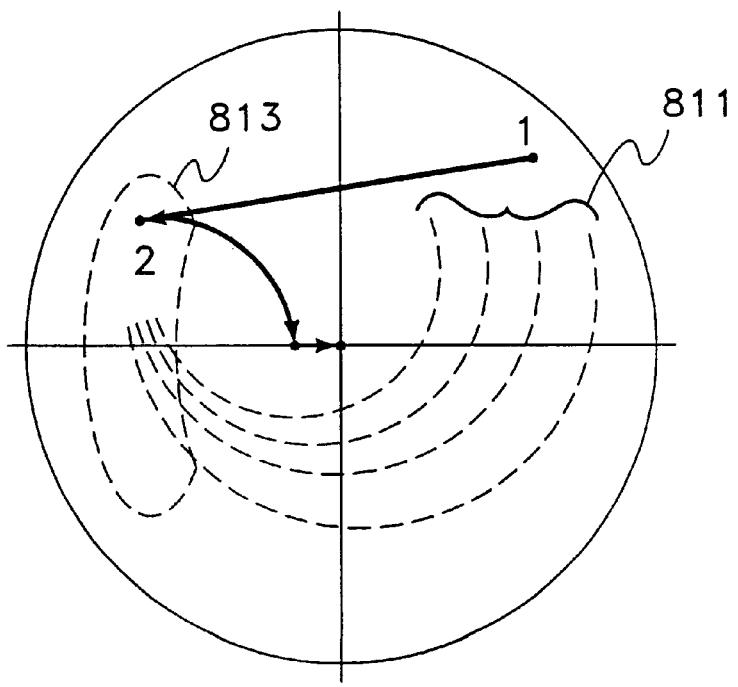

FIG. 170 is a Smith chart which illustrates various problems presented by the starting sequence in a non-impedance switched and non-isolated lamp system.

Figure 171:
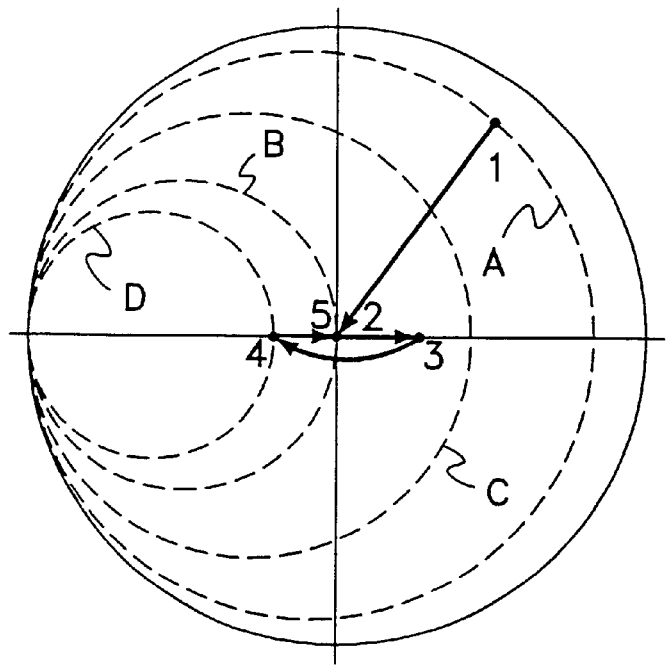

FIG. 171 is a Smith chart which illustrates a first method of dynamically controlled impedance switching according to an aspect of the invention.

Figure 172:
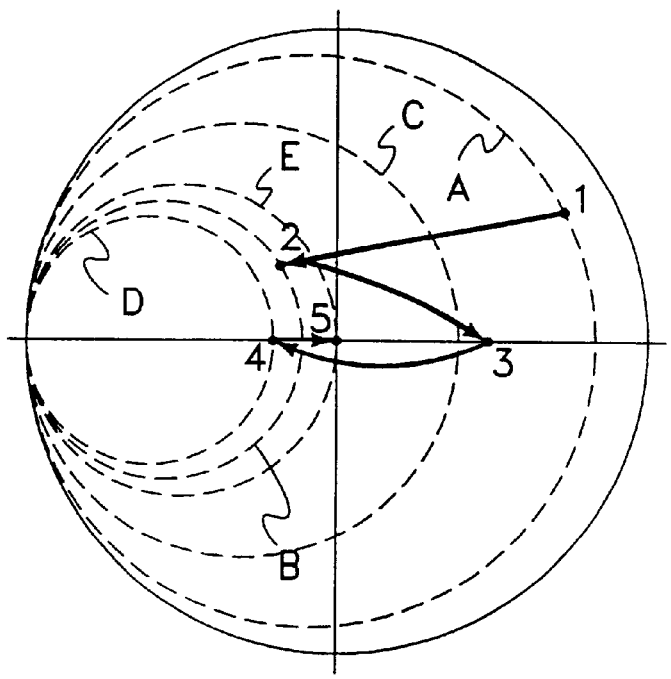

FIG. 172 is a Smith chart which illustrates a second method of dynamically controlled impedance switching according to an aspect of the invention.

Figure 173:
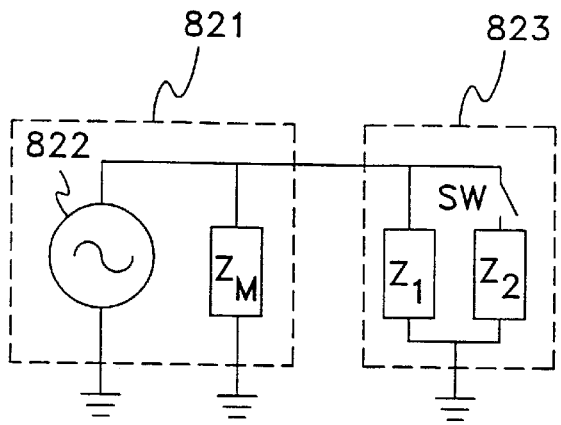

FIG. 173 is a schematic diagram of a first example RF circuit comprising an RF driven load in accordance with an aspect of the invention.

Figure 174:
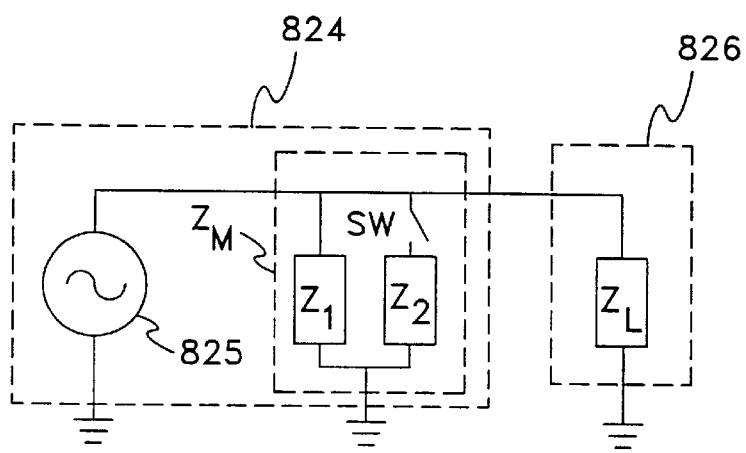

FIG. 174 is a schematic diagram of a second example RF circuit comprising an RF driven load in accordance with an aspect of the invention.

Figure 175:
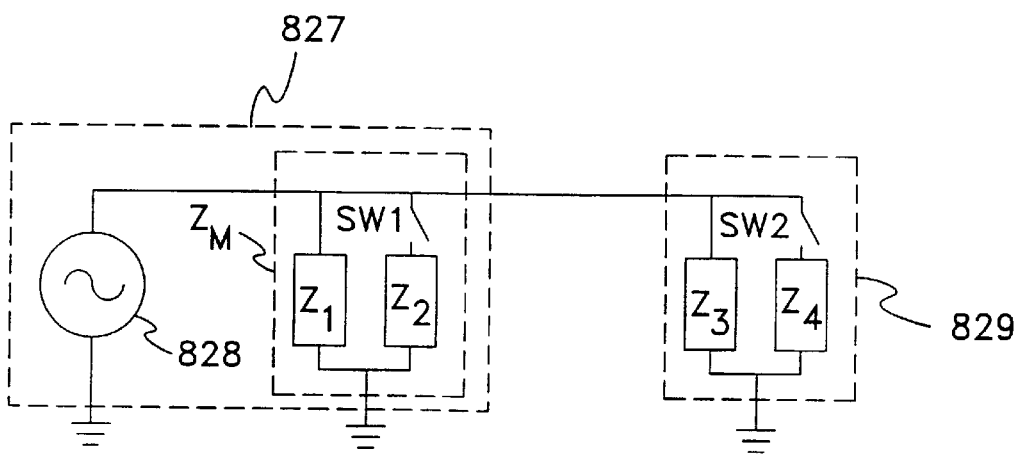

FIG. 175 is a schematic diagram of a third example RF circuit comprising an RF driven load in accordance with an aspect of the invention.

Figure 176:
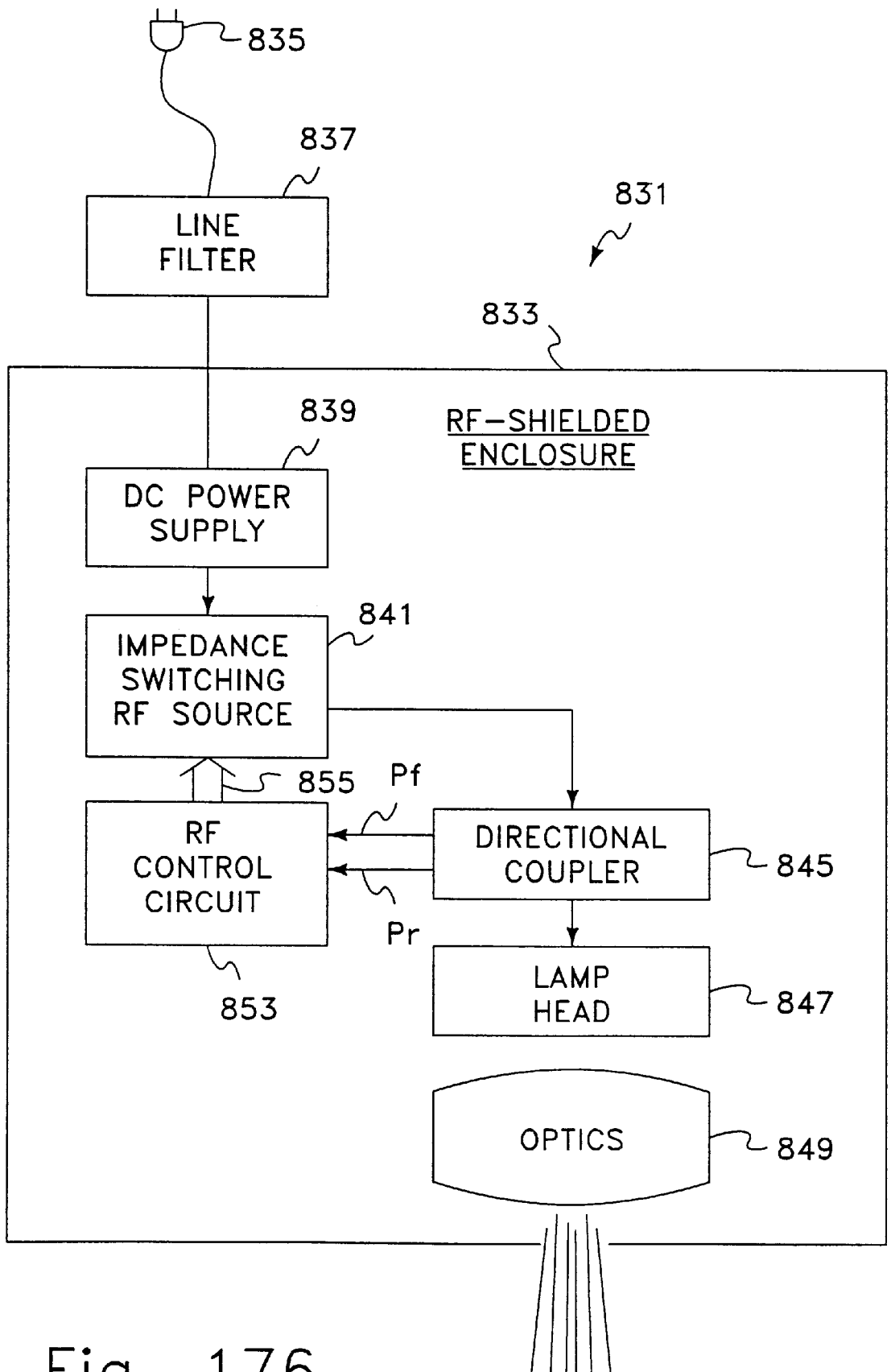

FIG. 176 is a block level schematic diagram of a third lamp system in accordance with an aspect of the invention, including an impedance switching RF source.

FIG. 177 is a block level schematic diagram of an RF source in accordance with an aspect of the invention.

FIG. 178 is a schematic diagram of a dynamically controlled impedance switching circuit in accordance with an aspect of the invention.

FIG. 179 is a circuit level schematic diagram of a dynamically controlled impedance switching circuit in accordance with an aspect of the invention.

FIG. 180 is an assembly level schematic diagram of a printed circuit board populated with suitable devices for providing an impedance switching RF source and directional coupler in accordance with an aspect of the invention.

FIG. 181 is an enlarged schematic view of the impedance switching circuit indicated by area 181 in FIG. 180.

Figure 182:
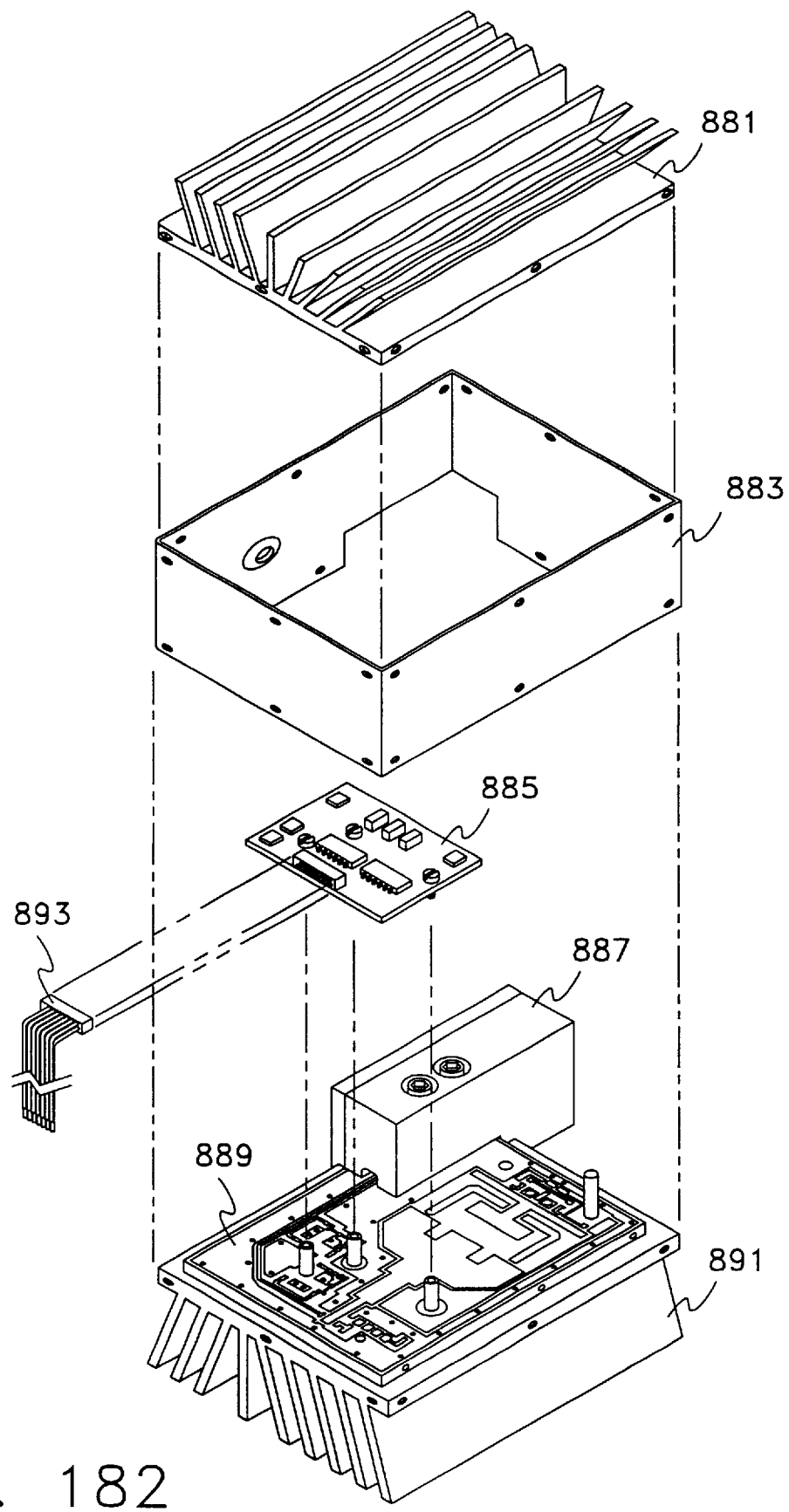

FIG. 182 is an exploded perspective view of an integrated lamp system including an impedance switching RF source, directional coupler, RF control circuit, and lamp head in a single enclosure.

Figure 183:
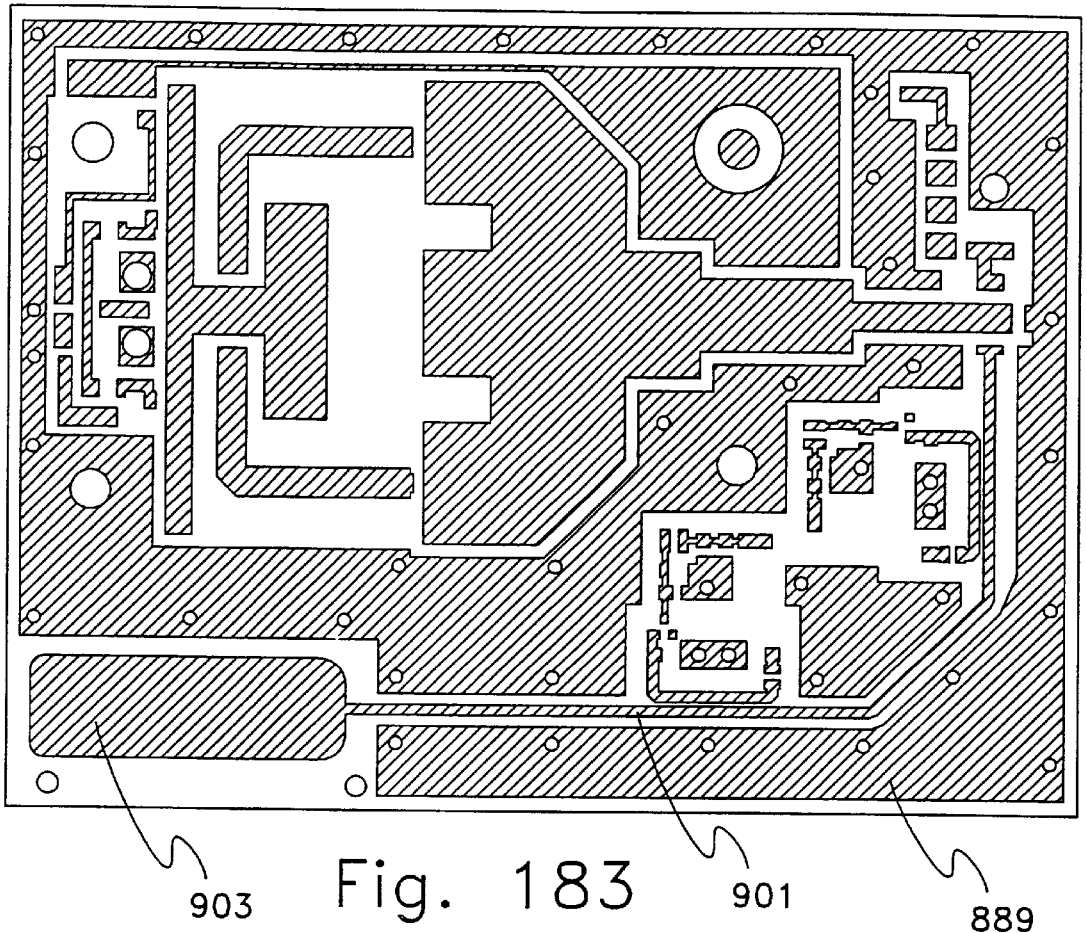

FIG. 183 is a schematic diagram of a printed circuit board layout utilized by the integrated lamp system of FIG. 182.

Figure 184:
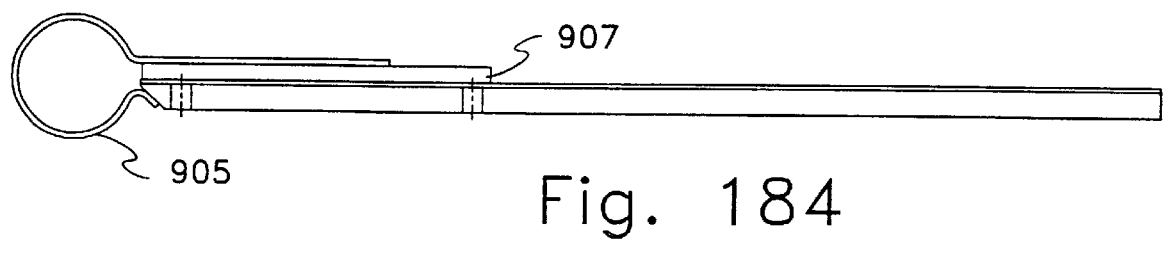

FIG. 184 is a side schematic view of the printed circuit board illustrating the configuration of the excitation coil.

Figure 185:
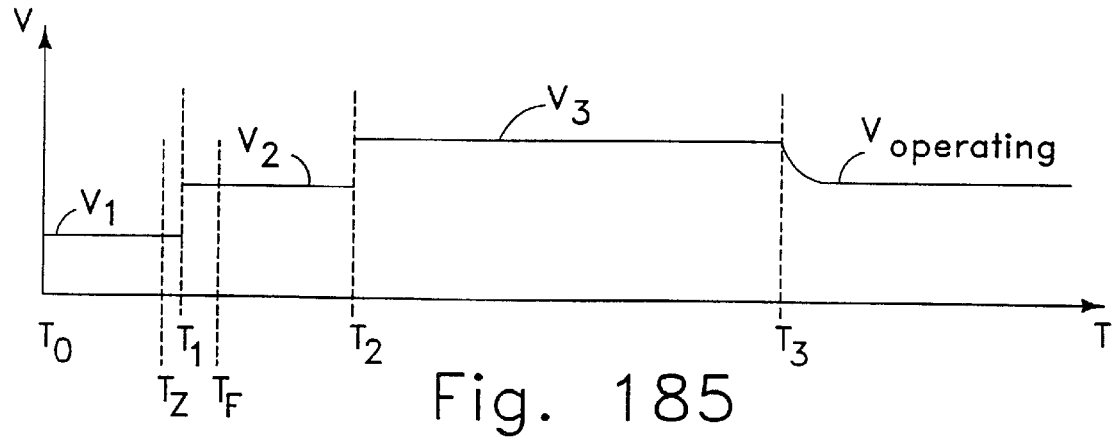

FIG. 185 is a graph of oscillator supply voltage versus time for an RF source according to an aspect of the invention utilizing active power control.

Figure 186:
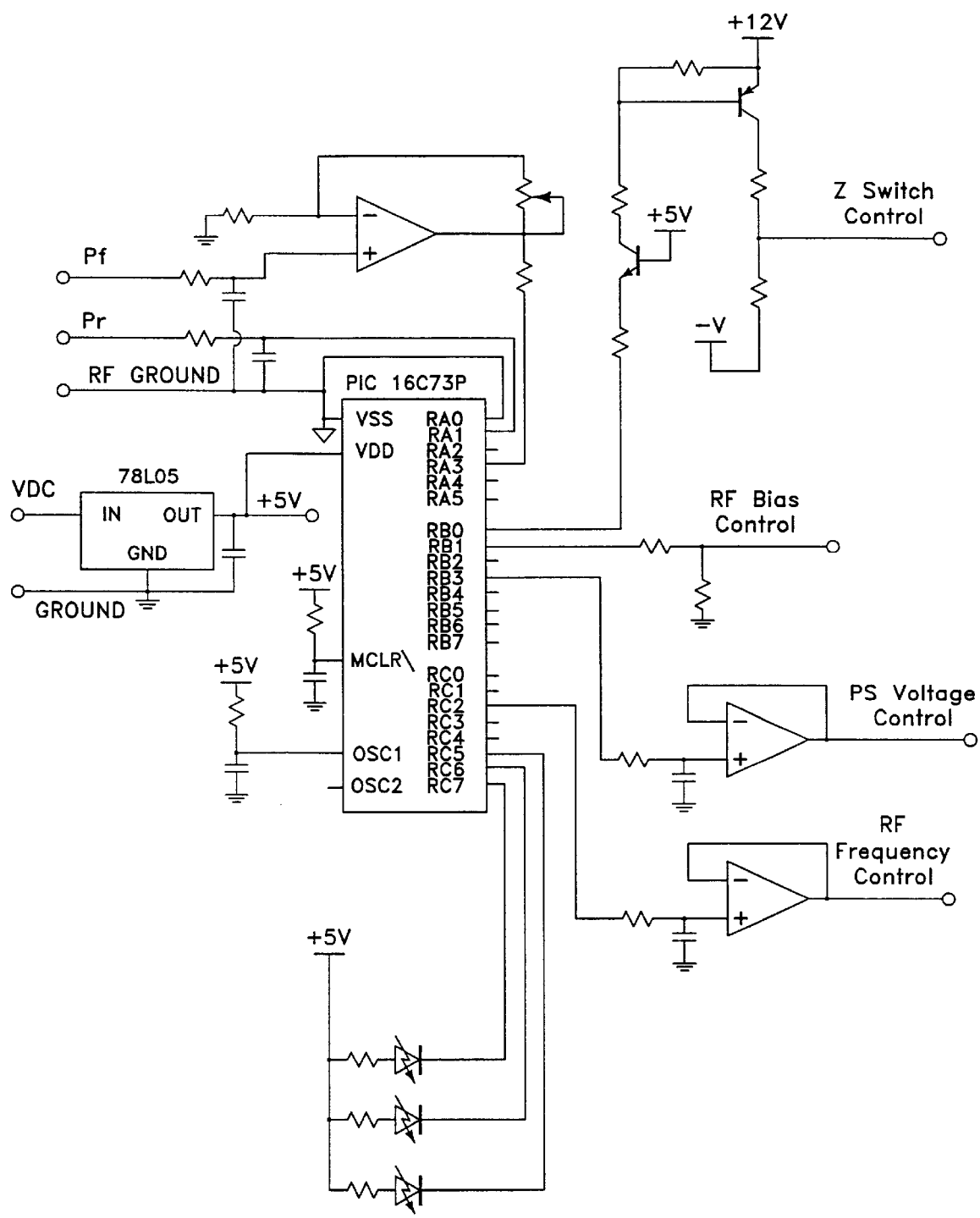

FIG. 186 is a circuit level schematic diagram of a control circuit according to an aspect of the invention.

Figure 187:
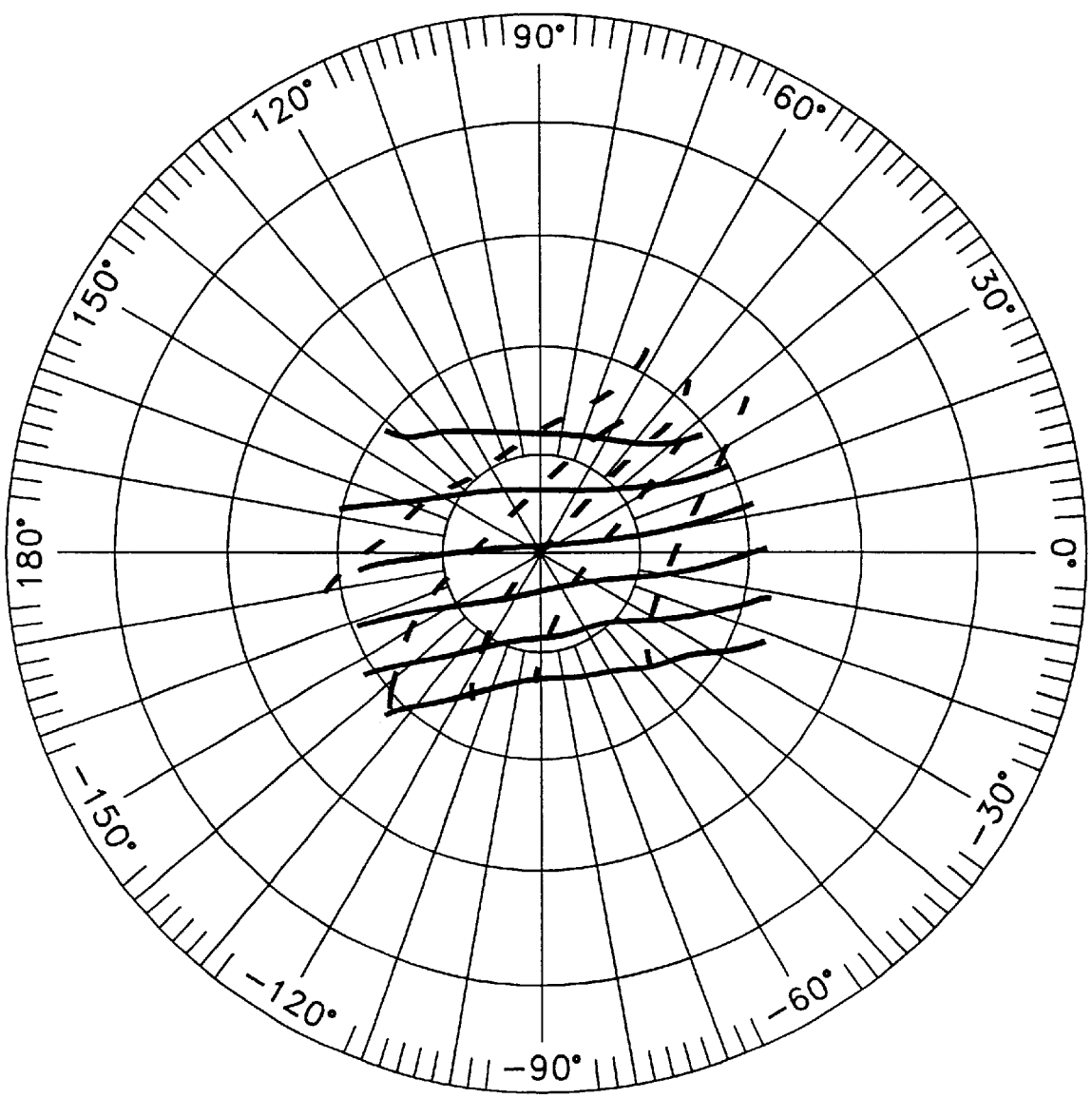

FIG. 187 is a Rieke diagram representative of the load characteristics of an oscillator.

Figure 188:
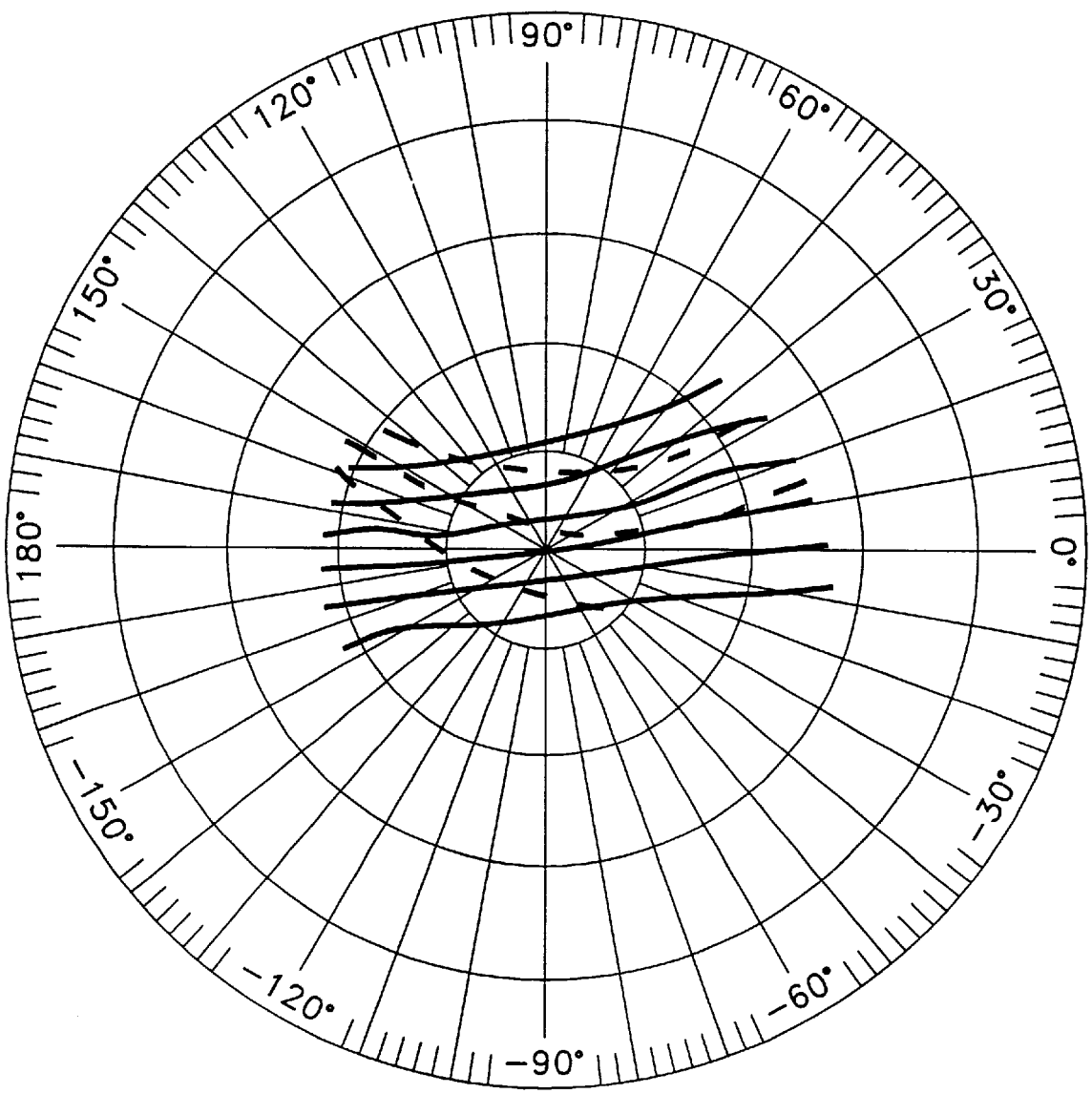

FIG. 188 is a Rieke diagram representative of the load characteristics of a first example an oscillator with controlled frequency-load characteristics.

Figure 189:
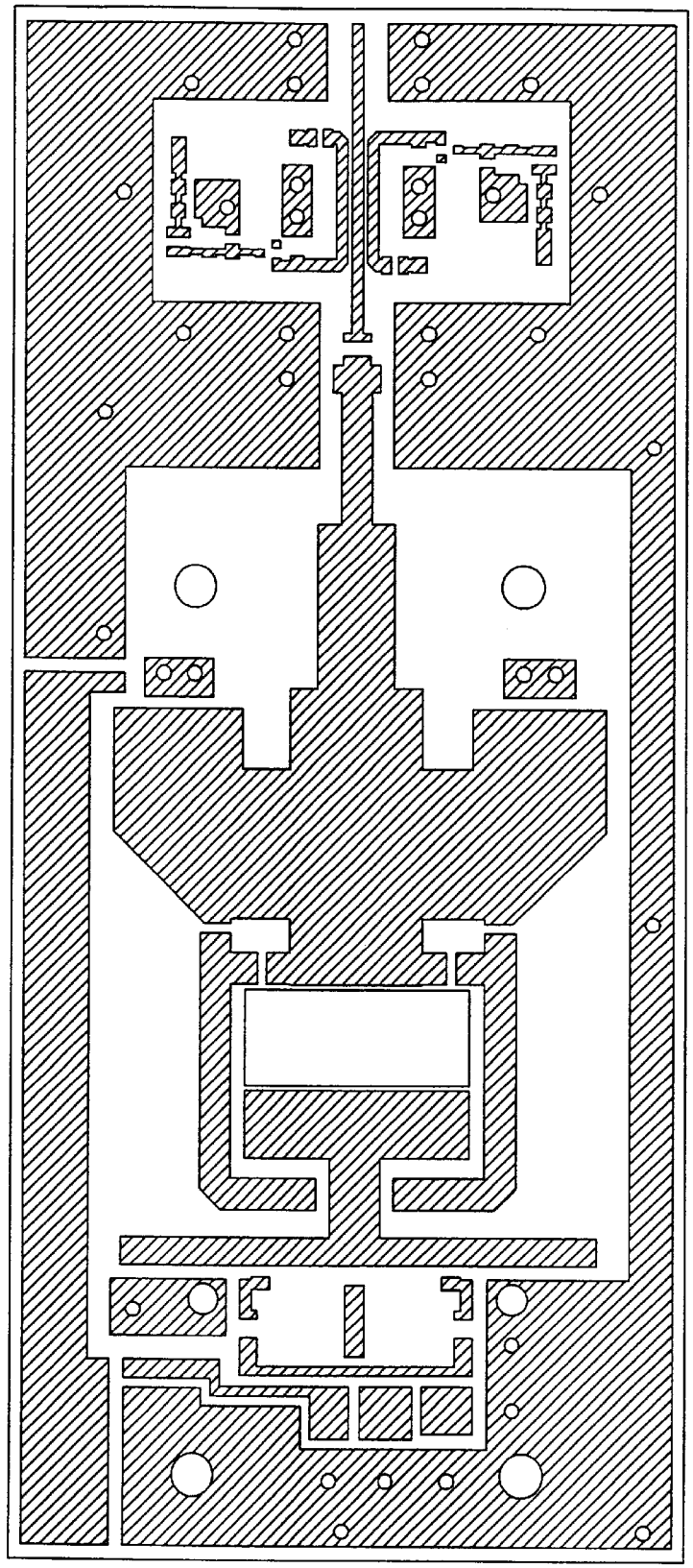

FIG. 189 is a schematic diagram of a printed circuit board layout for a second example of an oscillator with controlled frequency-load characteristics.

Figure 190:
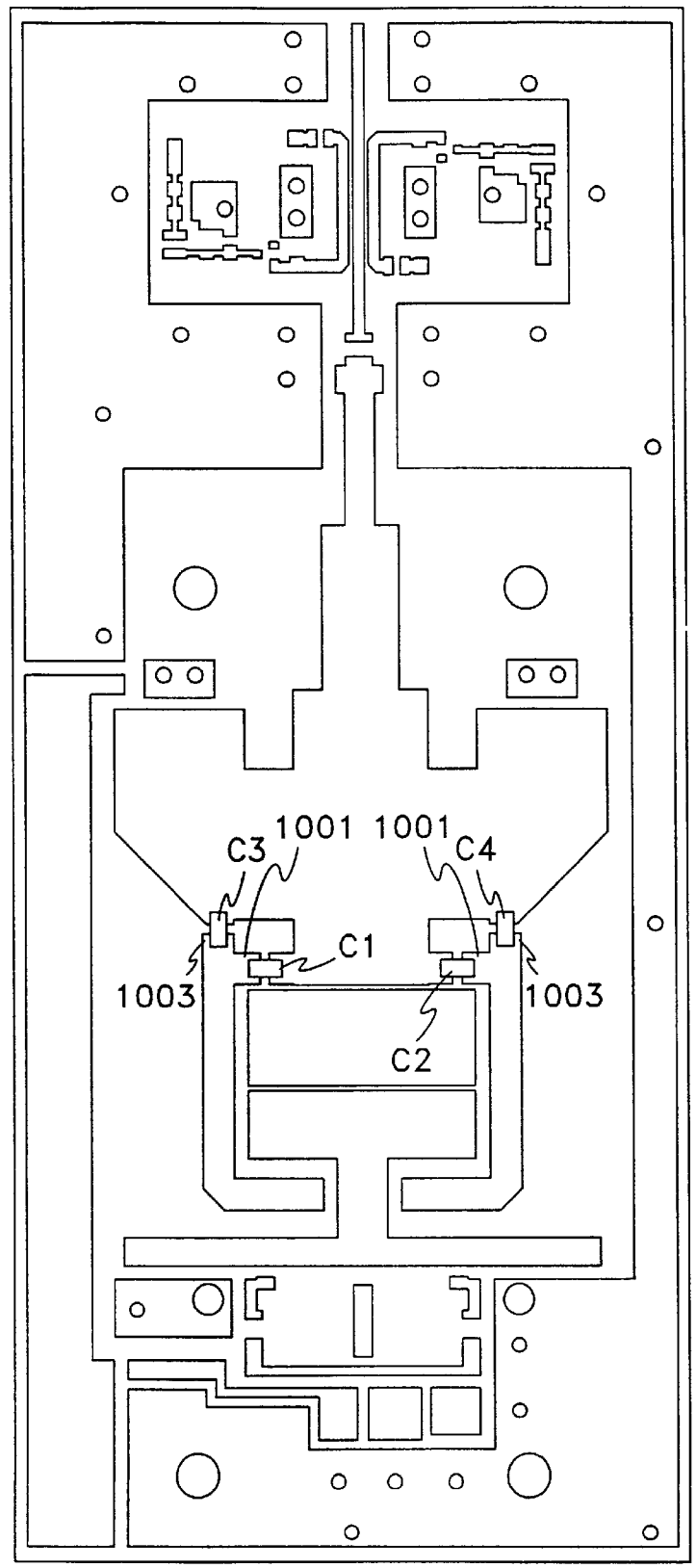

FIG. 190 is a schematic diagram of a component assembly showing exemplary positions for the feedback capacitors in the second example.

Figure 191:
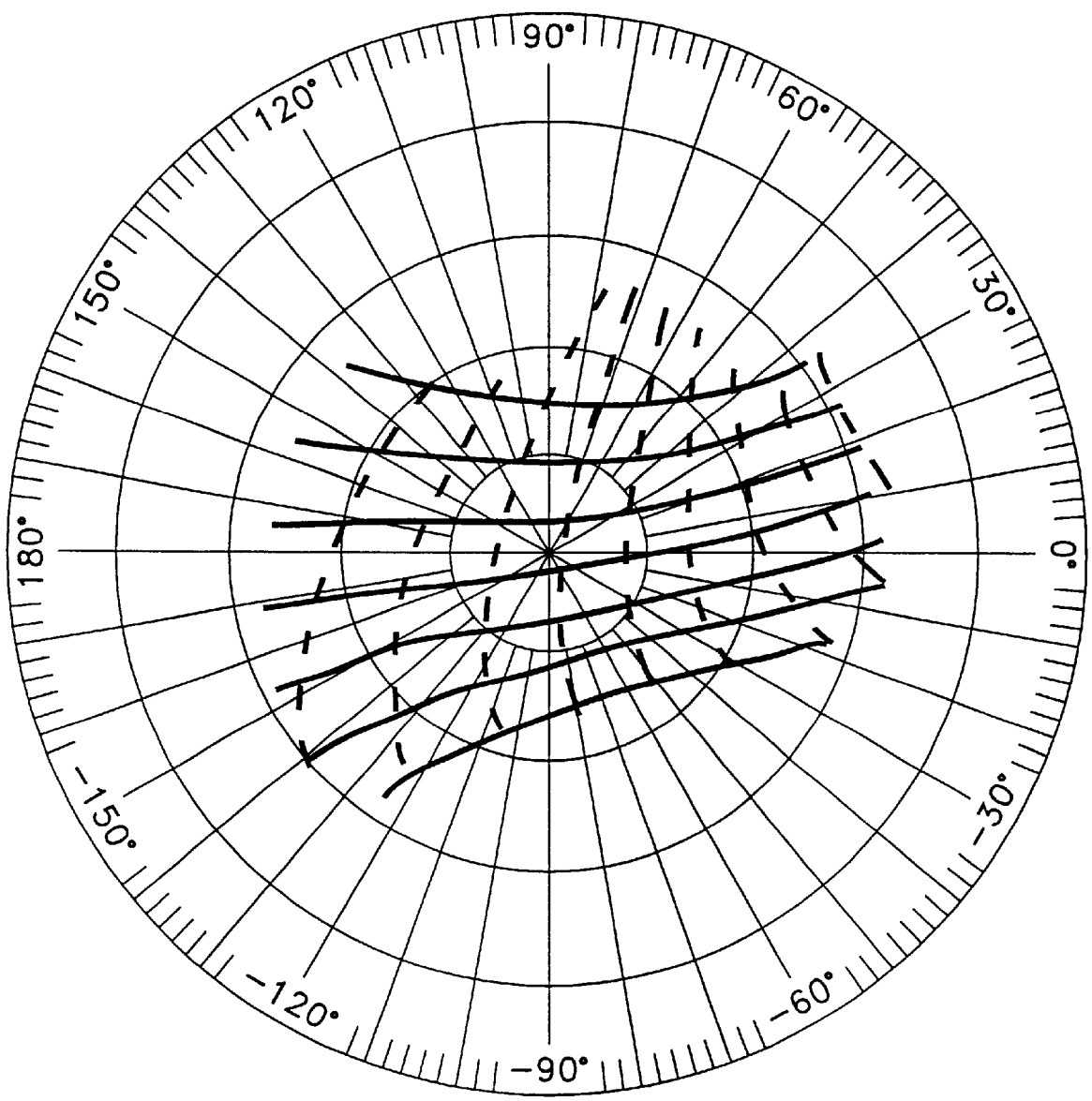

FIG. 191 is a Rieke diagram representative of the load characteristics of the second example.

Figure 192:
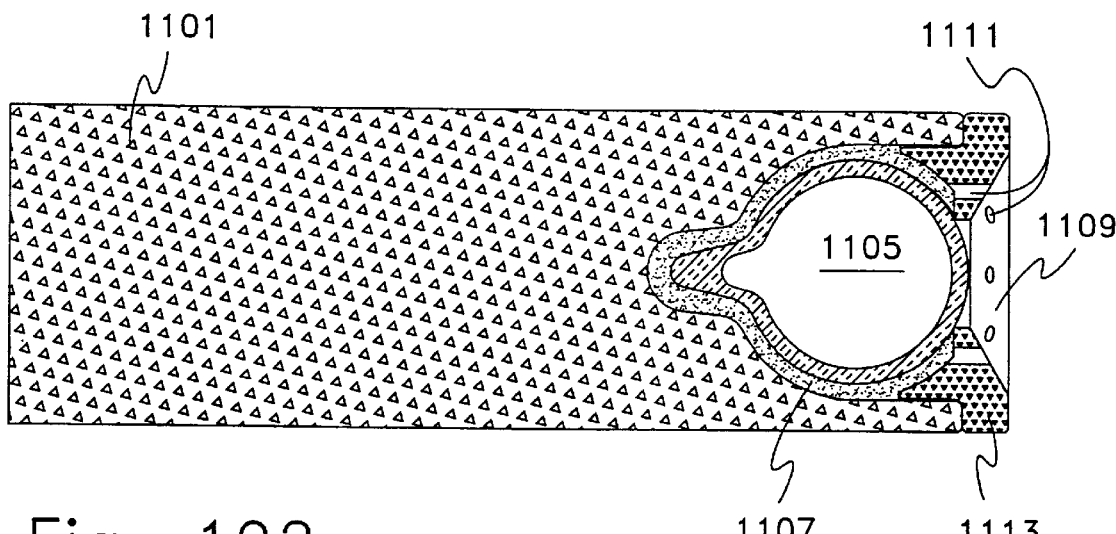

FIG. 192 is a cross sectional diagram of a first example of a back-cooled aperture cup.

Figures 193, 194, 195:
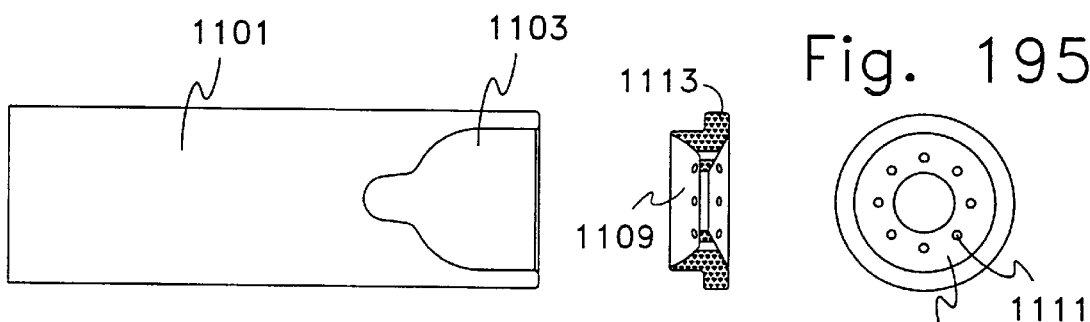

FIG. 193 is a cross sectional view of a ceramic cup part of the first example.

FIG. 194 is a cross section view of a ceramic washer part of the first example.

FIG. 195 is a front view of the ceramic washer part of the first example.

Figures 196, 197:
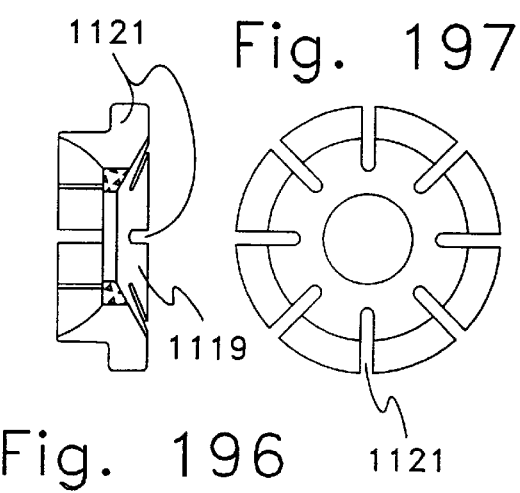

FIGS. 196 and 197 are cross sectional and front views, respectively, of a first alternative washer part for the first example.

Figures 198, 199:
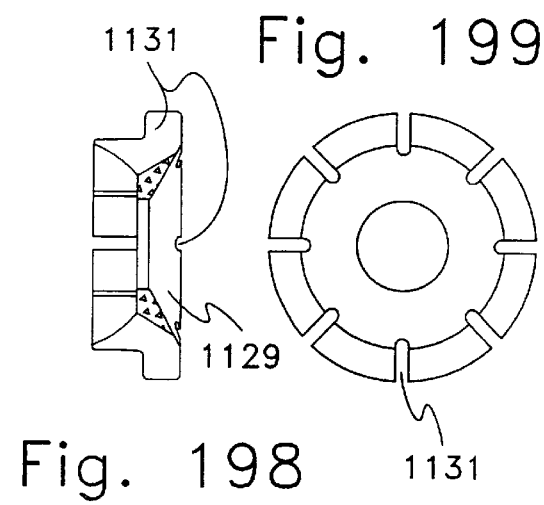

FIGS. 198 and 199 are cross sectional and front views, respectively, of a second alternative washer part for the first example.

FIG. 200 is a cross sectional diagram of a second example of a back-cooled aperture cup.

FIG. 201 is a cross sectional view of a ceramic cup part of the second example.

FIG. 202 is a cross section view of a ceramic washer part of the second example.

FIG. 203 is a front view of the ceramic washer part of the second example.

FIGS. 204 and 205 are cross sectional and front views, respectively, of a first alternative washer part for the second example.

FIGS. 206 and 207 are cross sectional and front views, respectively, of a second alternative washer part for the second example.

Figure 208:
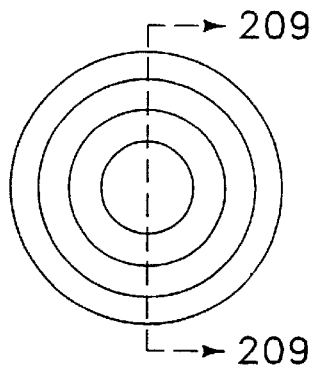

FIG. 208 is a front, schematic view of a first example of a tall aperture cup.

Figure 209:
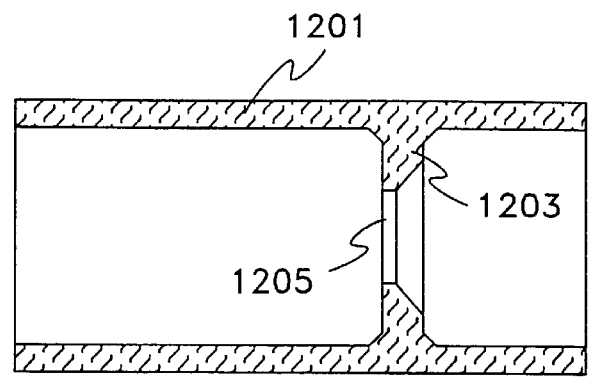

FIG. 209 is a cross sectional view taken along 209—209 in FIG. 208.

Figure 210:
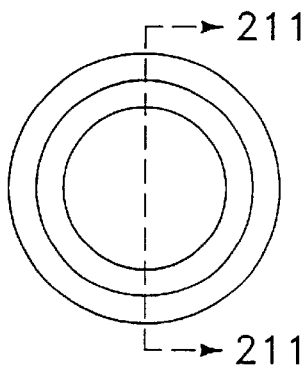

FIG. 210 is a front, schematic view of a second example of a tall aperture cup.

Figure 211:
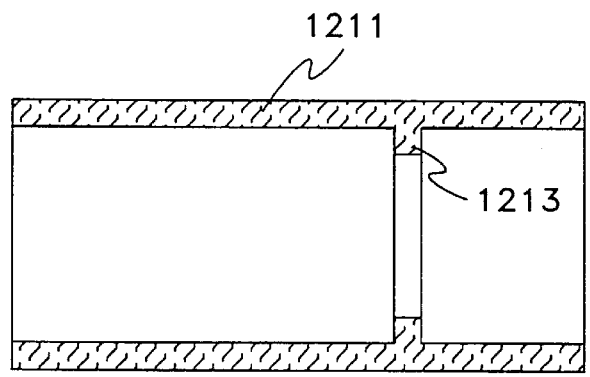

FIG. 211 is a cross sectional view taken along 211—211 in FIG. 210.

Figure 212:
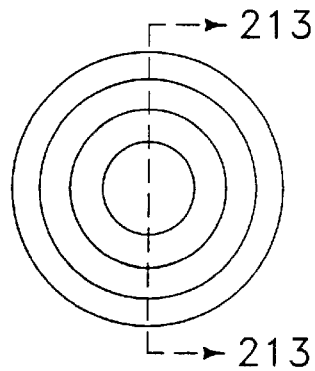

FIG. 212 is a front, schematic view of a third example of a tall aperture cup.

Figure 213:
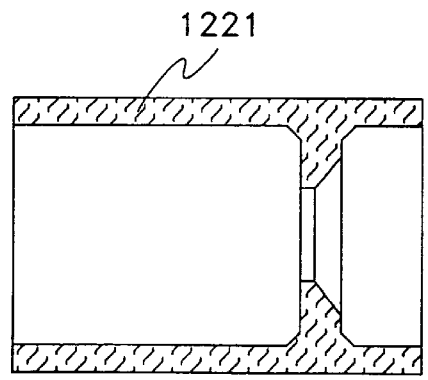

FIG. 213 is a cross sectional view taken along 213—213 in FIG. 212.

FIG. 214 is a schematic, cross sectional diagram of an electrodeless lamp utilizing a tall aperture cup.

FIG. 215 is a schematic, cross sectional view of a first example of a dichroic coated aperture lamp.

FIG. 216 is a schematic, cross sectional view of a second example of a dichroic coated aperture lamp.

Figure 217:
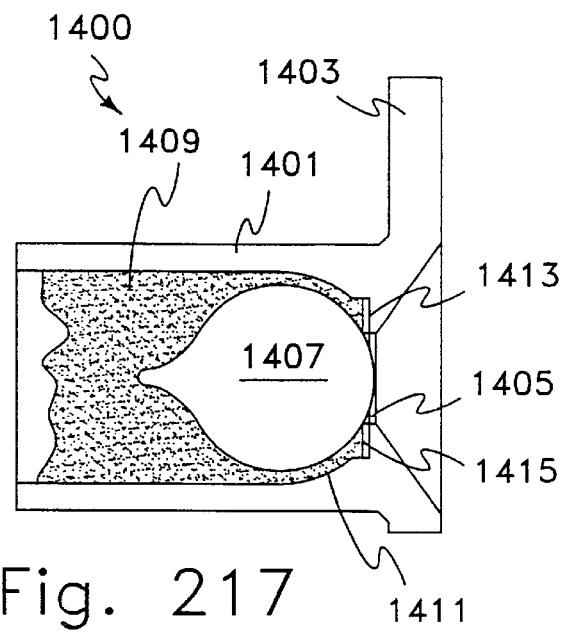

FIG. 217 is a cross sectional diagram of a first example of an aperture cup with contoured interior walls.

Figure 218:
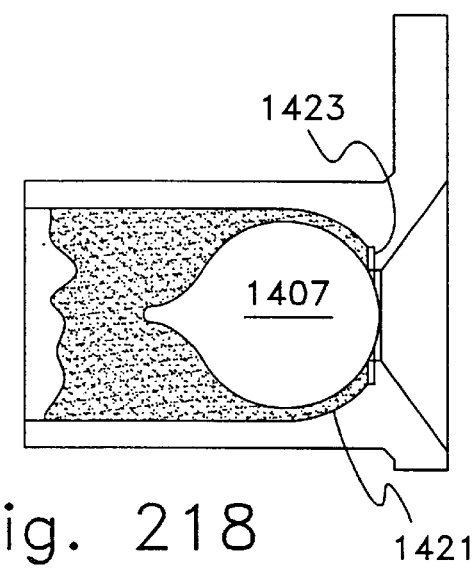

FIG. 218 is a cross sectional diagram of a second example of an aperture cup with contoured interior walls.

Figure 219:
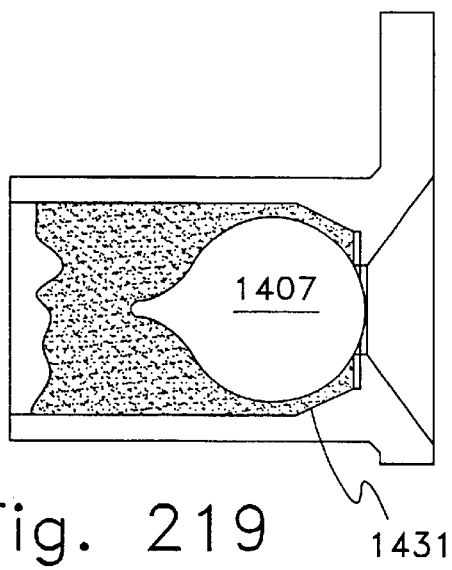

FIG. 219 is a cross sectional diagram of a third example of an aperture cup with contoured interior walls.

Figure 220:
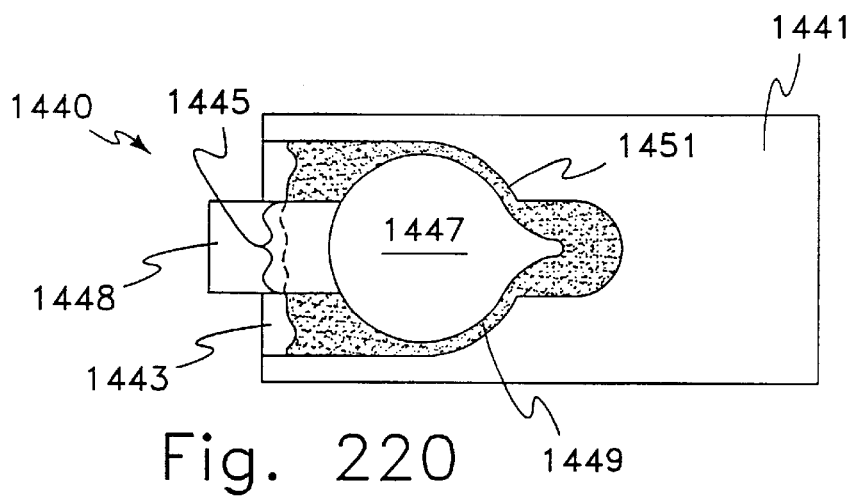

FIG. 220 is a cross sectional diagram of a fourth example of an aperture cup with contoured interior walls.

DESCRIPTION

In the following description, for purposes of explanation and not limitation, specific details are set forth such as particular structures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the invention with unnecessary detail.

In general, the inventions described herein are related to the lamps described in PCT Publication No. WO 99/36940, and to various improvements and/or modifications thereof (although many of the inventions described herein predate that publication). A detailed discussion of such lamps and the manner of making and using such lamps is incorporated herein by reference to PCT Publication No. WO 99/36940, which corresponds to co-pending U.S. patent application Ser. No. 09/228,230, filed Jan. 11, 1999.

Figure 1:
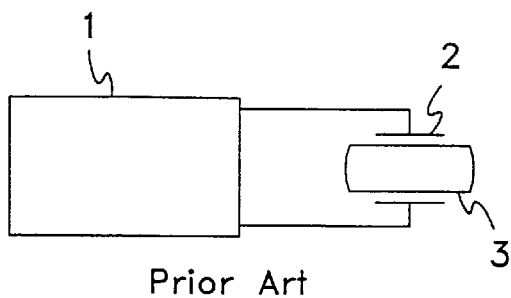
FIG. 1 is a schematic diagram of a conventional electrodeless lamp which produces an E discharge.
Figure 2:
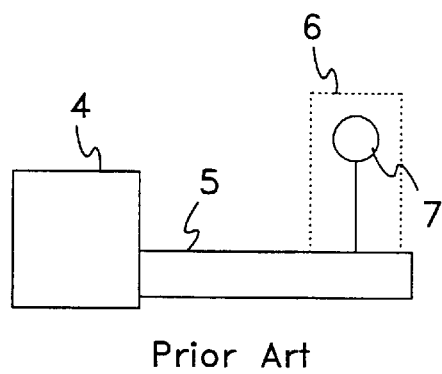
FIG. 2 is a schematic diagram of a conventional electrodeless lamp which produces a microwave discharge.
Figure 3:
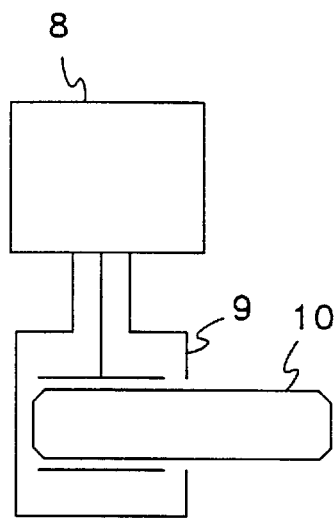
FIG. 3 is a schematic diagram of a conventional electrodeless lamp which produces a travelling wave discharge.
Figure 4:
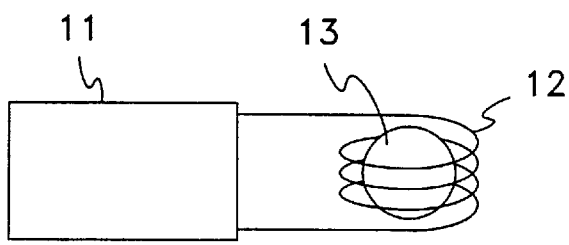
FIG. 4 is a schematic diagram of a conventional electrodeless lamp which produces an H discharge.
Figure 5:
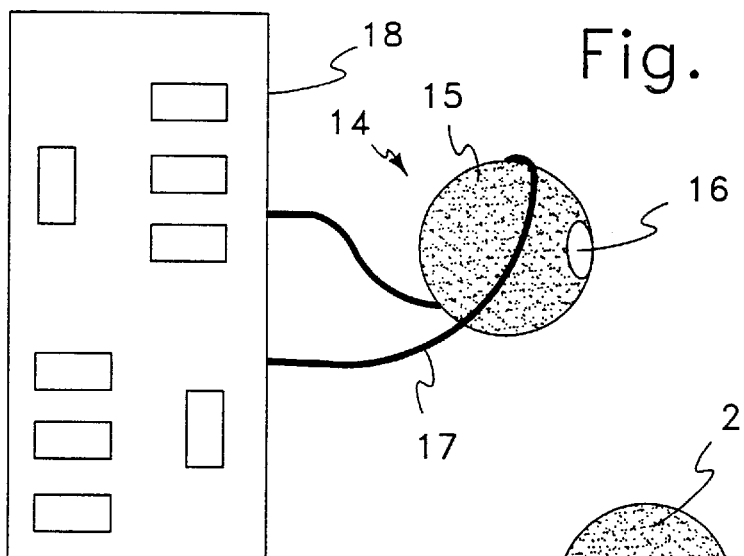
FIG. 5 is a schematic, conceptual diagram of an high brightness electrodeless lamp according to an aspect of the invention.

FIG. 5 is a schematic, conceptual diagram of a high brightness electrodeless lamp according to one aspect the invention. As shown in FIG. 5, an electrodeless lamp bulb 14 is covered with a reflective covering 15 which defines an aperture 16. An inductive coupling loop 17 is driven by a solid state RF source 18 to power the lamp.

Figure 6:
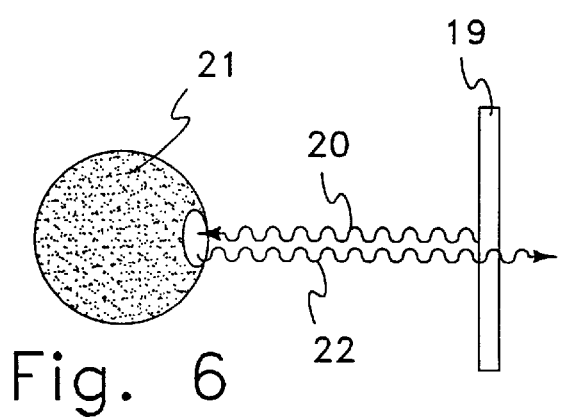
FIG. 6 is a schematic diagram of an optical system which utilizes an example lamp according to an aspect of the invention.

With suitable fills, the lamps of the present invention offer other unique system level advantages. For example, in certain applications, all of the light emitted from a source may not be useful. With a conventional light source, light of an undesired wavelength or polarization must be treated simply as waste light. However, as shown in FIG. 6, an optical system which utilizes an example lamp according to an aspect of the invention may include an optical element 19 which directs waste light 20 back, to be "recaptured" by the aperture bulb 21. Some of these returned photons interact with the plasma and are converted to useful light 22, before being re-emitted, increasing the overall efficiency of the lamp. Such light recapture is described in more detail in U.S. Pat. No. 5,773,918 and U.S. Pat. No. 5,903,091 (assigned in common with the assignee of the present invention), both of which are herein incorporated by reference in their entireties.

Figure 7:
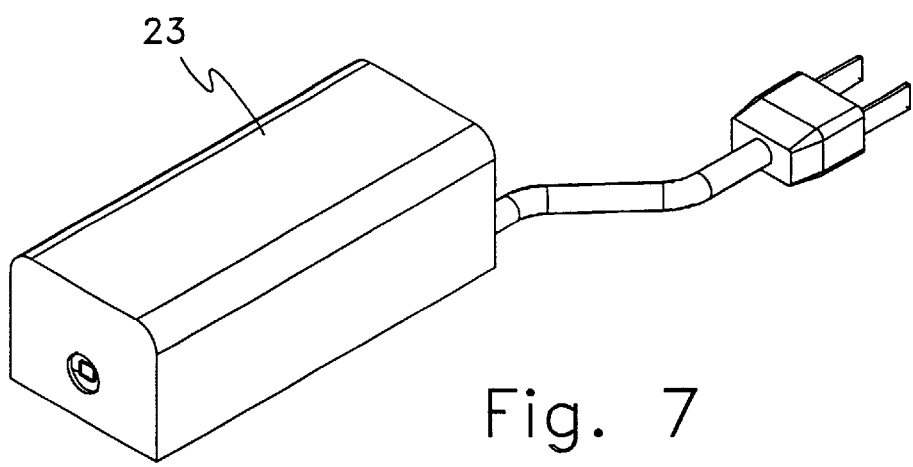
FIG. 7 is a perspective view of an example lamp according to an aspect of the invention, wherein the bulb, RF source, and DC power supply are located in a single housing.
Figure 8:
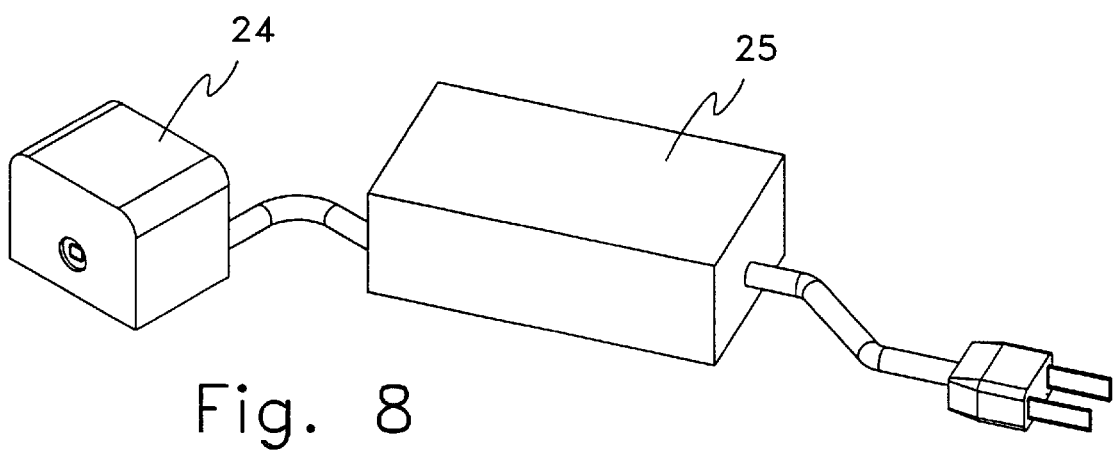
FIG. 8 is a perspective view an example lamp according to an aspect of the invention, wherein the bulb is located in a first housing and the RF source and DC power supply are located in a second housing.

Preferably, the lamp according to invention is compact in size. Advantageously, the lamp can be conveniently packaged into a variety of configurations. For example, the bulb, RF source and DC power supply can be packaged together or each of these modules can be packaged and located separately. FIG. 7 is a perspective view of a lamp according to an aspect of the invention, wherein the bulb, RF source, RF control circuitry, and DC power supply are located in a single housing 23. FIG. 8 is a perspective view of an example lamp according to an aspect of the invention, wherein the bulb is located in a first housing 24 and the RF source, RF control circuitry, and DC power supply are located in a second housing 25. The bulb receives the RF energy through suitable transmission means (e.g., a coaxial cable). While the lamps of the present invention preferably employ a high power oscillator as described herein or in the above-referenced '940 publication, other circuit topologies can alternatively be used to generate the required RF energy. A full range of bulb fill materials from conventional mercury and metal halides to sulfur, selenium, and tellurium can be used in the lamps of the present invention.

Figure 9:
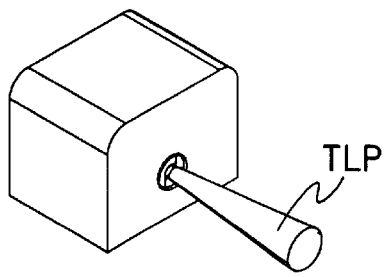
FIG. 9 is a perspective view of an example lamp according to an aspect of the invention utilized in conjunction with a tapered light pipe (TLP).
Figure 10:
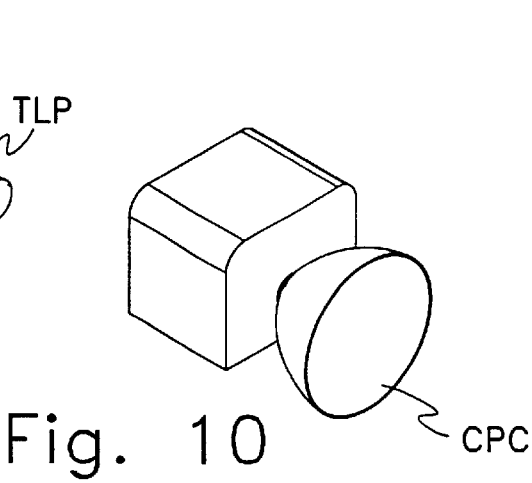
FIG. 10 is a perspective view of an example lamp according to an aspect of the invention utilized in conjunction with a compound parabolic concentrator (CPC).
Figure 11:
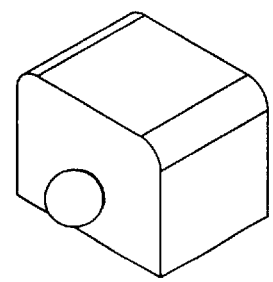
FIG. 11 is a perspective view of an example lamp according to an aspect of the invention utilized in conjunction with a ball lens.
Figure 12:
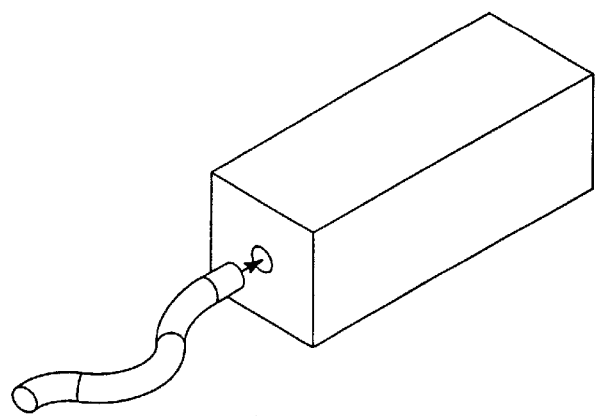
FIG. 12 is a perspective view of an example lamp according to an aspect of the invention directly coupled to a large core fiber optic.
Figure 13:
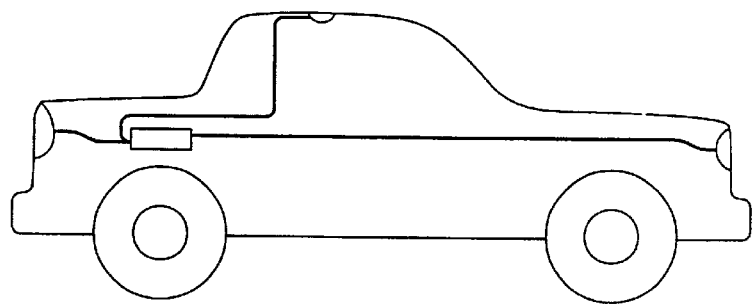
FIG. 13 is a schematic diagram of an example lamp according to an aspect of he invention used in an automotive lighting system with fiber optic distribution.
Figure 14:
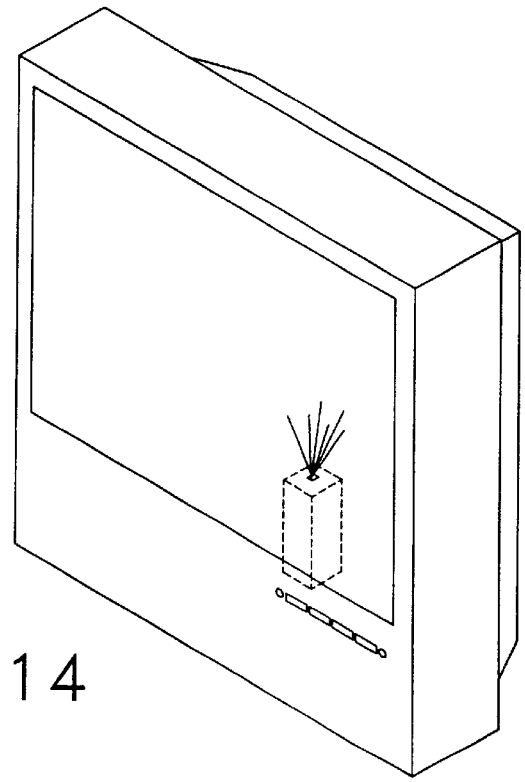
FIG. 14 is a perspective view of an example lamp according to an aspect of he invention used in a projection display.

Many features, advantages, and applications of a solid state, inductively coupled aperture lamp are enumerated in the '940 publication and those skilled in the art will appreciate that such features, advantages, and application are generally applicable to the lamps described herein. FIGS. 9–11 show example lamp systems utilized in conjunction with a tapered light pipe (TLP), a compound parabolic concentrator (CPC), and a ball lens, respectively. FIGS. 12–14 show example applications including a large core fiber optic, an automotive lighting system with fiber optic distribution, and a projection display, respectively.

The examples of the lamps of the present invention described hereinafter are adapted to power a large screen display, a medical instrument, a vehicle headlamp or other application requiring a bright source with an output of three to five thousand lumens. However, a lamp according to various aspects of the invention may be scaled up or down in power and/or size to provide a bright source capable of emitting less than one thousand and up to tens of thousands of lumens or more.

First Lamp System

Figure 15:
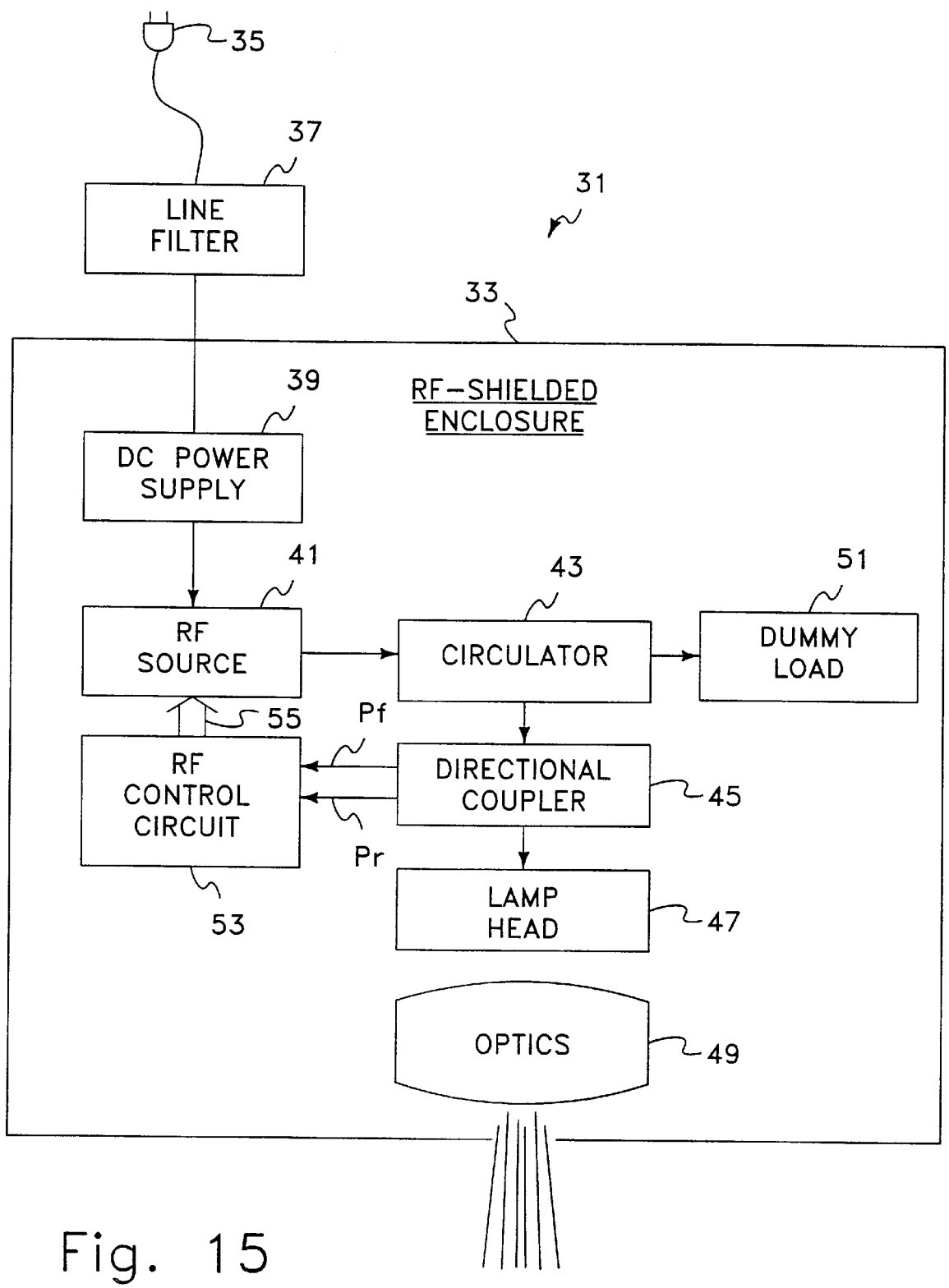
FIG. 15 is a block diagram level schematic representation of a first lamp ystem according to one aspect of the invention.

FIG. 15 is a block diagram level schematic representation of a first example lamp system according to an aspect of the invention. The lamp system 31 includes an RF shielded enclosure 33 which receives power from a wall outlet (or other suitable external source of power) through an electrical connector 35. An optional line filter 37 conditions power provided to the lamp system 31 and/or minimizes RF leakage through the power line (alternatively, the line filter 37 may also be located inside the enclosure 33).

Within the enclosure 33, the external power is provided to an internal DC power supply 39 which converts the external power to a suitable DC voltage for operating the lamp system 31. The DC power supply 39 is connected to an RF source 41 which provides high frequency energy through an optional circulator 43 and a directional coupler 45 to a lamp head 47. The lamp head 47 produces light which is directed out of the enclosure 33 by suitable optics 49. Signals Pf, and Pr, representative of forward and reverse power, respectively, are provided to an RF control circuit 53. The RF control circuit 53 provides a control signal 55 to the RF source 41 in accordance with the signals Pf, Pr. In addition, a port of the optional circulator 43 is coupled to a dummy load 51.

According to one aspect of the invention, a lamp system utilizes a real-time control circuit to eliminate potential problems associated with frequency drift due to thermal effects or aging. The control circuit also eliminates the need for individually tuning each lamp system.

Examples for each of the above discussed components are hereinafter described in detail. Certain of the above components are novel and the subject of the present application. Other components are conventional components which are commercially available from numerous sources. The components are connected by suitable means. For example, coaxial cable is utilized for carrying RF signals and suitable gauge wiring is used for other connections. Also, as discussed herein and depending on system requirements, the components of the lamp system 31 may be distributed among several separate enclosures with suitable connections therebetween. A suitable DC power supply is available from VICOR, Andover, Massachusetts, model number VI MU3-ES, which provides approximately 24 VDC with approximately 300 watts of power.

Optional Circulator

The circulator 43 and its associated dummy load 51 are optional in the first lamp system. When present, the circulator stabilizes the system performance over a wider range of lamp operating conditions. However, the use of the circulator increases the cost of the system and reduces the amount of RF power provided to the lamp head. Without the circulator, more precise control and dynamic impedance matching, especially during the impedance transitions which occur during starting, are required to operate the lamp with consistent stability.

A suitable circulator is available from Connecticut Microwave Corporation, Cheshire, Connecticut, model number 112196, which is capable of handling approximately 150 watts of RF power in the band of about 430–450 MHz. A dummy load is available from Narda, Haupauge, N.Y., model number 374BNM, which is capable of dissipating approximately 20 watts average (5 KW peak) of reflected power at up to about 18 GHz.

Lamp head

With reference to FIG. 16, a lamp head 61 includes an excitation coil 63 disposed around an electrodeless bulb 65. The coil 63 is part of a series resonant circuit which includes two capacitors 67 and 69. The capacitor 67 is a high voltage capacitor. The capacitor 69 is a low voltage capacitor. The capacitors 67 and 69 are connected to each other at one end, with the other end of the capacitor 69 being connected to ground and the other end of the capacitor 67 being connected to the coil 63. The coil 63 is grounded at its other end through a small resistance R1 (which represents the lumped circuit resistance). An RF source 71 provides a high frequency signal to the junction of the capacitors 67 and 69. Operation of the circuit is similar to the operation described in detail in the above referenced '940 publication in connection with the fourth example therein.

In the example illustrated in FIGS. 17 through 22, the bulb 65 is configured in a cup assembly 73. The bulb 65 is disposed within a ceramic cup 75 in between a front ceramic washer 77 (which defines a light-emitting aperture therethrough) and a back ceramic disk 79. As hereinafter described in detail in connection with FIG. 34, the cup assembly 73 also includes a high reflectivity ceramic material surrounding the bulb 65 except in the area of the aperture. The cup assembly 73 is disposed inside the coil 63, with an outer diameter of the cup assembly 73 adapted to be disposed within an inner diameter of the coil 63.

The excitation coil 63 has a general wedding ring shape with an axial lead extending parallel to an axis of the coil and a radial lead extending radially from the coil, as hereinafter described in detail in connection with FIGS. 27 through 31. The excitation coil 63 is disposed in a ceramic heatsink 81 which has an inner bore with a diameter adapted to accommodate an outside diameter of the coil 63. The heatsink 81 also defines a slot which is adapted to receive the radial lead of the coil 63. The axial lead of the coil 63 extends through the heatsink 81 and is connected to the capacitor 67 (see FIG. 21).

The ceramic heatsink 81 is disposed in an upper heatsink 83 which is mounted on an electrically grounded spreader plate 85. A lower heatsink 87 is disposed on a side of the spreader plate 85 opposite to the upper heatsink 83. Preferably, bolts or other fasteners pass through aligned holes in the lower heatsink 87 and spreader plate 85 and into a threaded hole or the like in the upper heatsink 83 to mechanically hold the lamp head 61 together. The upper heatsink 83 is also electrically grounded to the spreader plate 85 and forms a grounded conductive surface or "stove pipe" around the coil 63, the advantages of which are described in the '940 publication. The spreader plate is slotted in the area of the radial lead of the coil 63 and the lead is electrically connected to the spreader plate 85 by soldering or the like.

Figure 21:
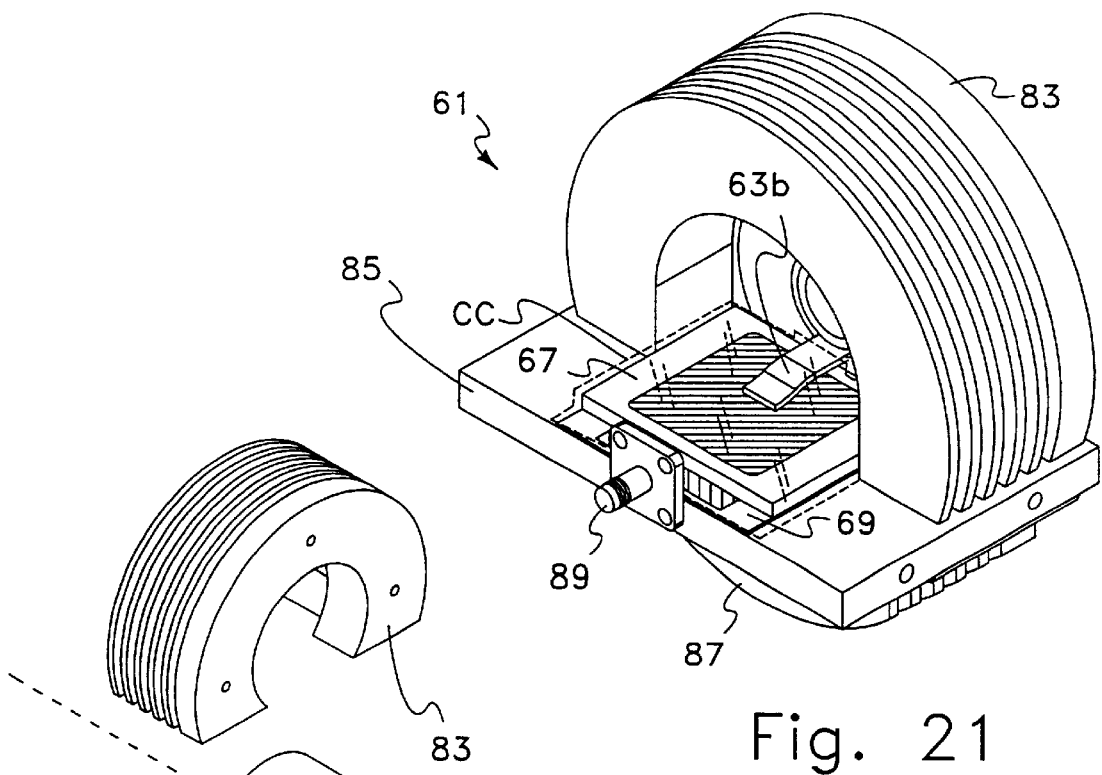
FIG. 21 is a back side perspective view of a lamp head according to an aspect of the invention.
Figure 22:
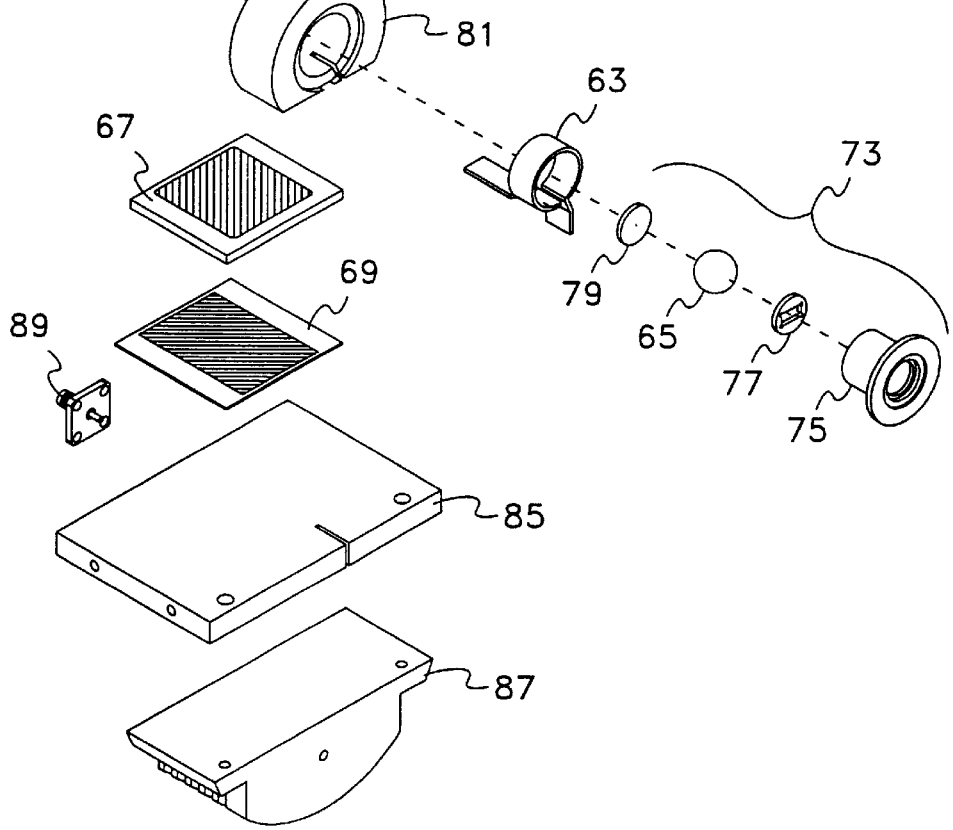
FIG. 22 is an exploded perspective view of a lamp head according to an aspect of the invention.

The capacitors 67 and 69 are stacked together and mounted on the spreader plate 85. Electrical and mechanical connections between the capacitor stack and the spreader plate 85 are formed by soldering or the like. As shown in FIG. 18, a conductive area of the capacitor 69 extends beyond the capacitor 67 and serves as a power feed for the lamp head 61. A coaxial connector 89 is mounted to the spreader plate 85 with a center conductor being soldered to a conductive plate of the capacitor 69 in the extended area. An axial lead 63b of the excitation coil 63 connects to the capacitor 67, as shown in FIG. 21. In particular, a distal end of axial lead 63b is gently bent toward and soldered to the capacitor 67.

Lamp Head Improved Arcing Performance

As is noted in the '940 publication, the high voltages used during lamp operation can create conditions where arcing may occur. Preferably, any steps taken to reduce arcing should not negatively impact overall system efficiency. According to a present aspect of the invention, arcing is minimized by several structural improvements while substantially maintaining system efficiency. One such improvement is a high voltage capacitor (e.g. capacitor 67) with a relatively low dielectric constant. Another improvement is the utilization of a low loss connection between the capacitor stack and the excitation coil. Yet another such improvement is promoting heat transfer away from the capacitor stack.

For a same capacitance value, a material having a lower dielectric constant requires a relatively thicker amount of dielectric material. A relatively thick dielectric material increases the spacing between the capacitor plates, thereby reducing the opportunity for arcing to occur. Preferably, the dielectric constant for the dielectric material utilized in the high voltage capacitor is between about K=2 and K=3.5, or lower. A thicker dielectric material also provides more accuracy in the capacitance value and therefore the operating frequency of the lamp head.

A low loss connection from the high voltage capacitor to the coil is provided by utilizing a short and broad conductor connected from the capacitor stack to the wedding ring coil. As hereinafter described, the conductor is preferably an axial lead which is integral with the coil. A short conductor overcomes a difficulty in achieving a match with the coil by lowering both resistance and inductance.

Lamp Performance

Figure 23:
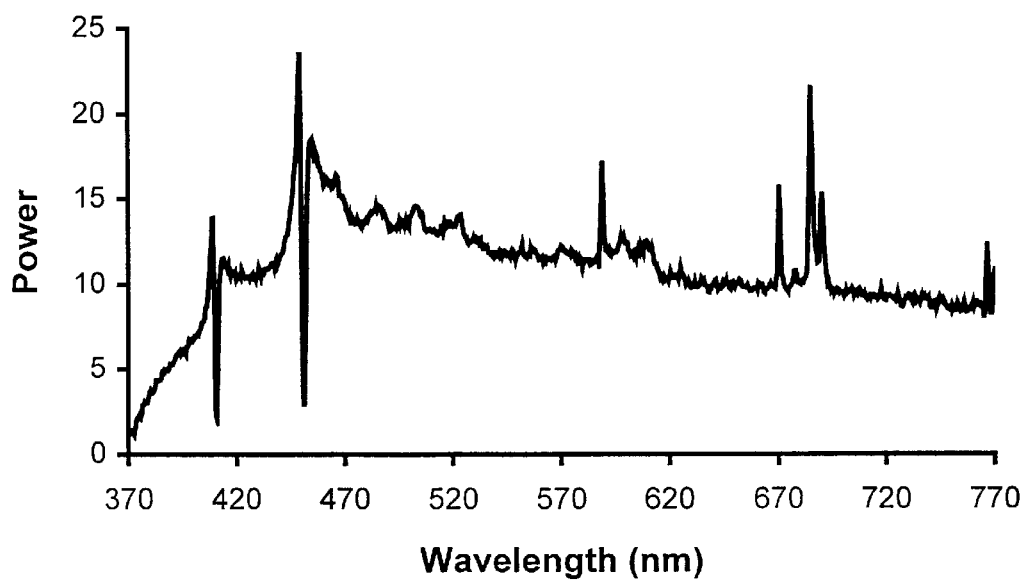
FIG. 23 is a graph of spectral power distribution for an example lamp head according to an aspect of the invention.

FIG. 23 is a graph of spectral power distribution for a lamp head according to an aspect of the invention. The spectrum is produced with a lamp bulb having an outer diameter of 9 mm, an inner diameter of 8 mm (bulb volume of about 0.268 cc), and a fill of 0.4 mg InBr (fill density of about 1.5 mg/cc), 50 Torr Krypton, and a small amount of $Kr_{85}$. The lamp is powered with approximately 140 RF watts of power. As can be seen from FIG. 23, the lamp produces a continuous spectrum of light throughout the visible region. Typical color rendering indices are about 90 or greater.

Figure 24:
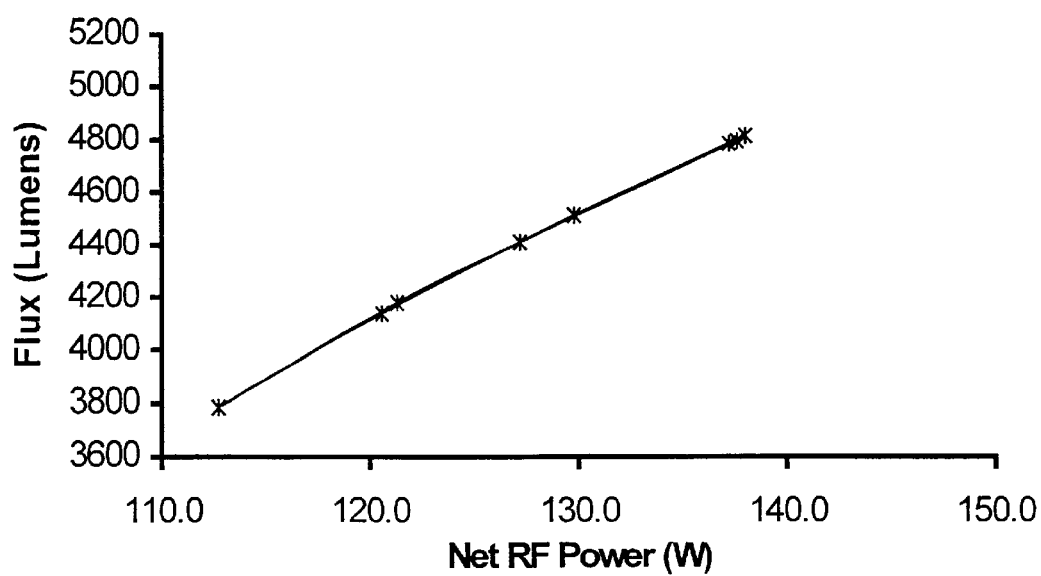
FIG. 24 is a graph of Flux versus RF power for an example lamp head according to an aspect of the invention.

FIG. 24 is a graph of Flux versus RF power for a lamp head according to an aspect of the invention. As can be seen from FIG. 24, the light output increases with increasing RF power. Typical light output from the aperture with 140 Watts of applied RF power is in the range of 4500 to 5000 lumens.

Figure 25:
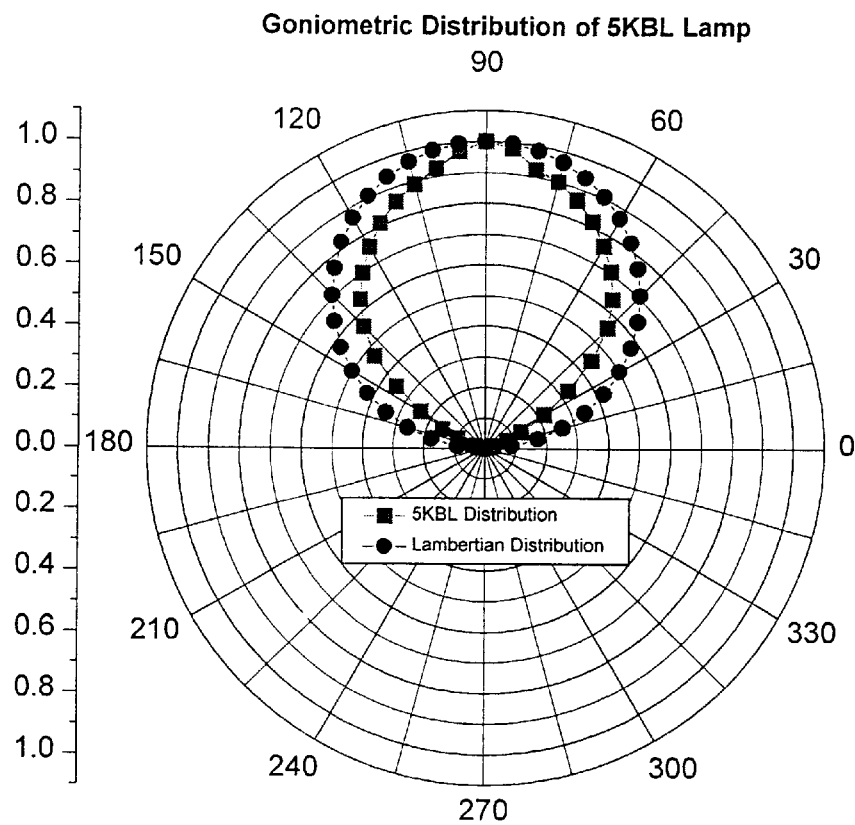
FIG. 25 is a graph of angular light distribution for an example lamp head according to an aspect of the invention.

FIG. 25 is a graph of angular light distribution for a lamp head according to an aspect of the invention.

Figure 26:
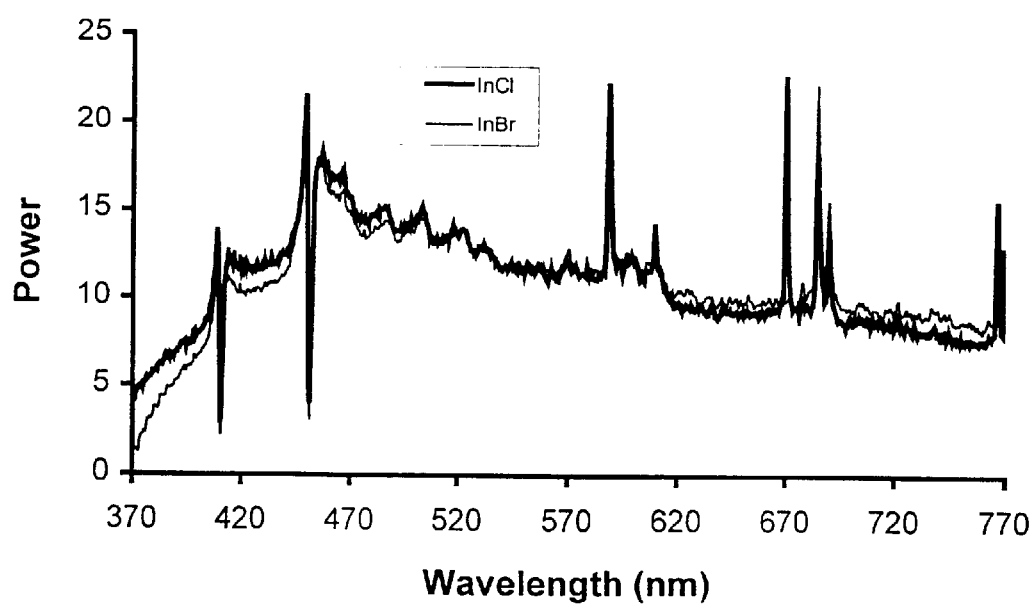
FIG. 26 is a comparison graph of spectral power distribution for an indium chloride lamp fill versus an indium bromide lamp fill.

FIG. 26 is a comparison graph of spectral power distribution for an indium chloride lamp fill versus an indium bromide lamp fill. A bulb having a 9 mm outer diameter and an about 8 mm inner diameter has a lamp fill of 0.48 mg of InCl and 20 Torr Kr and a small amount of $Kr_{85}$. The lamp produced over 6000 lumens at 186 W of RF power with a CCT of about 6,854° K. With a 3.9 mm diameter round aperture, the lamp produced a brightness of about 130 candela/$mm^2$ at an RF power of about 175 W. As compared to InBr fills, InCl runs cooler and therefore facilitates applications of higher levels of RF power while keeping the bulb temperature in a suitable operating range. InCl also provides higher levels of light output at comparable RF powers as compared to InBr.

Wedding Ring Coil

FIGS. 27 and 28 show an excitation coil according to an aspect of the invention. As noted above, the coil 63 has a general wedding ring shape, for which the operation and advantages are described in the '940 publication. In other words, the coil 63 is substantially semi-cylindrical, defining a small gap or slot, and having an axial height which is at least greater than its radial thickness and preferably being between about ⅓ and ⅔ the diameter of the coil. The coil 63 is integrally formed with leads 63a and 63b. In the present example, the lead 63a is nominally the lead which receives power and the lead 63b is nominally the lead which is connected to ground. The lead 63a extends along a plane which is parallel to an axis of the coil 63 while the lead 63b extends along a plane which is parallel to a radial line from the center of the coil 63 through the midpoint of the gap defined by the coil 63.

FIG. 29 is a schematic illustration of an L-shaped coil pre-form suitable for making an excitation coil according to the present aspect of the invention. The pre-form 91 is a conductive material, preferably copper, having a general "L" shape. To make the coil 63, the pre-form is curled around a cylindrical member having an outer diameter corresponding to a desired inner diameter for the coil 63. Specifically, the pre-form 91 is curled through almost a complete circle in the direction of the arrow 93, then bent along the dashed line 95 at a first desired angle, and then bent along the dashed line 97 at a second desired angle. This method of making the coil 63 is both simple and inexpensive while providing satisfactory manufacturing tolerances.

FIG. 30 is a schematic illustration of a first alternative coil pre-form used to make an excitation coil according to an aspect of the invention. In the first alternative, the end of the axial lead is rounded and the outside corner of the "L" is rounded.

FIG. 31 is a schematic illustration of a second alternative coil pre-form used to make an excitation coil according to an aspect of the invention. In the second alternative, the end of the axial lead is circular with a diameter greater than a width of the lead and the outside corner of the "L" is rounded.

Aperture Cup and Gupping

As described in the '940 publication in connection with FIGS. 176–178 thereof, an aperture cup includes a flanged aperture cup made from fully densified alumina with a porosity of about 20%. The flange promotes heat transfer away from the bulb. However, alumina has only modest thermal conductivity characteristics. During operation, most of the heat from the bulb is deposited into the cup in the area of the equator (aligned with the ring of plasma discharge). With the alumina cup, the thermal path from the bulb equator to the heatsink must be minimized for good thermal transfer. Without tight manufacturing tolerances, small radial gaps between the outer wall of the cup and the inner surface of the coil/heatsink assembly can have unpredictable effects on bulb temperature and lamp performance. Thus, to provide good thermal transfer, relatively tight manufacturing tolerances are required to maintain thermal contact between the cup body and the coil/heatsink assembly, thereby increasing costs.

According to a present aspect of the invention, a high thermal conductivity ceramic material is used for the aperture cup (e.g. boron nitride (BN) or aluminum nitride (AlN)). Novel cup structures and lamp head structures utilizing a high thermal conductivity material are hereinafter described. The novel arrangements hereinafter described reduce the need for tight manufacturing tolerances and also reduce the thermal resistance between the bulb and the heatsink, as compared to the various arrangements described in the '940 publication which utilize alumina, alumina-silica or silica cup structures.

Figure 33:
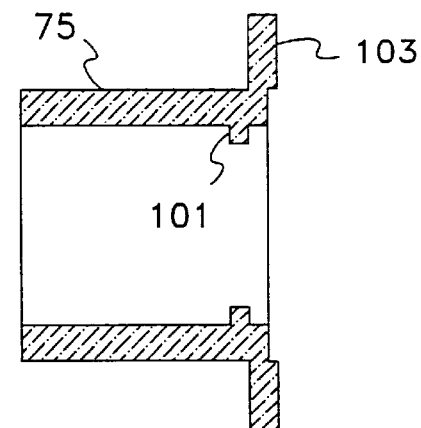
FIG. 33 is a sectional, schematic view of the ceramic cup taken along line 33—33 in FIG. 32.
Figure 32:
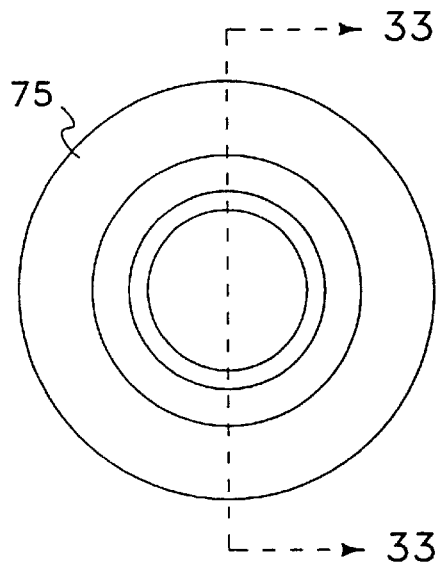
FIG. 32 is a front, schematic view of an example ceramic cup according to an aspect of the invention.
Figure 34:
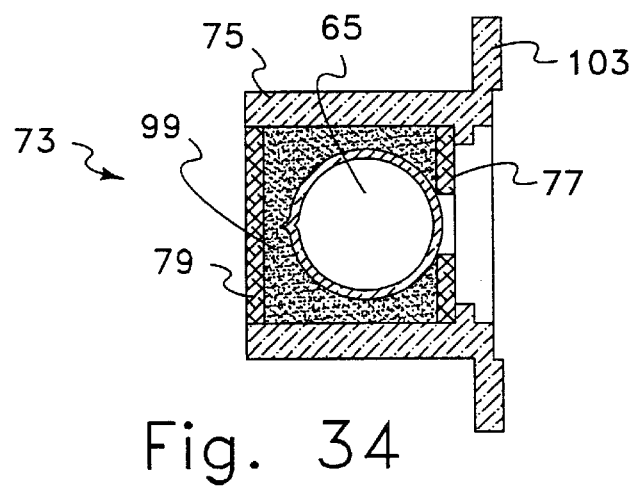
FIG. 34 is a sectional, schematic view of an example assembled ceramic cup according to an aspect of the invention.

As shown in FIGS. 32–34, a ceramic cup 75 is cylindrical with an outer diameter adapted to be disposed within an inner diameter of the coil 63. An inner diameter of the cup 75 is at least slightly greater than an outer diameter of a bulb 65 which is utilized with the cup 75 and is typically made large enough to accommodate a desired amount of high reflectivity ceramic material 99 between the cup 75 and the bulb 65 (see FIG. 34). A typical wall thickness for the cup 75 is between about 0.5 mm and 1 mm. A typical reflective material thickness between the wall of the cup 75 and the bulb 65 is also between about 0.5 mm and 1 mm. The reflective material 99 may include any of the materials noted in the '940 publication and the cup 75 may be filled with the reflective material 99, for example, by any of the techniques described in the '940 publication including hand gupping, solid casting, vacuum pressure, and centrifuge. The reflective material 99 also serves to conduct heat away from the bulb.

The cup 75 defines a shoulder 101 which is adapted to retain the front ceramic washer 77. The cup 75 also includes a flange 103 which is adapted to be received against a shoulder of the ceramic heatsink 81, as hereinafter described. The cup assembly 73 and the heatsink 81 cooperate to position the bulb 65 approximately symmetrically with respect to the coil 63. A front face plate or retaining bracket or the like may be used to secure the cup assembly 73 against the heatsink 81 in the assembled lamp head 61. Also, thermal putty may be disposed at the cup 73/heatsink 81 interface to facilitate a good thermal contact. As described in the '940 publication, the cup assembly 73 may include additional structural features for axially, radially, and otherwise positioning the assembly 73 at a desired location with respect to the coil 63 and the heatsink 81. As shown in FIG. 34, the cup assembly 73 is fitted with the back ceramic disk 79 which may be held in place by a retaining bracket or the like in the assembled lamp head 61.

As noted above, according to a present aspect of the invention, boron nitride (BN) is a suitable material for the ceramic cup 75. The thermal conductivity of BN is at least about three to four times higher than fully densified alumina (e.g. with the alumina having a porosity of 20%). Accordingly, heat is conducted to the front flange 103 of the cup assembly 73 with equal or lower thermal resistance than the alumina cup assembly can conduct heat radially, even if the alumina cup is in interference contact with the coil/heatsink. Also, BN may be configured to exhibit relatively higher thermal conductivity along a direction (e.g. arrows 76) which is preferably aligned with an axis of the coil to promote heat transfer away from the bulb along a thermal path other than radially with respect to the axis of the coil.

Preferably, the high thermal conductivity material does not react with the bulb or reflective ceramic material over the range of lamp temperatures and conditions. When utilizing BN for the high thermal conductivity material and silica for the bulb material, care is taken to avoid contact between the cup 75 and the bulb 65 because of the potential formation of boro-silicates which might degrade the performance of the bulb. The front ceramic washer 77, back ceramic disk 79, and reflective material 99 are all preferably alumina or alumina-silica mixtures. The bulb 65 is preferably adhered to the front washer 77 prior to inserting the bulb 65 in the cup 75. During insertion the washer 77 precisely centers the bulb 65 in the cup 75, thereby promoting a uniform distribution of the reflective material 99 azimuthally around the bulb 65.

Figure 46:
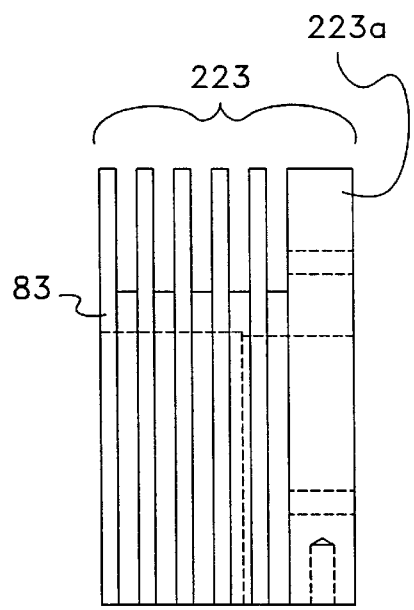
FIG. 46 is a side, schematic view of the first heatsink according to an aspect of the invention.
Figure 47:
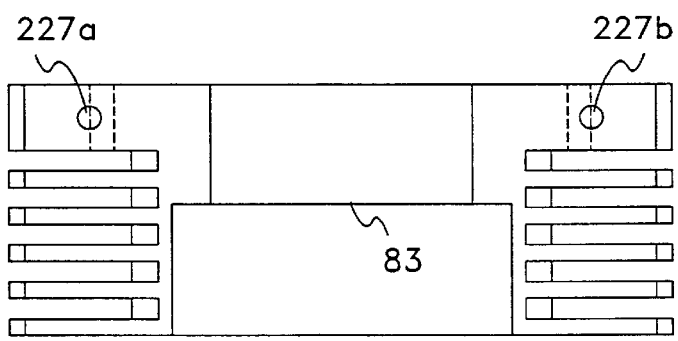
FIG. 47 is a front, schematic view of the first heatsink according to an aspect of the invention.
Figure 48:
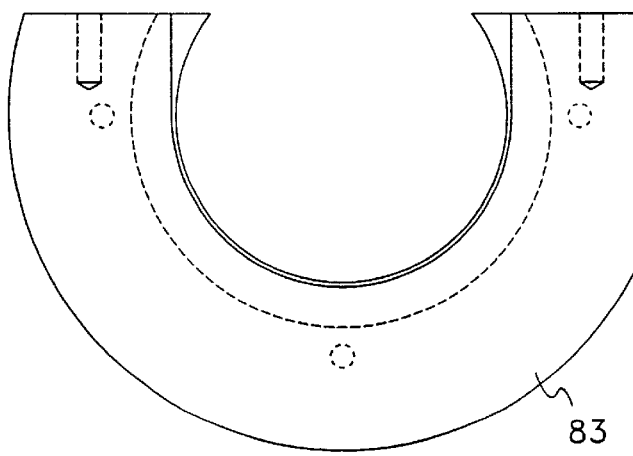
FIG. 48 is a bottom, schematic view of the first heatsink according to an aspect of the invention.
Figure 49:
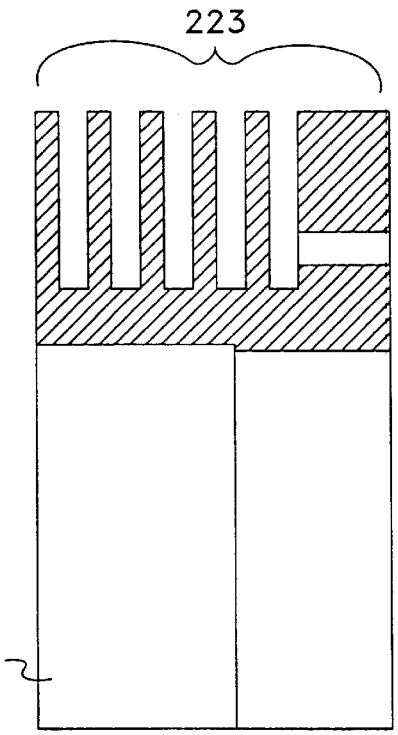
FIG. 49 is an enlarged sectional, schematic view of the first heatsink according to an aspect of the invention.
Figure 51:
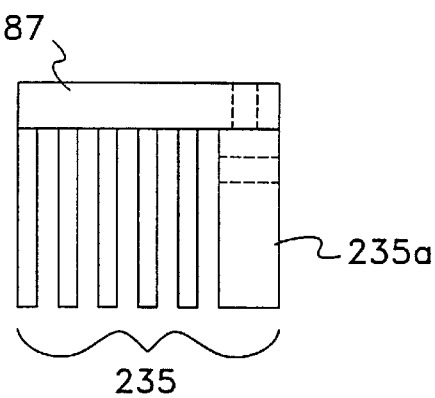
FIG. 51 is a side, schematic view of the second heatsink according to an aspect of the invention.

In some examples, a fan (not shown) may be provided to direct air over the fins 223 of the heatsinks 83, 87 (see FIGS. 46 and 51). With cooling air provided to the lamp head by such a fan, lamp heads utilizing the BN aperture cup of the present aspect of the invention consistently maintain a bulb surface temperature in the area of the aperture of between about 850° C. and 950° C. With a comparable amount of cooling air, lamp heads utilizing an alumina cup may reach temperatures in excess of 1100° C. Accordingly, the high thermal conductivity cups of the present aspect of the invention provide significantly improved bulb lifetimes.

If the BN cup material gets excessively hot, a diffusion path may occur between the BN material and the bulb 65. The partial pressure of borate over a BN surface is a function of the temperature of the BN. By maintaining a close thermal contact between the cup 75 and the heatsink 81, the temperature of the BN cup 75, and consequently the partial pressure of borate are kept suitably low to minimize the likelihood of a diffusion path occurring between the cup and the bulb.

Figure 35:
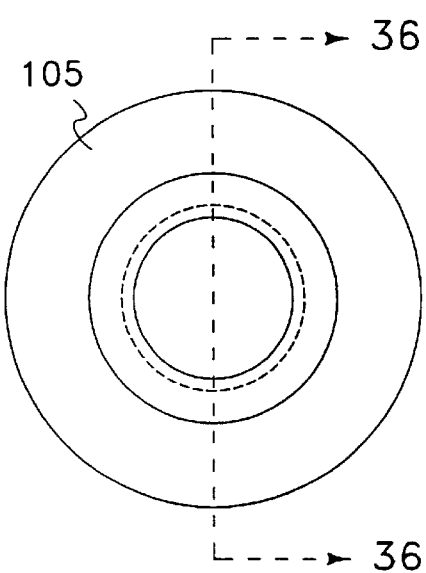
FIG. 35 is a front, schematic view of a ceramic cup according to another example of the invention.
Figure 36:
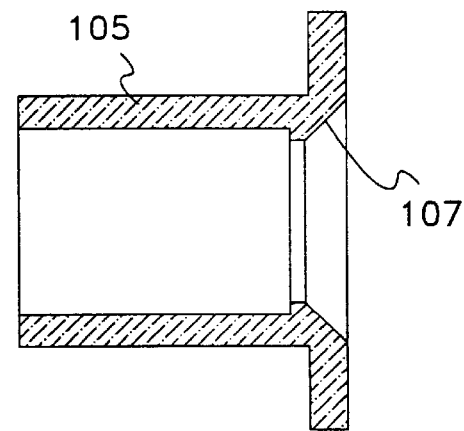
FIG. 36 is a sectional, schematic view of the ceramic cup taken along line 36—36 in FIG. 35.

FIGS. 35 and 36 show another example of a ceramic cup. In particular, a cup 105 is similar to the cup 75, except that the front opening of the cup 105 defines a chamfer 107.

Figure 37:
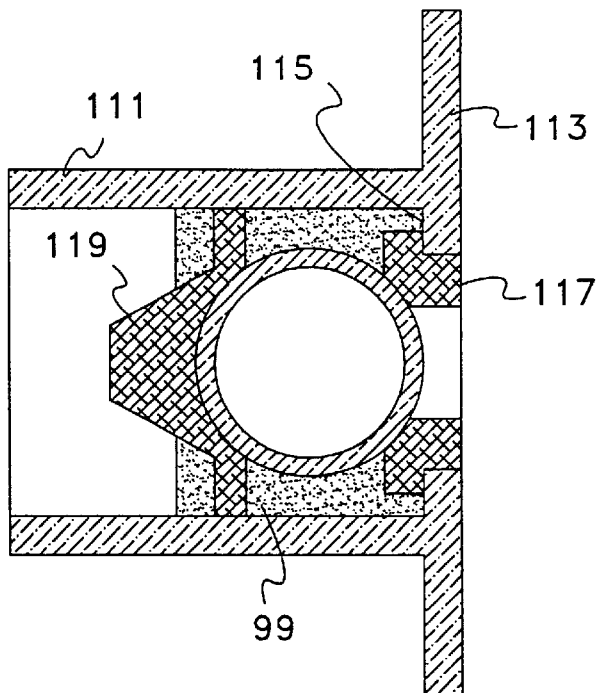
FIG. 37 is a sectional, schematic view of an alternative assembled ceramic cup according to another example of the invention.
Figure 38:
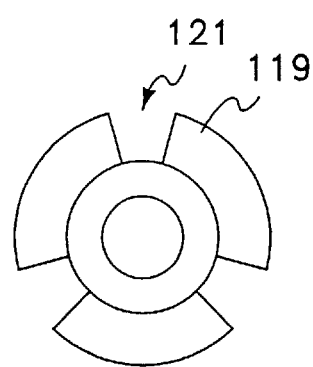
FIG. 38 is a schematic view of a back washer according to an example of the invention.

FIG. 37 is a sectional, schematic view of an alternative assembled ceramic cup according to an aspect of the invention. FIG. 38 is a schematic view of a back ceramic washer according to an aspect of the invention. A ceramic cup 111 is similar to the ceramic cup 75, including a flange 113 and defining a shoulder 115. A front ceramic washer 117 and a back ceramic washer 119 are disposed in contact with the bulb 65. The front washer 117 is positioned within an opening defined by the cup 111 and abuts the shoulder 1 15. An outer diameter of the back washer 119 closely matches an inner diameter of the cup 111. The front and back washers 117, 119 cooperate to center the bulb within the cup 111. As shown in FIG. 38, the back washer 119 may include wedge shaped radial openings 121 which are adapted to provide proper flow and drying of the ceramic reflector slurry precursor (i.e. gupping). For example, the inside volume of the cup 111 may be filled with a flowable slurry of gup material (e.g. Nichia) which completely covers the bulb. The back washer 119 is then slid onto the back of the bulb, thereby displacing the flowable slurry through the openings 121. The gup material then dries and is oven fired to provide the reflective material 99. The back washer 119 may be further configured with a well adapted to accommodate the gradual drying of the reflective material 99 without significant cracking.

Figure 39:
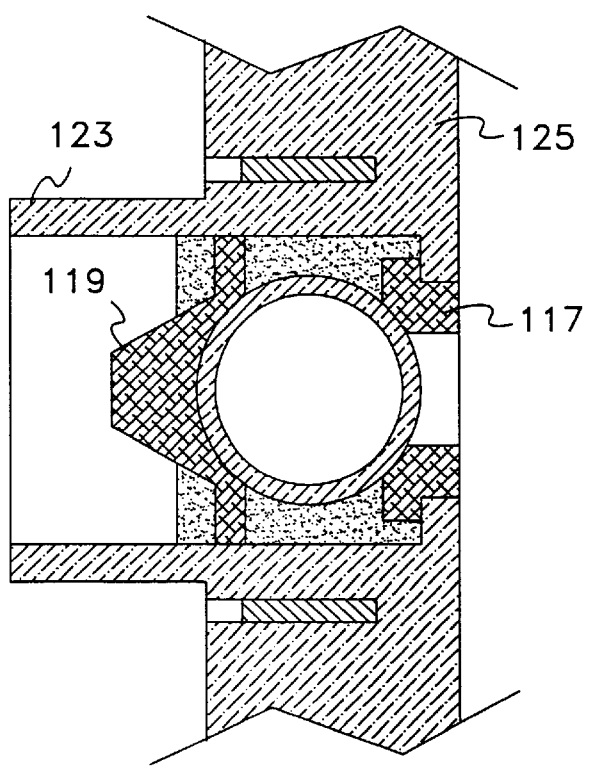
FIG. 39 is a fragmented, sectional view of an integral ceramic cup and heatsink assembly according to an example of the invention.

FIG. 39 is a fragmented, sectional view of an integral ceramic cup and heatsink assembly according to an aspect of the invention. In FIG. 39, a ceramic cup portion 123 is integral with a ceramic heatsink portion 125. The bulb 65 and front and back washers 117,119 are otherwise similar to those described above with respect to FIG. 37. As compared to a separate ceramic cup and heatsink assembly, the integrated cup and heatsink may reduce costs because less material is wasted.

Figure 40:
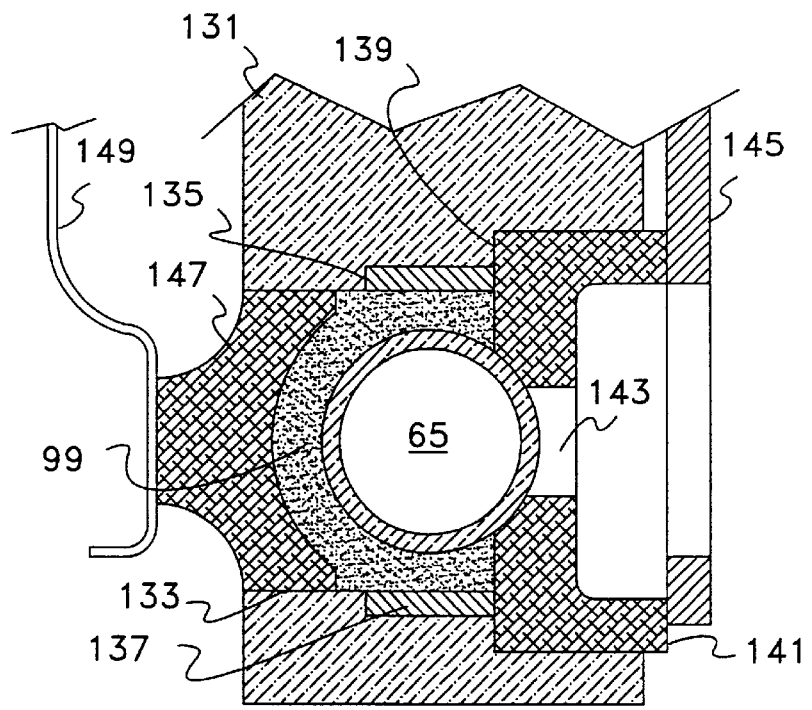
FIG. 40 is a fragmented, sectional view of a first alternative integral ceramic cup and heatsink assembly according to an example of the invention.

FIG. 40 is a fragmented, sectional view of a first alternative integral ceramic cup and heatsink assembly according to an aspect of the invention. In FIG. 40, a ceramic heatsink 131 defines a bore 133 having a first shoulder 135 adapted to receive an excitation coil 137 and a second shoulder 139 adapted to receive a front ceramic washer 141. The front ceramic washer 141 defines an aperture 143 therethrough and the bulb 65 is disposed against the front washer 141 so that the bulb emits light through the aperture 143 during lamp operation. A face plate 145 is mechanically secured to the lamp head 61 and is adapted to retain the front washer 141 in close contact with the heatsink 131. The bore 133 is filled with reflective ceramic material 99 and closed with a back ceramic washer or plunger 147. The reflective material 99 may comprise an alumina powder. A spring 149 constantly provides tension to the plunger 147 to retain the plunger 147 and the powder in the bore 133. As compared to the foregoing example, the present arrangement eliminates the cup material between the coil 137 and the bulb 65. The diameter of the coil 137 is consequently reduced, thereby improving the coupling of RF energy to the fill during operation. Typical thickness for the reflective material 99 between the coil 137 and the bulb 65 is about 0.5 mm to 1 mm. The first alternative example may be manufactured in mass quantities and is low cost and highly durable.

Figure 41:
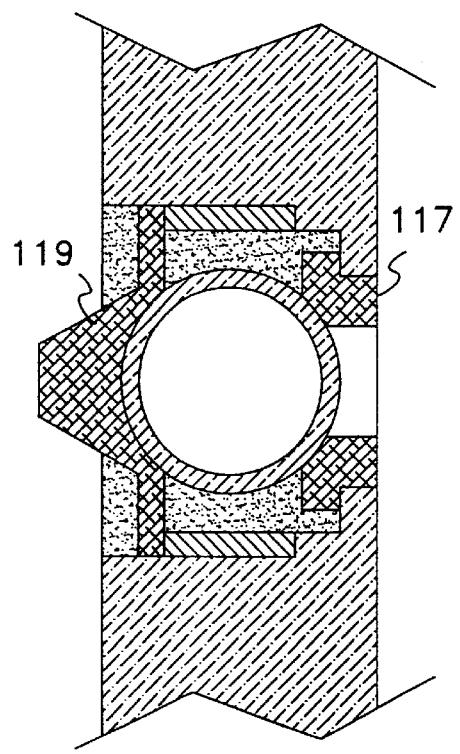
FIG. 41 is a fragmented, sectional view of a second alternative integral ceramic cup and heatsink assembly according to an example of the invention.

FIG. 41 is a fragmented, sectional view of a second alternative integral ceramic cup and heatsink assembly according to an aspect of the invention. The second alternative also eliminates the cup material between the coil and the bulb, while otherwise utilizing the front and back washers 117, 119 described above in connection with FIG. 37. In this and other examples utilizing a back washer, and if necessary or desirable, an optional spring or high temperature resilient material may be disposed against the back washer to retain the washer in position.

Ceramic Heatsink

Figure 42:
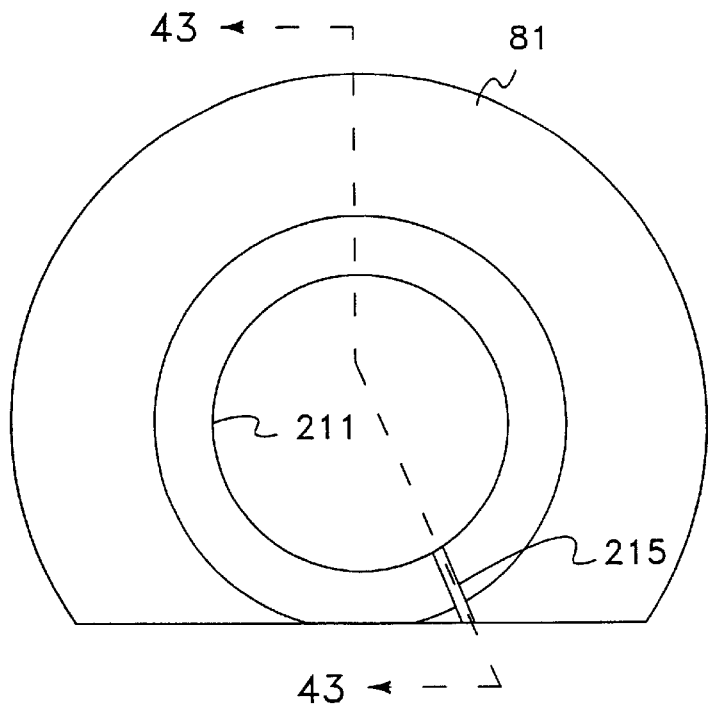
FIG. 42 is a top, schematic view of a ceramic heatsink according to an aspect of the invention.
Figure 43:
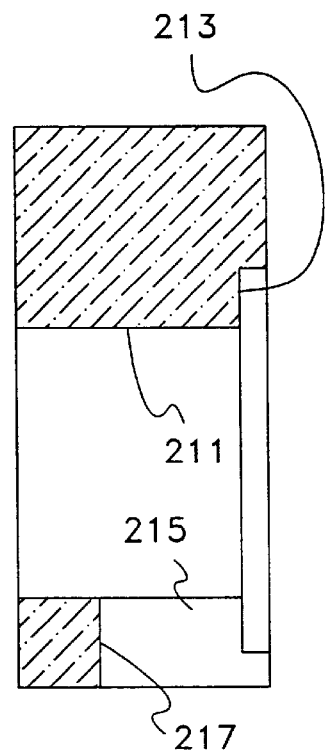
FIG. 43 is a sectional, schematic view of the ceramic heatsink according to an aspect of the invention, taken along line 43—43 in FIG. 42.
Figure 44:
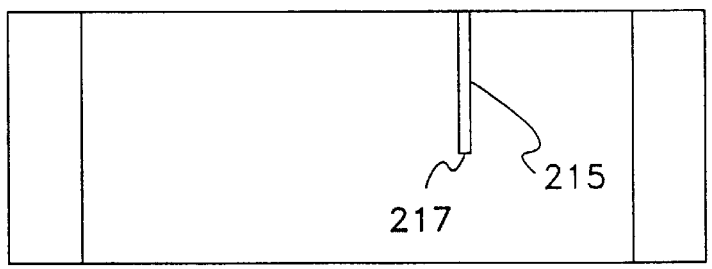
FIG. 44 is a front, schematic view of a ceramic heatsink according to an aspect of the invention.

With reference to FIGS. 42–44, a ceramic heatsink 81 is in the general shape of a truncated cylinder with a bore 211 therethrough. The outer diameter of the coil 63 substantially corresponds to the inner diameter of the bore 211. The heatsink 81 is counter-bored to define a shoulder 213 which is adapted to receive the flange 103 of the cup assembly 73. The heatsink 81 further defines a slot 215 which is wide enough to receive the radial lead 63b of the coil 63. The slot 215 is machined to a desired depth in the heatsink 81 to set the position of the coil 63 within the heatsink 81. When the coil 63 is positioned in the heatsink 81 the coil 63 is oriented so that the radial lead 63b aligns with the slot 215. The coil 63 is then pushed into the heatsink 81 until the leading edge of the lead 63b abuts a back wall 217 of the slot 215. Boron nitride (BN) is a suitable material for the heatsink 81. Aluminum nitride (AlN) is an alternative material.

Upper Heatsink

The foregoing structures relating to the ceramic cup assembly 73 and the ceramic heatsink 81 can be made part of an integrated lamp head having, for example, a metal matrix composite body made from AlSiC, as described in detail in the '940 publication. However, another example of the invention utilizes a separate outermost heatsink, as hereinafter described.

With reference to FIGS. 45–49, an example of an upper heatsink 83 is made from an electrically conductive material with good thermal conductivity properties such as, for example, aluminum. The heatsink 83 may be machined, molded, or otherwise manufactured by conventional means. The heatsink 83 is in the general form of a truncated cylinder with a bore 221 therethrough. The heatsink 83 includes a plurality of radial cooling fins 223 disposed perpendicular to an axis of the bore 221. Alternatively, axially aligned cooling fins or any other useful arrangement for the cooling fins may be utilized. An end fin 223a in the area of where the ceramic heatsink 81 is to be positioned is relatively thicker and provides a plurality of mounting holes 225a–c, which may be threaded, for mounting a face plate retaining bracket, a lens holder, and/or other interfacing components to the lamp head 61 (see FIG. 45). The heatsink 83 also provides threaded mounting holes 227a–b on a bottom surface thereof which are aligned with corresponding through holes in the spreader plate 85 and bottom heatsink 87 for mechanically securing these components to each other (see FIG. 47).

Lower Heatsink

Figure 50:
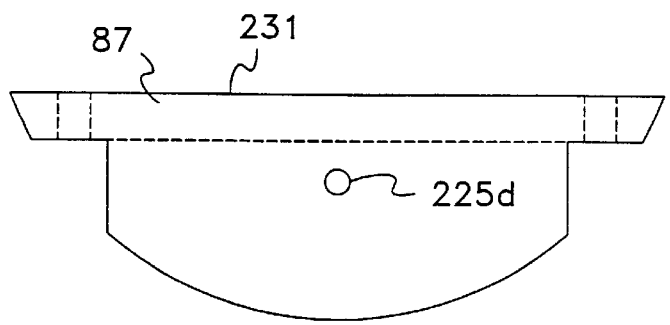
FIG. 50 is a front, schematic view of a second heatsink according to an aspect of the invention.
Figure 52:
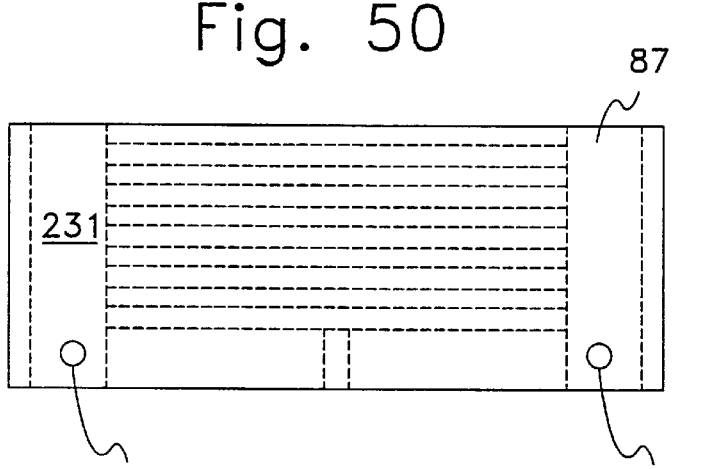
FIG. 52 is a top, schematic view of the second heatsink according to an aspect of the invention.

As shown in FIGS. 50–52, a lower heatsink 87 is also in the general shape of a truncated cylinder having a substantially flat top surface 231 with through holes 233a–b defined therethrough which align with the threaded holes 227a–b in the upper heatsink 83. The heatsink 87 includes a plurality of radial cooling fins 235 disposed perpendicular to the top surface 231. An end fin 235a defines a mounting hole 225d which may be used in conjunction with the holes 225a–c in the upper heatsink 83 for mounting components to the lamp head 61.

Spreader Plate

The spreader plate 85 (see FIGS. 53–54) is a relatively thick (e.g. 3–5 mm) slab of electrically conductive material with good thermal conductivity such as, for example, copper. The spreader plate provides an electrically grounded mounting base for the coil 63 and capacitors 67 and 69. The spreader plate 85 also distributes heat which is generated primarily at the coil/bulb end of the lamp head over a larger surface for dissipation by the upper and lower heatsinks 83, 87.

Figure 53:
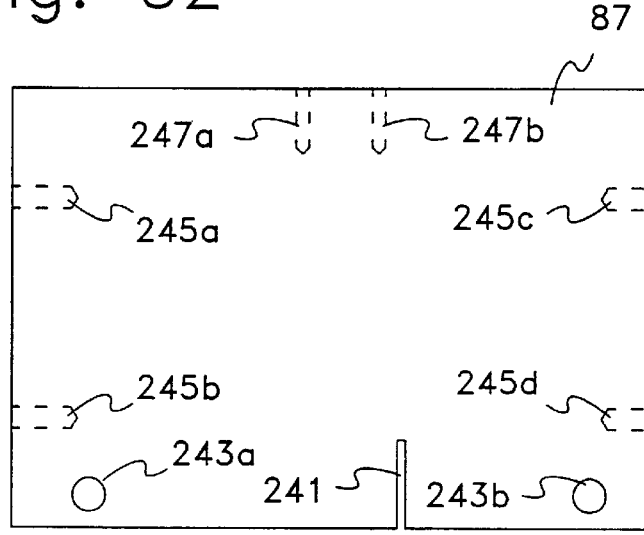
FIG. 53 is a top, schematic view of a spreader plate according to an aspect of the invention.
Figure 54:
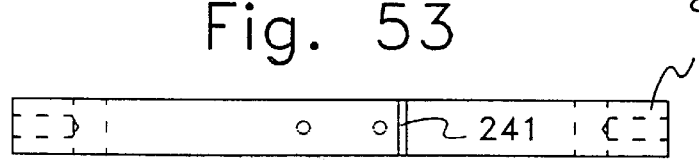
FIG. 54 is a front, schematic view of the spreader plate according to an aspect of the invention.

The spreader plate 85 defines a slot 241 which is typically at least as deep as the slot 215 in the ceramic heatsink 83 so that the heatsink 81 may be positioned flush with a front edge of the spreader plate 85 (see FIG. 53). The radial lead 63b is positioned in the slot 241 and mechanically and electrically connected to the spreader plate 85 by soldering or the like. The spreader plate 85 defines through holes 243a–b which align with the through holes 233a–b in the lower heatsink 87 and the threaded holes 227a–b in the upper heatsink 83 The spreader plate 87 also defines a plurality of threaded holes 245a–d which may be utilized to mount the lamp head 61 within an enclosure. Threaded holes 247a–b are utilized to mount the coaxial connector 89.

Capacitor Stack

In general terms, the first lamp system is an RF-powered, inductively coupled electrodeless lamp which utilizes a capacitor stack as part of a series resonant circuit for coupling the RF power to the lamp fill. The lamp head 61 utilizes two capacitors stacked together, with power being provided to the series resonant circuit at a junction between the junction of the two capacitors (see FIG. 16). The capacitor stack includes a high voltage capacitor between the power feed and the coil and a low voltage capacitor between the power feed and ground. The high voltage capacitor is subject to high voltages during lamp operation and is preferably configured to minimize arcing, through utilization of one or more of the techniques described herein or in the '940 publication.

Figure 55:
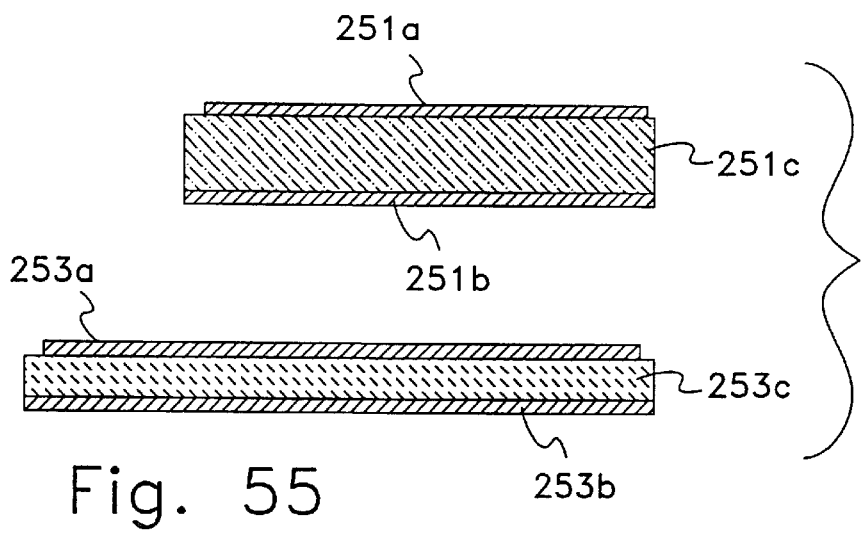
FIG. 55 is a schematic cross-sectional view of an exemplary capacitor stack according to an aspect of the invention.
Figure 56:
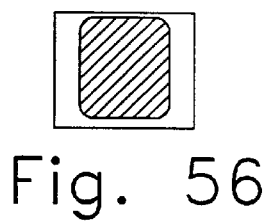
FIGS. 56 and 57 are schematic views a first example of a high voltage capacitor and a low voltage capacitor, respectively, according to an aspect of the invention.
Figure 57:
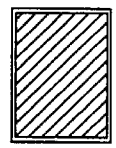
Figure 58:
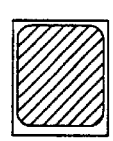
FIGS. 58 and 59 are schematic views a second example of a high voltage capacitor and a low voltage capacitor, respectively, according to an aspect of the invention.
Figure 59:
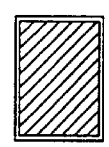
Figure 60:
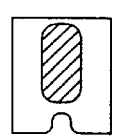
FIGS. 60 and 61 are schematic views a third example of a high voltage capacitor and a low voltage capacitor, respectively, according to an aspect of the invention.
Figure 61:
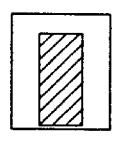
Figure 62:
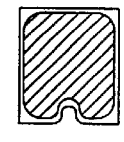
FIGS. 62 and 63 are schematic views a fourth example of a high voltage capacitor and a low voltage capacitor, respectively, according to an aspect of the invention.
Figure 63:
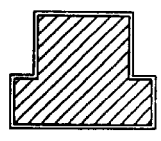
Figure 64:
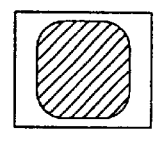
FIGS. 64 and 65 are schematic views a fifth example of a high voltage capacitor and a low voltage capacitor, respectively, according to an aspect of the invention.
Figure 65:
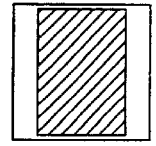
Figure 66:
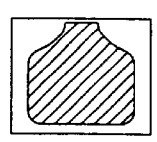
FIGS. 66 and 67 are schematic views a sixth example of a high voltage capacitor and a low voltage capacitor, respectively, according to an aspect of the invention.
Figure 67:
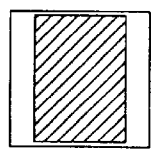

FIG. 55 is a schematic cross-sectional view of an exemplary capacitor stack according to an aspect of the invention. A high voltage capacitor 251 (corresponding, e.g., to capacitor 67) includes conductive pads 251a and 251b which are disposed on opposite sides of a first dielectric material 251c. A low voltage capacitor 253 (corresponding, e.g., to capacitor 69) includes conductive pads 253a and 253b which are disposed on opposite sides of a second dielectric material 253c. For example, the high voltage capacitor 251 may comprise a printed circuit board having a dielectric material made of a Teflon® composite and clad with copper plating for the conductive pads 251a, 251b. The thickness of the dielectric material and the area of the conductive pads are selected to provide a desired capacitance value. When stacked together, the conductive surface 253a extends beyond the high voltage capacitor 251 and provides a connection point (e.g. by soldering) for the RF power between the two capacitors.

FIGS. 56 through 69 are respective schematic representations of various configurations of high voltage capacitors and low voltage capacitors, respectively, according to an aspect of the invention. In the present example, the dielectric material, the thickness of the dielectric material, and the conductive surface areas of the high voltage capacitor are selected to provide a capacitance of about 5 pF. The dielectric material, the thickness of the dielectric material, and the conductive surface areas of the low voltage capacitor are selected to provide a capacitance of about 48 pF. Suitable materials for the high and low voltage capacitors include Rogers™ 4003 at thicknesses of 0.063" and 0.020", respectively and Rogers Duroid™ 5870 at thicknesses of 0.125" and 0.020". In general, the thickness of the dielectric material of the high voltage capacitor 251 can range between about 0.5 mm and 3.0 mm, with the capacitance of the capacitor 251 ranging between about 5 pF and 6 pF. Preferably, the low voltage capacitor 253 is several times larger in capacitance value than the high voltage capacitor 251, preferably ranging between about 30 pF and 40 pF.

Lid Over Capacitor Edge

Figure 70:
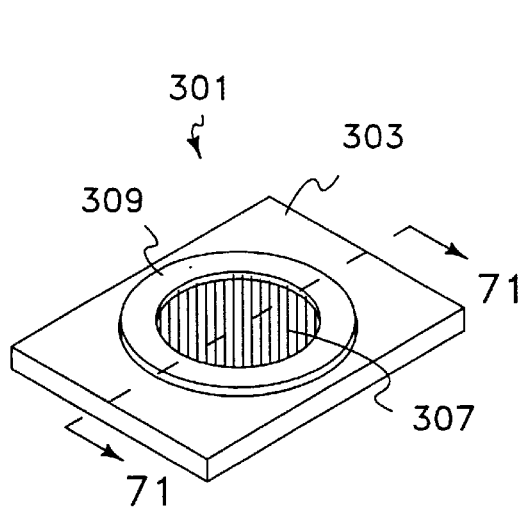
FIG. 70 is a perspective view of a high power capacitor according to another example of the invention having a circular conductor plate.
Figure 71:
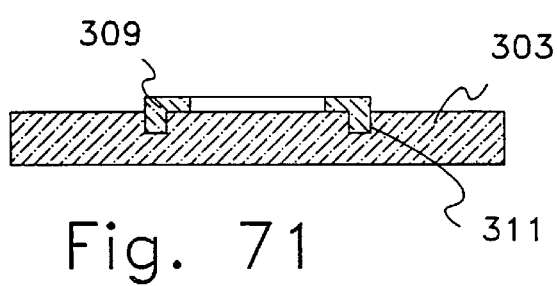
FIG. 71 is a side sectional view of the capacitor of FIG. 70, taken along line 71—71 in FIG. 70.
Figure 72:
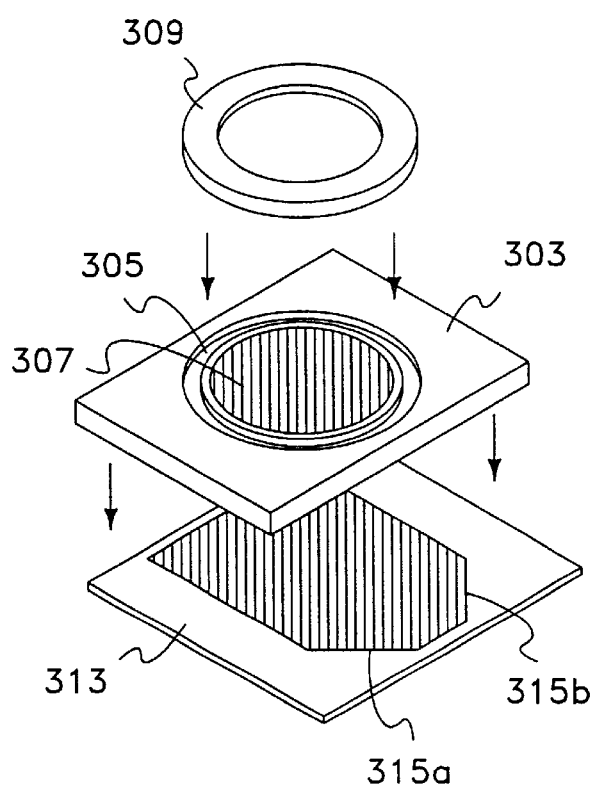
FIG. 72 is an exploded view of the capacitor of FIG. 70.

FIGS. 70–72 show an example of a high voltage capacitor according to a present aspect of the invention. A high voltage capacitor 301 is made from relatively thick dielectric material 303 and defines a circular groove or channel 305 approximately centered therein. A circular capacitor plate 307 is formed on the material 303 interior to the channel 305. A second plate (not illustrated) of the high voltage capacitor is disposed on an opposite side of the material 303 and is preferably rectangular and extends beyond the edge of the circular plate 307 in both dimensions. A dielectric lid 309 is configured to cover the edge of the circular plate 307 and includes a shoulder 311 adapted to fit in the channel 305. The dielectric lid 309 may be made from the same dielectric material as the material 303.

The capacitor 301 improves the arc resistant performance of the lamp head for various reasons. For example, the round surface for the plate 307 minimizes the E field. Further, the round surface for the plate 307 has no sharp corners where charge may accumulate. Moreover, the lid 309 covers the edge of the circular plate 307 so that any burrs or finishing defects are not exposed.

The low voltage capacitor 321 includes chamfered corners 315a and 315b on the conductive plate to which power is connected to the capacitor stack.

Cooling of Capacitor Stack

Figure 73:
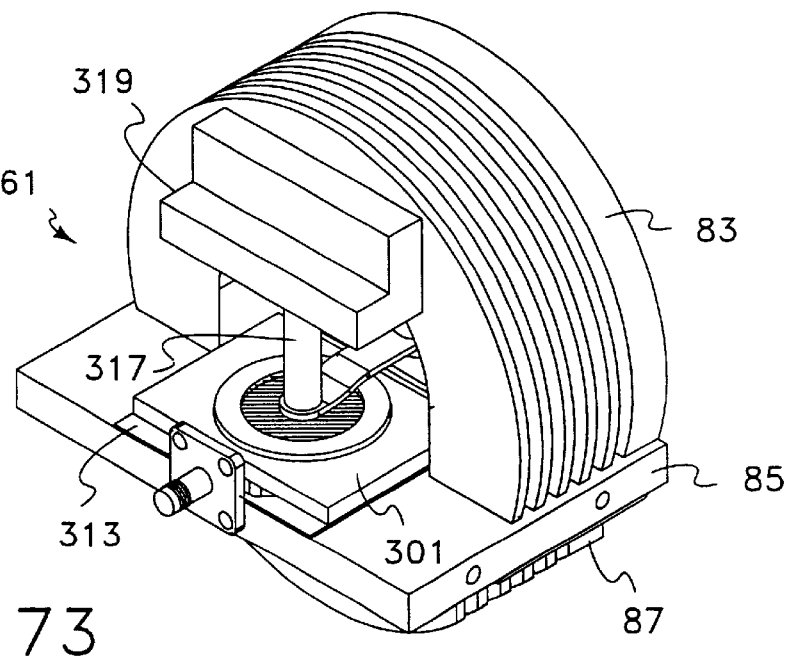
FIG. 73 is a perspective view of a lamp head assembly including heat dissipating structures for a capacitor stack.

FIG. 73 is a back side perspective view of a lamp head configuration according another aspect of the invention. The lamp head 61 utilizes the above described capacitor stack arrangement. The lamp head 61 further includes a rod 317 disposed between the capacitor stack and a bracket 319 which is mounted to the heatsink 83. The rod 317 functions to draw heat away from the capacitors by providing a thermal conduction path from the capacitors to the heatsink. The rod 317 is made from a suitable material for conducting heat from the high voltage capacitor without otherwise adversely affecting the lamp head performance. Specifically, the selected material should not introduce parasitics which might adversely affect the head frequency, the impedance match, or the efficiency. A suitable material for the rod 317 is boron nitride (BN). An alternative material is aluminum nitride (AIN).

Corona Suppression

During assembly, the capacitor stack may be conformally coated with, for example, silicone resin to further reduce the occurrence of arcing. The conformal coating reduces corona effects because it prevents the conductive surfaces from being exposed to air.

High fields can ionize the air around conductive surfaces. If the air breaks down, corona can occur on the edges of the conductive surface. In accordance with a present aspect of the invention, the silicone-based conformal coating is applied over the capacitor stack and the axial lead 63b of the coil 63. In particular, in FIG. 21, the essentially clear conformal coating CC is sprayed over the upper (e.g. exposed) surfaces of the high voltage capacitor 67, the exposed surface of the voltage capacitor 321, and over the axial lead 63b. An example silicone-based resin spray suitable for conformal coating CC is KonForm® SR, commercially available from Chemtronics®. Conformal coating may likewise be applied to the exposed surfaces of the capacitors 301 and 313, the lead 63 b, and the ceramic parts 317 and 81P illustrated in FIGS. 73 and 75. Preferably, the edges of the lead 63b are curved to avoid sharp corners and the surfaces of the lead 63b are polished to remove burrs, crevices, etc.

Figure 74:
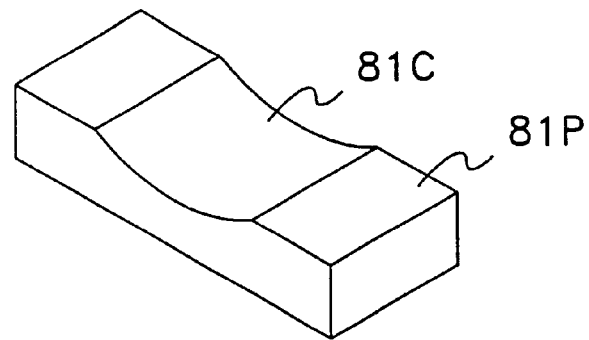
FIG. 74 is a perspective view of a ceramic coil lead support post according to an example of the invention.
Figure 75:
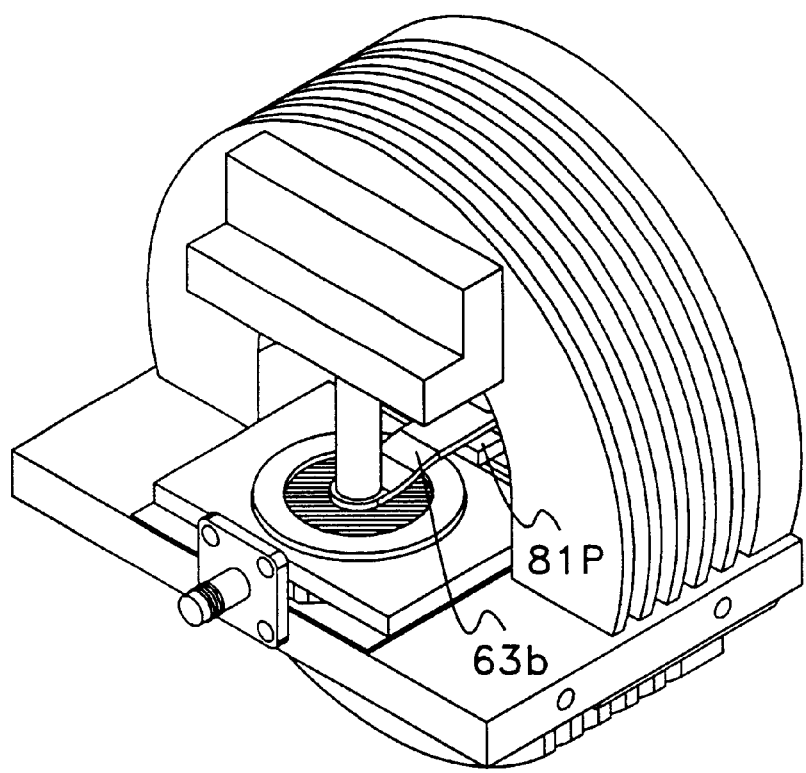
FIG. 75 is a rear perspective view of a lamp head assembly including heat dissipating structures for a capacitor stack as well as the coil lead support post of FIG. 74.

In one aspect of the invention, as shown in FIGS. 74 and 75, the ceramic heatsink further defines a post 81 P formed on a rear surface thereof. A bottom surface of the post 81 P is coplanar with a bottom surface of the heatsink 81. The post 81 P defines a channel or trough 81C formed on an upper surface thereof and adapted to accommodate and support the axial lead 63b in the manner shown in FIG. 75. The post 81P serves, e.g., to contain fields in the region of the axial lead 63b, so that any such fields do not significantly interfere with the capacitor stack. The post 81P can be coated with the conformal coating CC along with the capacitor stack and axial lead 63b in the manner described above.

Coaxial Capacitor

In the electrodeless lamps described herein, a resonant RF circuit is utilized to couple energy into a lamp fill. As noted above, such circuits generate high voltages. The present aspect of the invention is directed to a capacitor structure with improved high voltage tolerance. The present capacitor structure also advantageously facilitates coupling adjustments to improve the match with the RF source.

High voltages may induce arcing or corona effects, which are damaging to the insulators used with capacitors, thereby shortening the capacitor life. Conventional planar capacitors have "knife" edge structures that are prone to have high electric fields that are prone to initiate arcing or corona effects. The capacitor structures discussed above are directed to novel planar capacitor structures which are relatively more arc resistant than conventional capacitors. The present capacitor structure is an alternative arrangement which further reduces sharp protrusions, as compared to planar capacitor plates, and thereby reduces high voltage fields. A further advantage of the present capacitor structure is its ease of adjustment and its high frequency capabilities.

Figure 76:
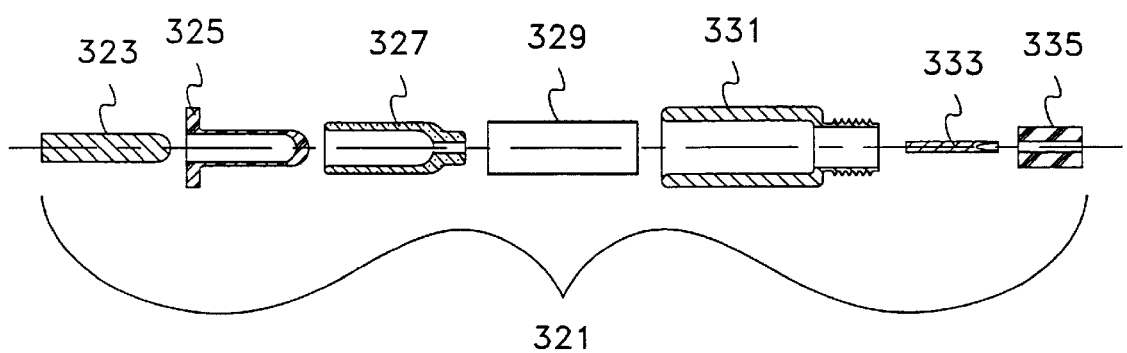
FIG. 76 is an exploded, cross sectional view of a coaxial capacitor according to an aspect of the invention.
Figure 77:
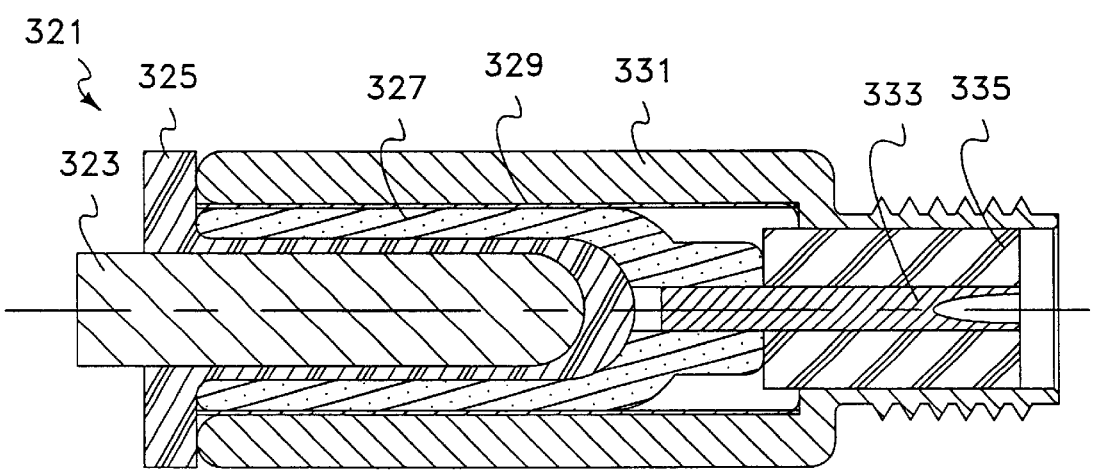
FIG. 77 is an enlarged, cross sectional view of the coaxial capacitor.

With reference to FIGS. 76 and 77, a coaxial capacitor structure 321 according to an aspect of the invention includes a first conductive element 323 disposed coaxially inside a first insulating element 325. The first elements 323 and 325 are further coaxially disposed inside a second conductive element 327 and a second insulating element 329. Each of the elements 323–329 are coaxially aligned with and at least partially contained within an outer conductive element 331, which typically is electrically grounded. In the illustrated example, the ground conductor 331 includes a threaded end for connecting to a mating coaxial connector or the like. A center conductor 333 is disposed proximate to the threaded end of the ground conductor 331 and is positioned in the coaxial capacitor 321 and insulated from the ground conductor 331 by a third insulating member 335.

The structure 321 provides two capacitors in series with the center conductor 333 being connected at a junction of the series connection. The first conductive element 323 provides one terminal of the first capacitor (C1, e.g. the high voltage capacitor), the second conductive element 327 provides the other terminal of C1 and one terminal of the second capacitor (C2, e.g. the low voltage capacitor). The outer conductive element 331 provides the other terminal of C2. The three terminals are separated by insulation (elements 325 and 329) selected for a desired voltage performance and desired capacitor values. Advantageously, the coaxially aligned elements 323–335 can move relative to each other along their common axis and thereby provide adjustment of the respective capacitor values. The coaxial structure is also readily adapted for connection to commercially available RF connectors, as illustrated in the figures or by other suitable configurations.

Ignoring end effects, the approximate respective capacitance values of the structure 321 may determined according to the following equation:

$$C = 2\pi L D \epsilon / \ln(R_o/R_i) \quad \text{Eq. 1}$$

where:

L is the length of the capacitor in meters;

D is the dielectric constant of the insulator material;

$\epsilon$ is $1/(36\pi \times 10^9)$, the permittivity of a vacuum;

$R_o$ is the radius of the outer conductive element in meters; and $R_i$ is the radius of the inner conductive element in meters.

Equation 1 is more accurate for relatively high ratios of length to diameter. L is preferably limited to less than one-tenth of the resonant frequency of the lamp head. D is selected based on a desired capacitance value, but also for temperature, dissipation factor at the operating frequency, and voltage standoff capability. A suitable material is PTFE (Teflon™). In selecting appropriate values for $R_o$ and $R_i$, consideration is given to manufacturing tolerances and a desired accuracy in the capacitance value.

In general, there is a trade-off between circuit efficiency and capacitor accuracy. Small capacitor sizes are generally more efficient while larger capacitor sizes are generally more accurate. Exemplary coaxial capacitors according to an aspect of the invention are configured to provide an about 5 pF value for the high voltage capacitor and an about 39 pF value for the low voltage capacitor. Such capacitor range in length, for example, from about 10 mm to about 60 mm. Exemplary corresponding dimensions (in mm) and expected tolerances (in %) for the high voltage and low voltage capacitor are as follows:

TABLE 1

| | High voltage capacitor | | | | Low voltage capacitor | | |
| --- | --- | --- | --- | --- | --- | --- | --- |
| Length | Inner radius | Outer radius | Expected tolerance | Length | Inner radius | Outer radius | Expected tolerance |
| 10 | 1.6 | 2.020 | 2.0 | 14 | 2.877 | 3.0 | 6.53 |
| 10 | 3.0 | 3.788 | 1.0 | 16 | 4.766 | 5.0 | 3.43 |
| 15 | 2.0 | 2.838 | 1.0 | 22 | 3.745 | 4.0 | 3.14 |
| 20 | 1.4 | 2.233 | 1.0 | 26 | 2.776 | 3.0 | 3.57 |
| 20 | 2.8 | 4.465 | 0.5 | 28 | 5.518 | 6.0 | 1.66 |
| 30 | 1.8 | 3.625 | 0.5 | 38 | 4.463 | 5.0 | 1.49 |
| 40 | 1.2 | 3.052 | 0.5 | 46 | 3.922 | 4.5 | 1.39 |
| 40 | 2.4 | 6.103 | 0.25 | 50 | 6.458 | 7.5 | 0.77 |
| 60 | 1.4 | 5.677 | 0.25 | 72 | 6.450 | 8.0 | 0.52 |

Figure 78:
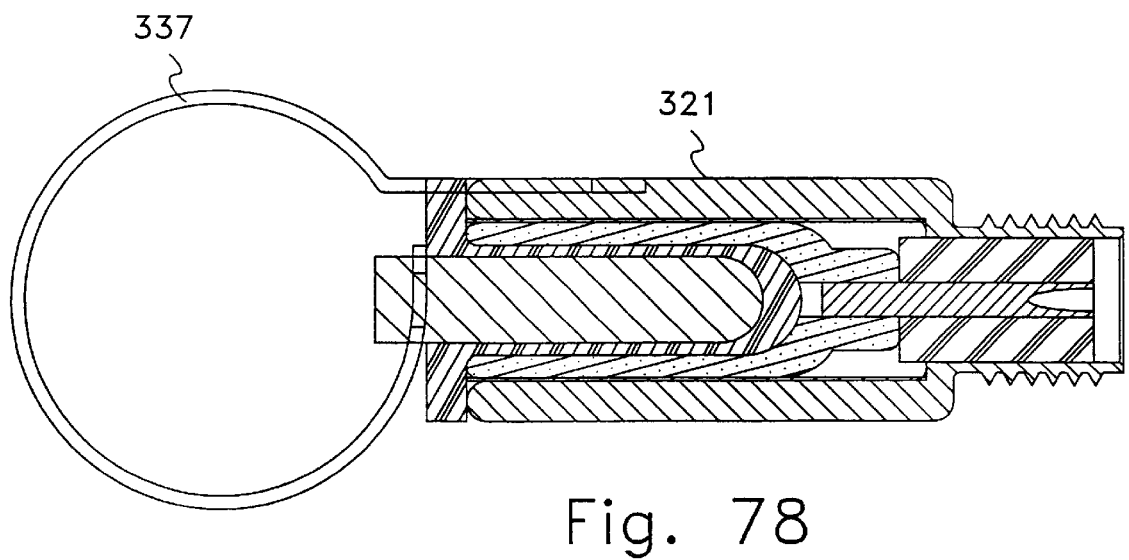
FIG. 78 is a first example of the coaxial capacitor utilized together with an excitation coil to form a series resonant circuit for an electrodeless lamp.

FIG. 78 is a first example of the coaxial capacitor utilized together with an excitation coil to form a series resonant circuit for an electrodeless lamp. A first end of an excitation coil 337 is connected to the inner conductor (e.g. first conductive element 323) of the capacitor 321. The other end of the excitation coil 337 is connected the outer conductor (e.g. ground conductor 331) of the capacitor 321. The coil 337 and the capacitor 321 are arranged so that a center of the coil 337 intersects an axis of the capacitor 321.

Figure 79:
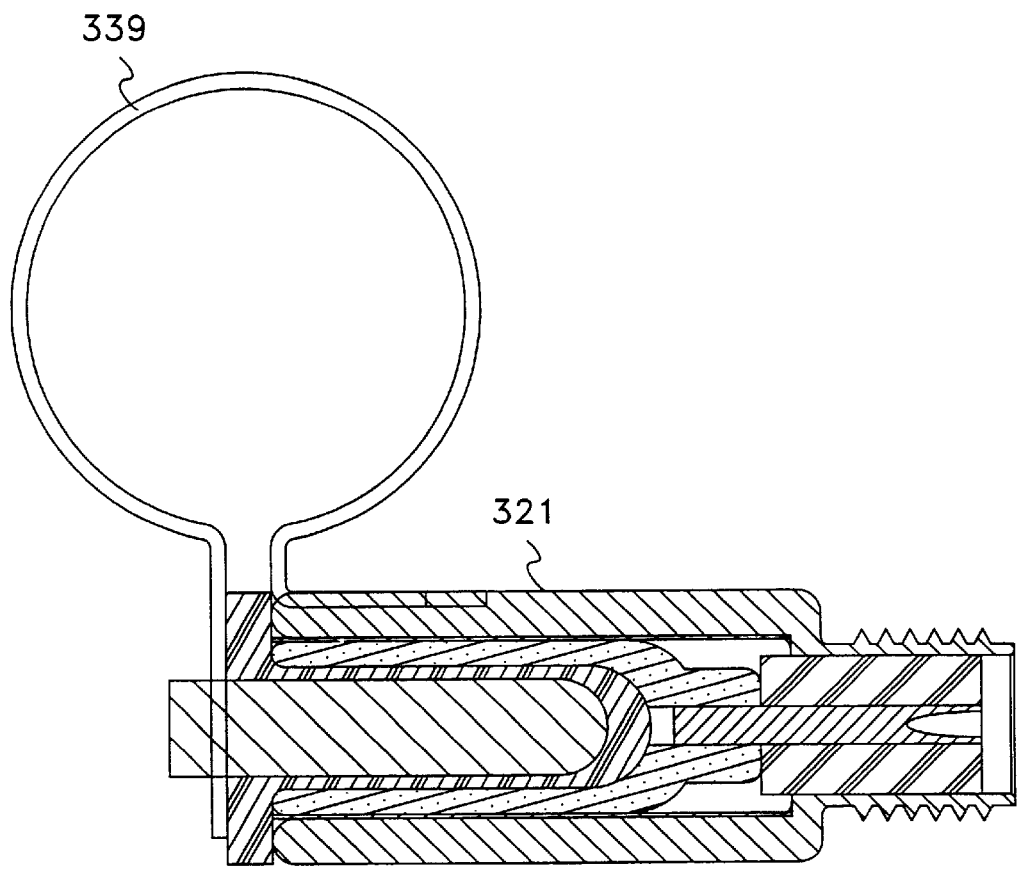
FIG. 79 is a second example of the coaxial capacitor utilized together with an excitation coil to form a series resonant circuit for an electrodeless lamp.

FIG. 79 is a second example of the coaxial capacitor utilized together with an excitation coil to form a series resonant circuit for an electrodeless lamp. A first end of an excitation coil 339 is connected to the inner conductor (e.g. first conductive element 323) of the capacitor 321. The other end of the excitation coil 339 is connected the outer conductor (e.g. ground conductor 331) of the capacitor 321. The coil 339 and the capacitor 321 are arranged so that the coil 339 is substantially at a right angle to an axis of the capacitor 321.

In the first and second examples, the coils 337, 339 include a bore adapted to receive the inner conductor of the capacitor 321 and the electrical connection is made by soldering or the like. The capacitor 321 further defines a channel in the first insulating element 325 and/or the ground conductor 331 which is adapted to receive a lead of the coil so that the lead is substantially flush with the capacitor 321. Numerous other particular arrangements will occur to those skilled in the art having the benefit of the present application.

Disk Capacitor with Increased Edge Radius

A present aspect of the invention is also directed to the problem of arcing. High voltage potentials may be generated in air at the edges of a capacitor plate on top of a dielectric material. According to the present aspect of the invention, the potential edge gradients are significantly reduced (e.g. by a factor of 5 or more) by increasing the effective edge radius of the capacitor. For example, a 1 ounce copper disk may produce edge potentials on the order of 10,000 volts per mm. By increasing the effective edge radius from approximately 0.02 mm (e.g. for a 1.5 mil thick copper sheet) to about 0.25 to 0.5 mm, the gradient is reduced to between about 1000 to 2000 volts per mm. Thus, by utilizing a relatively simple geometry, the potential edge gradients may be reduced by a factor of about 6 to 9.

Figure 80:
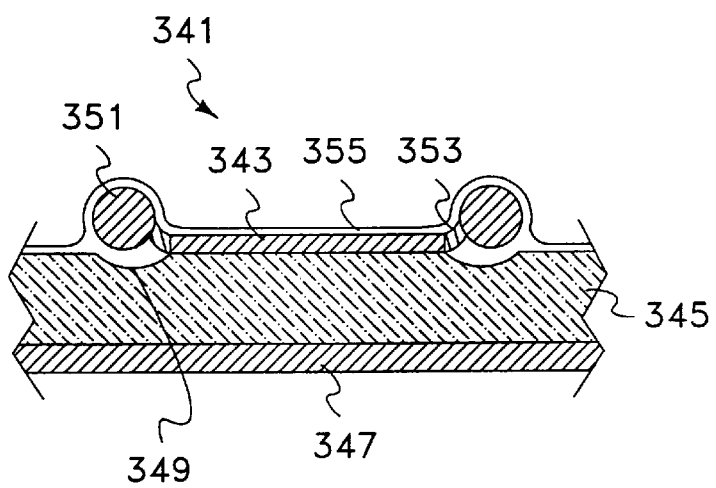
FIG. 80 is a schematic, cross sectional view of a disk capacitor according to an aspect of the invention with an increased edge radius.

FIG. 80 is a schematic, cross sectional view of a disk capacitor according to the present aspect of the invention with an increased edge radius. A high voltage capacitor 341 includes a circular plate 343 formed on a dielectric material 345 with a conductive material 347 disposed on an opposite side of the material 345. In this regard, the capacitor 341 is similar to the capacitor 301, except that the capacitor 341 defines a curved groove 349 (e.g. 0.6 mm deep) in the material 345 instead of the rectangular cross section channel 305. For example, the capacitor 341 may be formed from printed circuit material having either 1 or 2 ounce copper bonded to each side.

A conductive wire 351 of circular cross section (e.g. a 16 gauge wire) encircles the circumference of the disk 343 and is electrically and mechanically connected to the disk by a solder bridge 353. At least the disk 343, the wire 351, and the solder 353 are covered by a dielectric coating 355, which may be, for example, a conformal coating of silicone resin.

Preferably, the conformal coating 355 has a dielectric constant which is similar to the dielectric constant of the material 345. In the present example, the material is about 1.5 mm thick and has a dielectric constant of about 3.4. The dielectric constant of the conformal coating is about 3. The conformal coating acts to further reduce the gradients within the boundaries of the coating material. The combined result is a decrease in the near conductor surface gradients by a factor of about 18 to 27 (3×6 to 3×9) within the boundaries of the coating.

Preferably, the conformal coating is of suitable material to have good adherence to all coated surfaces. Most preferably, the conformal coating is applied uniformly with no voids or air pockets, except that small bubbles not capable of supporting electron avalanche may be acceptable. Air pockets under the coating may result in fields which are sufficiently strong to produce the undesired corona effects.

RF Source

Figure 81:
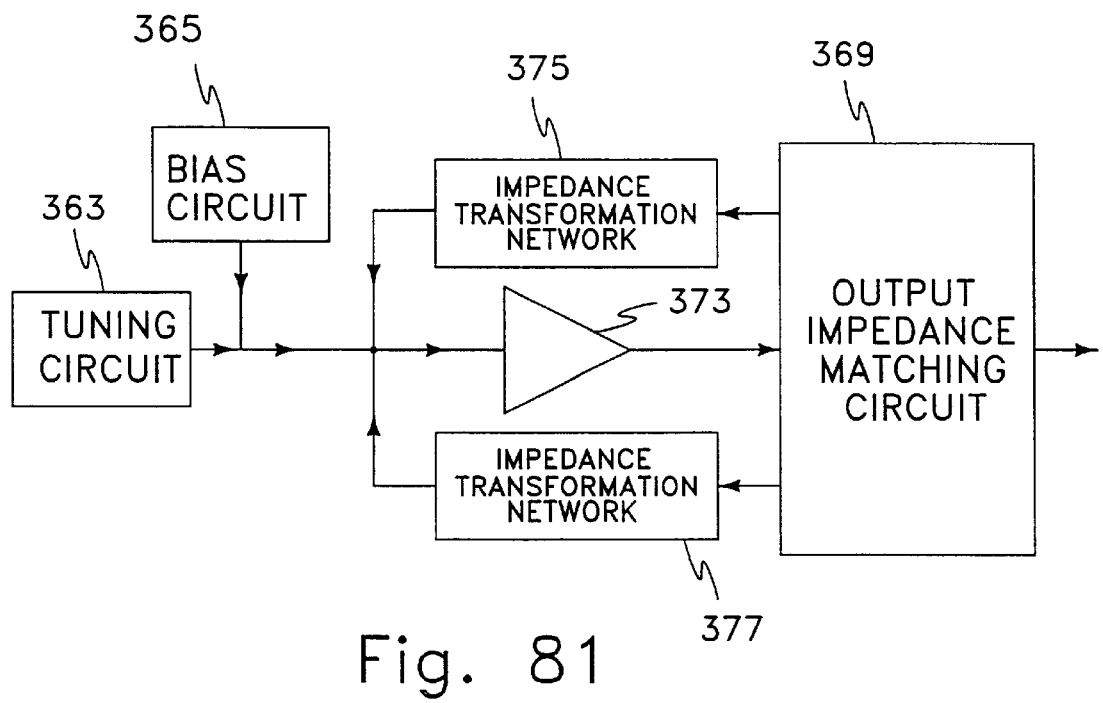
FIG. 81 is a block level schematic diagram of an RF source according to an aspect of the invention.

FIG. 81 is a block level schematic diagram of an example RF source according to a present aspect of the invention. The RF source utilizes, e.g., an oscillator, and also preferably utilizes two feedback circuits, which may be asymmetrical. In this regard, an output of an amplifier 373 (e.g., comprising two transistors) is fed back to an input of the amplifier 373 through a first impedance transformation network 375 and a second impedance transformation network 377. The impedance transformation networks 375 and 377 are not directly coupled to the output of the amplifier 373, but are instead coupled to an output impedance matching circuit 369 to improve the load impedance sensitivity as discussed in the '940 publication. A bias circuit 365 provides power to the RF source. A tuning circuit 363 is provided for adjusting the operating frequency of the RF source.

As described in detail in the '940 publication, the dual impedance transformation networks 375, 377 of the RF source are configured to provide suitable positive feedback for initiating and sustaining an oscillating condition. The dual impedance transformation networks are further configured to protect the amplifier input, during high output power operation, from an over-voltage condition which would otherwise destroy the device(s). Other features and advantages of a dual feedback system generally are discussed in the '940 publication.

Figure 82:
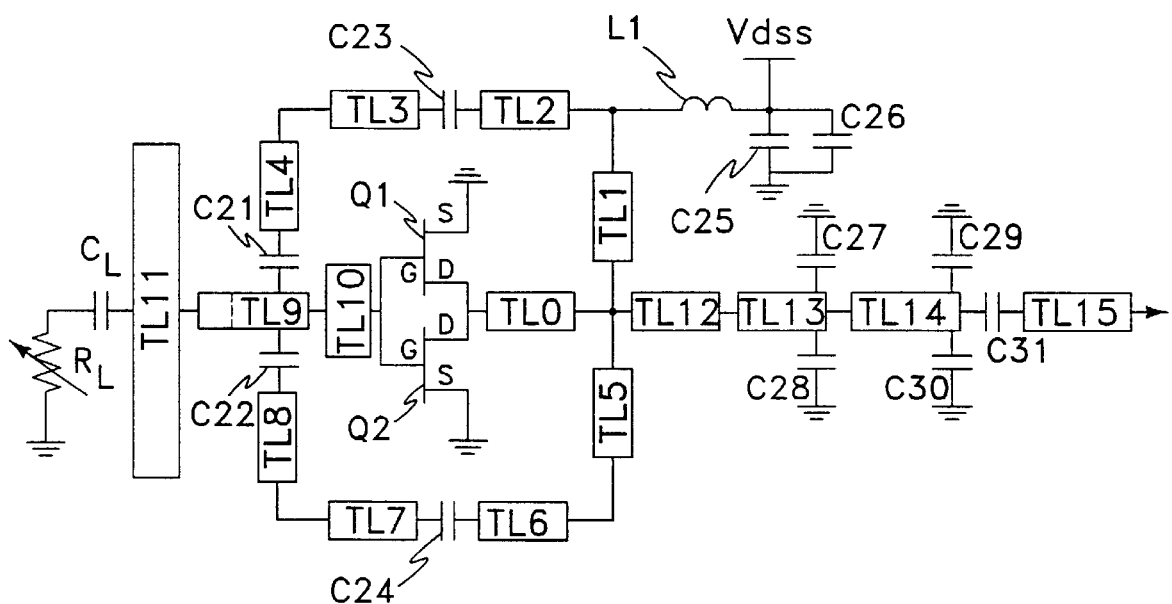
FIG. 82 is a circuit level schematic diagram of an RF source according to an aspect of the invention.

FIG. 82 is a circuit level schematic diagram of an RF source according to a present aspect of the invention. As shown in FIG. 82, an amplifier (e.g. amplifier 373) includes a pair of transistors Q1 and Q2 which are connected in parallel with their source terminals S grounded. An output of the transistors Q1, Q2 is taken from their drain terminals D and is connected to the output impedance matching circuit 369.

The output impedance matching circuit 369 includes a transmission line TL0 connected at one end to the drains D. The other end of the transmission line TL0 is connected between respective ends of two transmission lines TL1 and TL5. The other end of TL1 is connected to the first feedback circuit 375. The other end of TL5 is connected to the second feedback circuit 377. The output impedance matching circuit 369 further includes a transmission line TL12 connected at one end to the junction of TL0, TL1, and TL5 and connected at the other end to an end of transmission line TL13. The other end of TL13 is connected to a pair of grounded capacitors C27, C28 and an end of transmission line TL14. The other end of TL14 is connected to a pair of grounded capacitors C29, C30 and in series with a first end of a capacitor 31. The other end of the capacitor 31 is connected to an output transmission line TL15, which may be connected to a load.

The first feedback circuit 375 is connected between the end of the transmission line TL1 (which is distal to the drains D) and an input of the transistors Q1, Q2 at their gate terminals G. The first feedback circuit includes, connected in series, a transmission line TL2, a capacitor C23, a transmission line TL3, a transmission line TL4, a capacitor C21, and a "T". The "T" includes a portion of a transmission line TL9 (the leg of the "T") and a transmission line TL10 (the top of the "T", also referred to as the gate pad). The "T" is also influenced by a transmission line TL11. In this regard, the line TL11 may be considered part of the first feedback circuit 375.

The second feedback circuit 377 is connected between the end of the transmission line TL5 (which is distal to the drains D) and the gates G. The second feedback circuit 737 includes, connected in series, a transmission line TL6, a capacitor C24 (which in this example may be a variable capacitor), a transmission line TL7, a transmission line TL8, a capacitor C22, and the "T".

Thus, neither the first feedback circuit 375 nor the second feedback circuit 737 include any discrete inductive components, only transmission lines and capacitors. Moreover, the feedback circuits are asymmetrical in view of the unequal values of capacitors C23 and C24.

A DC supply voltage Vdss (e.g. from DC power supply 39, see FIG. 15) provides operating voltage to the drains D of the transistors Q1, Q2 through an RF filter circuit including an inductor L1 and two capacitors C25, C26. In FIG. 82, one end of the inductor L1 is connected to Vdss and the other end of the inductor L1 is connected at the junction of TL1 and TL2. One end of each of the capacitors C25, C26 is connected to Vdss and the other ends of the capacitors C25, C26 are connected to ground.

The oscillator system illustrated in FIG. 82 further includes the tuning circuit 363. In accordance with a present aspect of the invention, the tuning circuit is configured to provide a variable damping coefficient on the feedback signal to the gate of the transistors Q1, Q2, thereby influencing the oscillator operating frequency. An example of the tuning circuit 363, as illustrated in FIG. 82, includes the transmission line TL11 connected at a mid point thereof to an end of TL9 distal to TL10 and a variable capacitive load. The variable capacitive load comprises a capacitor $C_L$ connected to ground through a variable resistor $R_L$. For example, the control signal from an RF control circuit is utilized to adjust the resistance of variable resistor $R_L$, thereby providing the variable damping coefficient on the feedback signal to the gates of the transistors Q1, Q2.

Figure 83:
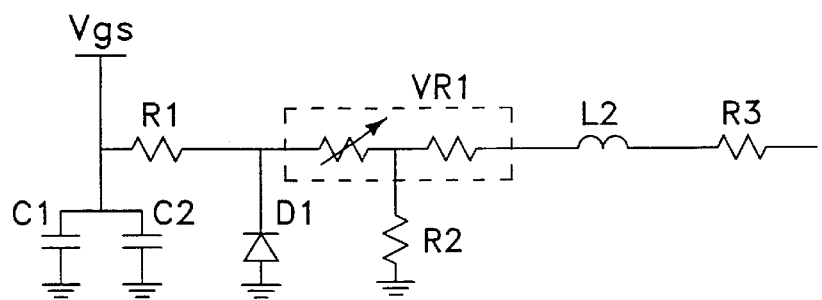
FIG. 83 is a circuit level schematic diagram of a bias circuit for an RF source according to an aspect of the invention.

FIG. 83 is a circuit level schematic diagram of an example of the bias circuit 365 for an RF source according to an aspect of the invention. A DC supply voltage Vgs (e.g. from DC power supply 39, see FIG. 15) is connected to one end of a resistor R1 and two capacitors C1 and C2. The other ends of the capacitors C1 and C2 are grounded. The other end of the resistor R1 is connected to the junction of a cathode end of a diode D1 and a three terminal variable resistor VR1. The anode end of D1 is grounded. The second terminal of VR1 (at the junction of the internal voltage division) is connected to ground through a resistor R2. The third terminal of VR1 is connected in series with an inductor L1 and a resistor R3. The output of R3 is connected to the transmission line TL11 (see FIG. 82), and thereby provided to the gates of the transistors Q1, Q2 through connection to the "T".

Figure 84:
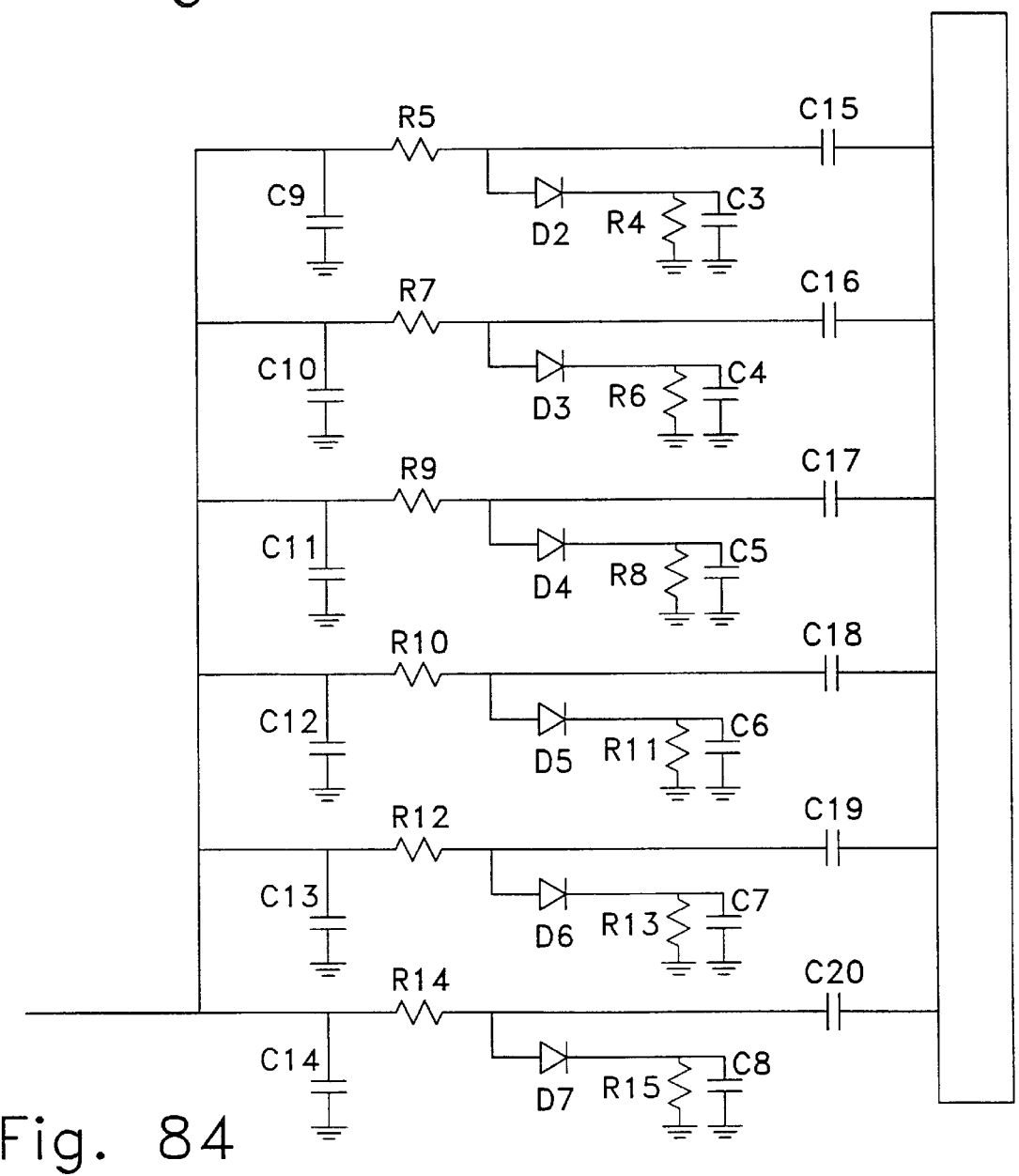
FIG. 84 is a circuit level schematic diagram of a tuning circuit for an RF source according to an aspect of the invention.

FIG. 84 is a circuit level schematic diagram of another example of the tuning circuit 363 for an RF source according to an aspect of the invention. According to a present aspect of the invention, the tuning circuit 363 is configured so that a low voltage DC control signal can adjust the operating frequency of the oscillator over a range of about 10 to 15 MHz, with an exemplary operating band of about 435 to 450 MHz.

The tuning circuit 363 of FIG. 84 includes one or more (e.g. six) identically configured pin diode circuits. In the illustrated example, each pin diode circuit includes a pin diode (one of D2–D7) which receives a control signal (e.g. the control signal 55) through a first resistor (one of R5, R7, R9, R10, R12, and R14) connected to its anode. The cathode side of the diode is connected through a second resistor (one of R4, R6, R8, R11, R13, and R15) to ground. A first capacitor (one of C9–C14) is connected between the cathode and ground. A second capacitor (one of C15–C20) is connected between the anode of the diode and an active frequency determining track of the tuning circuit (e.g. TL11). A third capacitor (one of C3–C8) is connected between the anode of the diode and ground, in parallel with the second resistor.

Preferably, the tuning circuit comprises plural (rather than one) of the PIN diode circuits. The tuning circuit adjusts the frequency of the oscillator by switching the bias of the PIN diodes. When the PIN diodes (e.g. D2–D7) are switched on, a capacitance coupling exists between the PIN diodes and the line carrying the RF signal. In the case of utilization of only one PIN diode circuit and a large RF signal, the capacitive coupling of the RF signal current through the PIN diode may disturb the behavior of the PIN diode (e.g. affect rectification and change biasing). In the plural (e.g. six) PIN diode circuit arrangement of FIG. 84, however, there is less capacitance coupling (via capacitors C15–C20) between the PIN diodes and the transmission line TL11, and therefore less rectification effect and bias disturbance. Application of the control signal to plural (e.g. six) PIN diode circuits is thus more beneficial than to a single PIN diode circuit.

Those skilled in the art will appreciate that particular devices with associated tolerances, power ratings, and other characteristics may be utilized in accordance with a desired RF source operating frequency and power output. Representative suitable values for various components of the circuits of FIGS. 82–84, are indicated in Table 2.

TABLE 2

| REFERENCE | DEVICE/VALUE |
| --- | --- |
| C1 | 4.7 µF capacitor |
| C2 | 4700 pF capacitor |
| C3–C14 | 470 pF capacitor |
| C15–C20 | 1.5 pF, 150 V capacitor |
| C21–C22 | 30 pF, 500 V capacitor |
| C23 | 3.0 pF, 500 V capacitor |
| C24 | 0.6–2.0 pF variable capacitor |
| C25 | 0.1 µF capacitor |
| C26 | 1000 pF capacitor |
| C27 | 13 pF, 500 V capacitor |
| C28 | 15 pF, 500 V capacitor |
| C29 | 3.6 pF, 500 V capacitor |
| C30 | 4.3 pF, 500 V capacitor |
| C31 | 270 pF, 200 V capacitor |
| D1 | Zener diode, 4.7 V |
| D2–D7 | PIN diode (e.g. M/A COM, AMP MA4P7002) |
| L1 | 18 AWG, hand-wound coil |
| L2 | 35.5 nH inductor |
| Q1, Q2 | RF POWER FET (e.g. Motorola MRF373S) |
| R1 | 332K Ohm, 0.25 W resistor |
| R2 | 5.6K Ohm, 0.25 W resistor |
| R3 | 100K Ohm, 0.25 W resistor |
| R4–R15 | 1K Ohm resistor |
| VR1 | 1k Ohm variable resistor |

In production, the capacitor C24 (see FIG. 82) may be replaced with a fixed value capacitor having a value of about 1.3 pF. The coil L1 is hand wound with 18 gauge wire at an outside diameter of about 8 mm for between about 8 to 9 turns.

In the illustrated example, a control signal (e.g. from RF control circuit 53; See FIG. 15) varies from 0 volts to about 4.1 volts, effectively causing a continuously variable capacitance change. The control signal effectively changes the capacitance to ground of the frequency determining track by altering the RF resistance of the pin diode. The RF current should be kept sufficiently low to avoid causing the PIN diode to latch into an open state because of the rectified current.

Parallel Transistor(s)

In accordance with an aspect of the invention, two active devices are used to provide a higher level of output (e.g. power) than would be obtained with a single active device. In this regard, as shown in FIG. 82, the two transistors Q1, Q2 are connected in parallel and are in close physical proximity to each other. The gate connections for each transistor share a common input pad and the drain connection for each transistor share a common output pad. In the illustrated example, the drain tab on each device is bent substantially perpendicular to the printed circuit board and the solder connection is made on a bottom side of the tab. The perpendicular bend of the drain tab provides improved impedance matching than would otherwise be the case with a straight tab.

Figure 85:
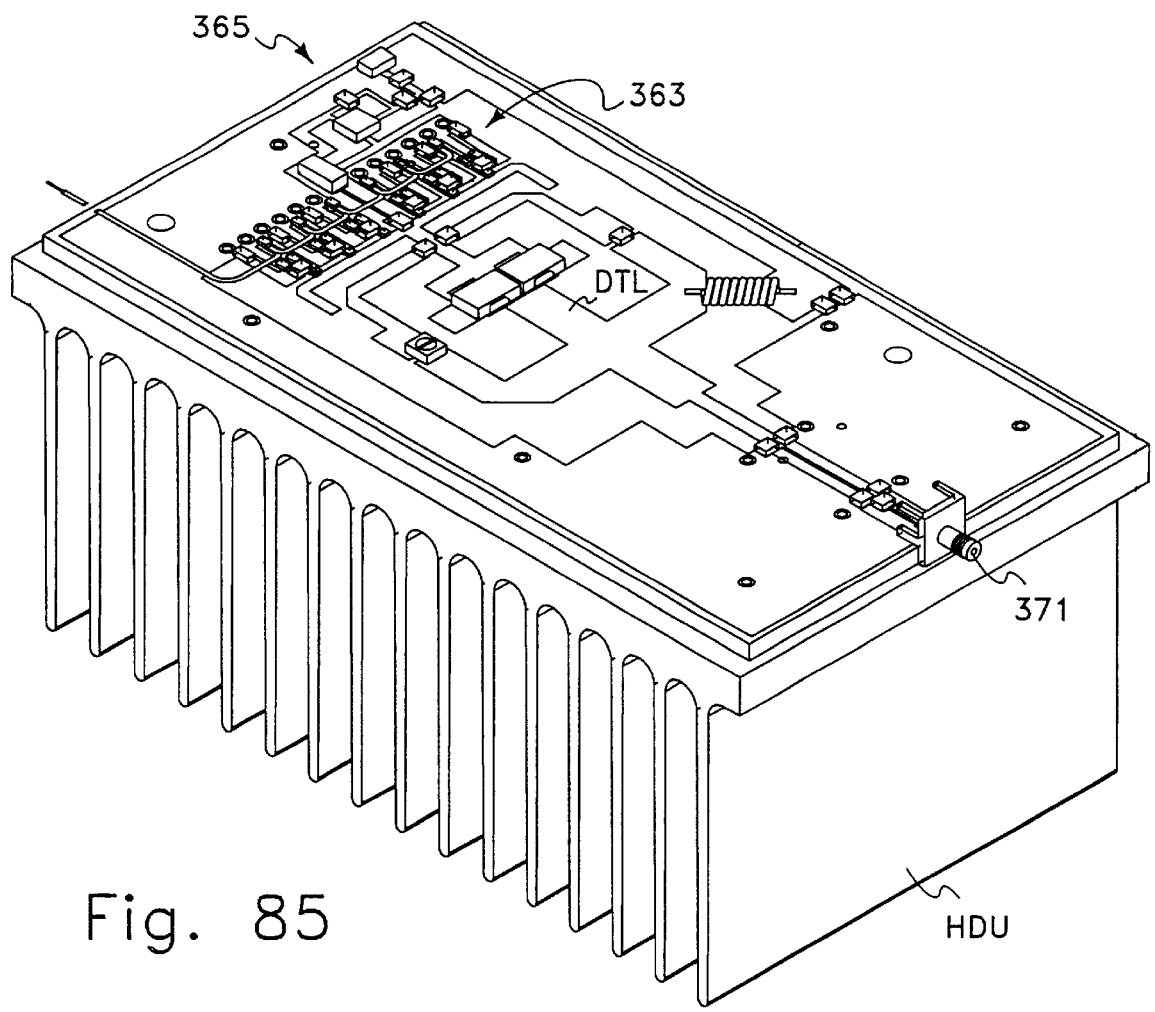
FIG. 85 is a perspective view of the RF source according to an aspect of the invention.
Figure 86:
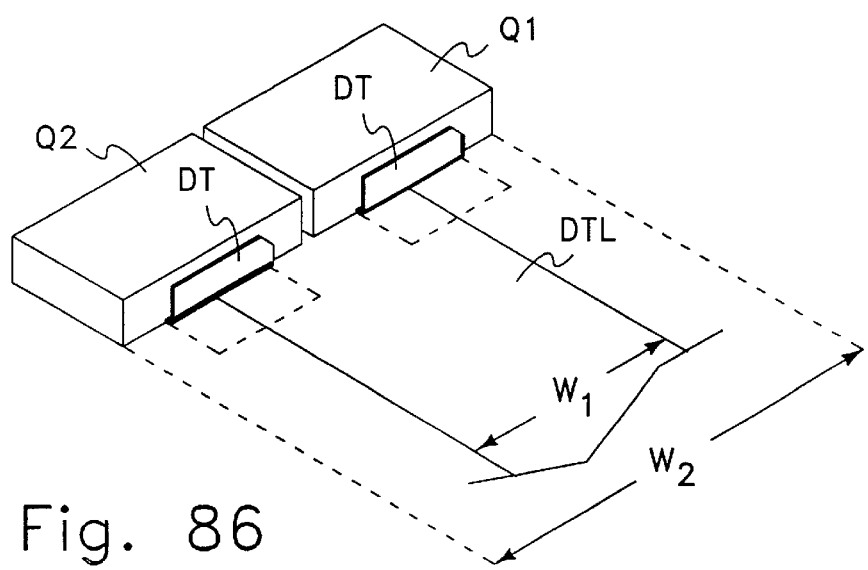
FIG. 86 is an enlarged, perspective view of the transistor devices showing the bent drain tabs.

FIG. 85 is a perspective view of the RF source according to an aspect of the invention. FIG. 86 is an enlarged, fragmented perspective view of the RF source in the area of the transistors. FIGS. 85 and 86 show the perpendicularly bent (i.e. vertically oriented) drain tabs DT for the transistors Q1, Q2, and the drain tab lead DTL connected thereto. The drain tab lead DTL has a width W, as shown in FIG. 86. If the drain tabs DT remained coplanar with the drain tab lead DTL, as shown by dashed lines in FIG. 86, the width W2 between the extreme edges of the coplanar drain tabs would result in an increased (and undesirable) capacitance at the connection. However, advantageously, the orthogonal (vertical) bending of the drain tabs DT reduces the capacitance at the connection of the drain tab lead DTL to the drain tabs DT.

A problem with configuring two active devices in an oscillating configuration is that one active device may become active before the other, and consequently may inhibit the other device from conducting by influencing its forward voltage. In accordance with a present aspect of the invention, this problem is overcome by configuring the oscillator system to provide a relatively soft gate switch. For example, such soft gate switching may be achieved by configuring the oscillator with unequal feedback loops. By utilizing slightly asymmetrical feedback loops (e.g. loops 375 and 377 described above), a phase difference is introduced at the gate inputs to transistors Q1, Q2 which inhibits a hard switching of the devices.

Exemplary Assembly and Board layout

Figure 87:
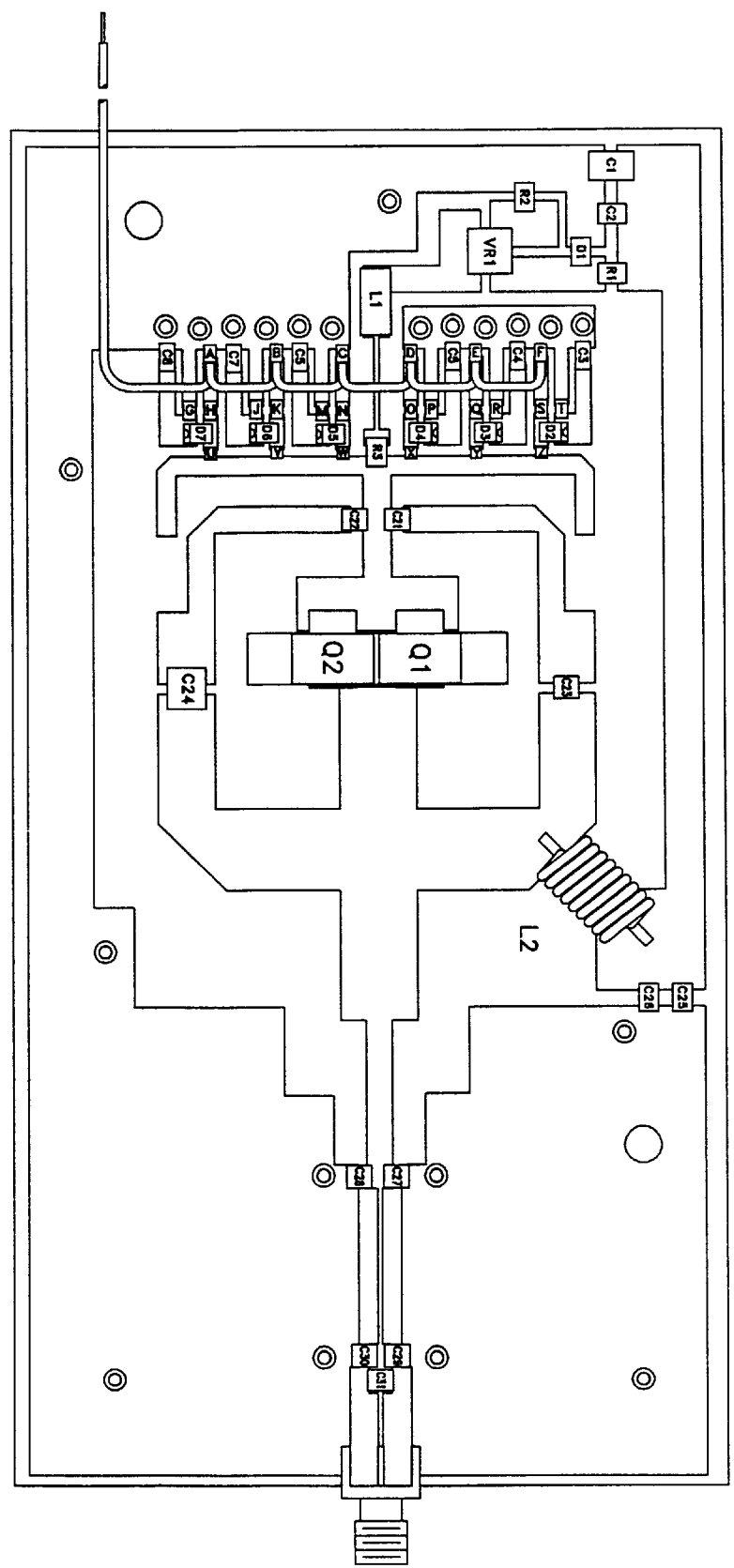
FIG. 87 is an assembly level schematic diagram of the RF source according to an aspect of the invention.
Figure 88:
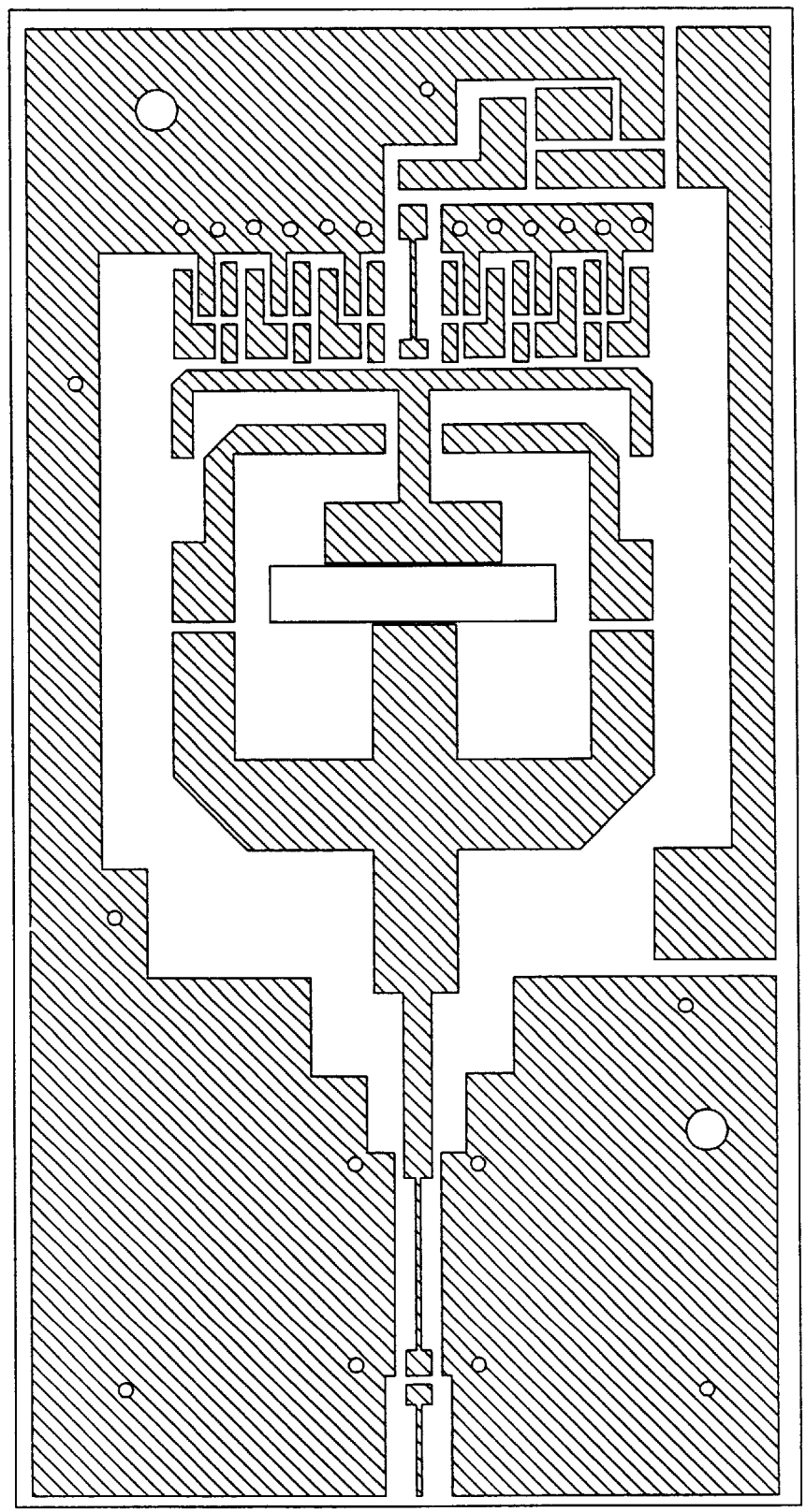
FIG. 88 is a schematic diagram of an example printed circuit board layout for the RF source according to an aspect of the invention.

FIG. 87 is an assembly level schematic diagram of the RF source according to an aspect of the invention. FIG. 88 is a schematic diagram of a printed circuit board layout for the RF source according to an aspect of the invention. FIG. 85 shows the location of the transistors Q1, Q2; the bias circuit 365 of FIG. 83; the tuning circuit 363 of FIG. 84; and a coaxial connector 371 which supplies RF power through a coaxial cable to the lamp head. As is also shown in FIG. 85, the printed circuit board is mounted on a finned heat dissipation unit HDU.

Figure 89:
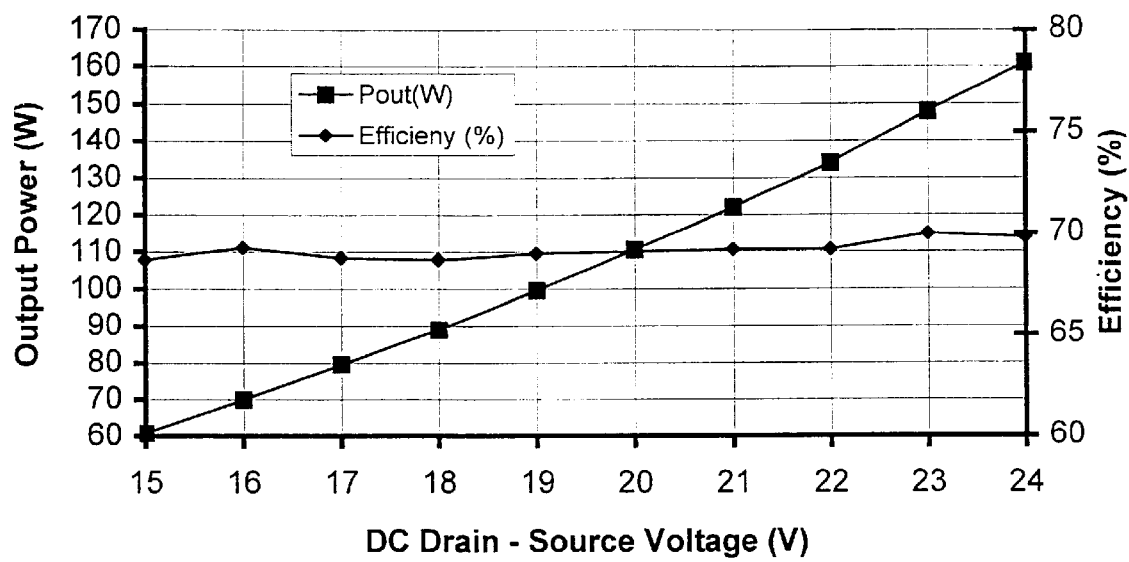
FIG. 89 is a combined graph of Power versus DC Drain Voltage and Efficiency versus DC Drain Voltage for an example oscillator according to an aspect of the invention.
Figure 90:
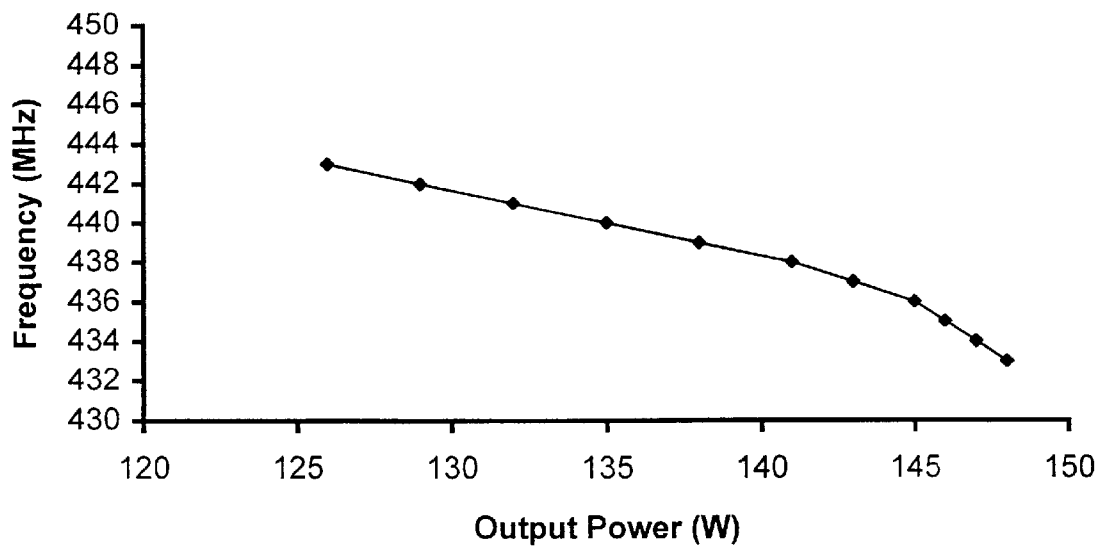
FIG. 90 is a graph of Frequency versus Power for an example oscillator according to an aspect of the invention.

FIG. 89 is a combined graph of Power versus DC Drain Voltage and Efficiency versus DC Drain Voltage for an exemplary oscillator according to an aspect of the invention. The oscillator is about 68–70% efficient over a wide range of Drain-Source voltages. The output power increases substantially linearly with increasing Drain-Source voltage, from about 60 W at 15 V to about 160 W at 24 V. FIG. 90 is a graph of Frequency versus Power for an exemplary oscillator according to an aspect of the invention.

Oscillator Tunability and Stability

A problem with high power oscillators, including the oscillator circuits described in the '940 publication, is that the oscillator circuit may provide multiple resonant poles, some of which are undesirable. Under mismatched load conditions, the oscillator may lock into a resonant mode at an undesired frequency. During lamp startup, a fill may undergo several transitions. For example, the InBr fill goes from its unexcited state, to a glow state (or "blue" mode) as the fill material begins to evaporate and participate in the discharge, and finally to a bright, visible white light discharge when the fill material is more fully involved in the plasma discharge. Each state and the transitions therebetween represent a different impedance condition to which the oscillator adapts. As noted in the '940 publication, the tunability of the oscillator addresses this problem to some extent. However, under certain conditions the complex load may cause the oscillator to go into a resonant mode at an undesired frequency which does not provide optimal lamp performance and which cannot be avoided by the tuning range provided by the oscillator circuits of the '940 publication. Accordingly, it is an object of the present aspect of the invention to provide an oscillator with improved tunability and stability.

According to one aspect of the invention, a high power oscillator is configured with continuous frequency tuning over a sufficiently broad range to aid in the starting and steady state operation of the oscillator. Preferably such continuous frequency tuning is achieved with no mechanically tuned parts, thereby providing a more economically manufacturable system.

According to another aspect of the invention, an oscillator is configured with reduced resonant complexity. Specifically, the circuit is configured to have as few a number of resonant poles as possible, preferably two or fewer.

According to another aspect of the invention, a primary resonant loop of the oscillator is configured to be only slightly above the maximum intended frequency of operation for the oscillator circuit. In the present example, the primary resonant loop corresponds to the circuitry between the output (drain) of the amplifier(s) and the input (gate) of the amplifier, including the transistors Q1 and Q2, the first and second feedback circuits 375, 377 identified above. The frequency of the primary resonance may be determined, for example, by removing the arms of the "T" section, keeping the remaining straight section containing the gate bias resistor (e.g. R3, see FIG. 83) as short as possible, and observing the frequency at which the oscillator operates. A target for the primary resonance frequency of 1–10% above of the maximum intended frequency is suitable, with about 5% above being an exemplary value.

According to another aspect of the invention, the oscillator is configured with unequal feedback loops to break up the resonance of the primary feedback loop. Such unequal feedback loops, in addition to the advantages discussed above with respect to the parallel transistors, provide a broader range of resonant frequencies for the primary feedback loop and consequently a wider tuning range for the oscillator.

According to another aspect of the invention, a "T" shaped conductive area is connected to the input of the amplifier and is configured to present a capacitive load on the primary resonant loop.

According to another aspect of the invention, the voltage division capacitors C21 and C22 are configured to connect to the respective resonant feedback loops to the leg of the "T" shaped section, spaced from the gate pad of the transistor(s).

In the present example, the input impedance of the gate of the LDMOS transistors Q1, Q2 is typically very low, and effectively forms one pole of the resonant chain. In each of the circuits described in the '940 publication, the feedback circuit is connected to the transistor gate. Thus configured, the "T" section is less able to affect the charge/discharge cycling of the gate and consequently the frequency of the oscillator, except via its own resonant behavior. Further, because of the low impedance of the gate, connecting the voltage division capacitors between the feedback circuit and the gate pad of the "T" section introduces a third resonance into the system (i.e., output bandwidth, feedback loop, and "T"), which further limits the bandwidth achievable with the circuits of the '940 publication.

As noted above, in one example of the invention, the feedback loop is connected to and includes the leg of the "T" section. This improved circuit configuration causes the portion of the "T" section outside of the loop (e.g. a portion of TL9 to the left of the dashed line in FIG. 82) and a portion of TL11 to become a reactive load shunt impedance on the feedback loop. This capacitive load destroys (e.g. counteracts or inhibits) the third parasitic resonance, thereby increasing the tuning bandwidth of the oscillator. Preferably the length of the leg of the "T" between the arms and the point at which the voltage dividing feedback capacitor couple in, should be kept sufficiently short to avoid introducing any other independent resonance which might negatively impact the operation of the oscillator. Any independent resonance attributable to a suitably short length will be sufficiently high in frequency to avoid such negative impact.

The relative size of the arms of the "T" section are adapted to provide a good match to the gate impedance, which is dependent on the particular active device used in the oscillator. The size of the arms may be varied as desired to affect the operating frequency of the operation, the range of frequency achievable with the tuning capacitor, and the matching to the gate impedance. In general, increasing the length or width of the arms reduces the maximum operating frequency of the oscillator.

Complementary PIN Diode Tuning Circuit

Figure 91:
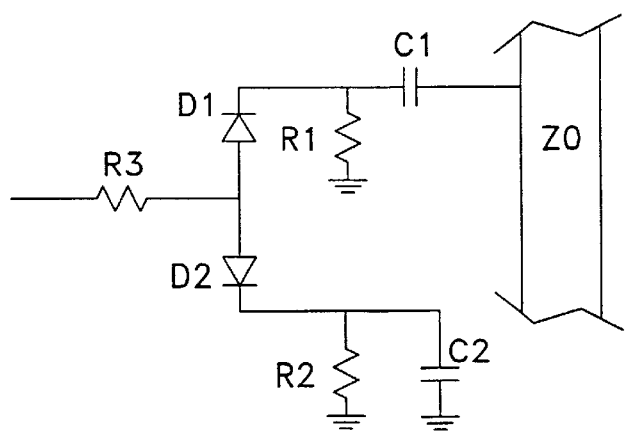
FIG. 91 is a circuit level schematic diagram of an alternative tuning circuit according to an aspect of the invention which utilizes a complementary PIN diode arrangement.

FIG. 91 is a circuit level schematic diagram of an alternative tuning circuit according to an aspect of the invention which utilizes a complementary PIN diode arrangement. As noted above with respect to the tuning circuit of FIG. 84, the RF signal may cause problems with rectification and bias of the tuning circuit. In that tuning circuit, this problem was addressed by utilizing a plurality of PIN diode circuits to decrease the capacitive coupling of the RF signal to the tuning circuit. According to a present aspect of the invention, an alternative tuning circuit is provided which is less sensitive to the RF signal and utilizes fewer components.

As shown in FIG. 91, a complementary PIN diode tuning circuit receives a control signal (e.g. a DC voltage which varies from 0 to 4.1 V) on one end of a resistor R3. The other end of R3 is connected to a junction of two PIN diodes D1 and D2. D1 and D2 are connected in a complementary arrangement with their respective cathodes being connected together. The cathode of D1 is connected to ground through a voltage dividing resistor R1. The cathode of D2 is connected to ground through a voltage dividing resistor R2. The junction of D1 and R1 is connected to one end of a coupling capacitor C1, while the other end of C1 is connected to the active frequency determining track Z0. The junction of D2 and R2 is connected to one end of a bypass capacitor C2, while the other end of C2 is connected to ground.

In operation, half of the control signal current goes through R3, D1, and R1, and half of the control signal current goes through R3, D2, and R2. The equivalent circuit is a capacitive load connected in series with two variable resistances to ground. The tuning circuit is controllable even with high levels of RF signal because of the complementary configuration of the PIN diodes. When the RF signal is applied, if the RF current through D1 increases, then the RF current through D2 decreases and vice versa. Under all conditions, the RF current remains less than the bias current.

Directional Coupler

Figure 92:
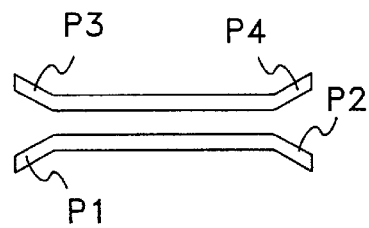
FIG. 92 is a schematic representation of the structure of a coupled line coupler.

In general, directional couplers are passive microwave components used for power division or power combining. FIG. 92 is a schematic representation of a conventional four port coupled line coupler having ports P1, P2, P3, and P4. Port P1 in an incident port; port P2 is a through port; port P3 is a coupled port; and port P4 is an isolated port. A signal incident at port P1 goes out through port P2. In view of the coupling of the lines, a percentage of the signal incident at port P1 is also obtained at coupled port P3, for which reason the coupler of FIG. 92 is known as a reverse flow coupler. Thus, advantageously, the power into incident port P1 can be measured at coupled port P3 (figuring in a coupling factor or ratio), without interfering with the signal obtained at through port P2. Similarly, a reflected signal entering through port P2 can be obtained at port P1, and a percentage thereof obtained at port P4.

However, the conventional four port coupled line coupler of FIG. 92 has a relatively low directivity. The directivity of the four port coupled line coupler of FIG. 92 is usually between 9 dB and 12 dB. Low directivity results in a percentage of the reflected signal received at port P2 also going to port P3, thereby undesirably influencing the detection of the incident signal at port P3. Moreover, if detection circuits were employed at P3 and P4, respectively, their associated diodes will have an inherent mismatch due to the diodes operating under different bias voltages.

Figure 93:
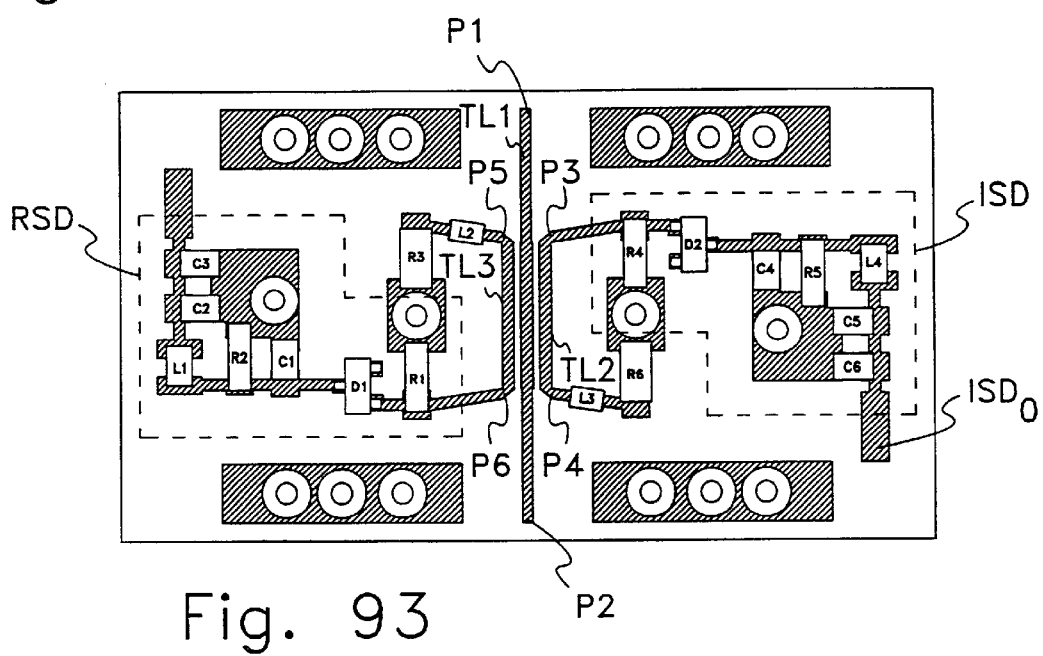
FIG. 93 is an assembly level schematic diagram of an example directional coupler circuit according to an aspect of the invention.
Figure 94:
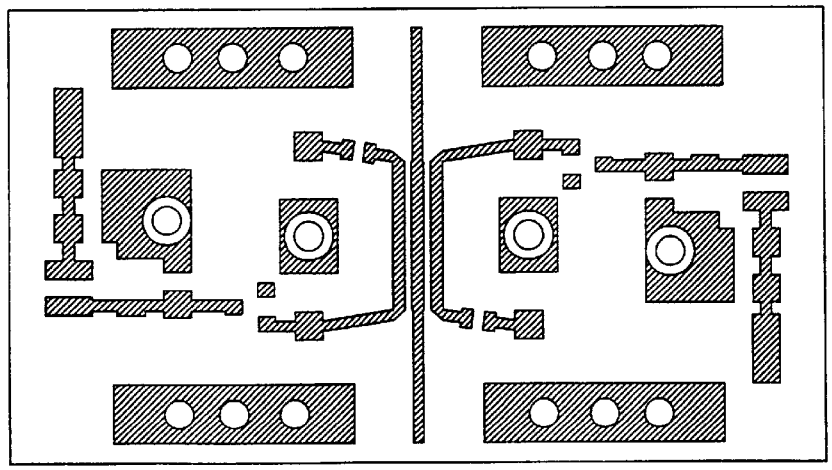
FIG. 94 is a schematic diagram of an example printed circuit board layout for the directional coupler according to an aspect of the invention.

According to a present aspect of the invention, a novel six port directional coupler provides relatively high directivity, for example, when used as coupler 45 (see FIG. 15). FIG. 93 is an assembly level schematic diagram of a directional coupler circuit according to an aspect of the invention. FIG. 94 is a schematic diagram of a printed circuit board layout for the directional coupler according to an aspect of the invention. The directional coupler 45 of the present aspect of the invention provides, e.g., higher directivity and phase cancellation to assure that the input applied to RF control circuit 53 is accurate. The directional coupler 45 is fabricated as a six port coupled line coupler in the manner exemplified in FIG. 93. In particular, directional coupler 45 comprises three lines TL1, TL2, and TL3. Incident port P1 and through port P2 are provided on line TL1. Coupled port P3 and port P4 are provided on line TL2. Port P5 and port P6 are provided on line TL3. Port P4 on line TL2 is connected through phase cancellation elements (inductor L3 and resistor R6) to ground. Port P5 on line TL3 is connected through phase cancellation elements (inductor L2 and resistor R3) to ground.

FIG. 93 also shows an incident signal detector ISD (framed by broken lines in FIG. 93) and an reflected signal detector RSD (framed by broken lines in FIG. 93). The signal detectors ISD and RSD include a peak detection circuit with filtering and are employed to convert power to voltage. Thus constituted, the directional coupler 45 is a 27.5 dB coupler providing a voltage at the output $ISD_o$ of the incident signal detector ISD of between 4 and 5 volts (in view of the coupling ratio) with respect to the incident or forward signal operating parameter (e.g., strength).

With reference to FIG. 15, the oscillator of RF signal source 41 is driven by RF control circuit 53, in the manner described herein, in an effort to obtain zero reflection from the lamp head 47. When the lamp is operating optimally, the measurement of the reflected signal (obtained at port P6 and output by reflected signal detector RSD) is zero volts. In considering directional couplers in general, however, due to factors such as certain mismatches, a reading of zero volts for the reflected signal may not actually correspond to zero reflection from the load (i.e., zero volts may not be at the center of the reflection space in the polar chart). In order to assure that a true correspondence between a reading of zero volts and zero reflection, the directional coupler 45 of the present aspect of the invention employs a certain phase cancellation.

In the above regard, the power input at port P5 of directional coupler 45 is nullified using phase cancellation. Similarly, the reflected power at port P4 can be phase cancelled (although this reflected power is already so low as not to be a problem). The phase cancellation of power input to port P5 results from employment of the phase cancellation elements (resistor R3 and reactive element L2). In particular, in an example in which the lines are 50 ohm lines, R3 is empirically chosen not to be 50 ohms, but rather R3=68 ohms. L2 is chosen to be 7.5 nH. Values of the other elements of the signal detectors ISD and RDS of directional coupler 45 as shown in FIG. 93 are listed in Table 3.

TABLE 3

| REFERENCE | DEVICE/VALUE |
| --- | --- |
| C1, C4 | 39 pF capacitor |
| C2, C5 | 0.1 µF capacitor |
| C3, C6 | 1.0 µF capacitor |
| D1, D2 | Diode (Macom MA4CS103A) |
| L1, L4 | 39 nH inductor |
| L2, L3 | 7.5 nH inductor |
| R1, R4 | 50 Ohm resistor |
| R2, R5 | 2200 Ohm resistor |
| R3, R6 | 68 Ohm, 0.25 W, 200 V resistor |

In view of its structure and operation as described above, the directional coupler 45 of the present aspect of the invention cancels incident energy (from the forward signal) at port P5 from port P1 on line TL3, so as to provide a true zero reflectivity reading when the voltage output from reflected signal detector RSD is actually zero. Thus, the incident or forward energy has substantially no influence on the reflected power detection circuit RSD. The cancellation assures that a reading of zero volts corresponds to zero reflectivity, which is important since (depending on various factors) a reflected signal can damage the transistors Q1, Q2 comprising the oscillator.

As understood from the foregoing, the directional coupler 45 of the present aspect of the invention, with its six port coupled line arrangement with detection circuitry and phase cancellation, provides 20–30 dB directivity which is sufficient for the operation of lamp head 47. Directional coupler 45 is configured for power division (an input signal being divided by the coupler into two (or more) signals of lesser power). The directional coupler 45 is configured to detect a very small percentage of the incident power without degrading the strength of the incoming signal. The strength of the detected signal is determined in accordance with a sensed power and a coupling factor.

In context of the lamps described herein, a symmetrical dual directional coupler 45 provides signals representative of forward power and reflected power, respectively, to RF control circuit 53 (see FIG. 15). The coupler is configured as part of an overall detection and control circuit to direct the oscillator's frequency of operation as to obtain a better impedance match to the lamp head. The directional coupler 45 measures both incident (forward) power from the source (oscillator) and the reflected power from the load (lamp head). In some examples, the coupler facilitates the removal of the isolator (e.g., circulator 43) from the lamp system. The coupler is configured to provide about 27 dB coupling in both forward and reflected directions with a directivity of about 30 dB. The coupling lines of directional coupler 45 are matched to 50 ohms with a return loss of about 25 dB or better and insertion loss of about 0.3 dB. Although some examples of the lamp system utilize a separate RF source board and a separate directional coupler board, other configurations include the directional coupler integrated on the output section of the RF source board.

The advantages of a coupled line coupling structure in the lamp systems described herein include ease of fabrication and small packaging size. Preferably, the structure is implemented in microstrip form and detects the desired power measurements from a transmission line of the source (oscillator).

RF Control Circuit

Figure 95:
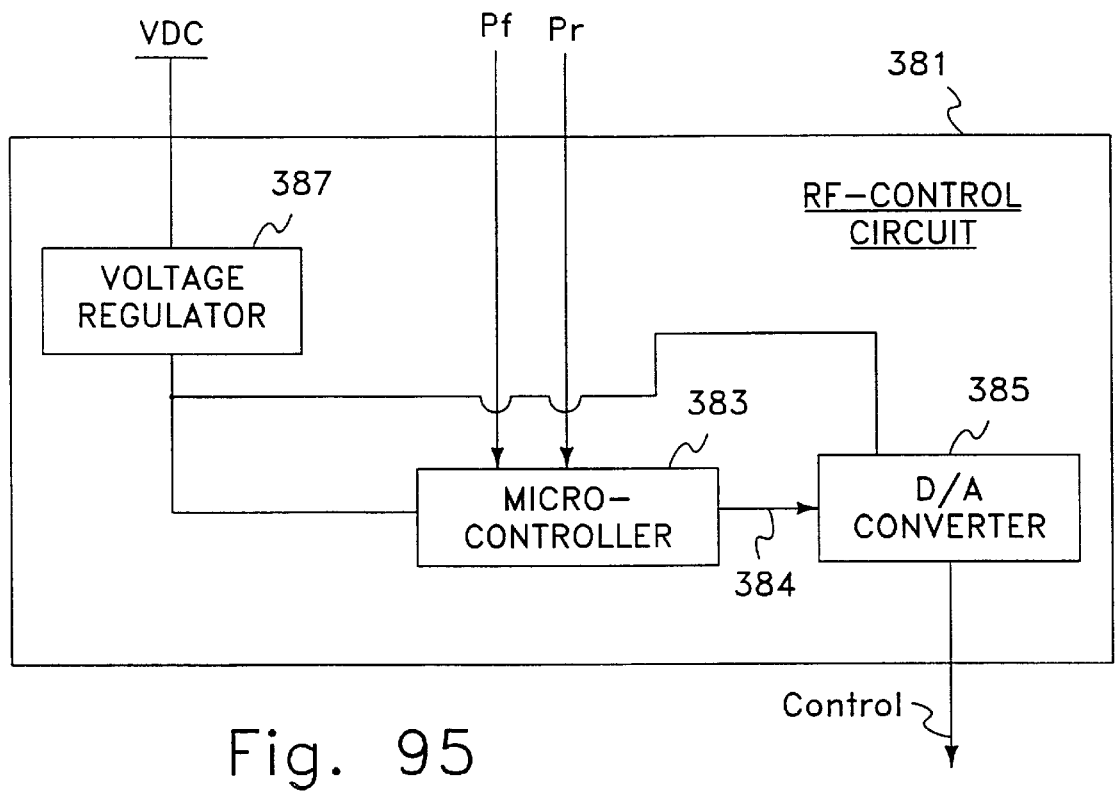
FIG. 95 is a block level schematic diagram of a control circuit according to an aspect of the invention.

FIG. 95 is an example block level schematic diagram of a control circuit according to an aspect of the invention. A control circuit 381 receives (e.g. from the directional coupler 45) two input signals respectively representative of a sensed RF forward power (Pf) and a sensed RF reverse power (Pr). A large amount of sensed reverse power generally indicates a mismatched impedance condition.

In the control circuit 381, the input signals Pf and Pr are provided to a micro-controller 383 which runs an algorithm adapted to achieve certain performance goals, which may be different during different periods of lamp operation (e.g. starting, steady state, and shutdown). The micro-controller 383 generates an intermediate digital signal 384 in accordance with the input signals Pf, Pr and its control algorithm. The intermediate signal 384 is provided to a digital-to-analog (DIA) converter 385 which outputs a control signal (Control) to the RF source 41. The control circuit further includes a voltage regulator 387 which accepts power from an available source and converts it to a DC voltage suitable for operating the micro-controller and the D/A converter.

Micro-controller Circuit

Figure 96:
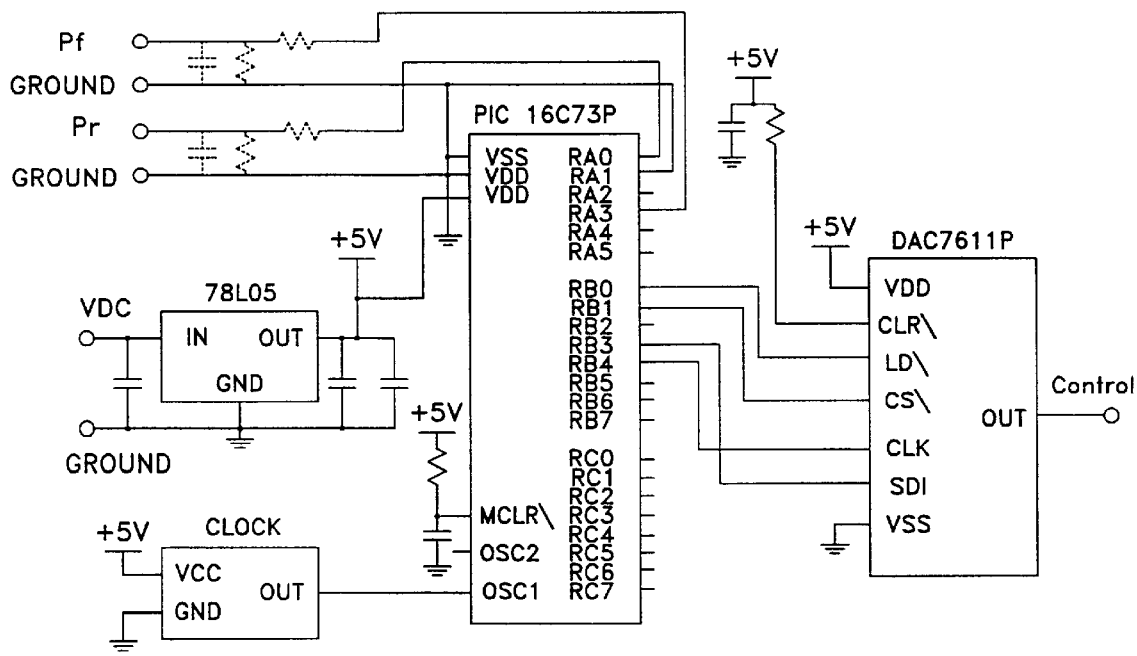
FIG. 96 is a circuit level schematic diagram of an example control circuit according to an aspect of the invention.

FIG. 96 is a circuit level schematic diagram of an example RF control circuit according to a present aspect of the invention. An integrated circuit with model no. PIC 16C73P available from Microchip Technologies, Chandler, Arizona is utilized for the micro-controller in the illustrated example. An example D/A converter is a model no. DAC7611P made by Burr Brown. A 10 MHz clock is connected to the first clock pin (OSC1) of the PIC 16C73P. A voltage regulator (e.g. model no. 78L05) converts an input voltage VDC (e.g. +26 volts DC) to +5 volts DC for powering the micro-controller, D/A converter, and clock.

As further shown in FIG. 96, signals Pf and Pr are provided as inputs to the micro-controller chip on the RA bus. One of the RA bus pins is connected to GROUND to provide a ground reference for the signals Pf and Pr. The RB bus of the micro-controller is used to provide control signals and data to the D/A converter. Specifically, one pin of the RB bus is connected to the load enable pin of the D/A (LD\); another pin of the RB bus is connected to the chip select pin (CS\); another pin of the RB bus is connected to the D/A clock line (CLK); and another pin of the RB bus is connected to the serial data input (SDI). One of ordinary skill in the art having the benefit of the present disclosure will understand that this circuit includes many implementation specific details and that numerous variations may be made based on the particular components selected to implement other examples of the control circuit.

In operation of the present example, the directional coupler provides the input signals representative of Pf and Pr as a DC voltage in the range of 0 to about 4.5 volts. The input voltage signals are approximately proportional to the square root of the sensed power. The input voltages are converted to digital information via a switched analog to digital converter on the micro-controller chip. The intermediate control signal is determined as described below and output via the serial line to the digital to analog converter which provides the 0 to 4.1 voltage control signal to the RF source.

Control Algorithm

As noted above, the RF source according to an aspect of the invention is configured so that a low voltage dc signal can adjust the operating frequency of the RF source over a range of about 10 to 15 MHz, with an exemplary band of about 435 to 450 MHz. According to a present aspect of the invention, the RF control circuit is configured to utilize this feature of the RF source to provide consistent lamp ignition, to provide rapid lamp run-up to full output, and to provide stable lamp operation over the lifetime of the lamp.

In general, the method according to a present aspect of the invention includes three major states:

1) During lamp starting and when the lamp is not in resonance. In this first state, the controller is configured to step through the operating range to find a resonance condition.

2) During lamp starting and after resonance has been detected. In this second state, the controller is configured to adjust the operating frequency to minimize the reflected power.

3) During steady state operation when reflected power is below a pre-determined threshold. In this third state, the controller is configured to maintain the control voltage when a good match is found.

The above states are implemented by programming the micro-controller with suitable logic and commands, in accordance with the input signals Pf and Pr, to provide the control signal. Various methods according to this aspect of the invention are hereinafter described in detail.

Figure 97:
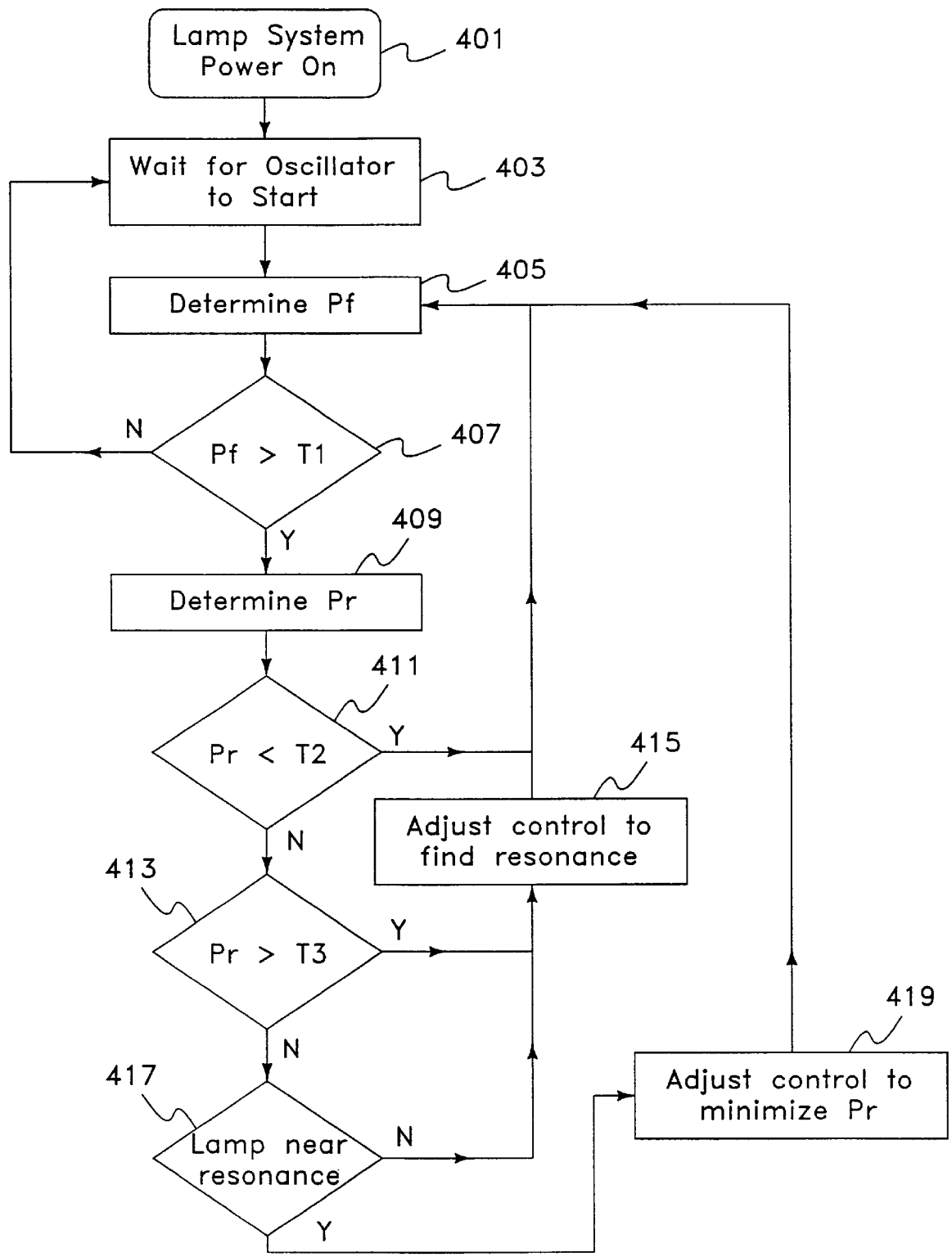
FIG. 97 is a flow chart of an example method according to an aspect of the invention for controlling an RF source for an electrodeless lamp.
Figure 98:
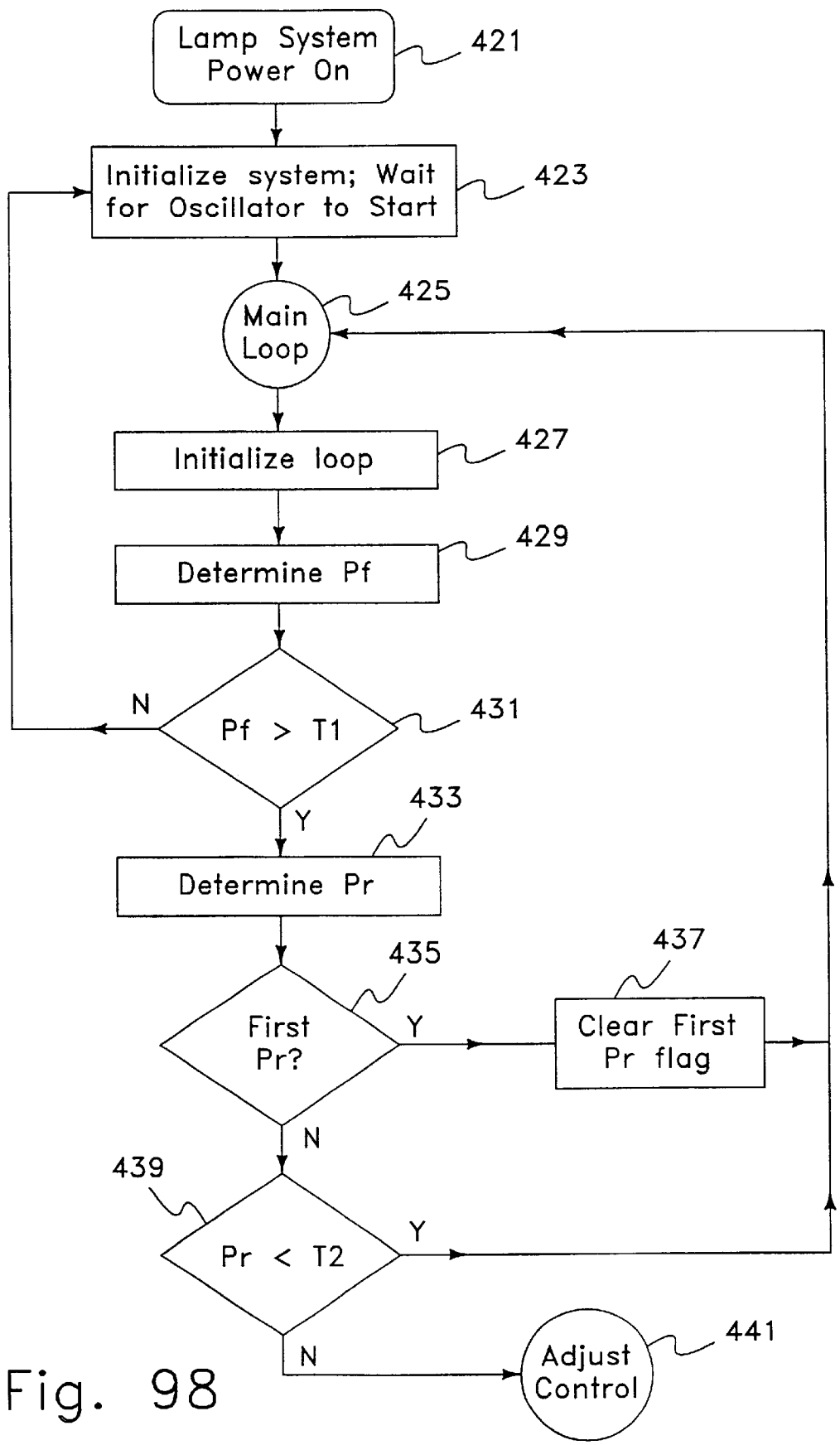
FIGS. 98–102 are more detailed flow charts of an example method according to an aspect of the invention for controlling an RF source for an electrodeless lamp, with connections between the charts being indicated by like labeled process steps.

FIG. 97 is a schematic diagram of a first method according to an aspect of the invention for controlling an RF source for an electrodeless lamp. When the lamp system is turned on (step 401), the control circuit waits a pre-determined delay time for the oscillator to start (step 403). The control circuit then determines the level of forward power, Pf (step 405). At step 407, if Pf does not exceed a first threshold (T1), the oscillator is not operating and the control circuit returns to step 403. If sufficient forward power is detected, the control circuit then determines the amount of reverse power, Pr (step 409). At step 411, if Pr is less than a second threshold T2), the lamp is considered to be operating in a well matched resonance condition and the control circuit loops back to step 405 with no adjustments being made to the control signal. Otherwise, at step 413, if Pr is greater than a third threshold (T3), the lamp is not considered to be near resonance and the control circuit adjusts the control signal to find the lamp resonance (step 415). If the reflected power Pr is not greater than the third threshold (T3), a determination is made as to whether the lamp is near resonance (step 417). If the lamp is not considered to be near resonance, execution passes to step 415 for suitable adjustment of the control signal to find resonance. If the lamp is determined to be near resonance, the control signal is adjusted to minimize the reflected power (step 419) until the reflected power drops below the second threshold (T2).

As is apparent from the foregoing, the operating frequency of the lamp is not preset but rather is determined dynamically based on an operating condition of the lamp. Also, the amount of adjustment of the operating frequency is not preset but rather is determined dynamically based on the sensed signals. The control circuit according to an aspect of the invention therefore eliminates the need for pre-tuning a particular RF source to match a particular lamp head. Moreover, the control circuit of the present aspect of the invention facilitates field replacement of a single component of the lamp system (e.g. just the lamp head or just the RF source) without having to tune or re-tune the lamp system. The control circuit of the present aspect of the invention is adaptive to changes in the lamp condition due to thermal effects or aging. Any necessary tuning adjustments due to such effects automatically take place during lamp starting and even during lamp operation because the control circuit continues to monitor the forward and reflected power during lamp operation. If during operation the reflected power increases above the second threshold (T2), execution proceeds to step 415 to make appropriate adjustments to the control signal.

FIGS. 98–102 are more detailed flow charts of a second method according to an aspect of the invention for controlling an RF source for an electrodeless lamp, with connections between the charts being indicated by like labeled process steps. At step 421, the lamp system is powered on. At step 423, the system is initialized and the oscillator is powered on. For example, step 423 includes initializing I/O ports, option registers, flags, loop timers, program variables, and setting initial control voltages. The system is preferably configured so that the control circuit receives power prior to the oscillator circuit so that the control circuit can initialize and set all the required control voltages before the oscillator turns on. For example, an initially open relay circuit may be provided to connect power to the oscillator and the control circuit may provide the signal to close the relay circuit after the initialization is complete. The control program then waits a short period of time (e.g. 72 ms) for the oscillator to start before entering the main control loop at step 425. At a first step 427 of the main loop, any loop parameters are initialized. For example, a loop timer is set and current stored values of Pf and Pr are saved as previous values of Pr and Pf, respectively. Next, at step 429, a value representative of a sensed amount of forward power Pf is determined. For example, the on board A/D converter is set to read the Pf signal from the directional coupler and 32 readings are taken and averaged. The averaged value is stored. At step 431, the value of Pf is compared to a first predetermined threshold, T1. If the forward power is not greater than an expected minimum value, the control program returns to step 423 to re-initialize the system and re-start the oscillator. Otherwise, at step 433, a value representative of a sensed amount of reverse power Pr is determined. For example, the on board A/D converter is set to read the Pr signal from the directional coupler and 256 readings are taken and averaged. The averaged value is stored. Next, at step 435, the control program determines if the stored value is the first reading taken. If so, at step 437 a flag indicating that the first Pr reading has been taken is cleared and execution returns to the main loop at step 425. If not, the stored value of Pr is compared against a second threshold T2. T2 represents a low amount of reflected power which indicates that the lamp system is well matched and no adjustments in the operating frequency are required. If the stored value of Pr is less than T2, execution returns to the main loop at step 425 and no adjustments are made. Otherwise, the control program enters a routine to adjust the control voltage at step 441.

Figure 99:
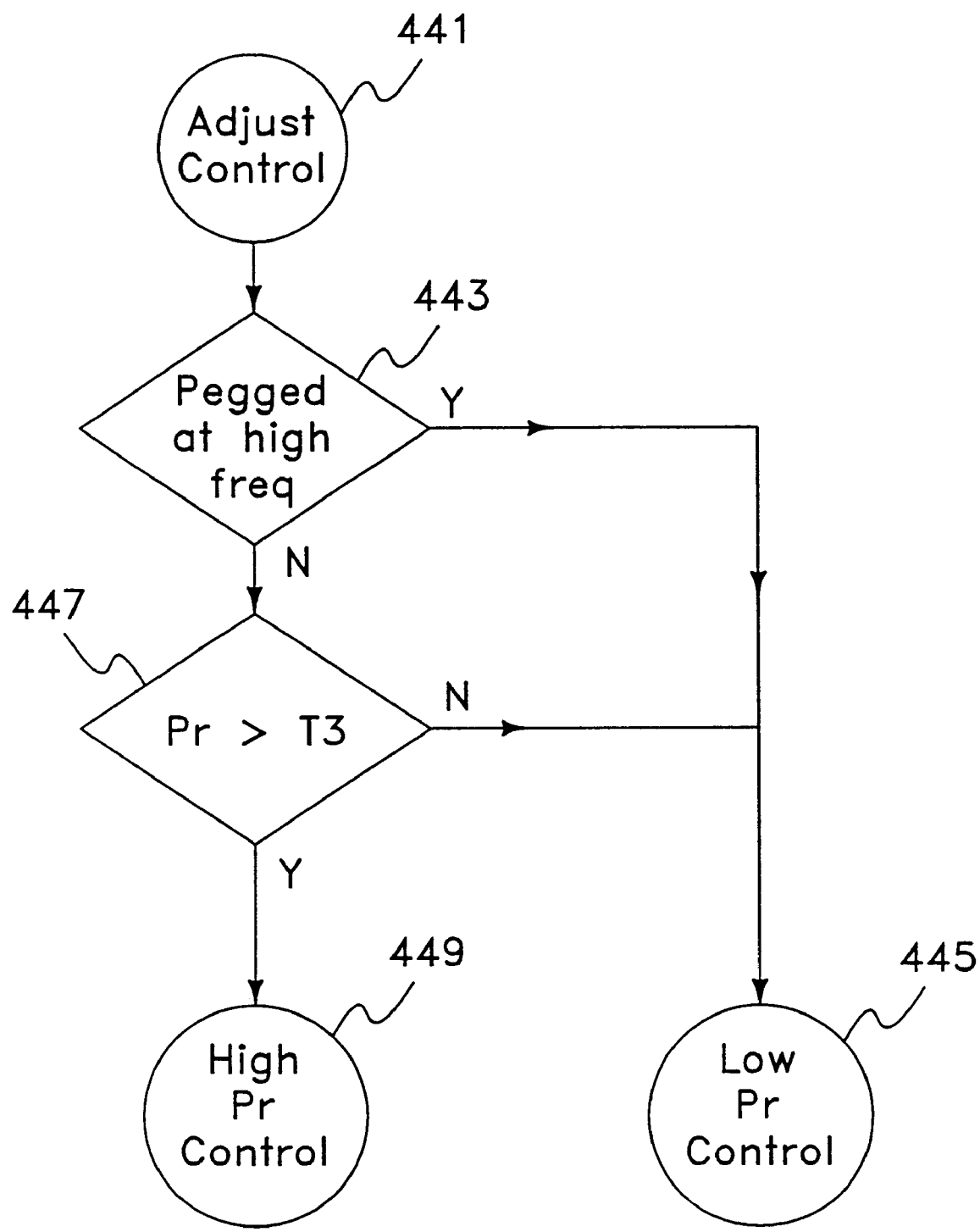

FIG. 99 is a flow chart of the adjust control routine. First, at step 443, the control program determines if the lamp system is presently operating at the high frequency limit of the tuning circuit (e.g. corresponding to control voltage of zero). If so, execution proceeds to a low Pr control routine at step 445. If not, the stored value of Pr is compared against a third threshold T3. T3 represents a moderate amount of reflected voltage which indicates that the operating frequency is approaching resonance. If Pr is greater than T3, execution passes to a high Pr control routine at step 449. In general the high Pr control routine provides more aggressive control (e.g. larger control voltage changes) while the low Pr control routine provides less aggressive control (e.g. smaller control voltage changes). If Pr is not greater than T3, control passes to the low Pr control routine at step 445.

Figure 100:
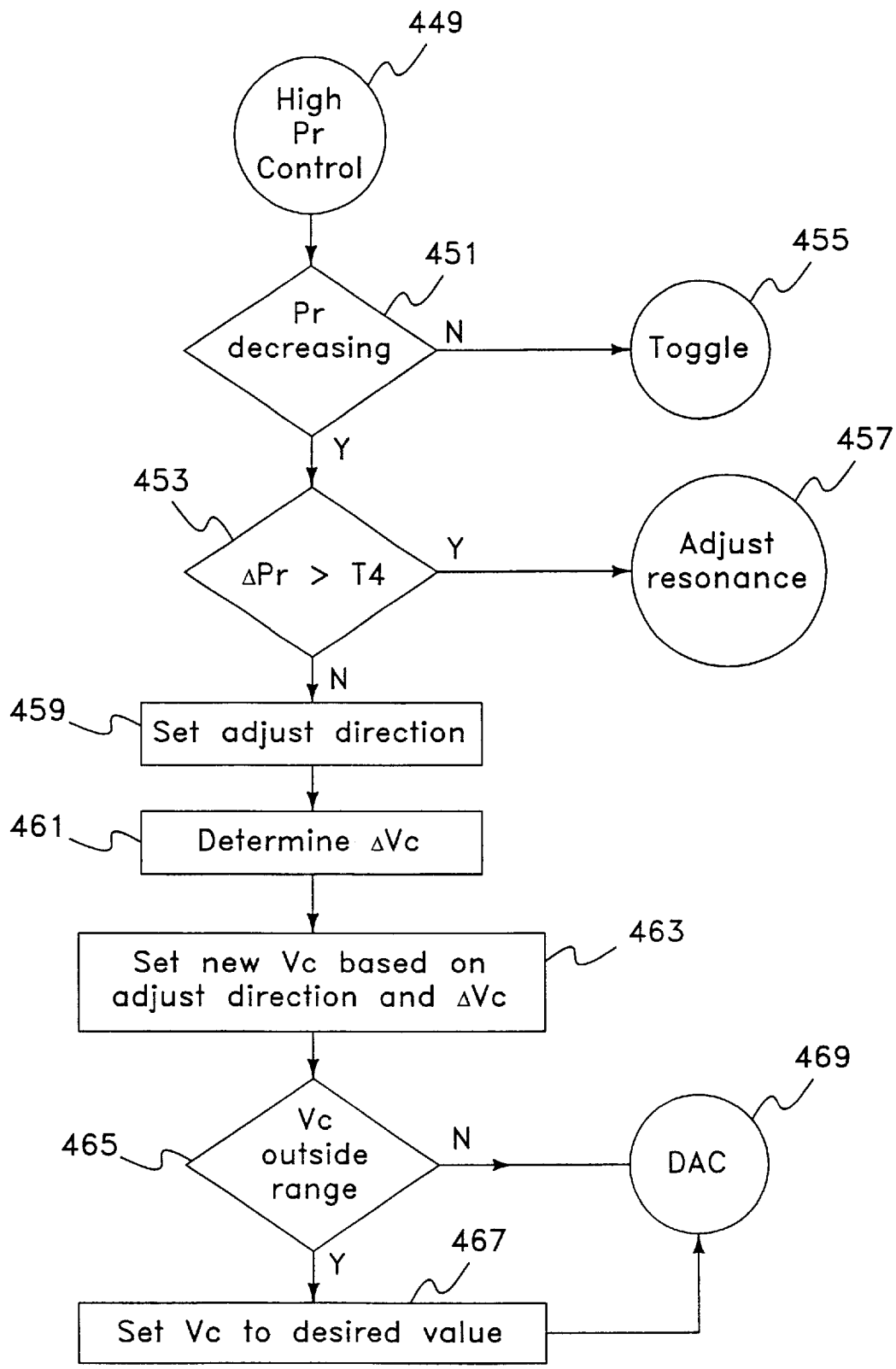

FIG. 100 is a flow chart of the high Pr control routine at step 449. In general, the high control routine is required during lamp starting. First, at step 451, the presently stored value of Pr is compared against a previously stored value of Pr to determine whether the reflected power is decreasing. If the reflected power is not decreasing, control transfers to a toggle routine at step 455 which changes the direction (e.g. positive or negative) in which the control voltage is adjusted.

If the reflected power is decreasing, the difference between the presently stored value of Pr and the previously stored value of Pr (ΔPr) is compared against a fourth threshold T4 at step 453. T4 represents a change in the amount of reflected power which indicates that the operating frequency may be near resonance. For example, a large decrease in the amount of reflected power may indicate that the lamp system is near resonance. If ΔPr is greater than T4, then execution proceeds to an adjust resonance routine at step 457. If not, then an adjust direction is set at step 459 and an amount of control voltage change ΔVc is determined at step 461. For example, ΔVc may be a constant or may be variable such as the product of a constant times Pr or ΔPr. Next, at step 463, a new value for the control voltage Vc is determined by either adding or subtracting ΔVc from the current Vc, depending on the adjust direction. For example, if the adjust direction is positive then ΔVc is added to Vc and if the adjust direction is negative then ΔVc is subtracted from Vc. At step 465 the control program determines if the new value for Vc is outside of the range of the tuning circuit. If not, execution proceeds to a DAC routine at step 469 which converts the digital value of Vc to an analog control voltage level for the frequency tuning circuit. If the new value of Vc is out of range (e.g. less than zero or greater than the highest desired control voltage level), then the value for the new control voltage is set to a pre-determined value at step 467 before passing to the DAC routine at step 469.

Figure 101:
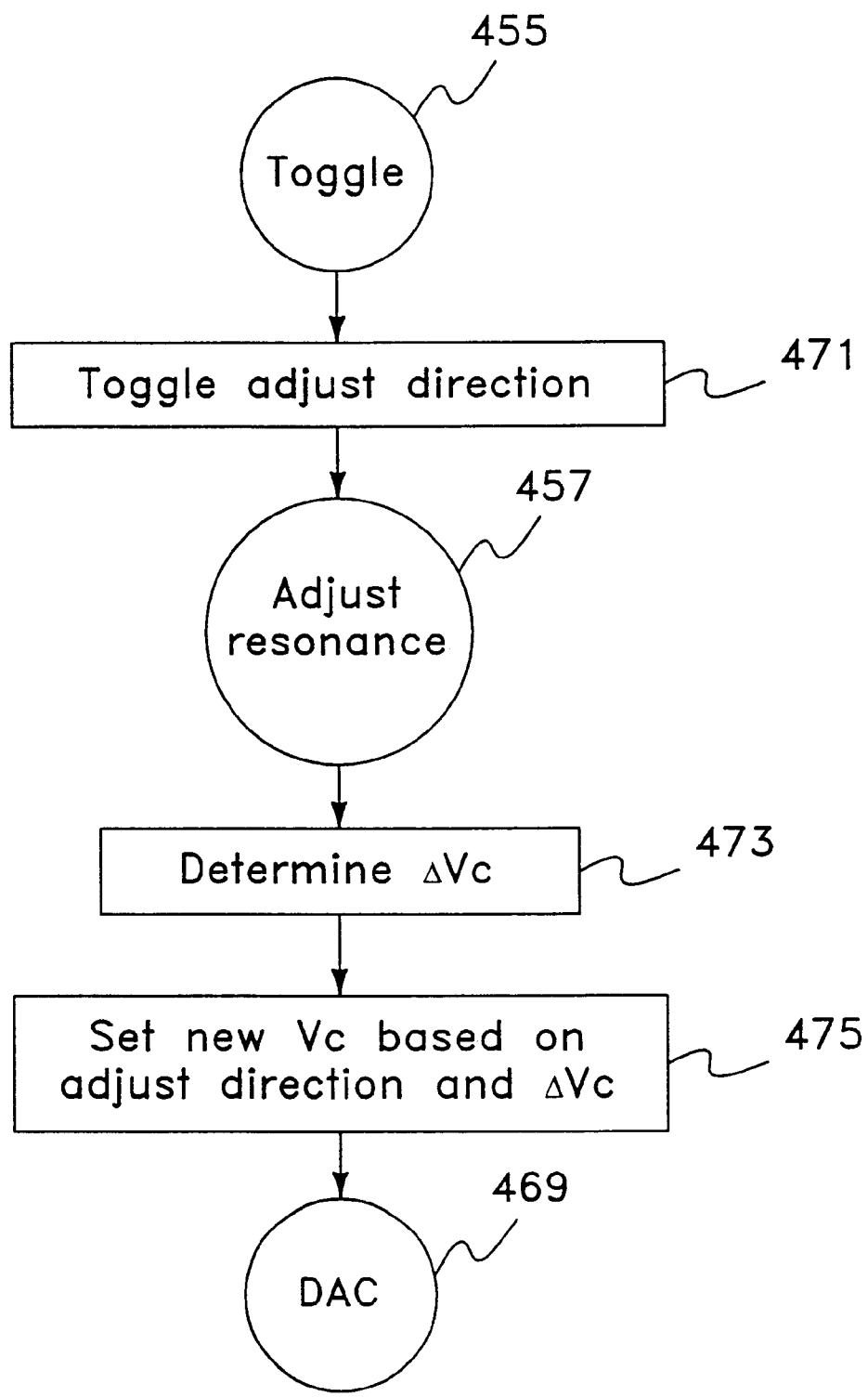

FIG. 101 is a flow chart of the toggle routine and the adjust resonance routine. When execution passes to the toggle routine at step 455, a new adjust direction is set to be the opposite of the present adjust direction. For example, the adjust direction may be represented by a variable named "sign" which has a value of either one (1) or minus one (−1). The toggle routine may be configured to multiply the variable "sign" by minus one (−1) and store the result as "sign":

$$sign=-1\times sign;$$

After the adjust direction has been toggled, execution proceeds to the adjust resonance routine at step 457. Upon entering the adjust resonance routine, a new amount of control voltage change ΔVc is determined at step 473. For example, ΔVc may be a constant or may be variable such as the product of a constant times Pr or ΔPr. In general, ΔVc in the adjust resonance routine is smaller than in the high Pr control routine. Next, at step 475, a new value for the control voltage Vc is determined as follows:

$$Vc=Vc+sign\times \Delta Vc;$$

Execution then passes to the DAC routine at step 469.

Figure 102:
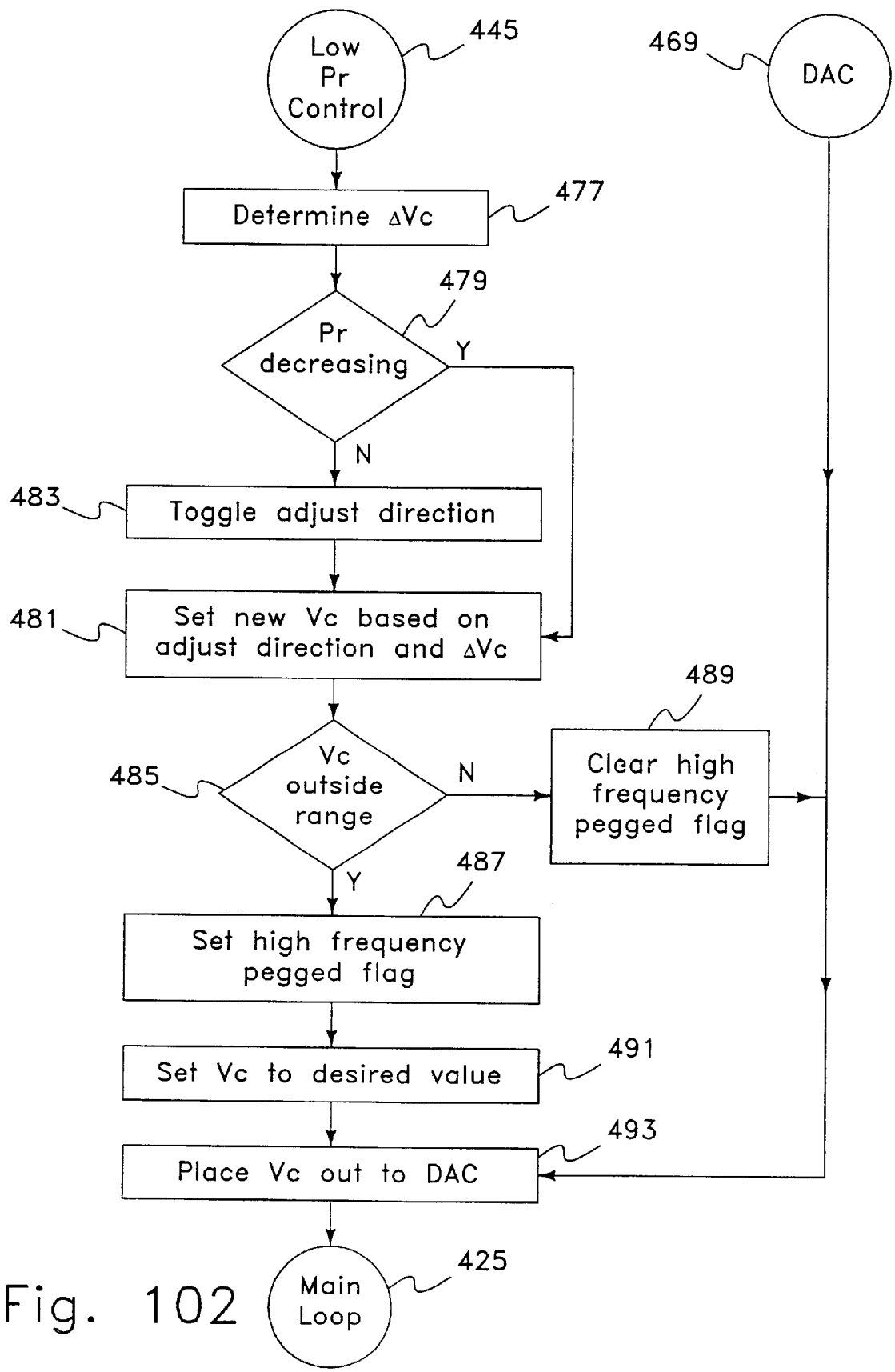

FIG. 102 is a flow chart of the low pr control routine and the DAC routine. When execution passes to the DAC routine at step 469. the present value of Vc is converted from its digital value to an analog voltage level by a digital to analog converter. The analog control voltage is connected to the frequency tuning circuit of the RF source. Execution then returns to the main loop at step 425.

When execution proceeds to the low Pr control routine at step 445, a new amount of control voltage change ΔVc is determined at step 477. In general, ΔVc in the low Pr control routine is less than in either the adjust resonance routine or the high Pr control routine Next, at step 479, the control program determines whether Pr is decreasing. If so, a new value for Vc is determined based on ΔVc and the adjust direction at step 481. If not, the adjust direction is toggled at step 481 before setting the new value for Vc at step 481. At step 485 the control program determines if the new value for Vc is outside of the range of the tuning circuit. If not, a flag indicating that the control voltage is at the high frequency limit is cleared and control passes into the DAC routine at step 493. If the new value of Vc is out of range (e.g. less than zero or greater than the highest desired control voltage level), then the value for the new control voltage is set to a pre-determined value at step 491 before passing into the DAC routine at step 493.

In general, the second method as applied to the first lamp system is as follows:

1) Wait (e.g. 72 ms) for the oscillator to turn on prior to starting active frequency control. During the wait period, zero volts are provided as the control signal to the RF source, thereby keeping the operating frequency high and providing greater loop gain to aid the starting of the oscillator.

2) Set the control voltage for low frequency operation (e.g. 2.3 volts).

3) Start the main loop, each loop being approximately the same duration (e.g. about 16.4 ms). Wait until the expiration of the time period from the start of the last loop prior to continuing.

4) Read the forward power voltage (averaging 32 successive reading to reduce the effect of noise on the accuracy of the reading). If forward power is not detected (e.g. below a first threshold), return to step 1.

5) Read the reflected power (averaging 256 successive readings).

6) If the reflected power is below a second threshold (e.g. 0.04 volts or less), the system is in control. The control signal is not adjusted and control returns to step 3.

7) Start adjusting the control voltage downward (at a rate of about 8.8 volts per second). Determine changes in the reflected power by comparing the present reading with prior readings.

8) If a change in the reflected power is significant (e.g. about 0.12 volts or more), the lamp system is considered to be near resonance.

9) If the reflected power is high (e.g. greater than a third threshold of 1.96 volts) or the changes in reflected power are not significant (e.g. less than a fourth threshold of 0.12 volts), the control signal continues to step downward until it reaches zero volts.

10) If the control voltage reaches the value for highest frequency operation (e.g. zero volts), the control voltage is set back for low frequency operation (e.g. to 2.3 volts) and the stepping repeats.

11) If the change in reflected power is significant, the control voltage is adjusted to minimize the reflected power so long as the adjustments continue to cause significant changes in the reflected power or the reflected power remains below the third threshold (even if the changes are not significant). The control voltage is adjusted in a direction determined to cause lower reflected power and the amount of the adjustment is proportional to the magnitude of the reflected power.

Figure 103:
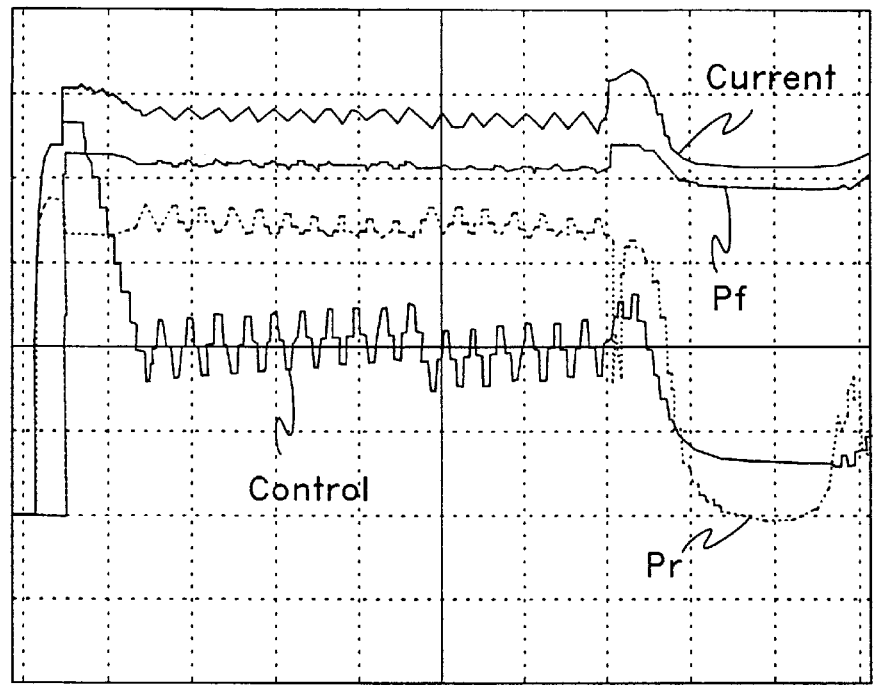
FIG. 103 is a graph of the signals Pf, Pr, and Control which illustrates one execution of the method according to an aspect of the invention for controlling an RF source for an electrodeless lamp.

FIG. 103 is a graph of the signals Pf, Pr, and Control which illustrates one execution of the method according to the present aspect of the invention for controlling an RF source for an electrodeless lamp. As can be seen from FIG. 103, the control circuit waits for the oscillator to start, while holding the control signal at 0 volts. Thereafter, forward power is detected and the control voltage is set to 2.3 volts. The control voltage steps downward until a significant change in the reflected power is detected. Small adjustments are then made in the control voltage as the lamp runs up to full output. In the present example, a number of cycles in the near resonance condition were necessary before the lamp moved to full output. Thereafter, the control voltage is adjusted until it settles at a value which maintains the reflected power at a low level, indicating a well matched resonant condition for the lamp system.

Figure 104:
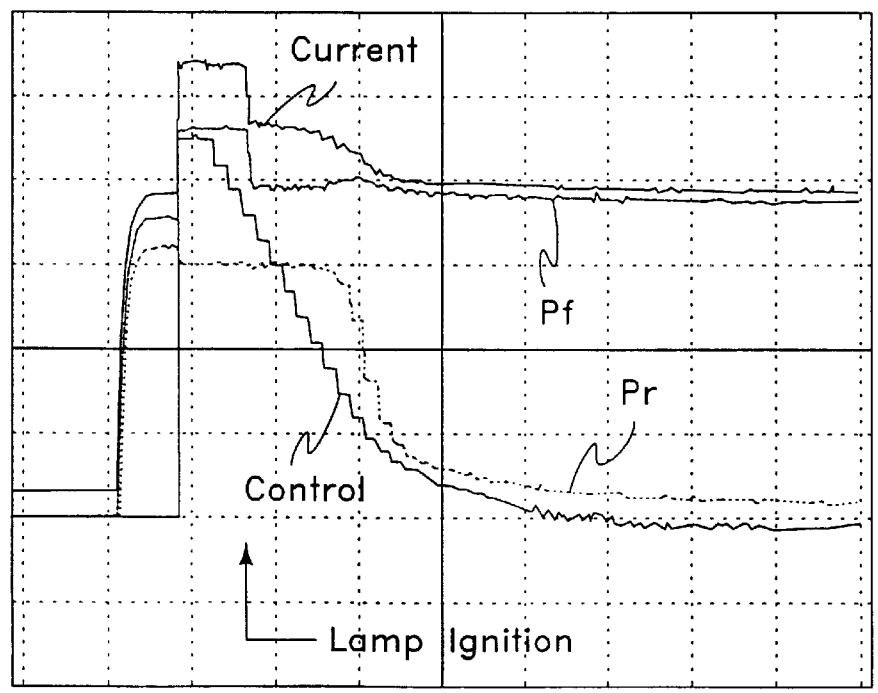
FIG. 104 is another graph of the signals Pf, Pr, and Control which illustrates another execution of the method according to an aspect of the invention for controlling an RF source for an electrodeless lamp.

FIG. 104 is another graph of the signals Pf, Pr, and Control which illustrates another execution of the method according to the present aspect of the invention for controlling an RF source for an electrodeless lamp. Most lamp heads ignite and run up to full output in a single cycle of adjusting the control voltage to find a near resonance condition and thereafter adjusting the control voltage to minimize Pr. This typical lamp starting and control method is illustrated in FIG. 104.

Optics

Figure 105:
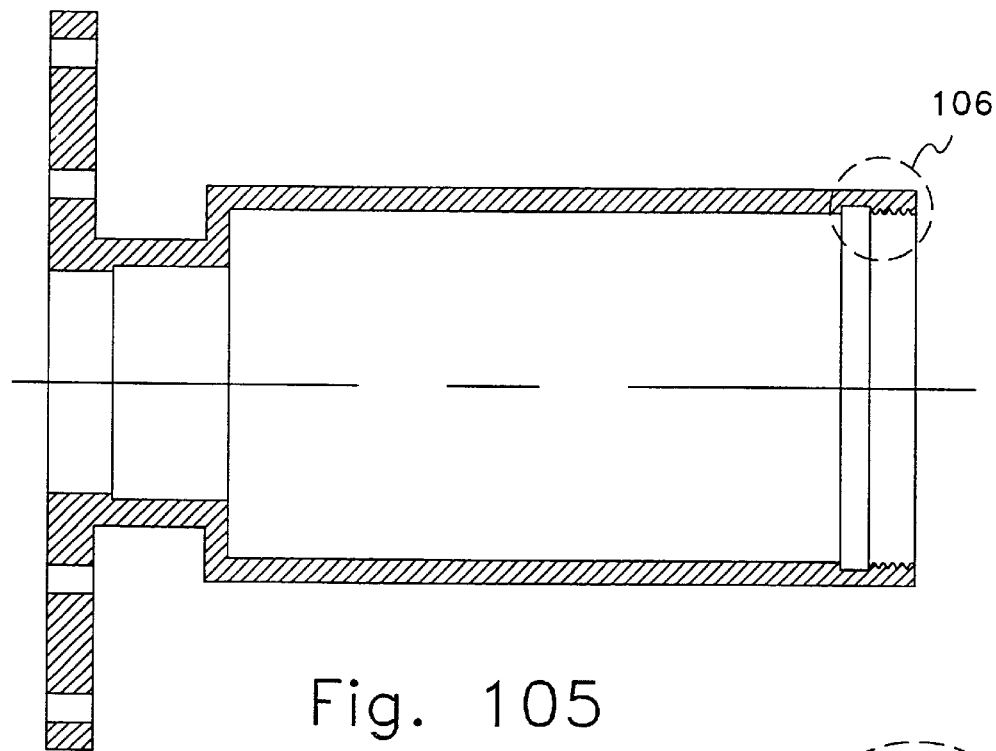
FIG. 105 is a sectional schematic view of a lens holder according to an aspect of the invention.

FIG. 105 is a sectional schematic view of a lens holder according to an aspect of the invention. A lens holder includes a hollow cylindrical structure with a first inner bore corresponding to an outer diameter of a set of lenses spaced closely to the lamp head and a second inner bore corresponding to an outer diameter of a lens positioned distal from the lamp head. The first inner bore has an inner diameter which less than a cutoff frequency of the lamp operating frequency and operates to contain RF energy.

Figure 45:
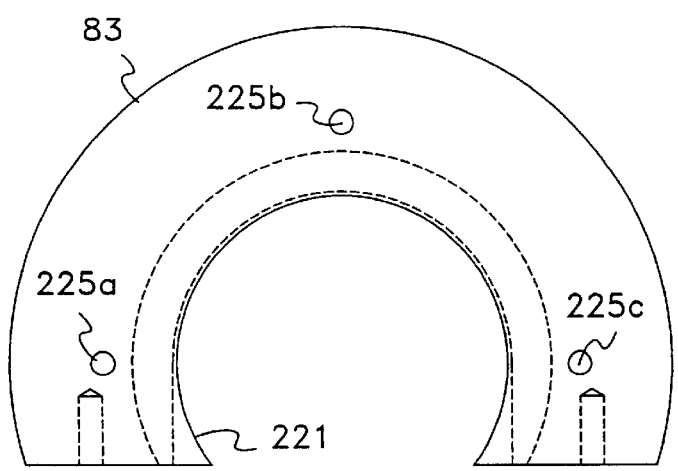
FIG. 45 is a top, schematic view of a first heatsink according to an aspect of the invention.
Figure 106:
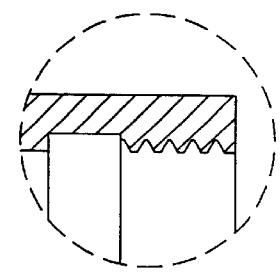
FIG. 106 is an enlarged view of area 106 in FIG. 105.

An end of the lens holder which mounts to the lamp head 61 (see FIG. 17) includes a disk shaped mounting portion with through holes defined therethrough which are adapted to align with through holes 225a–d (see FIGS. 45 and 50). The mounting portion includes further mounting holes which may be used to interface with other components. FIG. 106 is an enlarged view of area 106 in FIG. 105. As can be seen in FIG. 106, an end of the lens holder which is distal to the lamp head includes a threaded portion which adapted to mate with a threaded lens retainer ring.

Figure 107:
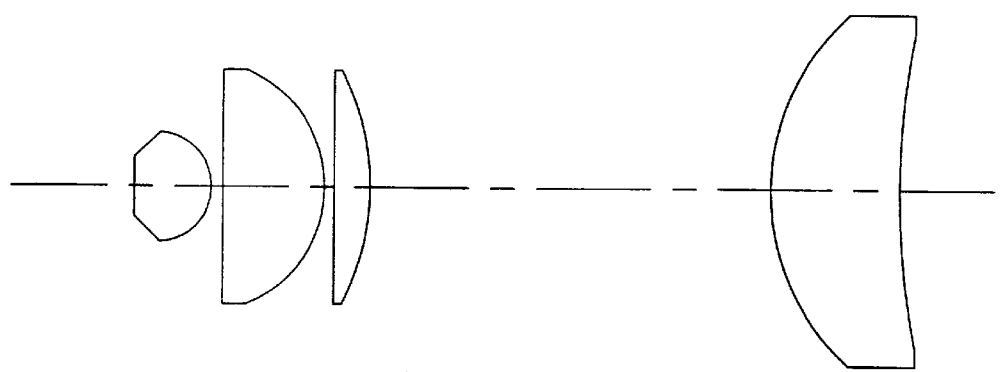
FIG. 107 is a schematic illustration of a lens arrangement according to an aspect of the invention.

FIG. 107 is a schematic illustration of a lens arrangement according to an aspect of the invention. A first lens is a truncated ball lens with a 45 degree chamfer at the truncated end. An intermediate lens pair includes two aplanatic lenses which may alternatively be replaced by a single aspheric lens. A final lens comprises a meniscus lens. The meniscus lens creates an image of the aperture at the imager plane and utilizes negative distortion to improve the uniformity. Each of the lenses is rotationally symmetrical about the center line.

The ball lens and the intermediate lens pair function to reduce the numerical aperture of the light produced by the lamp. From the aperture, the beam angle of the lamp is about +/−70°. The ball lens reduces the beam angle to about +/−40° and the intermediate lens pair further reduces the beam angle to about +/−20°. The meniscus lens functions to make the optical system telecentric and provide more uniform illumination. Each of the lenses in the intermediate lens pair and the meniscus lens are preferably coated to reduce reflection losses. Such a coating includes, for example, a multi-layer anti-reflective coating.

Exemplary dimensions for the lens system are as follows. The ball lens has a radius of about −7.57 mm and is truncated to a center thickness of about 10.6 mm. An outer diameter of the ball lens is about 15.14 mm The ball lens may be made, for example, from silica with Nd=1.4585 and Vd=67.82. The chamfer is for mounting purposes and does not affect light output. A surface of the ball lens which faces the aperture of the lamp defines an approximately 8 mm diameter circular surface. The ball lens, if coated, requires a high temperature coating because of its proximity to the bulb. The intermediate lens pair includes a first lens with a radius of about −17.255 mm truncated to a center thickness of about 14.1 mm. The second lens of the intermediate lens pair has a radius of about −34.404 mm and is truncated to a center thickness of about 5.0 mm. The outer diameter for each lens of the intermediate lens pair is about 32.0 mm. The lenses may be made from, for example, BK7. The meniscus lens has a first radius of about 32.03 and a second radius of about 112.690 with a center thickness of about 19.8 mm. The outer diameter of the meniscus lens is about 48 mm and the lens may be made from, for example, BK7. In the lens holder, the lenses are mounted so that they are aligned along the center line with an air gap of about 1 mm between the ball lens and each lens of the intermediate lens pair and an air gap of about 55.1 mm between the second lens of the intermediate lens pair and the meniscus lens.

The foregoing optical system is given by way of illustration and not limitation. Given the benefit of the present description, numerous other optical systems may be adapted to utilize the lamps described herein.

Second Lamp System

Figure 108:
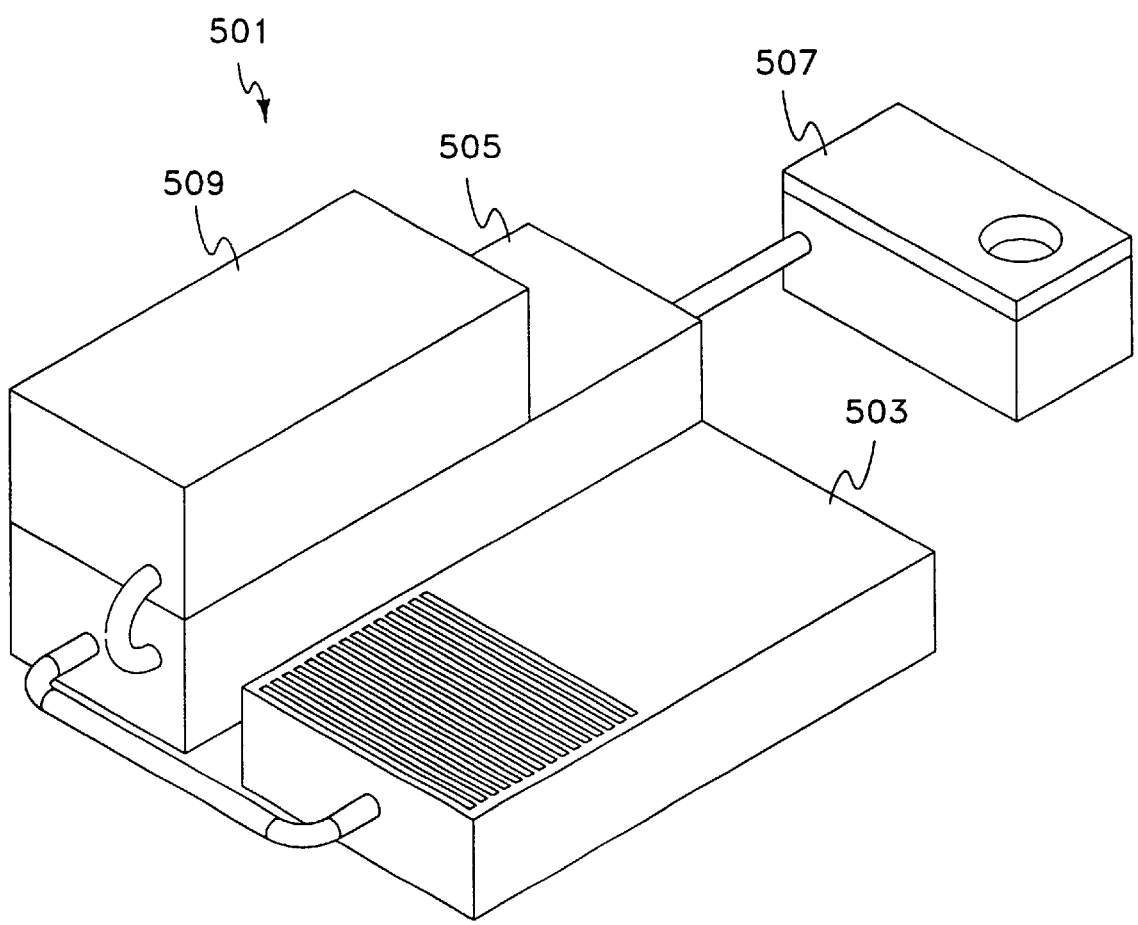
FIG. 108 is a perspective view of a second lamp system according to an aspect of the invention.

FIG. 108 is a perspective view of a second lamp system according to an aspect of the invention. The lamp system 501 includes a DC power supply 503 which provides DC power to an RF source 505 which converts the DC power to RF energy and supplies the RF energy to a lamp head 507 which couples the RF energy to a fill which emits light. An RF control unit 509 monitors and controls the RF source 505. Each of these system components is hereinafter described in detail.

The second lamp system of the invention may utilize any DC power supply capable of providing a desired amount of DC voltage and current to power the RF source. A variable power supply is preferred. A suitable example of a DC power supply for the lamp system according to an aspect of the invention is commercially available from Astro Dyne, Taunton, Mass., with model no. SP-300-24. This power supply is rated at 300 Watts with a variable output from 17 V to 24 V at a maximum of 12.5 amps. An alternate suitable power supply is available from VICOR, Andover, Mass., model number VI MU3-ES, which provides approximately 24 VDC with approximately 300 watts of power.

RF Source

Generally, any RF source capable of providing a suitable amount of RF energy, typically in range of 50 to 150 RF Watts, for exciting the lamp fill may be utilized in the lamp system. Preferably, the RF source is compact and energy efficient such as the sources described above and also in the above-mentioned PCT Publication No. WO 99/36940. More preferably, the RF source is controlled by a micro-controller such as the RF control circuit described above in connection with FIGS. 95–104. In accordance with a present aspect of the invention, the RF source includes an oscillator circuit, an isolator, and a directional coupler which are integrated on a single printed circuit board as hereinafter described in detail.

Figures 109, 110:
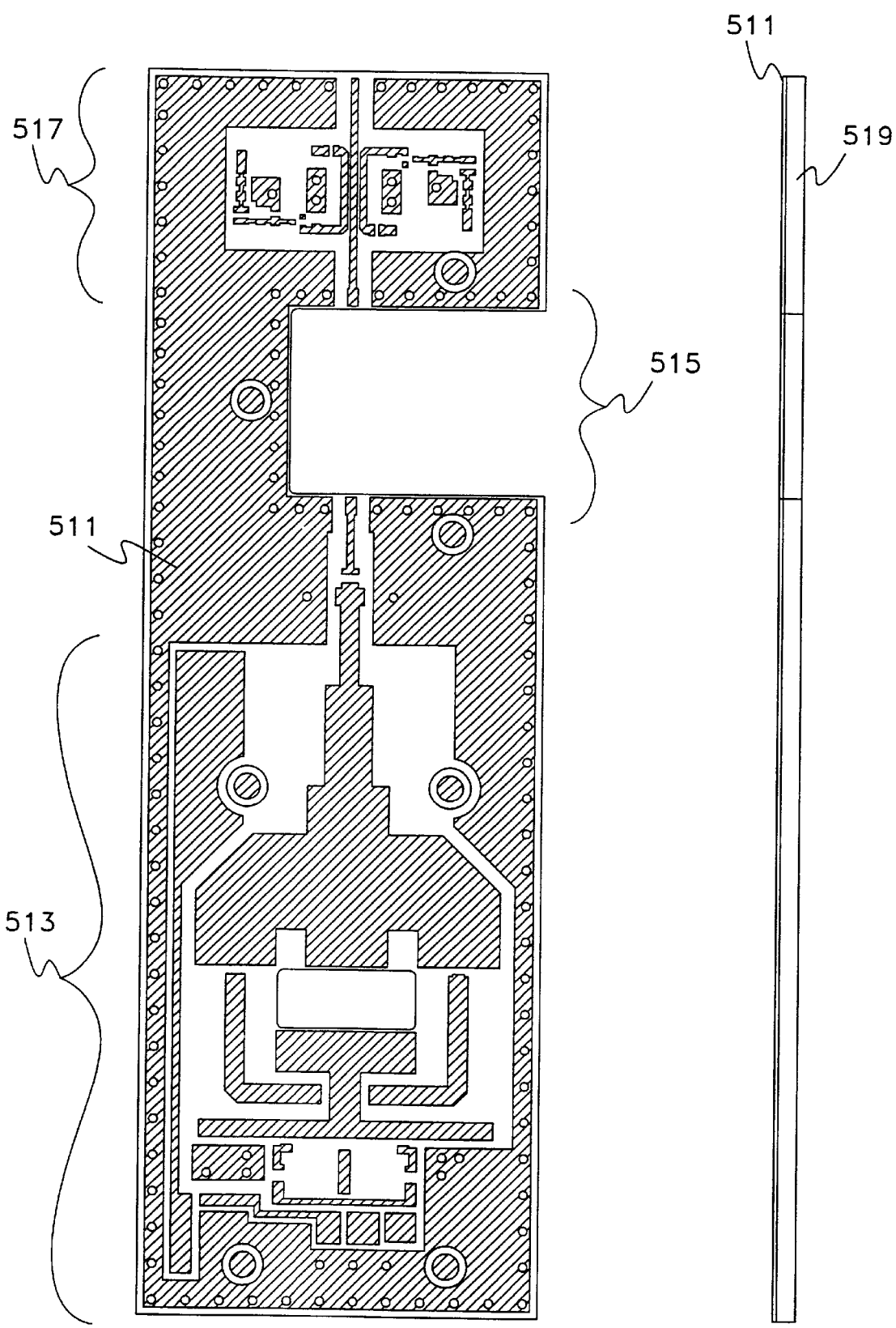
FIG. 109 is a schematic view of a printed circuit board layout for an RF source according to an aspect of the invention.
FIG. 110 is a side schematic view of the printed circuit board from FIG. 109 mounted on a spreader plate.

FIG. 109 is a schematic view of a printed circuit board layout for an RF source according to an aspect of the invention. The printed circuit board 511 includes an oscillator section 513, an isolator section 515, and a directional coupler section 517. By including each of these sections on a single printed circuit board, transmission losses, cable losses, and coupling losses are avoided. Assembly and manufacturing costs are also reduced by the high level of integration.

FIG. 110 is a side schematic view of the printed circuit board 511 from FIG. 109 mounted on a spreader plate 519. The spreader plate 519 defines a cutout which corresponds to the isolator section 515.

FIG. 111 is a schematic, assembly level view of the RF source according to an aspect of the invention. FIG. 112 is an enlarged view of the area 112 in FIG. 111 showing assembly details of a directional coupler utilized by the RF source. The directional coupler is similar in operation and construction to the directional coupler described above in connection with FIGS. 92–94. FIG. 113 is a side schematic view of the RF source showing details of a hand wound coil L2. FIG. 114 is an enlarged view of the area 114 in FIG. 111 showing assembly details of a tuning circuit utilized by the RF source. The tuning circuit is similar in operation and construction to the complementary PIN diode tuning circuit described above in connection with FIG. 91. Suitable component values are as follows:

| Reference # | Description |
| --- | --- |
| C1 | 4.7 uF capacitor |
| C2 | 4700 pF capacitor |
| R1 | 3.32K Ohm, 1/4 W, 1% thick film chip (TFC) resistor |
| D1 | 4.7 V Zener diode |
| R2 | 4000 Ohm, 1/8 W, 1% TFC resistor |
| VR1 | 1K Ohm variable resistor |
| L1 | 330 nH inductor |
| C3 | 470 pF, 200 V capacitor |
| C4 | 39,000 pF, 50 V capacitor |
| D2–D3 | High power PIN diode (M/A COM, AMP MA4P7102F-1072) |
| R3–R4 | 5.1K Ohm, 1/4 W, 1% TFC resistor |
| C5–C6 | 2.7 pF, 150 V capacitor |
| R5 | 100K Ohm, 1/4 W, 1% TFC resistor |
| C7–C8 | 24 pF, 500 V capacitor |
| C9 | 0.6 pF–2.0 pF trimming capacitor (Johanson 9401-2SL1) |
| C10 | 2.4 pF, 150 V capacitor |
| C11 | 0.10 uF capacitor |
| C12 | 1000 pF capacitor |
| C13 | 3.6 pF, 500 V capacitor |
| C14 | 1.7 pF, 500 V capacitor |
| C15 | 130 pF, 300 V capacitor |
| L2 | 18 AWG hand wound inductor |
| Q1 | RF POWER FET (Motorola XRF187S) |
| R6–R7 | 68 Ohm, 200 V, 114 W, 2% TFC resistor |
| L3–L4 | 2.5 nH inductor |
| R8–R9 | 50 Ohm resistor |
| D4–D5 | diode (M/A COM MA4CS103A-287) |
| C16–C17 | 39 pF capacitor |
| R10–R11 | 2200 Ohm resistor |
| L5–L6 | 39 nH inductor |
| C18–C19 | 0.1 uF capacitor |
| C20–C21 | 1.0 uF capacitor |
| CN1 | SMA RF connector (Johnson 142-0701-801) |
| IS1 | Isolator (Southern Microwave SMI U73 ODICWH) |

In general, operation of the various sections may be understood with reference to the above-mentioned PCT Publication No. WO 99/36940 and the above description in connection with FIGS. 15–104. An exemplary RF source built with the foregoing components produces between 60 W and 130 W of RF power (e.g. 80.5 W at 18.8V to 125 W at 23.1V) and is tunable over a range of about 708 MHz to 735 MHz. By integrating the various sections on a single printed circuit board, the RF source produces 5–10 RF watts more than a comparably configured RF source utilizing separate sections.

A heatsink 521, as illustrated in FIGS. 115–117, may be made from, for example, cast or extruded aluminum. The heatsink 521 provides several mounting holes 523 for securing the RF source to the heatsink 521 and several other mounting holes 525 for securing the isolator to the heatsink 521. For example, the spreader plate 519 lies flat on the flat surface of the heatsink 521 and is secured to the heatsink by screws through holes in the board 511 and plate 519 which align with the mounting holes 523. Around a perimeter of the heatsink 521 are more mounting holes 527 for securing a cover to the heatsink 521 for RF shielding.

Thermal management of PIN Diodes

During operation of the RF source, high temperatures may develop at various regions of the circuit. By providing effective thermal management, the RF source can operate over a wider operating temperature, power, and output mismatch range. The PIN diodes D2, D3 (see FIG. 114) are used to control the variable capacitance for the frequency tuning circuit. Such devices are prone to overheating and may thereafter function in pure resistance operation mode. Under these circumstances, the frequency control of the RF source is inhibited and there arises a danger of damage or destruction of the oscillator.

According to a present aspect of the invention, separate thermal management is provided for the PIN diodes to keep them in a suitable temperature range. FIG. 118 is a fragmented, sectional view of a heatsink arrangement for a PIN diode according to an aspect of the invention. The RF source comprises a printed circuit board 511 mounted on a spreader plate 519 (see FIG. 110). A PIN diode 512 (e.g. D2, D3 in FIG. 114)) has one end connected to a pad 514 on the printed circuit board 511. The other end of PIN diode 512 is connected to an electrical and thermal conducting post 516 (made from, e.g. copper or aluminum). The post 516 is positioned through a hole in the board 511 and mounted in the spreader plate 519. The PIN diode 512 is connected to the post 516 by a solder bridge 518. Preferably, the post 516 is substantially as wide as the diode 512 (e.g. 1/8 inch or more) and protrudes sufficiently from the board 511 such that the solder bridge 518 is made across the entire face contact of the diode 512.

It is estimated that heatsinking the PIN diodes D2, D3 directly to the spreader plate 519 reduces the PIN diode temperature by more than 20° C., with corresponding improved margins in heatsink temperature, output power, or output mismatch range.

Advantageously, the heatsink post 516 can be utilized to simplify the manufacturing process. By positioning a post at each PIN diode location (and optionally at other locations), the posts function as locator pins to provide proper alignment of the board 511 on the spreader plate 519.

RF Control Unit

The operation and function of a RF control unit 509 is similar to the RF control unit described above in connection with the first lamp system. In general terms, the RF control unit receives input signals from the directional coupler which correspond to forward and reflected power. The control unit utilizes a micro-controller to generate control signals based on these input signals.

Lamp Head

In general terms, the lamp head according to an aspect of the invention includes a housing having a base portion and a cover. The base portion is adapted to receive an electrodeless lamp circuit comprising an integrated coil and capacitor assembly. A first ceramic heatsink is disposed around the coil portion of the assembly and a second ceramic heatsink is disposed proximate to the capacitor portion of the assembly to provide heat transfer from the assembly to the housing. An aperture bulb is positioned and secured within the housing proximate to the coil. Suitable optics may be further provided for modifying light emitted from the aperture bulb.

With reference to FIGS. 119–124, a lamp head 531 includes a base 533 and a cover 535 which together form an enclosure with a light-emitting opening 537. Base 533 and cover 535 are preferably made from conductive material such as, for example, aluminum. The base 533 defines a cavity 539 which is adapted to receive an electrodeless lamp circuit comprising an integrated coil and capacitor assembly 541. A first ceramic heatsink 543 is disposed around a coil portion 545 of the assembly 541. A second ceramic heatsink 547 is disposed between a capacitor portion 549 of the assembly 541 and a wall 551 of the cavity 539 (see FIG. 123). The heatsink 547 is in close thermal contact with a lead 548 of the coil 545, the lead 548 also forming one plate of the capacitor portion 549. The heatsinks 543 and 547 are preferably made of boron nitride and during operation function to transfer heat from the respective portions of the lamp circuit to the housing. A thermally conductive spacer block 553 is disposed between the capacitors 549 and another wall 555 of the cavity 539. The spacer block 553 may be made of metal (e.g. aluminum).

The lamp head 531 may be interfaced to further external heatsinks (e.g. with extruded aluminum fins) and cooling air may be provided to keep the lamp head 531 at a suitable operating temperature. Advantageously, the housing provides numerous substantially flat surfaces to facilitate good heat transfer and threaded mounting holes 559 for convenient mounting to suitable external heatsinks. Precise mounting locations may also be provided for mounting optical elements which require optical alignment.

The lamp head 531 further includes an aperture bulb assembly 561 secured within the housing and positioned interior to the coil 545. In the first example, the aperture bulb assembly 561 includes a ceramic (e.g. alumina) cup 563 which defines an aperture 565. The cup 563 has an integral front flange 567 to promote heat transfer away from a bulb 569. The cup 563 encloses the bulb 569 which is positioned against the aperture 565 and the cup 563 is otherwise filled with reflective ceramic material 571. In the first example, a ceramic (e.g. BN) sleeve 573 is disposed between the cup 563 and the coil 545 (see FIG. 124).

A ball lens 575 is secured in front of the aperture 565 to reduce a beam angle of the light emitted from the aperture.

RF power is provided to the lamp head 531 via a coaxial cable 577 which enters the housing through an slot in the base 533 and connects to the integral coil and capacitor assembly 541 as hereinafter described. A portion 579 of the outer insulation of the coaxial cable 577 may be removed to connect the grounded outer conductor to the integrated coil and capacitor assembly 541 and the base 533 (see FIG. 123).

With reference to FIGS. 125–130, another example lamp head 631 includes a base 633 and a cover 635 which together form an enclosure with a light-emitting opening 637. Base 633 and cover 635 are preferably made from conductive material such as, for example, aluminum. The base 633 defines a cavity 639 which is adapted to receive an electrodeless lamp circuit comprising an integrated coil and capacitor assembly 641. A first ceramic heatsink 643 is disposed around a coil portion 645 of the assembly 641. A second ceramic heatsink 647 is disposed between a capacitor portion 649 of the assembly 641 and a wall 651 of the cavity 639. The heatsink 647 is in close thermal contact with a lead 648 of the coil 645, the lead 648 also forming one plate of the capacitor portion 649. The heatsinks 643 and 647 are preferably made of boron nitride and during operation function to transfer heat from the respective portions of the lamp circuit to the housing. A thermally conductive spacer block 653 is disposed between the capacitors 649 and another wall 655 of the cavity 639. The spacer block 653 may be made of metal (e.g. aluminum). Two fasteners 656 are disposed through threaded holes 658 in a side wall of the base 633. The fasteners 656 are tightened to create good thermal contact between the spacer block, the capacitor portion 649, the second heatsink 647 and the wall 651 of the base 633. Alternatively, the holes 658 and fasteners 653 may be omitted and springs or a resilient material may be used to create the contact.

The lamp head 631 may be interfaced to further external heatsinks (e.g. with extruded aluminum fins) and cooling air may be provided to keep the lamp head 631 at a suitable operating temperature. Advantageously, the housing provides numerous substantially flat surfaces and threaded mounting holes 659 to facilitate good heat transfer and convenient mounting to suitable external heatsinks. The lamp head 631 further includes an aperture bulb assembly 661 secured within the housing and positioned interior to the coil 645. In the second example, the aperture bulb assembly 661 includes a ceramic (e.g. BN) cup 663 and a ceramic washer 664 which defines an aperture 665. The cup 663 has an integral front flange 667 to promote heat transfer away from the bulb. The cup 663 and washer 664 enclose a bulb 669 which is positioned against the aperture 665 and the cup 663 is otherwise filled with reflective ceramic material 671. In the second example, no additional ceramic sleeve is disposed between the cup 663 and the coil 645.

The lamp head 631 includes several features, in addition to the above-mentioned fasteners 656, to improve thermal management of the lamp head 631. The base 633 defines a channel 660 which extends completely around a perimeter of the cavity 639 (see FIGS. 127 and 129–130). An RF sealing gasket 662 is disposed in the channel 660 and improves RF shielding. A thermal conductive pad 668 is disposed between the cover 635 and the flange 667 to improve heat transfer from the aperture bulb 661 to the cover 635. Suitable materials for the pad 668 include SIL-PAD 2000 made by the Berquist Company or silicone sponge rubber.

A ball lens 675 is secured in front of the aperture 665 to reduce a beam angle of the light emitted from the aperture. For example, the ball lens 675 may be glued to the cup 663 and/or washer 664. The cover 635 is configured such that the ball lens 675 is recessed and does not substantially protrude past an outer surface of the cover 675. In accordance with a present aspect of the invention, the cover 635 provides a pair of tabs 636 in the area of the opening 637. The tabs 636 are configured to contact the ball lens 675 and provide additional mechanical strength for holding the ball lens 675 in place. Preferably, the tabs 636 are positioned to reduce potential light blockage. For example, in the case of a rectangular aperture, the tabs 636 are preferably positioned along a line which is perpendicular to the longer side of the aperture.

RF power is provided to the lamp head 631 via a coaxial cable 677 which enters the housing through a slot in the base 633 and connects to the integral coil and capacitor assembly 641 as hereinafter described.

Integrated Coil/Capacitor Assembly

According to a present aspect of the invention, a capacitor stack and excitation coil for an inductively coupled electrodeless lamp are fabricated as a highly integrated assembly using standard industry techniques for low cost, high volume manufacturing. Advantageously, the integrated coil/capacitor assembly of the present aspect of the invention provides a highly reproducible resonant frequency and impedance characteristics.

Numerous capacitor stack and coil arrangements are described above and also in the aforementioned PCT Publication No. WO 99/36940. In each of these arrangements, several subassemblies are utilized which must be mechanically and electrically connected together to form the lamp circuit. For example, the coil, the low voltage capacitor, and the high voltage capacitor are typically separate subassemblies. In some arrangements, single or double sided printed circuit boards may be utilized to provide one or more of the plates of the capacitor stack. The separate subassemblies require several solder connections. Accordingly, it is difficult to maintain tight tolerances and the part to part variations can have a significant effect on lamp performance.

The integrated assembly of the present aspect of the invention overcomes these problems by using multi-layer printed circuit board fabrication techniques to eliminate solder connections in the capacitor stack and to maintain tight tolerances (e.g. about 0.025 mm). The cost of the integrated assembly itself is low, while the precision and robustness of the circuit is high. Moreover, the overall lamp assembly cost is reduced because the number of processes required to assemble the lamp are reduced.

The precision of the PCB etching process also contributes to the precision of the electrical characteristics of the integrated assembly. For example, it is important to accurately define the areas and relative boundaries of the capacitor electrodes.

PCB etching procedures can define the edges of the electrode structure to an accuracy of about 0.01 mm. As noted above, overall alignment of the capacitor plates can be held to tolerances as high as about 0.025 mm, thereby providing a precise and repeatable coil/capacitor assembly with highly consistent frequency and impedance characteristics. Preferably, the PCB material utilized for dielectric layers has a low loss at the desired operating frequency and also good thermal conductivity. For example, Rogers® 6002 Teflon® based composite is a suitable material.

In addition to the foregoing advantages, the integrated coil/capacitor assembly of the present aspect of the invention provides improved arcing performance. The high temperature and high pressure fabrication techniques minimizes or eliminates the presence of voids interior to the capacitor stack. Such voids, which have been detected in the soldered arrangements mentioned above, can lead to corona and eventual breakdown due to the high field stresses in the volume and over the surface of the capacitor stack structure. Preferably, according to an aspect of the invention, the common plate of the high and low voltage capacitors is completely buried between two layers of dielectric with no outside edges exposed to air. Also, the layout of the transverse dimensions of the capacitor is arranged to reduce or minimize the electric field stresses on the capacitor plate surfaces and edges.

Another factor which promotes arcing is high temperature. According to an aspect of the invention, the integrated coil/capacitor assembly provides exterior surfaces which are readily interfaced to thermally conducting structures.

Figure 131:
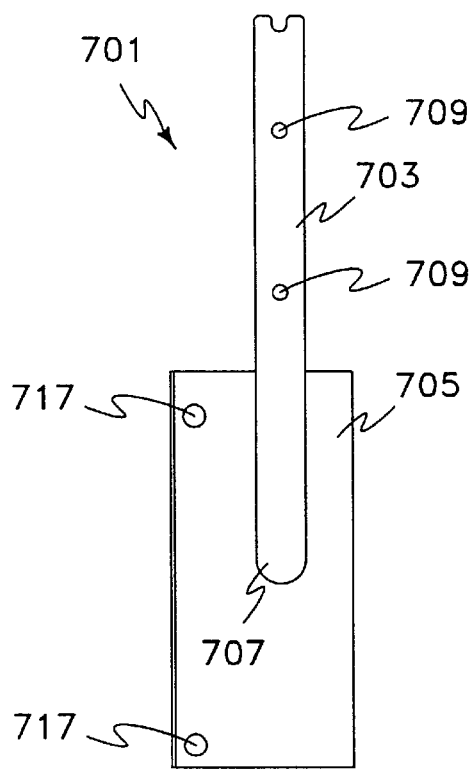
Figure 132:
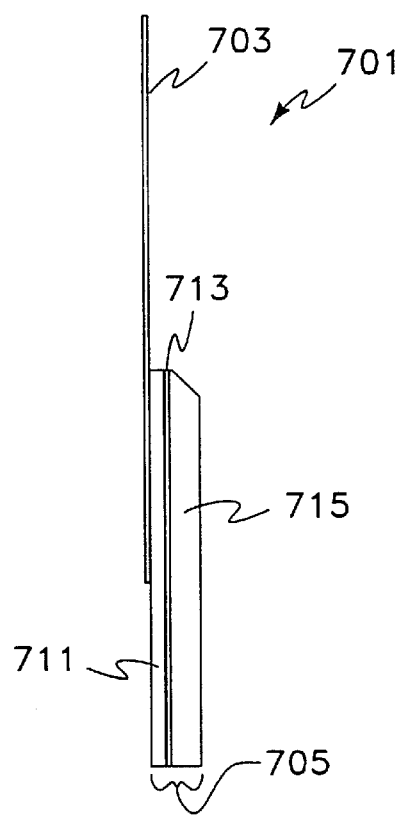

FIG. 131 is a top schematic view of an integrated coil and capacitor assembly 701 according to an aspect of the invention, prior to forming the coil. FIG. 132 is a right side schematic view the integrated coil and capacitor assembly 701. The assembly 701 comprises alternating conductive and dielectric layers bonded together using multi-layer printed circuit board fabrication techniques. The assembly 701 includes a coil portion 703 and a capacitor portion 705.

The coil portion 703 comprises a portion of a conductive strip of metal 707 (e.g. copper) which extends beyond the capacitor portion 705. This portion of the metal strip 707 defines one or more (e.g. two) alignment holes 709. The holes 709 are used during the fabrication process to position the metal strip 707 in a desired position with respect to the rest of the assembly 701. For example, an assembly fixture may include corresponding pins which align with the holes 709. To form the coil, the metal strip 707 is turned on a mandrel or the like. Once formed, the coil has a general wedding ring shape as described in the aforementioned PCT Publication WO 99/36940. The alignment holes 709 do not significantly affect circuit performance because most of the current is carried in two rings around the outside edges of the coil.

The capacitor portion 705 includes the remaining portion of the metal strip 707, a first dielectric material 711, an internal common conductive area (see FIG. 133), a second dielectric material 713, and a spreader plate 715. Each of the foregoing conductive/dielectric layers define one or more holes 717 which are used for alignment during the PCB processing and are also useful for holding the assembly in a fixture during the coil forming process. For example, the first dielectric material is Rogers 6002 about 0.060 inch thick and the second dielectric material is Rogers 6002 about 0.020 inch thick.

Figure 133:
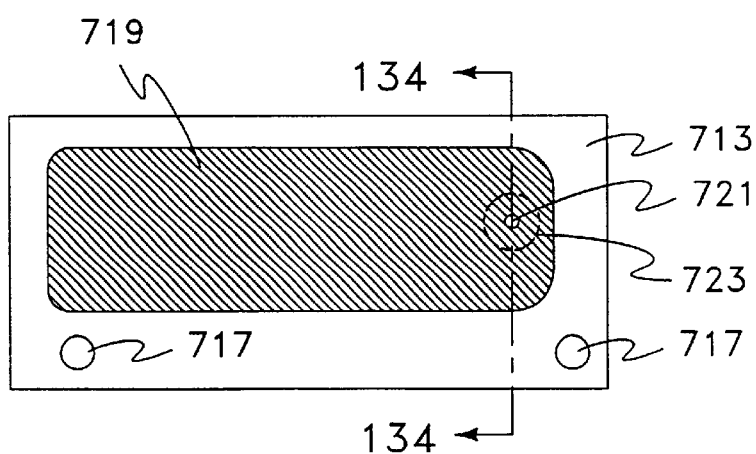
Figure 134:
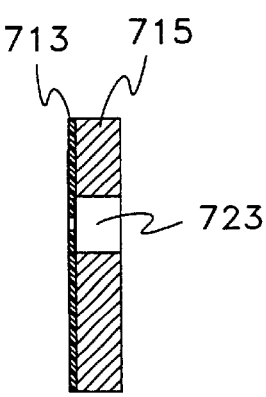
Figure 135:

FIG. 133 is a top schematic view of the internal common conductive area, second dielectric material, and spreader plate of the integrated coil and capacitor assembly. FIG. 134 is a sectional view taken along line 134—134 in FIG. 133. FIG. 135 is a front side schematic view of the second dielectric material and spreader plate of the integrated coil and capacitor assembly. In one step of the multi-layer PCB fabrication process, a sheet of dielectric with a correspondingly sized sheet of copper bonded thereto is etched to provide the second dielectric material 713 with the internal common conductive area 719 disposed thereon. A small hole 721 is drilled through the conductive area 719 to provide a connection point for the RF power. The material 713 is then bonded to the copper spreader plate 715 with a bonding film (e.g. Dupont® FEP) and high temperature/high pressure processing. The spreader plate 715 defines a through hole 723 which is adapted to receive a coaxial cable (see FIG. 134).

Figures 136, 137:
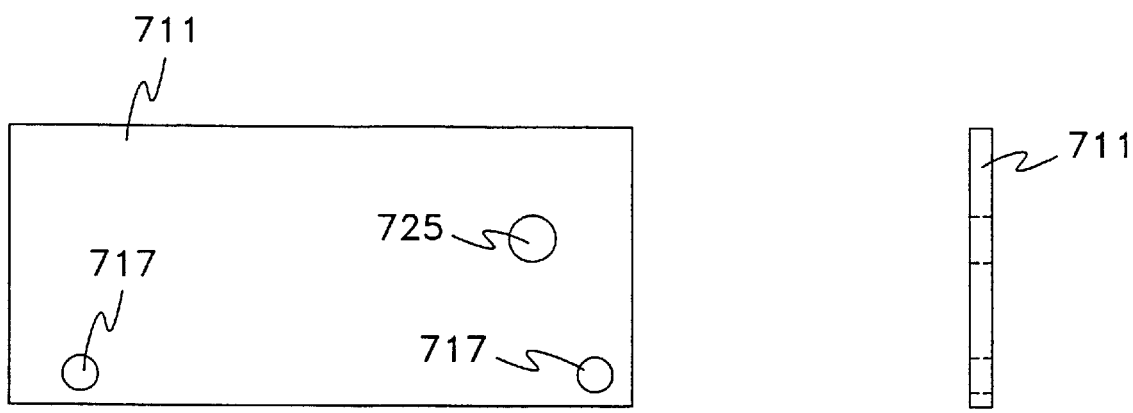

FIG. 136 is a top schematic view of the first dielectric material of the integrated coil and capacitor assembly. FIG. 137 is a right side schematic view of the first dielectric material. The material 711 defines a through hole 725 which is aligned with the holes 721 and 723 to provide access to the connection point for the RF power.

Figure 138:
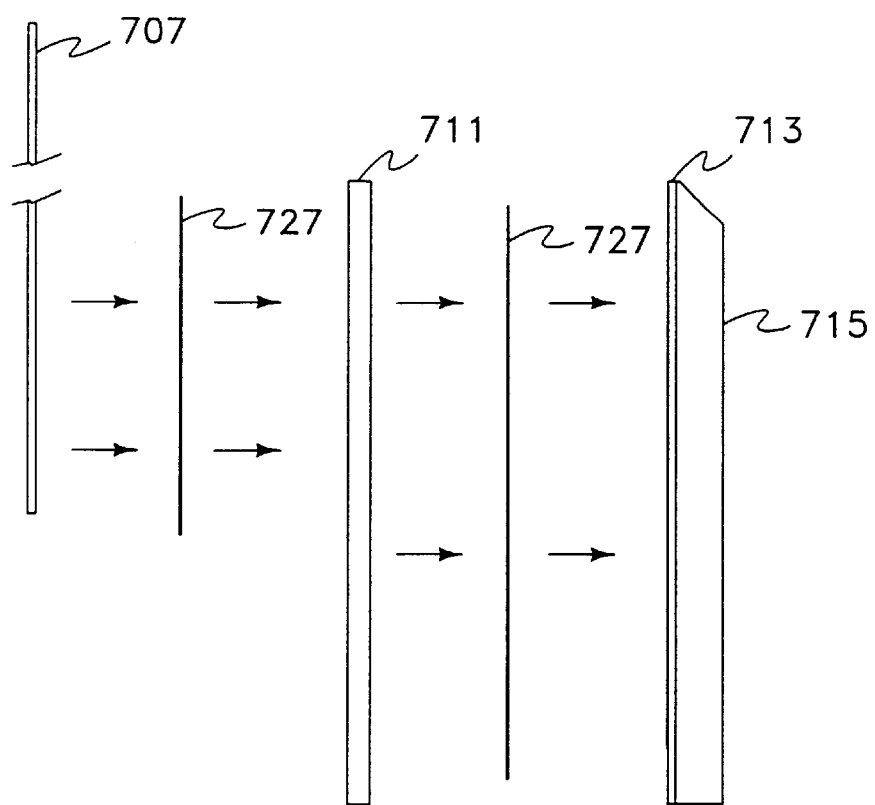
Figure 139:
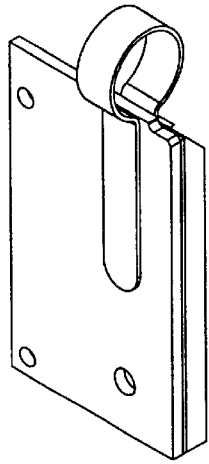
Figure 141:
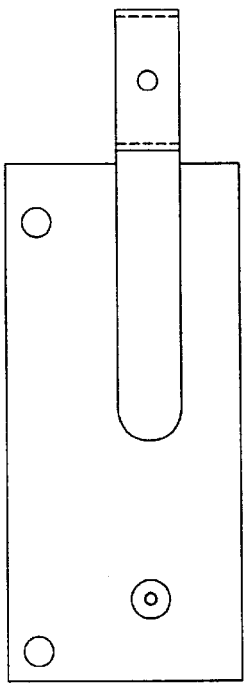

FIG. 138 is an exploded schematic view of the integrated coil and capacitor assembly. During fabrication, bonding films 727 (e.g. Dupont FEP) are positioned between the respective layers and the layers are aligned, compressed and heated to form the integrated assembly 701.

FIGS. 139–149 show examples of the integrated coil and capacitor assembly according to an aspect of the invention, after the coil has been formed. The coil is formed with a short lead 731 which is connected to the spreader plate 715 (e.g. by soldering, See FIG. 148). The coaxial cable 677 is inserted through the hole 721 with a center conductor of the cable protruding slightly into the hole 723. The center conductor is then soldered to the internal conductive area 719 (see. FIG. 149) and the outer conductor is soldered to the spreader plate 715 (see FIG. 149). Preferably, a high temperature solder is utilized.

Coil Heatsink

FIGS. 150–153 show an example ceramic heatsink for the coil. Reference may be made to the aforementioned PCT Publication No. WO 99/36940 for details concerning the construction and advantages of using a ceramic heatsink, generally, for and inductive lamp circuit. The heatsink 643 defines a first bore 741 having an inner diameter closely matched to an outer diameter of the coil. The heatsink 643 further defines a second bore 743 having an inner diameter closely matched to an outer diameter of the ceramic cup 663.

Capacitor Heatsink

As discussed above in connection with the first lamp system, it is desirable to transfer heat from the capacitor stack during lamp operation. Advantageously, the lamp heads of the present aspect of invention provide short conduction paths and large surfaces for achieving the desired heat transfer.

FIGS. 154–156 show a first example of a ceramic heatsink for the capacitor stack. The heatsink 647 is formed with a raised portion or plateau 751 having dimensions substantially corresponding to the lead 648 of the coil. FIG. 155 includes an arrow 753 indicating a direction of preferred maximum thermal conductivity.

FIGS. 157–159 show a second example of a ceramic heatsink 755 for the capacitor stack. FIG. 158 is a right side schematic view of the second capacitor heatsink. FIG. 159 is a back schematic view of the second capacitor heatsink. The heatsink 755 defines a groove 757 or channel adapted to at least partially accommodate the lead 648 of the coil. FIG. 158 includes an arrow 759 indicating a direction of preferred maximum thermal conductivity.

Aperture Bulb

FIGS. 160–161 show an example aperture bulb according to an aspect of the invention. In one example, the bulb 669 is a 7 mm outer diameter by 6 mm inner diameter spherical bulb (except in the tip off region). An exemplary fill is 1.8 mg/cc InBr, 50 Torr Argon, and a small amount of $Kr_{85}$. In another example, the aperture is about 9 $mm^2$, the bulb 669 is a 6 mm outer diameter by 5 mm inner diameter spherical bulb (except in the tip off region) with a fill of 0.15 mg InCl, 25 Torr Krypton, and a small amount of $Kr_{85}$.

FIG. 162 is a graph comparing spectral outputs of lamps utilizing different dosages of InCl. The first lamp utilizes a relatively low dosage of 0.1 mg InCl in a bulb having an outer diameter of 7 mm and an inner diameter of 6 mm. The aperture is round and has an area of approximately 12.56 $mm^2$. The fill was excited with about 125 W of RF power. The second lamp utilizes a regular dosage of 0.21 mg InCl in a bulb having an outer diameter of 7 mm and an inner diameter of 6 mm. The aperture is round and has an area of approximately 9 $mm^2$. The fill was excited with about 130 W of RF power.

The relative amount of light output for the first lamp is normalized by 130/125 to approximately account for the difference in RF power. The relative amount of light output for the second lamp is normalized by 12.56/9 to approximately account for the difference in aperture sizes. As can be seen from the graphs, the higher dosage fill provides a greater proportion of visible light throughout the visible spectrum while the lower dosage fill provides a greater proportion of light in the UV and blue regions of the spectrum.

FIG. 163 is a chart comparing the amount of power in various wavelength ranges for various dosages of indium chloride. As compared to higher dosages, a properly selected under-dosed (low dosage) fill of InCl provides approximately double the light output in range of 300–350 nm and as much as 10–20% more light output in the ranges of 350–400 nm and 400–500 nm. Although a lamp utilizing the under-dosed InCl fill would still be considered a visible light source with more than 50% of its power being in wavelengths greater than 430 nm, it may provide enough light in the blue and UV regions to be a useful light source for certain curing applications, such as curing certain dental adhesives.

Dynamically Controlled Impedance Switching

Certain RF driven loads have dramatically changing impedance characteristics. For example, an electrodeless lamp presents a high impedance load (e.g. near open circuit) prior to ignition and a low impedance load (e.g. near short circuit) following ignition, with a relatively rapid transition between the two states. Microwave excited, inductively coupled, and capacitively coupled electrodeless lamps are all examples of RF driven loads with changing impedance characteristics. An electroded discharge lamp is a further example of an RF driven load with changing impedance characteristics. Conventionally, the RF source is configured to match the impedance of the load during steady state operation. Consequently, the RF source and load are mismatched during the starting phase and power is transferred relatively less efficiently due to the mismatch. A further effect of the mismatch is that significant amounts of RF power are reflected back to the source. Such reflected RF power is potentially destructive if the RF source is not sufficiently isolated or otherwise protected.

Another aspect of the invention is to provide an RF driven load with dynamically controlled impedance switching. By controlling the impedance of either the RF source or the load, the fraction of power coupled to the load during start-up is increased and the amount of reflected RF power is reduced. For example, in an electrodeless lamp such dynamically controlled impedance switching provides the advantage of faster start times, better protection of the RF source, and reducing or eliminating the need for an isolator or circulator between the RF source and the lamp circuit.

For example, the initial plasma impedance may be made to more closely match the RF source output impedance by switching in or out circuit elements in the lamp coupling circuit at start-up for at least a portion of the start-up time. Alternatively, the RF source output impedance may be made to more closely match the initial plasma impedance by switching in or out circuit elements in the RF source output impedance matching network. One or more switches may be made as described in detail below.

One aspect of the better protection of the RF source is that the more closely matched impedance during starting reduces the amount of reflected RF power which is potentially destructive. Another aspect of better protection of the RF source involves controlling the impedance match such that the various points of resonance present during the start-up phase are configured to avoid unstable operation of the oscillator.

Another aspect of the invention is active power control of the oscillator output power. An RF source receives its DC supply voltage from an electronically controlled variable DC power supply. An RF control circuit is adapted to adjust the DC supply voltage in accordance with one or more of a variety of control objectives. For example, power may be decreased prior to ignition to reduce arcing potential and reflected power. Power may be increased during starting to bring the lamp to full output faster. Power may be adjusted during steady state operation to provide constant forward power and/or constant light output.

FIG. 164 is a graph of nominal impedance switches versus time in accordance with an aspect of the invention. Prior to time $T_0$, the lamp is unlit and the RF source is initially configured to present an output impedance of $Z_1$. For example, $Z_1$ may be selected to more closely match an impedance of the lamp head immediately following ignition. At time $T_0$, the lamp is ignited. Because the impedance $Z_1$ is configured to correspond to the impedance of the lamp immediately following ignition, RF energy is more effectively transferred to the plasma. As the impedance of the plasma changes, a first impedance switch is made at time $T_1$ so that the RF source presents an output impedance of $Z_2$ which more closely matches the impedance of the lamp head during its warm-up period prior to achieving full output. At time $T_2$, a second impedance switch is made so that the RF source present an output impedance $Z_{operating}$ which is more closely matched to the lamp head impedance during steady state operation. At time $T_{On}$, the lamp arrives at full output.

The graph of FIG. 164 is not to scale. For example, the time between $T_0$ and $T_1$ may be on the order of a few milliseconds to tens of milliseconds while a few seconds may pass between $T_1$ and $T_2$. Moreover, more or less impedance switches may be utilized. Any appropriate sensed condition may be utilized to control the switches. For example, the switches may occur at pre-determined time periods and/or in response to sensed forward/reflected power levels or light outputs. Respective switches may be made in accordance with different control criteria. For example, the first switch may be made after a pre-determined time period while subsequent switches may be made in response to sensed reflected power levels. Also, while the foregoing example has been given in connection with switching output impedances of the RF source the impedance switching may also be accomplished at the lamp head.

FIG. 165 is a representative graph showing a portion of a Smith chart for a conventional non-impedance switched lamp. FIG. 166 is an representative graph showing a portion of a Smith chart for an impedance switched lamp in accordance with an aspect of the invention. Each curve of the graph is separately rotated to place the resonance point at the left for the purposes of illustration. For the conventional lamp, $D_1$ represents the difference between an impedance of the lamp head at some time $T_3$ shortly after lamp ignition and the impedance of the lamp head at full output. $D_2$ represents the difference between an impedance of the lamp head at a comparable time $T_3$ and the impedance of the lamp head at full output for an impedance switched lamp system in accordance with an aspect of the invention. As is evident from the graphs, $D_2$ is significantly less than $D_1$, thus indicating a better impedance match corresponding to more effective power transfer during the lamp starting process. As noted above, the more effective power transfer results in faster lamp starting times and better protection of the RF source through reduced power reflections.

FIG. 167 is a generalized schematic illustration of a single stage oscillator. An amplifier A is configured to provide suitable positive feedback B to sustain an oscillating condition. The oscillator is connected to a load Z. The load Z provides a reflected signal R which may undergo some transformation operation X before being combined with the desirable feedback B. Depending on the magnitude and phase of the undesired feedback, the oscillator can be stable or otherwise, including non-oscillating. $V_0$ represents the oscillator input and $V_r$ represents the oscillator output. While $V_0$ can be small, it must be large enough to initiate oscillation. Generally, random small signal noise is sufficient for this purpose. Z, A, B, and X are all complex entities. The oscillator of FIG. 167 is not isolated in that there is no buffer stage (amplifier or isolator) between the oscillator and the load. Theoretically, the amplifier A may have multiple stages and/or be a complex integrated circuit, but if not isolated from the load the overall circuit is still considered a single stage oscillator for the purpose of the present description.

FIG. 168 is a schematic diagram of an RF source driving an electrodeless lamp circuit. An oscillator provides an RF signal through an inductance L3 to a series resonant lamp circuit. The series resonant lamp circuit comprises two capacitors C1, and C2 connected in series with an excitation coil L1. RF energy is coupled from the coil L1 to a fill in a bulb (represented by the dashed line), where L2 and R1 represent the fill as a secondary coil of a transformer. The RF signal is provided to the lamp circuit at a junction of C1 and C2. A capacitance value of C1 is a primary determining element of the steady state resonant frequency of the lamp circuit. A capacitance value of C2 is a primary determining element of an impedance match between the lamp circuit and the RF source. By adjusting the RF input inductor L3 (e.g. by switching in an additional few mm of track or wire) or C2 (e.g. by switching in additional capacitor elements), the impedance of the lamp head circuit can be dynamically controlled to more closely match the impedance of the RF source over a greater range of the starting period.

For inductively coupled electrodeless lamps of the type described herein, the frequency determining capacitor is typically between about 3 pF and 10 pF and the matching capacitor C2 is typically between about 20 pF and 100 pF. The matching inductance is typically between about 0.2 nH and 2 nH. The nominal impedance of such lamp heads during operation is readily selectable between 10 and 50 ohms.

Most high power RF sources utilize a low power oscillator followed by one or more stages of amplification. Also, many high power RF sources utilize an isolator between the source and the load. These conventional configurations are less affected by interactions with the load. However, the use of multiple stages of amplification and/or isolators involve additional components with corresponding increased cost, circuit size and complexity, and decreased efficiency.

In accordance with a present aspect of the invention, a non-isolated single stage oscillator utilizes a dynamically controlled switched lamp head impedance or oscillator output impedance adapted to avoid a "sink" region while more closely matching the lamp head to the oscillator during lamp start-up between ignition and full output. As used herein, a "sink" means that portion of the Smith chart representing unstable operating frequency of a single stage oscillator.

FIG. 169 is a Smith chart illustrating typical operation of an isolated, non-impedance switched RF source connected to an inductively coupled lamp head. The arrows represent an impedance change between the respective points. The actual lamp system most closely corresponds to the 5000 lumen lamp described above in connection with the first lamp system. In the example system, the frequency is actively controlled to minimize reflected power during start-up and operation. Prior to lamp ignition, a Smith chart of the load impedance is represented by the circle A, which assumes a calibration plane at the input to the lamp head. The resonant point is indicated by the point 1. Upon ignition, the impedance of the lamp head rapidly moves to the circle B at the point indicated by point 2 (not at resonance). This transition takes place over a short time, typically on the order of magnitude of a millisecond and generally much less than 16 milliseconds for the example system utilizing a 9 mm bulb having a 50 Torr argon starting gas. As the frequency is adjusted to achieve a good match, the impedance moves to a resonant point indicated by point 3, typically about 1 second after ignition for the example system. Point 3 is displaced slightly right of circle B as the impedance continues to change while the bulb and buffer gas heat up and the fill material evaporates. As power continues to be delivered to the fill, the impedance moves to point 4 on circle C (while the frequency is adjusted), which represents the steady state load impedance at resonance and full output.

FIG. 170 is a Smith chart which illustrates various problems presented by the starting sequence in a non-impedance switched and non-isolated lamp system. The lower approximately one third of the plane is characterized by low current and low power, which may be insufficient to sustain oscillation. The upper approximately one third of the plane is characterized by high current and high power, which may exceed the rated limits for the oscillator transistor. Points 1 and 2 are on nearly opposite sides of the chart which, as noted above, correspond to near open circuit and near short circuit conditions, respectively. Without the isolator, point 2 is in or near the sink region of instability. Lines 811 of constant frequency show that the frequencies converge in an area 813 of the Smith chart referred to herein as the sink. In this area 813, no particular frequency dominates and the oscillator may hop through several frequencies and is unstable. Accordingly, if a resonance point of the lamp moves into the sink, the lamp may not be able to successfully make a transition out of this region, or such transition could be to either an over-current or under-current condition. If the lamp does stabilize, the frequency may not be the desired resonant frequency and there may be no practical path to the resonant frequency.

FIG. 171 is a Smith chart which illustrates a first method of dynamically controlled impedance switching according to an aspect of the invention. The pre-ignition impedance load is indicated at point 1 on circle A. Initial values are selected for C2 and L3 such that upon ignition the impedance transitions to a point 2 on circle B which is sufficiently displaced from the sink and preferably also suitably displaced from the high current region. Thereafter, the frequency will adjust towards point 3, which may not correspond to a resonant point. Next, typically before the lamp reaches a resonant point on circle C, a circuit element is switched in or out of the lamp head circuit to decrease the capacitance value of C2, thereby causing the load impedance to make a transition to point 4 on circle D. For example, the impedance switch may occur after a pre-determined period of time. Alternatively, the impedance switch may occur in response to a sensed condition such as light output, or forward or reflected power above or below a pre-determined threshold, or a ratio of forward and reflected power. Once the lamp reaches full output in resonance, the load impedance moves to point 5. If desirable, more than one impedance switch may be made to control the start-up process.

FIG. 172 is a Smith chart which illustrates a second method of dynamically controlled impedance switching according to an aspect of the invention. The second method is similar to the first method, except that point 2 is in the high current region of operation. Relatively high current may be necessary during starting to ensure reliable lamp starting. Under these circumstances, it may be desirable to ignite the lamp at a lower voltage level to reduce the potential for arcing or otherwise harming the oscillator for the fraction of a second that the oscillator operates in this region. The pre-ignition impedance load is indicated at point 1 on circle A. An initial value is selected for the output impedance of the RF source such that upon ignition the impedance moves to a point 2 on circle B which is sufficiently displaced from the sink and within the high current region to provide suitable fields and voltages for starting. Thereafter, the frequency adjusts towards point 3 outside circle D, which may not correspond to a resonant point. Next, typically shortly after lamp ignition, a circuit element is switched in or out of the RF source output impedance matching network and the load impedance moves to point 4 on circle E. For example, the impedance switch may occur after a pre-determined period of time. Alternatively, the impedance switch may occur in response to a sensed condition such as light output or forward or reflected power above or below a pre-determined threshold. Once the lamp reaches full output in resonance, the load impedance moves to point 5. If desirable, more than one impedance switch may be made to control the start-up process.

FIG. 173 is a schematic diagram of a first example RF circuit comprising an RF driven load in accordance with an aspect of the invention. An RF source 821 includes an oscillator 822 providing an output through an impedance matching network $Z_M$. The output of the RF source is provided to a load 823. The load 823 includes a first impedance $Z_1$ and a second impedance $Z_2$ which is connected to the RF source through an electronically controlled switch SW. For example, the switch SW may comprise a solid state switching device such as a diode or a transistor which can be controlled by providing suitable bias voltages. Alternatively, the switch SW may comprise an electronically controlled mechanical switching device such as a solenoid or relay device. In general, the solid state switching devices are preferred over the mechanical devices.

FIG. 174 is a schematic diagram of a second example RF circuit comprising an RF driven load in accordance with an aspect of the invention. An RF source 824 includes an oscillator 825 providing an output through an impedance matching network $Z_M$. The impedance matching network includes a first impedance $Z_1$ and a second impedance $Z_2$ which is connected to the output line through an electronically controlled switch SW. The output of the RF source is provided to a load 26 comprising an impedance $Z_L$.

FIG. 175 is a schematic diagram of a third example RF circuit comprising an RF driven load in accordance with an aspect of the invention. The third RF circuit is similar to the first and second examples where an RF source 827 including an oscillator 828 provides a signal to a load 829. However, in FIG. 175 both the impedance matching network $Z_M$ and the load 829 include switched impedances. The impedance matching network includes impedances $Z_1$ and $Z_2$, with $Z_2$ connected to the output line by a switch $SW_1$. The load 829 includes impedances $Z_3$ and $Z_4$, with $Z_4$ connected to the RF source by a switch $SW_2$.

Generally, the present aspect of the invention relates to the dynamically controlled impedance switching and any RF source and RF driven load which benefit from such impedance switching may be utilized with a suitable impedance switching circuit made in accordance with the principles of the invention.

Third Lamp System

FIG. 176 is a block level schematic diagram of a third lamp system in accordance with an aspect of the invention, including an impedance switching RF source. A lamp system 831 includes an RF shielded enclosure 833 which receives power from a wall outlet (or other suitable external source of power) through an electrical connector 835. An optional line filter 837 conditions power provided to the lamp system 831 and/or minimizes RF leakage through the power line.

Within the enclosure 833, the external power is provided to an internal DC power supply 839 which converts the external power to a suitable DC voltage for operating the lamp system 831. The DC power supply 839 is connected to an impedance switching RF source 841 which provides high frequency energy through a directional coupler 845 to a lamp head 847. The lamp head 847 produces light which is directed out of the enclosure 833 by suitable optics 849. Signals Pf, and Pr, representative of forward and reverse power, respectively, are provided to an RF control circuit 853. The RF control circuit 853 provides a control signal 855 to the RF source 841 in accordance with the signals Pf, Pr.

The lamp system of the present aspect of invention preferably utilizes a real-time control circuit to reduce or eliminate potential problems associated with frequency drift due to thermal effects or aging. The control circuit also eliminates the need for individually tuning each lamp system.

Examples for each of the above discussed components are hereinafter described in detail. Certain of the above components are novel and the subject of the present application. Other components are conventional components which are commercially available from numerous sources. The components are connected by suitable means. For example, coaxial cable is generally utilized for carrying RF signals and suitable gauge wiring is used for other connections. Also, depending on system requirements, the components of the lamp system 831 may be housed in a single enclosure or may be distributed among several separate enclosures with suitable connections therebetween. A suitable DC power supply is available from VICOR, Andover, Massachusetts, model number VI MU3-ES, which provides approximately 24 VDC with approximately 300 watts of power.

FIG. 177 is a block level schematic diagram of an impedance switching RF source in accordance with an aspect of the invention. The RF source utilizes, e.g., an oscillator, and also preferably utilizes a feedback circuit, which may include dual symmetrical feedback paths. In this regard, an output of an amplifier 861 (e.g., comprising one or more transistors) is fed back to an input of the amplifier 861 through an impedance transformation network 863. The impedance transformation network 863 is preferably not directly coupled to the output of the amplifier 861, but is instead coupled to a dynamically switched impedance matching network 869. The dynamically switched impedance matching network is configured to provide one or more impedance switches in response to a control signal. A bias circuit 865 provides power to the RF source. A tuning circuit 867 is provided for adjusting the operating frequency of the RF source. Other features and advantages of the RF source are discussed above.

FIG. 178 is a schematic diagram of a dynamically switched impedance matching circuit in accordance with an aspect of the invention. A first transmission line TL1 is connected to an output transmission line TL2 by a series blocking capacitor C1. A first impedance matching capacitor C2 is connected between the first transmission line TL1 and ground. A second impedance matching capacitor C3 is connected at one end to the first transmission line TL1 and at the other end to an electronically controlled switch SW. When the switch SW is closed the capacitor C3 is connected to ground and forms part of the output impedance matching network. When the switch SW is open the capacitor C3 is unconnected and is not included in the impedance matching network.

FIG. 179 is a circuit level schematic diagram of another dynamically switched impedance matching circuit in accordance with an aspect of the invention. In FIG. 179, the switch SW is implemented by a PIN diode D1, which is a voltage controlled device, and a resistor R1 and three inductors L1, L2, and L3. An anode end of the diode D1 is connected to the capacitor C3 and a cathode end of the diode D1 is connected to ground. A control signal is connected to one end of R1 and is provided to the anode end of the diode D1 though a series circuit comprising R1, L1, L2, and L3. For example, the control signal is a suitable voltage for biasing the diode D1 to either conduct or not as desired to switch the output impedance.

FIG. 180 is an assembly level schematic diagram of a printed circuit board populated with suitable devices for providing an impedance switching RF source and directional coupler in accordance with an aspect of the invention. By way of illustration and not limitation, an exemplary RF source is substantially identical to the RF source described above in connection with FIGS. 109–118, except that the isolator is omitted and a dynamically controlled impedance switching circuit is included. As shown in FIG. 180, the RF source includes an oscillator section, a tuning section, an impedance matching section including an impedance switching circuit in accordance with an aspect of the invention, and a directional coupler.

FIG. 181 is an enlarged schematic view of the impedance switching circuit indicated by area 181 in FIG. 180. A control signal is applied to the conductive pad 871 by suitable wiring. The control signal is supplied to the anode end of D1 through the series circuit comprising R1, L1, L2, and L3. The cathode end of D1 is connected to the ground plane of the printed circuit board. Suitable component values for the circuit elements are as follows.

| Reference # | Description |
| --- | --- |
| C1 | 130 pF capacitor, 300 V |
| C2 | 3.9 pF capacitor, 500 V |
| C3 | 5.1 pF capacitor, 500 V |
| D1 | PIN diode, M/A-COM MA4P4002F-1091 |
| R1 | 100 Ohm resistor |
| L1, L2, L3 | 330 nH Inductor |

With these component values, the control signal is preferably a voltage of about five (5) volts to cause the diode D1 to conduct (i.e. close the switch) and about minus eight (−8) volts to place the diode D1 in a non-conductive state (i.e. open the switch). The RF control circuit is substantially as described above and is further adapted (e.g. with an inverting amplifier) to provide the required impedance control signal.

A method of operating the impedance switching RF source according to an aspect of the invention is as follows. The impedance matching network is configured such that when the diode D1 is conductive the output impedance of the RF source is more closely matched to the impedance of the lamp head in its immediately post ignition state (and also to provide a resonant point displaced from the sink) and when the diode D1 is non-conductive the output impedance of the RF source is more closely matched to the lamp head in its full output steady state operating impedance. Only one impedance switch is made. The unlit lamp head presents a high impedance and the initial mismatch between the RF source impedance and the lamp head impedance is beneficial in generating high fields and voltages for starting. Upon powering on the RF source, the RF control unit sets the voltage on pad 871 to five (5) volts to cause the diode D1 to conduct. After about a pre-determined time period (e.g. about 140 milliseconds) which is sufficient for the lamp to ignite, the RF control units sets the voltage on pad 871 to minus 8 (−8) volts so that the diode D1 is not conducting. The foregoing control of the impedance switching is only illustrative and is preferably integrated with other active control methods, such as the frequency control described above in connection with FIGS. 95–104 and the power control as herein described in detail.

Integrated Lamp System

FIG. 182 is an exploded perspective view of an integrated lamp system including an impedance switching RF source, directional coupler, RF control circuit, and lamp head in a single enclosure. The integrated lamp system includes a first heatsink 881, a four walled casing 883, a first printed circuit board 885 together with suitable components to implement the RF control circuit, a lamp head 887, a second printed circuit board 889 together with suitable components (not shown) which implement a high power oscillator (and tuning circuit), an impedance switching circuit, a directional coupler, and an RF transmission line connected to a portion of the lamp head circuit, and a second heatsink 891. The RF source 889 is mounted on the second heatsink 891. The RF control circuit 885 is mounted on posts as a daughter board to the RF source 889. The RF control circuit 885 receives signals from the directional coupler and provides control signals to, for example, the oscillator tuning circuit and the impedance switching circuit via suitable wiring 893. The lamp head 887 is substantially identical to the lamp head described above in connection with FIGS. 125–130, except that the integral coil/capacitor assembly is made part of the printed circuit board 889 and the base of the lamp head is adapted (e.g. slotted) to be mounted on the printed circuit board 889. The casing 883 is configured to enclose the RF source 889 and RF control unit 885 between the first and second heatsinks 881, 891.

FIG. 183 is a schematic diagram of a printed circuit board layout utilized by the integrated lamp system of FIG. 182. The RF source 889 is substantially identical to the RF source described above, except that two four port directional couplers are utilized in place of the single six port directional coupler and that instead of supplying the RF power through a coaxial connector the RF power is provided through a transmission line 901 to a conductive pad 903. The conductive pad 903 corresponds to the internal common conductive area described more fully above. The internal common conductive area is a capacitor plate which is shared between the high voltage and low voltage capacitors in the lamp head circuit.

FIG. 184 is a side schematic view of the printed circuit board illustrating the configuration of the excitation coil. An excitation coil 905 is formed substantially as described above. The coil 905 has a general wedding ring shape. One lead of the coil 905 is a short tab mechanically and electrically connected to ground, for example, by soldering the tab to the heat spreader plate. The other lead of the coil 905 extends over the pad 903 and is disposed on a dielectric material 907. The lead and the dielectric material 907 may be held in place, for example, by bonding film or other suitable high temperature adhesives. The lead of the coil 905, the dielectric 907, the pad 903, the dielectric material of the printed circuit board 889 and the ground plane form a capacitor stack which together with the coil 905 form the series resonant lamp circuit.

Active Power Control

Lamp and oscillator characteristics change over time as components age. These changes affect startup time of the lamp system and arcing potential. These problems are overcome in accordance with a present aspect of the invention by actively controlling the oscillator power level (e.g. by varying the DC supply voltage) and/or the oscillator frequency. Lamp system reliability and start times may be improved by also actively controlling the impedance match between the RF source and lamp head during starting. By utilizing a micro-controller for the active control, the lamp system may be brought to full operation in a short time and may be reliably operated over a long life time.

DC power supplies are commercially available with an adjustable output voltage level. For example, many DC power supplies provide an output voltage which is determined in part by a reference voltage. By adjusting the reference voltage the output voltage is correspondingly adjusted. In some commercially available DC power supplies, an external control voltage may be provided to adjust the output voltage. For example, an output voltage of the Astro Dyne model no. SP-300-24 may be adjusted over a range from about 17 V to about 24 V by manually turning a variable resistance potentiometer. This power supply is readily adapted to electronic control of the output voltage by turning the potentiometer to a position corresponding to the minimum desired output voltage position and connecting an additional control voltage signal to the output of the potentiometer. The output of the control voltage signal is combined with the voltage of the potentiometer, thereby causing a corresponding adjustment in the output voltage of the DC supply. By utilizing a control voltage which can be adjusted between about 0.2 V and 9 V, the output of the DC power supply can be adjusted over a range from about 16 V to about 27 V. For example, a micro-controller can provide a suitable control voltage which is adjustable over a desired range in accordance with a control algorithm.

Numerous advantages are provided by the active power control in accordance with the present aspect of the invention. These include reduced arcing potential, fast starting, constant light output, dimming control, lamp standby operation, controlled lamp shutdown, and compensation for aging effects. This list is illustrative and not inclusive. Many other applications and advantages of active power control will be apparent to those skilled in the art having the benefit of the present description.

Reduced Arcing

High voltage conditions may produce undesirable arcing in the lamp head circuit. Active power control may be utilized to reduce arcing by initially setting the power to a lower level during starting. For example, the lower level power may be maintained for a pre-determined period of time, until a detected reflected power is lower than a pre-determined level, and/or until ignition of the fill is detected (e.g. by a photodetector). The lower power level must still be sufficiently high to initiate the oscillation and ignite the lamp fill. However, by utilizing a lower level of power the potential for arcing is reduced and the magnitude of any reflected power is also reduced.

Fast Starting

Temporarily increasing the amount of power applied during starting increases the amount of power coupled to the bulb and fill and thus decreases the lamp start time.

Constant Light Output

The amount of light output varies with the amount of power supplied to the lamp circuit. In certain applications, a fixed and constant amount of light output is desirable. In accordance with a present aspect of the invention, light output is held constant by sensing the light output (e.g. with a photodetector) and adjusting the power level until a desired light output is reached. The photodetector may detect the light output directly or indirectly. For example, one end of a fiber optic may be configured to receive a portion of the light output and transmit the received light to a photodetector which is electrically connected to the RF control circuit.

Dimming, Standby, and Shutdown

By providing micro-controller based electronic control of the power level, numerous dimming, standby, and shutdown techniques may be readily implemented by the RF control unit of the present aspect of the invention. For example, an amount of ambient light may be sensed (e.g. by a photodetector) and used to set a desired amount of light output to supplement the ambient lighting. The micro-controller may be programmed to accept a signal indicating that the lamp should be placed in a standby mode and to suitably reduce the power level in response thereto. For example, the standby mode of the lamp may correspond to a condition where the supplied power is just sufficient to maintain the plasma in an ionized state. Similarly, the micro-controller may be programmed to respond to a shutdown signal to carry out a controlled shutdown of the lamp system.

Aging and Environmental Effects

As noted above, it is not unusual for lamp and oscillator characteristics to change over time as components age. It is also not unusual for environmental conditions such as ambient temperature to affect lamp performance. For example, the lumen output may initially increase over several hundred hours of operation and then typically decreases 10% or more over several thousand hours of operation. Similarly, the transistor characteristics are temperature dependent and also change over time. In accordance with a present aspect of the invention, the power control voltage is adjusted to provide a desired level of forward power and/or a desired level of light output to compensate for aging and/or environmental effects.

Lamp Start Times

The impedance switching aspect of the invention may be utilized alone or in conjunction with other active control such as the frequency control described above in connection with FIGS. 95–104 and/or the above-described active power control. The start time of the lamp depends in large measure on the ability to effectively couple energy to the bulb and the fill. In conventional electrodeless lamps, the source and the load are mismatched throughout the starting process and a significant amount of reflected power is generated. In accordance with an aspect of the invention, impedance switching, active power control, and/or active frequency control are utilized during the starting process to significantly reduce the amount of reflected power, thereby coupling a significantly greater amount of energy to the bulb and fill resulting in dramatically reduced start times.

For the following examples start time refers to the time between ignition and achieving 90% of full light output. For example, in the lamps described in PCT Publication No. WO 99/36940 typical start times are between about 20 and 30 seconds. Related co-pending application Ser. No. 60/166,997 describes self-tuned inductively coupled lamps. In these self-tuned lamps, the bulb and fill are part of the frequency determining elements of the oscillator circuit and the RF energy is well coupled to the load throughout the starting process. The best start times achieved with the self-tuned lamps is about 7 to 8 seconds. For exemplary third lamp systems configured with comparable bulb sizes and fills, start times of under 3 seconds have been achieved and typical start times are in the range of 3 to 5 seconds. Such fast start times are important in many commercial applications.

A method of operating an inductively coupled electrodeless discharge lamp in accordance with a present aspect of the invention to achieve fast start times, reliable operation, and protection of the RF source is as follows:

1) Power on the RF control circuit and oscillator.
2) Set and hold the initial frequency control voltage at a pre-determined level.
3) Set the initial power control voltage at a first level corresponding to a starting voltage which is less than the steady state operating voltage.
4) Set the initial impedance control voltage to close the switch so that output impedance of the RF source is more closely matched to the impedance presented by the fill just after ignition (and also so that the point on the Smith chart which the lamp system transitions to upon ignition is not in the sink).
5) Wait for the oscillator to start and for the fill starting gas to ignite, approximately 140 ms from detection of forward RF power.
6) Set the impedance control voltage to switch the output impedance of the RF source by opening the switch so that output impedance of the RF source is more closely matched to the impedance of the steady state full output condition.
7) Wait 10 ms. Set the power control voltage to a second level which is higher than the starting voltage but typically less than or equal to the steady state operating voltage.
8) Begin active frequency control as described above in connection with FIGS. 95–104. The frequency of the oscillator is adjusted in accordance with a control algorithm which tracks the changing resonant frequency of the lamp head by minimizing reflected power.
9) Monitor reflected power during the frequency adjusting process. When the reflected power is less than a pre-determined threshold, adjust the power control voltage to a third level corresponding to a ramp up voltage which is higher than the steady state operating voltage. Continue active frequency control.
10) Upon reaching steady state resonance, adjust the power control voltage to a fourth level corresponding to the steady state operating voltage.

FIG. 185 is a graph of oscillator supply voltage versus time for an RF source according to an aspect of the invention utilizing active power control. For example, FIG. 185 illustrates an implementation of the method steps listed above. The graph of FIG. 185 should be considered as illustrative and not limiting. At time $T_0$, power is provided to the RF control unit and oscillator and forward RF power has been detected. The power control voltage is set to a first level corresponding to an oscillator supply voltage $V_1$. $V_1$ corresponds to a starting voltage which is generally less than the steady state operating voltage but is still high enough to provide reliable starting. By utilizing a lower voltage, the arcing potential is reduced and the amount of reflected power is reduced. At a pre-determined time $T_Z$ an impedance switch occurs. For example, the time $T_Z$ may be empirically determined as a sufficient amount time for the oscillator to start and the lamp to ignite. Shortly thereafter at time $T_1$, the power control voltage is adjusted to set the oscillator supply voltage to $V_2$. $V_2$ is higher than $V_1$ in order to transfer more power to the fill, but should not be set too high because the active frequency control has not yet found the resonant frequency. Generally $V_2$ is less than or equal to the steady state operating voltage. Shortly thereafter at time $T_F$, active frequency control is initiated. At time $T_2$ the reflected power has dropped below a pre-determined level and the power control voltage is adjusted to set the oscillator supply voltage is set to $V_3$. $V_3$ is higher than the steady state operating voltage and provides more power to the fill for a short time during starting. The higher power level is not destructive to the RF source because the reflected power is low and the lamp is under active frequency control. When the reflected power is minimized and stable at time $T_3$, the power control voltage is adjusted to gradually transition from $V_3$ to $V_{operating}$.

For the lamps described herein, $T_Z$ is approximately 140 ms after $T_0$; $T_1$ is about 10 ms after $T_Z$; $T_F$ is a few milliseconds after or concurrent with $T_1$; $T_2$ is variable but typically about three tenths (0.3) of a second and rarely more than seven tenths (0.7) of a second after $T_F$; and $T_3$ is also variable but typically between about 2.5 and 5 seconds after $T_2$.

Gate Bias Control

As noted above, it is desirable to not start the oscillator until the RF control circuit has initialized and placed appropriate values on all of the various control signals. This may require the use of two separate power supplies and/or a relay device to ensure that power is provided to the RF control circuit before power is applied to the oscillator.

In accordance with a present aspect of the invention, the RF power oscillator is inhibited from starting by controlling the gate bias voltage (e.g. keeping the bias voltage for an LDMOS device at zero). At an appropriate time, the gate bias voltage is set to a suitable value to initiate oscillation. Prior to applying the gate bias voltage, the microprocessor can initialize and set the other control signals to desired values. For example, the other control signals include the frequency control signal, the impedance switch control signal, and the power supply voltage control signal.

With the gate bias control of the present aspect of invention, power may be applied concurrently to both the RF oscillator and the RF control circuit. However, without the necessary bias voltage, the RF oscillator does not operate and damage to the circuit is avoided while the appropriate control parameters are initialized. Advantageously, the gate bias control may be provided using an available output signal of the microprocessor with few additional components (see FIG. 186) and the need for separate power supplies or relay devices is avoided.

RF Control Circuit

FIG. 186 is a circuit level schematic diagram of another RF control circuit according to an aspect of the invention. An integrated circuit with model no. PIC 16C73P available from Microchip Technologies, Chandler, Ariz. is utilized for the micro-controller in the illustrated example. Instead of a digital to analog converter, a simple RC circuit and operational amplifier (op-amp) circuit is used. For example, the operational amplifier may be a part no. LM324 which is commonly available in a quad package. An RC circuit with a desired time constant is used to establish the clock signal connected to the OSC1 input of the micro-controller. A voltage regulator (e.g. model no. 78L05) converts an input voltage VDC (e.g. +26 volts DC) to +5 volts DC for powering the micro-controller and other circuits.

As further shown in FIG. 186, signals Pf and Pr are provided as inputs to the micro-controller chip on the RA bus. One of the RA bus pins is connected to RF GROUND to provide a ground reference for the signals Pf and Pr. The RB and RC busses of the micro-controller are used to provide various control signals. Specifically, one pin of the RB bus is connected to a voltage divider circuit to provide the RF Bias control signal. Another pin of the RB bus is connected to a circuit which is configured to provide the impedance switch control signal (either a positive or negative voltage). One pin of the RC bus is connected to an op-amp circuit which sets the power supply control voltage. Another pin of the RC bus is connected to an op-amp circuit which sets the frequency control voltage. Three more pins of the RC bus are connected to LEDs which may be illuminated to indicate an operating condition of the RF control circuit and/or RF oscillator. One of ordinary skill in the art having the benefit of the present disclosure will understand that this circuit includes many implementation specific details and that numerous variations may be made based on the particular components selected to implement other examples of the control circuit.

The op-amp circuits operate as follows. An RC circuit is connected to the positive input of the operational amplifier. The micro-controller is programmed to provide a pulse signal to the RC circuit. By controlling the width of the pulses in relation to the time constant of the RC circuit, the micro-controller controls the amount of voltage which develops at the input of the op-amp. This voltage is amplified by the op-amp and output by the op-amp as the control voltage. Advantageously, this simple RC/op-amp circuit is less expensive than the D/A converter it replaces.

Power Oscillator with Controlled Frequency-load Characteristics

According to a present aspect of the invention, a power oscillator is provided which can be directly connected to an electrodeless lamp with stable operation from startup through full brightness conditions without the need for isolators and/or impedances switches, while maintaining a wide range of tolerance for production variations. The present aspect of the invention may be applied to oscillators with or without feedback-controlled frequency tuning.

A problem arises from the relationship of the frequency pulling caused by the load impedance to the effect of load impedance on current and power output. The large changes of impedance of the inductively coupled lamp which occur during startup make it difficult to match an oscillator to its load without critical custom adjustment or additional components. When the oscillator is joined to the lamp, the length of cable used preferably places the load during starting in a high current area to reduce startup time but without exceeding the maximum allowable current. Unfortunately, as noted above in connection with the impedance switching oscillators, the preferred condition for effective starting may place the impedance close to an unstable frequency zone which may prevent an effective transition to full brightness. The present aspect of the invention overcomes this problem by enlarging the safe operating area between the starting impedance and the unstable area of operation.

A study of several different oscillators using a single transistor or two parallel transistors and for two different frequency ranges near 400 and 700 MHz showed similar load characteristics. FIG. 187 is a Rieke diagram representative of the load characteristics of these oscillators. For example, the representative oscillator is constructed as described in connection with FIG. 87. The coaxial connector RF output is used as the reference plane. The plot is made with constant drain supply voltage. The dashed lines are lines of constant frequency. The solid lines are lines of constant drain supply current. If the plot is rotated to place the current contours in a generally horizontal position with the high current values at the top, the constant frequency lines generally converge in the lower left quadrant only 30 to 50 degrees from the current lines.

It is believed that the current characteristics result from the reflected power modifying the load impedance at the drain and the frequency characteristics result from the interaction of the reflected power with the feedback of power from the drain to the gate. Significantly, this is a different circuit path than the drain load impedance.

A first example of an oscillator with controlled frequency-load characteristics involves modifying the oscillator design so that the feedback path is connected directly at the drain end of the matching network. FIG. 188 is a Rieke diagram representative of the load characteristics of the first example. As is apparent from FIG. 188, the first example has a greatly different frequency shape as compared to FIG. 187. The constant frequency lines are nearly parallel to the current lines near the center of the chart and converge in a region nearly 120 degrees away from the region of convergence in FIG. 187. However, while the load characteristics of the first example successfully avoid the region of instability during starting, the characteristics are less than ideal for the transition to full brightness at lamp resonance.

FIG. 189 is a schematic diagram of a printed circuit board layout for a second example of an oscillator with controlled frequency-load characteristics in accordance with the present aspect of the invention. FIG. 190 is a schematic diagram of a component assembly showing exemplary positions for the feedback capacitors C1–C4 in the second example. FIG. 191 is a Rieke diagram representative of the load characteristics of the second example. With reference to FIGS. 189–191, the oscillator includes a first section 1001 in the feedback path connected near the drain via drain capacitors C1, C2 and a second 1003 in feedback path connected to the output impedance matching network via upline capacitors C3, C4.

Changing the proportion of feedback between the two connection points by changing capacitance values allows the frequency contours to be placed at any desired intermediate angle, including nearly perpendicular to the current lines as shown in FIG. 191. Use of variable capacitors may permit such adjustment during operation, although fixed value capacitors are generally preferred. Once a desired frequency characteristic is determined, it is possible to further determine a single feedback tap at a position between the matching network and the drain which would provide similar characteristics, thereby reducing the number of components. Suitable component values are as follows:

C1 1.5 pF capacitor
C2 3.0 pF capacitor
C3 0.6–2.5 pF variable capacitor
C4 2.0 pF capacitor Back-cooled Aperture Cups According to a present aspect of the invention, an aperture bulb is cooled relatively more from the back. A cylindrical rod of ceramic material (e.g. alumina, boron nitride, or aluminum nitride) is formed with a cavity at one end adapted to receive the bulb. A measured amount of ceramic slurry of reflective material is deposited in the cavity. A bulb is secured (e.g. glued) to a ceramic aperture washer and assembled to the cavity end of the rod. The washer includes openings (e.g. holes or slots) for the slurry to flow through. The assembly is then centrifuged with the aperture end facing the center of rotation. As the bulb is forced into the cavity, excess slurry is vented through the openings in the ceramic washer.

The rod may include further features for effective cooling from the back of the bulb. For example, the rod may include passages adapted for liquid cooling. Alternatively, the back of the rod may be clamped to a heat conducting structure for conduction cooling. With a suitable clamp, the position of the rod may be axially adjusted to obtain an optimum coupling position for the bulb and then clamped to maintain that position.

FIGS. 192–195 show a first example of a back-cooled aperture cup assembly. A cylindrical rod 1101 of ceramic material is formed with a cavity 1103 at one end (see FIG. 193). The cavity 1103 is adapted to receive a bulb 1105. A reflective material 1107 is disposed between the bulb 1105 and the walls of the cavity 1103. The bulb 1105 is positioned against a ceramic aperture washer 1109 which covers the cavity 1103 at that end of the rod 1101. The washer 1109 defines openings 1111 (see FIGS. 194–195) through which the reflective material 1107 can flow during assembly of the cup. The washer 1109 defines a shoulder 1113 with an inner radius adapted to fit closely with the cavity 1103 and an outer radius approximately equal to an outside radius of the rod 1101.

FIGS. 196 and 197 are cross sectional and front views, respectively, of a first alternative washer part for the first example. A washer 1119 is substantially identical to the washer 1109, except that instead of holes 1111 the washer 1119 defines slots 1121 for the slurry to flow through.

FIGS. 198 and 199 are cross sectional and front views, respectively, of a second alternative washer part for the first example. A washer 1129 is substantially identical to the washer 1119, except that slots 1131 are angled with respect to an axis of the washer 1129.

FIGS. 200–207 show a second example of a back-cooled aperture cup assembly and alternate washers. The second example is substantially identical to the first example, except that a rod 1141 defines a larger cavity 1143 and a washer 1149 is adapted to fit completely inside the cavity 1143 (e.g. does not define a shoulder).

Tall Aperture Cups

According to a present aspect of the invention, an aperture lamp is effectively cooled from both the front and the back, without a flange. A relatively tall ceramic (e.g. alumina, boron nitride, or aluminum nitride) cup is cylindrical and hollow and adapted to support a bulb along its axial dimension so that at least a portion of the cylindrical cup extends significantly beyond the bulb in each axial direction. Preferably the bulb is centered along the axial direction of the cup. Also preferably, the cup is tall enough to avoid electromagnetic interference between an lamp head enclosure and the excitation coil. Because the cup extends beyond the bulb in both axial directions, heat may be conducted away from the bulb from both the front and back of the bulb. As compared to the flanged aperture cups, the tall aperture cup provides more symmetrical thermal management of heat conducted from the bulb and is believed to reduce the thermal gradient at the equator, thereby reducing stresses on the bulb and increasing bulb life. Also, the tall cup reduces cost and reduces electromagnetic effects of the cup on the lamp circuit.

Regarding cost, the flanged aperture cups are generally machined from a larger cylinder of ceramic material. The outer diameter of the starting material is slightly larger than the diameter of the flange. A significant amount of excess material is machined off to provide the final form. The resulting flange is relatively fragile and subject to shear stresses at the cup/flange interface.

The tall aperture cup of the present aspect of the invention uses less material than a flanged cup because of the significantly smaller outside diameter. For example, a flanged cup may require starting material having an outside diameter of 20 to 25 mm. A corresponding tall cup requires starting material having an outside diameter of 10 to 11 mm, representing a 4 to 5 times reduction in cross sectional area. Even with a longer cup design (e.g. about 21 mm long as compared to 15 mm), this represents a 70% reduction in the amount of material required and corresponding material cost. Manufacturing is also simplified and machining costs are reduced.

As noted above, the tall aperture cup effectively conducts heat away from the bulb from both the front of the bulb and the back of the bulb. This provides a more symmetrical thermal management which can be used to smooth out the peak temperatures and peak thermal stresses applied to the bulb. Although the bulb is preferably centered along the axial direction of the cup, the bulb position within the cup may be adjusted to be more towards the front or back if such positioning provides more beneficial thermal effects in a particular lamp system.

A further benefit is provided by forgoing the flange. With the flange, there is a small overlap between the coil and the flange material which constitutes a parasitic capacitance in the lamp circuit and limits the choice of material for the ceramic cup to materials having relatively low dielectric constants. Without the flange, no part of the ceramic cup overlaps with the excitation coil and therefore the cup has less effect on the lamp circuit. Accordingly, materials with higher dielectric constants may be used. Some tall aperture cup designs further reduce unwanted effects on the lamp circuit by spacing the lid and back of the lamp head enclosure further from the excitation coil.

FIG. 208 is a front, schematic view of a first example of a tall aperture cup. FIG. 209 is a cross sectional view taken along 209—209 in FIG. 208. An aperture cup 1201 is formed from ceramic material in the general shape of a hollow cylinder. The cup 1201 defines an interior shoulder 1203 with an aperture 1205 therethrough. The aperture 1205 may correspond to the final light emitting aperture for the aperture bulb. The shoulder 1203 is chamfered on one side which is generally the side which interfaces with optics in a lamp system. Alternatively, the shoulder 1203 may define a stop for a separate ceramic washer which defines the light emitting aperture which is smaller than the aperture 1205. The shoulder 1203 is spaced interior of both ends of the cup 1201 so that a portion of the cup 1201 extends in both axial directions from the shoulder 1203. Preferably, the shoulder 1203 is positioned such that a bulb which is positioned against the aperture 1205 (or together with a ceramic washer) is approximately centered along the axis of the cup 1201. Example dimensions for the cup 1201 are 10 mm in diameter and 21 mm long when utilized together with a 7 mm diameter bulb.

FIGS. 210–211 show a second example of a tall aperture cup. An aperture cup 1211 is similar to the cup 1201, except that its shoulder 1213 is adapted only to provide a stop which cooperates with a ceramic washer to provide the light emitting aperture. For example, if the cup 1213 is made from boron nitride it is preferable that the cup does not come in contact with a quartz bulb because of possible chemical interactions. As noted elsewhere herein, in such circumstances an alumina washer is utilized between the bulb and the cup.

FIGS. 212–213 show a third example of a tall aperture cup. An aperture cup 1221 is substantially identical to the cup 1201 except that the cup 1221 is relatively shorter. For example, the cup 1221 may be 15 mm long.

FIG. 214 is a schematic, cross sectional diagram of an electrodeless lamp utilizing a tall aperture cup. An aperture bulb 1230 utilizes an aperture cup 1211 as described above in connection with FIGS. 210–211. A ceramic washer 1231 is positioned against the shoulder 1213 and defines a light emitting aperture 1233. A bulb 1235 is positioned against the washer 1231 and is otherwise covered by a reflective material 1237. The back of the aperture cup 1201 is sealed with a ceramic plug 1239. The aperture bulb 1230 is positioned inside an excitation coil 1241 with the bulb 1235 approximately centered with respect to the coil 1241. The front of the aperture cup 1211 is in mechanical and thermal contact with a first surface 1243 (e.g. a cover or lid) of the lamp head while the back of the aperture cup 1211 is in mechanical and thermal contact with another surface 1245 (e.g. base) of the lamp head. It may be necessary or desirable to utilize a thermally conductive resilient material between the cup 1211 and the respective surfaces 1243 and 1245 to maintain good contact and to avoid damaging the cup 1211. For example, SIL-PAD 2000 made by the Berquist Company or silicone sponge rubber is a suitable resilient material.

Preferably, and depending on the dielectric constant of the ceramic material, the height of the cup is at least one and one-half to two times the diameter of the excitation coil. This accounts for the height of the bulb and either twice the radius of the coil or twice the diameter of the coil. The thermal conductivity can be increased by increasing the wall thickness of the cup and/or by inserting a high thermal conductivity plug (e.g. plug 1239) in the back of the cup.

Dichroic Coated Aperture Lamps

According to a present aspect of the invention, a conductively cooled aperture lamp includes a bulb bearing a high temperature, high reflectivity dichroic coating (except in the region which defines the aperture) and the coated bulb is encased in high thermal conductivity ceramic. Preferably, the dichroic material is structured to provide high reflectivity over a wide range of angles.

In all of the prior aperture lamps described herein and also in the '940 publication, the bulb is covered with a highly reflective gupping material which requires the gup to provide both good optical properties (e.g. high reflectivity) and good thermal properties (e.g. high thermal conductivity). This limits the choice of suitable materials, especially with respect to the thermal problem. The present aspect of the invention decouples the optical problem from the thermal problem, hereby increasing the range of suitable materials for thermal management of the bulb. Another advantage of the present aspect of the invention is that no gupping is required, thus eliminating a relatively complex manufacturing step.

Dichroic coatings are commercially available which are able to withstand the high operating temperatures of discharge lamps. These coating may be configured to provide good reflectivity in the ultraviolet and visible light regions over a broad range of angles. The present aspect of the invention is an electrodeless bulb covered over its entire exterior surface with a high temperature, high reflectivity dichroic coating, except in the region of a desired light emitting aperture.

By utilizing a high angle reflective coating, relatively high reflectivity may be achieved. For example, it is believed that a dichroic coating may provide a reflectivity in the range of 98%. A small increase in reflectivity can result in significantly more light output. Dichroic coatings are applied by various processes (e.g. sputtering and CVD) which are capable of masking an aperture area to sufficiently high precision. The aperture defined by the dichroic coating has an extremely thin profile and the light emitted therefrom may closely approximate a Lambertian distribution.

Because the dichroic coated bulb provides the entire optical solution, greater flexibility is provided in the choice and configuration of the thermal management of the bulb.

For example, the dichroic coating may provide a satisfactory chemical barrier between the bulb and the bulb heatsink such that boron nitride (BN) may be used for the heatsink material without any further barrier between the BN and the quartz envelope. An alternative heatsink material is aluminum nitride, depending on its affect on coupling energy from the coil to the fill.

In general, it is contemplated that a suitable heatsink for the bulb is made from two pieces which are molded, cast, or machined to provide an internal interference fit with the dichroic coated bulb. Suitable bias forces (e.g. a spring or cantilevered arm) are applied to the two pieces to maintain intimate thermal contact.

FIG. 215 is a schematic, cross sectional view of a first example of a dichroic coated aperture lamp. An aperture lamp 1300 includes a bulb 1301 bearing a high temperature dichroic coating 1303 except in the region of a light emitting aperture 1305. The bulb 1301 is captured between two high thermal conductivity cylindrical ceramic blocks 1307 and 1309. The first block 1307 defines a bore 1311 which is aligned with the aperture 1305. The first block 1307 further defines a hemispherical recess 1313 adapted to provide intimate thermal contact with a first half of the bulb 1301. The second block 1309 is solid except for defining a hemispherical recess 1315 also adapted to provide intimate thermal contact with the other half of the bulb 1301. The two blocks 1307 and 1309 are preferably biased against each other by the lamp head enclosure, metal spring(s), or other high temperature elastic material.

FIG. 216 is a schematic, cross sectional view of a second example of a dichroic coated aperture lamp. An aperture lamp 1320 includes a bulb 1321 bearing a high temperature dichroic coating 1323 except in the region of a light emitting aperture 1325. The bulb 1321 is captured between two high thermal conductivity cylindrical ceramic blocks 1327 and 1329. The first block 1327 is a ceramic cup which defines a first bore 1331 which is aligned with the aperture 1325. The first block 1327 further defines a second bore 1333 which is adapted to receive the bulb 1321 and provide intimate thermal contact with a first half of the bulb 1321. The second block 1329 is solid except for defining a hemispherical recess 1335 also adapted to provide intimate thermal contact with the other half of the bulb 1321. An outer diameter of the second block 1329 is adapted to match an inner diameter of the second bore 1333 of the first block 1327 so that the second block 1329 is slidably received into the first block 1327. The second block 1329 is preferably biased into the first block 1327 by the lamp head enclosure, a metal spring, or other high temperature elastic material.

Contoured Aperture Cups

As described in PCT publication No. WO 99/36940 and herein, an aperture lamp includes a ceramic cup and reflective ceramic material which define the aperture and provide suitable reflective and thermal properties. Typically, a layer of the reflective material is disposed between the bulb and the ceramic cup. The reflective material provides the initial thermal interface and conducts heat from the bulb to the walls of the ceramic cup. According to a present aspect of the invention, the walls of the ceramic cup are shaped to be relatively closer to the shape of the bulb. By contouring the walls of the ceramic cup, the density of the reflective material can be better controlled and the heat conduction path between the bulb and the wall of the ceramic cup is shorter. Preferably, an aperture lamp using this aspect of the invention is made using a centrifuge process such as the process described in the '940 publication.

FIG. 217 is a cross sectional diagram of a first example of an aperture cup with contoured interior walls. An aperture lamp 1400 includes a ceramic cup 1401 having a front flange 1403. The cup 1401 defines an aperture 1405. A bulb 1407 is disposed inside the cup 1401 against the aperture 1405. A reflective material 1409 is disposed around the bulb 1407. According to a present aspect of the invention, an inside wall 1411 of the cup 1401 is shaped to be relatively closer the to bulb 1407 as compared to, for example, the cup 75 illustrated in FIG. 34. Preferably, the wall 1411 matches the contour of the bulb 1407. If made from BN, the cup 1401 further defines a shoulder 1413 adapted to receive an alumina washer 1415 to inhibit reaction between the BN and the bulb 1407.

FIG. 218 is a cross sectional diagram of a second example of an aperture cup with contoured interior walls. The second example is substantially identical to the first example, except that an inside wall 1421 of the cup follows the contour of the bulb 1407 over a relatively larger area of the bulb 1407 and the shoulder 1423 is relatively smaller.

FIG. 219 is a cross sectional diagram of a third example of an aperture cup with contoured interior walls. The third example is substantially identical to the first and second examples, except that an inside wall 1431 of the cup is chamfered instead of curved. The chamfered wall 1431 is relatively closer to the bulb 1407 as compared to a straight wall.

FIG. 220 is a cross sectional diagram of a fourth example of an aperture cup with contoured interior walls. An aperture lamp 1440 includes a ceramic cup 1441 having a cylindrical structure defining a cavity 1443 at one end. The cavity 1443 is adapted to receive a bulb 1447. When the bulb 1447 is disposed in the cavity 1443, the open end of the cavity 1443 extends well beyond the bulb 1447. The bulb 1447 is attached to a light guide 1448. Reflective material 1449 fills the cavity 1443 and covers the bulb 1447, thus defining a light emitting aperture 1445 around the light guide 1448. An inside wall 1451 of the cup 1441 is shaped to be relatively closer the to bulb 1447 as compared to, for example, the cup 75 illustrated in FIG. 34. Preferably, the wall 1451 matches the contour of the bulb 1447. No ceramic washer is necessary, even if the cup 1441 is made from BN. The fourth examples thus combines several features described above including the back cooling feature, the tall cup feature, and the contoured wall feature.

While the invention has been described in connection with what is presently considered to be the preferred examples, it is to be understood that the invention is not limited to the disclosed examples, but on the contrary, is intended to cover various modifications and equivalent arrangements included within the spirit and scope of the inventions.

What is claimed is:

1. An inductively coupled electrodeless lamp, comprising:
   an excitation coil;
   a capacitor structure connected to the excitation coil, the capacitor structure and excitation coil together forming a resonant lamp circuit;
   an electrodeless lamp bulb positioned proximate to the excitation coil, the bulb containing a fill which emits light when excited by RF energy; and
   an RF source connected to the resonant lamp circuit and adapted to provide RF energy for exciting the fill,
   wherein the capacitor structure is adapted to inhibit arcing during operation of the lamp, and
   wherein the capacitor stack comprises a material having a low dielectric constant for the high voltage capacitor.

2. The lamp as recited in claim 1, wherein the capacitor structure comprises a conformal coating covering at least a portion thereof.

3. The lamp as recited in claim 2, wherein the conformal coating covers substantially all of the capacitor structure and a portion of the coil.

4. The lamp as recited in claim 1, wherein the capacitor structure comprises a capacitor stack and wherein the capacitor stack comprises a circular high voltage plate.

5. The lamp as recited in claim 4, wherein the high voltage plate comprises an edge radius which is larger than one half of the plate thickness.

6. An inductively coupled electrodeless lamp, comprising:
   an excitation coil;
   a capacitor structure connected to the excitation coil, the capacitor structure and excitation coil together forming a resonant lamp circuit;
   an electrodeless lamp bulb positioned proximate to the excitation coil, the bulb containing a fill which emits light when excited by RF energy; and
   an RF source connected to the resonant lamp circuit and adapted to provide RF energy for exciting the fill,
   wherein the capacitor structure is adapted to inhibit arcing during operation of the lamp,
   the lamp further comprising a heat transfer structure providing a thermal conduction path from the capacitor structure to a heat dissipating structure.

7. The lamp as recited in claim 1, wherein the capacitor structure comprises a coaxial capacitor circuit, including:
   a first capacitor comprising a first cylindrical sleeve;
   a second capacitor comprising a second cylindrical sleeve disposed at least partially inside the first cylindrical sleeve of the first capacitor, and
   insulators disposed in between the first and second sleeves,
   wherein the first and second capacitors are connected in series with a center conductor being connected at a junction of the series connection.

8. The lamp as recited in claim 1, further comprising:
   an enclosure housing the resonant lamp circuit, the enclosure comprising thermally conductive structures for transferring heat from the lamp circuit,
   and wherein the enclosure comprises substantially flat outer surfaces for interfacing with further heat dissipating structures.

9. The lamp as recited in claim 8, wherein the lamp circuit comprises an excitation coil made from copper.

10. The lamp as recited in claim 8, wherein the enclosure comprises a base portion and a cover, and wherein a thermal gasket is disposed between the cover and the base.

11. The lamp as recited in claim 8, wherein the coil and capacitor structure are integrated in a single assembly, and wherein the capacitor structure comprises a multi-layer printed circuit board adapted to form a capacitor stack.

12. An inductively coupled electrodeless lamp, comprising:
    an excitation coil;
    a capacitor structure connected to the excitation coil, the capacitor structure and excitation coil together forming a resonant lamp circuit;
    an electrodeless lamp bulb positioned proximate to the excitation coil, the bulb containing a fill which emits light when excited by RF energy; and
    an RF source connected to the resonant lamp circuit and adapted to provide RF energy for exciting the fill; and
    a structure encasing the bulb except for a light emitting aperture, the structure comprising a ceramic material configured to promote heat transfer away from the bulb along a thermal path other than radially with respect to an axis of the coil,
    wherein the ceramic material comprises a high thermal conductivity material.

13. The lamp as recited in claim 12, wherein the material exhibits relatively higher thermal conductivity along a direction and wherein the material is adapted such that the direction of higher thermal conductivity is aligned with an axis of the coil.

14. The lamp as recited in claim 13, wherein the material comprises boron nitride.

15. The lamp as recited in claim 12, further comprising an enclosure housing the resonant lamp circuit, and wherein the structure comprises a ceramic cup with a flange, and wherein a resilient, thermally conductive material is disposed between the flange and a heat dissipating structure inside the enclosure.

16. The lamp as recited in claim 12, wherein the structure comprises:
    a ceramic cylindrical rod defining a cavity at one end which is adapted to receive the bulb, wherein the bulb is disposed in the cavity; and
    a ceramic washer defining an aperture and disposed against the bulb, whereby the bulb is cooled from the portion of the bulb opposite from the aperture.

17. The lamp as recited in claim 12, wherein the structure comprises:
    a cylindrical and hollow structure adapted to support a bulb along its axial dimension so that at least a portion of the cylindrical cup extends significantly beyond the bulb in each axial direction.

18. The lamp as recited in claim 12, wherein the bulb bears a high temperature, high reflectivity, and wide angle dichroic coating except in a region which defines the aperture, and wherein the structure comprises a high thermal conductivity ceramic encasing the bulb except for an opening in the region of the aperture.

19. An inductively coupled electrodeless lamp, comprising:

an excitation coil;

a capacitor structure connected to the excitation coil, the capacitor structure and excitation coil together forming a resonant lamp circuit;

an electrodeless lamp bulb positioned proximate to the excitation coil, the bulb containing a fill which emits light when excited by RF energy; and an RF source connected to the resonant lamp circuit and adapted to provide RF energy for exciting the fill, wherein the excitation coil and the capacitor structure are integrated in a single assembly, and wherein the capacitor structure includes a capacitor stack made from a multi-layer printed circuit board.

* * * * *